US008930248B2

(12) United States Patent
Hubert et al.

(10) Patent No.: US 8,930,248 B2
(45) Date of Patent: Jan. 6, 2015

(54) MANAGING CONSISTENT INTERFACES FOR SUPPLY NETWORK BUSINESS OBJECTS ACROSS HETEROGENEOUS SYSTEMS

(75) Inventors: Matthias Hubert, Baiertal (DE); Michael Schweitzer, Leimen (DE); Andreas Huber-Buschbeck, Heiligkreuzsteinach (DE); Sven Hader, Wiesloch (DE); Christian Werner, Heidelberg (DE); Peter Heinemann, Budapest (HU)

(73) Assignee: SAP SE, Walldorf (DE)

(*) Notice: Subject to any disclaimer, the term of this patent is extended or adjusted under 35 U.S.C. 154(b) by 1220 days.

(21) Appl. No.: 12/059,971

(22) Filed: Mar. 31, 2008

(65) Prior Publication Data

US 2009/0248430 A1 Oct. 1, 2009

(51) Int. Cl.
*G06Q 30/06* (2012.01)
*G06Q 10/06* (2012.01)

(52) U.S. Cl.
CPC .............. *G06Q 10/06* (2013.01); *G06Q 10/067* (2013.01)
USPC ............ 705/35; 358/1.13; 370/352; 455/407; 705/3; 705/7; 705/7.22; 705/8; 705/9; 705/10; 705/26; 705/26.2; 705/28; 705/31; 705/39; 705/40; 705/74; 705/76; 709/203; 715/738

(58) Field of Classification Search
None
See application file for complete search history.

(56) References Cited

U.S. PATENT DOCUMENTS

| | | | | |
|---|---|---|---|---|
| 3,223,321 | A | | 12/1965 | Baumgartner |
| 5,126,936 | A | | 6/1992 | Champion et al. |
| 5,210,686 | A | | 5/1993 | Jernigan |
| 5,247,575 | A | | 9/1993 | Sprague et al. |
| 5,255,181 | A | * | 10/1993 | Chapman et al. ............ 705/7.25 |
| 5,321,605 | A | * | 6/1994 | Chapman et al. ............ 705/7.22 |
| 5,463,555 | A | | 10/1995 | Ward et al. |
| 5,787,237 | A | * | 7/1998 | Reilly .......................... 358/1.13 |
| 5,812,987 | A | | 9/1998 | Luskin et al. |
| 5,966,695 | A | | 10/1999 | Melchione et al. |
| 5,970,465 | A | | 10/1999 | Dietrich et al. |
| 5,970,475 | A | | 10/1999 | Barnes et al. |

(Continued)

FOREIGN PATENT DOCUMENTS

| | | |
|---|---|---|
| CN | 1501296 | 6/2004 |
| CN | 1609866 | 4/2005 |

(Continued)

OTHER PUBLICATIONS

Botterweck, Goetz.A Model-Driven Approach to the Engineering of Multiple User Interfaces. Lecture Notes in Computer Science, 2007, vol. 4364/2007, 106-115, DOI: 10.1007/978-3-540-69489-2_4.*

(Continued)

*Primary Examiner* — Robert R Niquette

(74) *Attorney, Agent, or Firm* — Fish & Richardson P.C.

(57) ABSTRACT

A business object model, which reflects data that is used during a given business transaction, is utilized to generate interfaces. This business object model facilitates commercial transactions by providing consistent interfaces that are suitable for use across industries, across businesses, and across different departments within a business during a business transaction. In some operations, software creates, updates, or otherwise processes information related to a supply network plan, a supply network plan configuration and/or a supply network planning aggregate hierarchy business object.

11 Claims, 306 Drawing Sheets

(56) References Cited

U.S. PATENT DOCUMENTS 5,983,284 A 11/1999 Argade
6,047,264 A 4/2000 Fisher et al.
6,058,378 A 5/2000 Clark et al.
6,073,137 A 6/2000 Brown et al.
6,092,196 A 7/2000 Reiche
6,104,393 A 8/2000 Santos-Gomez
6,115,690 A * 9/2000 Wong .......................... 705/7.27
6,125,391 A 9/2000 Meltzer et al.
6,138,118 A 10/2000 Koppstein et al.
6,154,732 A 11/2000 Tarbox
6,222,533 B1 4/2001 Notani et al.
6,226,675 B1 5/2001 Meltzer et al.
6,229,551 B1 5/2001 Huang
6,311,165 B1 10/2001 Coutts et al.
6,327,700 B1 12/2001 Chen et al.
6,331,972 B1 12/2001 Harris et al.
6,332,163 B1 12/2001 Bowman-Amuah
6,424,979 B1 7/2002 Livingston et al.
6,434,159 B1 8/2002 Woodward et al.
6,438,594 B1 8/2002 Bowman-Amuah
6,542,912 B2 4/2003 Meltzer et al.
6,591,260 B1 7/2003 Schwartzhoff et al.
6,725,122 B2 4/2004 Mori et al.
6,738,747 B1 * 5/2004 Tanaka et al. ................ 705/7.22
6,745,229 B1 6/2004 Gobin et al.
6,763,353 B2 7/2004 Li et al.
6,775,647 B1 8/2004 Evans et al.
6,868,370 B1 3/2005 Burbridge et al.
6,937,992 B1 8/2005 Benda et al.
6,970,844 B1 11/2005 Bierenbaum
7,020,594 B1 3/2006 Chacon
7,039,606 B2 5/2006 Hoffman et al.
7,076,449 B2 7/2006 Tsunenari et al.
7,131,069 B1 * 10/2006 Rush et al. .................... 715/738
7,206,768 B1 4/2007 deGroeve et al.
7,249,157 B2 7/2007 Stewart et al.
7,249,195 B2 7/2007 Panec et al.
7,269,569 B2 9/2007 Spira et al.
7,292,965 B1 11/2007 Mehta et al.
7,321,864 B1 1/2008 Gendler
7,363,271 B2 4/2008 Morimoto
7,379,931 B2 5/2008 Morinville
7,383,990 B2 6/2008 Veit
7,406,358 B2 7/2008 Preiss
7,426,520 B2 9/2008 Gorelik et al.
7,481,367 B2 1/2009 Fees et al.
7,509,278 B2 3/2009 Jones
7,515,697 B2 4/2009 Eng et al.
7,516,088 B2 4/2009 Johnson et al.
7,536,697 B2 5/2009 Wiseman et al.
7,574,383 B1 8/2009 Parasnis et al.
7,617,328 B2 11/2009 Lewis et al.
7,627,504 B2 12/2009 Brady et al.
7,634,482 B2 12/2009 Mukherjee et al.
7,689,711 B2 3/2010 Brouk et al.
7,788,319 B2 8/2010 Schmidt et al.
7,805,383 B2 9/2010 Veit et al.
7,853,491 B2 12/2010 Wittmer et al.
7,865,426 B2 1/2011 Volpert
7,873,965 B2 1/2011 Hayton et al.
7,895,209 B2 2/2011 Spence et al.
7,941,236 B2 5/2011 Spearman
8,082,243 B2 12/2011 Gorelik et al.
8,150,798 B2 4/2012 Ma et al.
2001/0042032 A1 11/2001 Crawshaw et al.
2001/0047372 A1 11/2001 Gorelik et al.
2002/0013721 A1 * 1/2002 Dabbiere et al. .................. 705/7
2002/0026394 A1 2/2002 Savage et al.
2002/0046053 A1 4/2002 Hare et al.
2002/0052754 A1 * 5/2002 Joyce et al. ....................... 705/1
2002/0072988 A1 6/2002 Aram
2002/0087481 A1 * 7/2002 Harif ............................... 705/74
2002/0087483 A1 * 7/2002 Harif ............................... 705/76
2002/0099634 A1 7/2002 Coutts et al.
2002/0107765 A1 8/2002 Walker
2002/0112171 A1 8/2002 Ginter et al.
2002/0138318 A1 9/2002 Ellis et al.
2002/0147668 A1 10/2002 Smith et al.
2002/0152104 A1 10/2002 Ojha et al.
2002/0152145 A1 10/2002 Wanta et al.
2002/0156693 A1 10/2002 Stewart et al.
2002/0156930 A1 10/2002 Velasquez
2002/0157017 A1 10/2002 Mi et al.
2002/0169657 A1 11/2002 Singh et al.
2002/0184070 A1 12/2002 Chen et al.
2002/0186876 A1 12/2002 Jones et al.
2002/0194045 A1 12/2002 Shay et al.
2003/0004799 A1 1/2003 Kish
2003/0041178 A1 2/2003 Brouk et al.
2003/0069648 A1 4/2003 Douglas et al.
2003/0086594 A1 5/2003 Gross
2003/0120502 A1 6/2003 Robb et al.
2003/0120665 A1 6/2003 Fox et al.
2003/0126077 A1 7/2003 Kantor et al.
2003/0167193 A1 9/2003 Jones et al.
2003/0171962 A1 9/2003 Hirth et al.
2003/0172007 A1 9/2003 Helmolt et al.
2003/0172135 A1 9/2003 Bobick et al.
2003/0195815 A1 10/2003 Li et al.
2003/0204452 A1 10/2003 Wheeler
2003/0208389 A1 * 11/2003 Kurihara et al. .................. 705/7
2003/0212614 A1 * 11/2003 Chu et al. ........................ 705/28
2003/0216978 A1 11/2003 Sweeney et al.
2003/0220875 A1 11/2003 Lam et al.
2003/0229522 A1 12/2003 Thompson et al.
2003/0229550 A1 12/2003 DiPrima et al.
2003/0233295 A1 * 12/2003 Tozawa et al. .................. 705/28
2003/0236748 A1 12/2003 Gressel et al.
2004/0015366 A1 1/2004 Wiseman et al.
2004/0024662 A1 2/2004 Gray et al.
2004/0034577 A1 2/2004 Van Hoose et al.
2004/0039665 A1 2/2004 Ouchi
2004/0073510 A1 4/2004 Logan
2004/0083201 A1 4/2004 Sholl et al.
2004/0083233 A1 4/2004 Willoughby
2004/0133445 A1 7/2004 Rajan et al.
2004/0138942 A1 7/2004 Pearson et al.
2004/0148227 A1 7/2004 Tabuchi et al.
2004/0172360 A1 9/2004 Mabrey et al.
2004/0186891 A1 9/2004 Panec et al.
2004/0187140 A1 9/2004 Aigner et al.
2004/0220910 A1 11/2004 Zang et al.
2004/0254945 A1 * 12/2004 Schmidt et al. ............... 707/100
2004/0267714 A1 12/2004 Frid et al.
2005/0015273 A1 1/2005 Iyer
2005/0021366 A1 1/2005 Pool et al.
2005/0033588 A1 * 2/2005 Ruiz et al. ......................... 705/1
2005/0038744 A1 2/2005 Viijoen
2005/0049903 A1 3/2005 Raja
2005/0055369 A1 3/2005 Gorelik et al.
2005/0071262 A1 3/2005 Kobeh et al.
2005/0080640 A1 4/2005 Bhaskaran et al.
2005/0108085 A1 5/2005 Dakar et al.
2005/0131947 A1 6/2005 Laub et al.
2005/0159997 A1 7/2005 John
2005/0171833 A1 8/2005 Jost et al.
2005/0182639 A1 8/2005 Dale
2005/0187797 A1 * 8/2005 Johnson ............................ 705/3
2005/0187866 A1 * 8/2005 Lee ................................ 705/39
2005/0194431 A1 9/2005 Fees et al.
2005/0194439 A1 9/2005 Zuerl et al.
2005/0197849 A1 9/2005 Fotteler et al.
2005/0197851 A1 9/2005 Veit
2005/0197878 A1 9/2005 Fotteler et al.
2005/0197881 A1 9/2005 Fotteler et al.
2005/0197882 A1 9/2005 Fotteler et al.
2005/0197886 A1 9/2005 Veit
2005/0197887 A1 9/2005 Zuerl et al.
2005/0197896 A1 9/2005 Veit et al.
2005/0197897 A1 9/2005 Veit et al.
2005/0197898 A1 9/2005 Veit et al.
2005/0197899 A1 9/2005 Veit et al.
2005/0197900 A1 9/2005 Veit
2005/0197901 A1 9/2005 Veit et al.

(56) References Cited

U.S. PATENT DOCUMENTS

2005/0197902 A1 9/2005 Veit
2005/0197928 A1 9/2005 Fotteler et al.
2005/0197941 A1 9/2005 Veit
2005/0209732 A1 9/2005 Audimoolam et al.
2005/0210406 A1 9/2005 Biwer et al.
2005/0216321 A1 9/2005 Veit
2005/0216371 A1 9/2005 Fotteler et al.
2005/0216421 A1 9/2005 Barry et al.
2005/0222888 A1* 10/2005 Hosoda et al. .................... 705/8
2005/0222896 A1* 10/2005 Rhyne et al. .................... 705/10
2005/0222945 A1 10/2005 Pannicke et al.
2005/0228821 A1 10/2005 Gold
2005/0234754 A1 10/2005 Veit
2005/0246240 A1* 11/2005 Padilla ............................ 705/26
2005/0256753 A1 11/2005 Veit et al.
2006/0004934 A1 1/2006 Guldner et al.
2006/0005098 A1 1/2006 Lotz et al.
2006/0020515 A1 1/2006 Lee et al.
2006/0026552 A1 2/2006 Mazzitelli et al.
2006/0026586 A1 2/2006 Remmel et al.
2006/0036941 A1 2/2006 Neil
2006/0047574 A1 3/2006 Sundaram et al.
2006/0047598 A1 3/2006 Hansen
2006/0059005 A1* 3/2006 Horn et al. ........................ 705/1
2006/0059059 A1* 3/2006 Horn et al. ...................... 705/35
2006/0059060 A1* 3/2006 Horn et al. ...................... 705/35
2006/0069598 A1 3/2006 Schweitzer et al.
2006/0069629 A1 3/2006 Schweitzer et al.
2006/0069632 A1 3/2006 Kahn et al.
2006/0074728 A1 4/2006 Schweitzer et al.
2006/0080338 A1 4/2006 Seubert et al.
2006/0085336 A1* 4/2006 Seubert et al. .................. 705/40
2006/0085412 A1 4/2006 Johnson et al.
2006/0085450 A1 4/2006 Seubert et al.
2006/0089885 A1 4/2006 Finke et al.
2006/0095373 A1 5/2006 Venkatasubramanian et al.
2006/0184435 A1 8/2006 Mostowfi
2006/0212376 A1 9/2006 Snyder et al.
2006/0280302 A1 12/2006 Baumann et al.
2006/0282360 A1 12/2006 Kahn et al.
2007/0027742 A1 2/2007 Emuchay et al.
2007/0043583 A1 2/2007 Davulcu et al.
2007/0055688 A1 3/2007 Blattner
2007/0067411 A1 3/2007 Angelov
2007/0078799 A1 4/2007 Huber-Buschbeck et al.
2007/0112574 A1 5/2007 Greene
2007/0124227 A1 5/2007 Dembo et al.
2007/0129978 A1* 6/2007 Shirasu et al. .................... 705/7
2007/0132585 A1 6/2007 Llorca et al.
2007/0150387 A1* 6/2007 Seubert et al. .................. 705/31
2007/0150836 A1 6/2007 Deggelmann et al.
2007/0156428 A1 7/2007 Brecht-Tillinger et al.
2007/0156545 A1 7/2007 Lin
2007/0156552 A1 7/2007 Manganiello
2007/0156690 A1 7/2007 Moser et al.
2007/0165622 A1 7/2007 O'Rourke et al.
2007/0214065 A1* 9/2007 Kahlon et al. .................. 705/28
2007/0225949 A1 9/2007 Sundararajan et al.
2007/0226090 A1 9/2007 Stratton
2007/0255639 A1 11/2007 Seifert
2007/0265860 A1 11/2007 Herrmann et al.
2007/0265862 A1 11/2007 Freund et al.
2007/0288250 A1 12/2007 Lemcke et al.
2007/0294159 A1 12/2007 Cottle
2008/0005012 A1 1/2008 Deneef
2008/0016242 A1 1/2008 Panec et al.
2008/0021754 A1* 1/2008 Horn et al. ........................ 705/8
2008/0040243 A1 2/2008 Chang et al.
2008/0046104 A1 2/2008 Van Camp et al.
2008/0046421 A1 2/2008 Bhatia et al.
2008/0120129 A1 5/2008 Seubert et al.
2008/0120190 A1 5/2008 Joao et al.
2008/0120204 A1* 5/2008 Conner et al. .................. 705/28
2008/0120313 A1 5/2008 O'Brien et al.
2008/0133303 A1 6/2008 Singh et al.
2008/0154969 A1 6/2008 DeBie
2008/0162266 A1 7/2008 Griessmann et al.
2008/0184265 A1 7/2008 Kasi et al.
2008/0196108 A1 8/2008 Dent et al.
2008/0215354 A1 9/2008 Halverson et al.
2008/0243578 A1 10/2008 Veit
2008/0288317 A1 11/2008 Kakar
2009/0006203 A1 1/2009 Fordyce et al.
2009/0063287 A1 3/2009 Tribout et al.
2009/0077074 A1 3/2009 Hosokawa
2009/0089198 A1 4/2009 Kroutik
2009/0094274 A1 4/2009 Gorelik et al.
2009/0164497 A1 6/2009 Steinmaier et al.
2009/0192926 A1 7/2009 Tarapata
2009/0193432 A1 7/2009 McKegney et al.
2009/0222360 A1 9/2009 Schmitt et al.
2009/0248429 A1 10/2009 Doenig et al.
2009/0248430 A1 10/2009 Hubert et al.
2009/0248431 A1 10/2009 Schoknecht et al.
2009/0248463 A1 10/2009 Piochon et al.
2009/0248473 A1 10/2009 Doenig et al.
2009/0248487 A1 10/2009 Santoso et al.
2009/0248547 A1 10/2009 Doenig et al.
2009/0248558 A1 10/2009 Hollberg et al.
2009/0248586 A1 10/2009 Kaisermayr et al.
2009/0248698 A1 10/2009 Rehmann
2009/0249358 A1 10/2009 Schuette
2009/0249362 A1 10/2009 Lindemann et al.
2009/0271245 A1 10/2009 Joshi et al.
2009/0300578 A1 12/2009 Neil
2009/0326988 A1 12/2009 Barth et al.
2009/0327009 A1 12/2009 Schmitt et al.
2009/0327105 A1 12/2009 Moussa et al.
2009/0327106 A1 12/2009 Bartelt et al.
2010/0001834 A1 1/2010 Brunswig et al.
2010/0014510 A1* 1/2010 Boreli et al. .................. 370/352
2010/0070391 A1 3/2010 Storr et al.
2010/0070395 A1 3/2010 Elkeles et al.
2010/0106555 A1 4/2010 Mneimneh et al.
2010/0131379 A1 5/2010 Dorais et al.
2010/0131394 A1 5/2010 Rutsch et al.
2010/0153297 A1 6/2010 Haaf et al.
2010/0161425 A1 6/2010 Sideman
2010/0217820 A1 8/2010 Brouk et al.
2010/0218245 A1 8/2010 Brouk et al.
2010/0241729 A1 9/2010 Angelov
2010/0306536 A1 12/2010 Brouk et al.
2011/0046775 A1 2/2011 Bailey et al.
2011/0077999 A1 3/2011 Becker et al.
2011/0078048 A1 3/2011 Becker et al.
2011/0153767 A1 6/2011 Coldicott et al.
2011/0276636 A1 11/2011 Cheng et al.

FOREIGN PATENT DOCUMENTS

CN 1632806 6/2005
CN 1765138 4/2006
CN 1767537 5/2006
CN 101174957 5/2008
CN 101288092 10/2008
WO WO 2008//005102 * 1/2008

OTHER PUBLICATIONS

He, Ning et al.; "B2B Contract Implementation Using Windows DNS"; 2001; pp. 71-79.

FSML-Financial Services Markup Language (Jul. 14, 1999) http://xml.coverpages.org/FSML-v1500a.pdf; pp. 1-159.

Webster's Revised Unabridged Dictionary (1913+1828); Def. "merchandise".

Statement in Accordance with the Notice from the European Patent Office dated Oct. 1, 2007 Concerning Business Methods—EPC ; Official Journal of the European Patent Office; Munich; Nov. 1, 2007; pp. 592-593.

Lynn, Chris; "Sony Enters Brand Asset Management Market"; The Seybold Report; Analyzing Publishing Technologies; Aug. 4, 2004; <www.Seybold365.com>; 3 pages.

(56) References Cited

OTHER PUBLICATIONS

Office Action issued in related U.S. Appl. No. 11/640,422 on Apr. 2, 2009; 13 pages.
Office Action issued in related U.S. Appl. No. 11/640,422 on Dec. 30, 2009; 9 pages.
Office Action issued in related U.S. Appl. No. 11/803,178 on Jun. 29, 2009; 5 pages.
Office Action issued in related U.S. Appl. No. 11/803,178 on Mar. 4, 2010; 43 pages.
Office Action issued in related U.S. Appl. No. 11/775,821 on Jan. 22, 2010; 16 pages.
Office Action issued in related U.S. Appl. No. 11/364,538 on Aug. 4, 2009; 5 pages.
Office Action issued in related U.S. Appl. No. 11/364,538 on Mar. 4, 2010; 40 pages.
Office Action issued in related U.S. Appl. No. 11/731,857 on May 15, 2009; 11 pages.
Office Action issued in related U.S. Appl. No. 11/731,857 on Feb. 4, 2010; 22 pages.
Office Action issued in related U.S. Appl. No. 11/864,786 on Jun. 22, 2009; 7 pages.
Office Action issued in related U.S. Appl. No. 11/864,786 on Mar. 3, 2010; 12 pages.
Office Action issued in related U.S. Appl. No. 11/864,832 on Sep. 18, 2009; 14 pages.
Notice of Allowance issued in related U.S. Appl. No. 11/864,832 on Mar. 24, 2010; 11 pages.
Office Action issued in related U.S. Appl. No. 12/059,867 on Aug. 18, 2009; 37 pages.
Office Action issued in related U.S. Appl. No. 12/059,867 on Feb. 22, 2010; 24 pages.
Office Action issued in related U.S. Appl. No. 12/060,178 on Dec. 7, 2009; 6 pages.
Office Action issued in related U.S. Appl. No. 12/060,171 on Aug. 11, 2009; 11 pages.
Office Action issued in related U.S. Appl. No. 12/060,171 on Mar. 19, 2010; 10 pages.
Office Action issued in related U.S. Appl. No. 11/145,464 on Aug. 5, 2009; 31 pages.
Office Action issued in related U.S. Appl. No. 11/145,464 on Feb. 5, 2010; 57 pages.
Office Action issued in related U.S. Appl. No. 11/155,368 on May 14, 2009; 6 pages.
Office Action issued in related U.S. Appl. No. 11/155,368 on Dec. 10, 2009; 43 pages.
Office Action issued in related U.S. Appl. No. 11/166,065 on Jun. 24, 2009; 6 pages.
Office Action issued in related U.S. Appl. No. 11/166,065 on Mar. 3, 2010; 25 pages.
Communication Pursuant to Article 94(3) EPC issued in related European Application No. 05757432.9 on Jan. 26, 2009; 4 pages.
Supplementary European Search Report issued in related European Application No. 05823434.5 on Sep. 28, 2009; 3 pages.
Supplementary European Search Report issued in related European Application No. 05766672.9 on Oct. 6, 2009; 3 pages.
"Header", Newton's Telecom Dictionary; 12th Edition, 2004; pp. 389-390).
Office Action issued in U.S. Appl. No. 11/640,422 on May 14, 2010; 12 pages.
Notice of Allowance issued in related U.S. Appl. No. 11/775,821 on Jul. 16, 2010; 4 pages.
Office Action issued in related U.S. Appl. No. 11/864,871 on Apr. 21, 2010; 20 pages.
Office Action issued in related U.S. Appl. No. 12/060,178 on May 25, 2010; 19 pages.
Office Action issued in related U.S. Appl. No. 12/060,171 on Jul. 1, 2010; 19 pages.
Advisory Action issued in U.S. Appl. No. 11/155,368 on Mar. 31, 2010; 3 pages.
SAP Structured Entity Relationship Model (SAP-SERM) for R/3 System Release 4.0 Introduction and Index; Dec. 1998; 26 pages.
SAP Structured Entity Relationship Model (SAP-SERM) for R/3 System Release 4.0 (Part 1); Dec. 1998; 5954 pages.
SAP Structured Entity Relationship Model (SAP-SERM) for R/3 System Release 4.0 (Part 2); Dec. 1998; 7838 pages.
Zencke, Peter; "Engineering a Business Platform"; SAP AG 2005; Engineering BPP; [Online] previously available at URL www.sap.com/community/pub/webcast/2006_01_16_Analyst_Summit_Vegas/2006_01_16_Analyst_Summit_Vegas_009.pdf ; 36 pages.
"UML in the .com Enterprise. Modeling CORBA, Components, XML/XMI and Metadata Workshop"; http://www.omg.org/news/meetings/workshops/uml_presentations.htm.
Medjahed, Brahim et al; "Business-to-Business Interactions: Issues and Enabling Technologies"; The VLDB Journal; vol. 12, No. 1; Apr. 3, 2003; pp. 59-89.
Medjahed, Brahim et al.; "Composing Web Services on the Semantic Web"; The VLDB Journal; vol. 12, No. 4, Sep. 23, 2003; pp. 333-351.
Born, Marc et al.; "Customizing UML for Component Design"; www.dot-profile.de; UML Workshop, Palm Springs, CA; Nov. 2000.
Kappel, Gerti et al.; "A Framework for Workflow Management Systems Based on Objects, Rules, and Roles"; ACM Computing Surveys; ACM Press; vol. 32; Mar. 2000; 5 pages.
Skonnard, Aaron et al.; "BizTalk Server 2000: Architecture and Tools for Trading Partner Integration"; MSDn Magazine; 2000; ms- help://ms.msdnqtr.2003apr.1033/dnmag00/htmal/biztalk.htm; 7 pages.
Microsoft; "Creating an XML Web Service Proxy"; 2001; mshelp://ms.msdnqtr.2003apr.1033/cpguide/html/cpconcreatingwebserviceproxy.htm; 3 pages.
Proceedings of OMG Workshops; http://www.omg.org/news/meetings/workshops/proceedings.htm; pp. 1-3.
Meltzer, Bart et al.; "XML and Electronic Commerce: Enabling the Network Economy"; SIGMOD Record; ACM Press; vol. 27, No. 4; Dec. 1998; pp. 21-24.
Huhns, Michael N. et al.; "Automating Supply-Chain Mangement"; Jul. 15-19, 2002; pp. 1017-1024.
Soederstroem, Eva; "Standardising the Business Vocabulary of Standards"; SAC, Madrid, Spain; 2002; pp. 1048-1052.
Bastide, Remi et al.; "Formal Specification of CORBA Services: Experience and Lessons Learned"; 2000; pp. 105-117.
Glushko, Robert J. et al.; "An XML Framework for Agent-Based E-Commerce"; Communications of the ACM; vol. 42, No. 3; Mar. 1999; pp. 106-114.
Coen-Porisini, Alberto et al.; "A Formal Approach for Designing CORBA-Based Applications"; ACM Transactions on Software Engineering and Methodology; vol. 12, No. 2; Apr. 2003; pp. 107-151.
Yang, J. et al.; "Service Deployment for Virtual Enterprises"; IEEE; 2001; pp. 107-115.
Karp, Alan H.; "E-speak E-xplained"; Communications of the ACM; vol. 46, No. 7; Jul. 2003; pp. 113-118.
Gillibrand, David; "Essential Business Object Design"; Communications of the ACM; vol. 43, No. 2; Feb. 2000; pp. 117-119.
Cole, James et al.; "Extending Support for Contracts in ebXML"; IEEE; 2001; pp. 119-127.
DiNitto, Elisabetta et al.; "Deriving Executable Process Descriptions from UML"; ICSE '02; May 19-25, 2002; pp. 155-165.
Stumptner, Markus et al.; "On the Road to Behavior-Based Integration"; First Asia-Pacific Conferences on Conceptual Modelling; Dunedin, New Zealand; Jan. 2004; pp. 15-22.
Gosain, Sanjay et al.; "The Impact of Common E-Business Interfaces"; Communications of the ACM; vol. 46, No. 2; Dec. 2003; pp. 186-195.
Damodaran, Suresh; "B2B Integration over the Internet with XML—RosettaNet Successes and Challenges"; WWW2004; May 17-22, 2004; pp. 188-195.
Schulze, Wolfgang et al.; "Standardising on Workflow-Management—The OMG Workflow Management Facility"; SIGGROUP Bulletin; vol. 19, No. 1; Apr. 1998; pp. 24-30.
Sutherland, Jeff; "Business Objects in Corporate Information Systems"; ACM Computing Surveys; vol. 27, No. 2; Jun. 1995; pp. 274-276.

(56) References Cited

OTHER PUBLICATIONS

Arsanjani, Ali; "Developing and Integrating Enterprise Components and Services"; Communications of the ACM; vol. 45, No. 10; Oct. 2002; pp. 31-34.
Kim, Dan Jong et al.; "A Comparison of B2B E-Service Solutions"; Communications of the ACM; vol. 46, No. 12; Dec. 2003; pp. 317-324.
Hasselbring, Wilhelm; "Information System Integration"; Communications of the ACM; vol. 43, No. 6; Jun. 2000; pp. 33-38.
Khosravi, Navid et al.; "An Approach to Building Model Driven Enterprise Systems in Nebras Enterprise Framework"; OOPSLA '02: Companion of the 17th Annual ACM SIGPLAN Conference on Object-Oriented Programming, Systems, Languages, and Applications; Nov. 4-8, 2002; pp. 32-33.
Hogg, K. et al.; "An Evaluation of Web Services in the Design of a B2B Application"; 27th Australasian Computer Science Conference; Dunedin, New Zealand; 2004; pp. 331-340.
Gruhn, Volker et al.; "Workflow Management Based on Process Model Repositories"; IEEE 1998; pp. 379-388.
Kim, HyoungDo; "Conceptual Modeling and Specification Generation for B2B Business Processes Based on ebXML"; SIGMOD Record; vol. 31, No. 1; Mar. 2002; pp. 37-42.
Siegel, Jon; "OMG Overview: CORBA and the OMA in Enterprise Computing"; Communications of the ACM; vol. 41, No. 10; Oct. 1998; pp. 37-43.
Yang, Jian et al.; "Interoperation Support for Electronic Business"; Communications of the ACM; vol. 43, No. 6; Jun. 2000; pp. 39-47.
Levi, Keith et al.; "A Goal-Driven Approach to Enterprise Component Identification and Specification"; Communications of the ACM; vol. 45, No. 10; Oct. 2002; pp. 45-52.
Terai, Koichi et al.; "Coordinating Web Services Based on Business Models"; 2003; pp. 473-478.
Aversano, Lerina et al.; "Introducing eServices in Business Process Models"; SEKE '02; Ischia Italy; Jul. 15-19, 2002; pp. 481-488.
Quix, Christoph et al.; "Business Data Management for Business-to-Business Electronic Commerce"; SIGMOD Record; vol. 31, No. 1; Mar. 2002; pp. 49-54.
Sutherland, Jeff; "Why I Love the OMG: Emergence of a Business Object Component Architecture"; StandardView; vol. 6, No. 1; Mar. 1998; pp. 4-13.
Dogac, Asuman et al.; "An ebXML Infrastructure Implementation through UDDI Registries and RosettaNet PIPs"; ACM SIGMOD; Madison, Wisconsin; Jun. 4-6, 2002; pp. 512-523.
Lee, Jinyoul et al.; "Enterprise Integration with ERP and EAI"; Communications of the ACM; vol. 46, No. 2; Feb. 2003; pp. 54-60.
Bratthall, Lars G. et al.; "Integrating Hundreds of Products through One Architecture—The Industrial IT Architecture"; ICSE '02; Orlando, Florida; May 19-25, 2002; pp. 604-614.
Fingar, Peter; "Component-Based Frameworks for E-Commerce"; Communications of the ACM; vol. 43, No. 10; Oct. 2000; pp. 61-66.
Sprott, David; "Componentizing the Enterprise Application Packages"; Communications of the ACM; vol. 43, No. 4; Apr. 2000; pp. 63-69.
Gokhale, Aniruddha et al.; "Applying Model-Integrated Computing to Component Middleware and Enterprise Applications"; Communications of the ACM; vol. 45, No. 10; Oct. 2002; pp. 65-70.
Bussler, Christoph; "The Role of B2B Engines in B2B Integration Architectures"; SIGMOD Record; vol. 31, No. 1; Mar. 2002; pp. 67-72.
Fremantle, Paul et al.; "Enterprise Services"; Communications of the ACM; vol. 45, No. 10; Oct. 2002; pp. 77-79.
Trastour, David et al.; "Semantic Web Support for the Business-to-Business E-Commerce Lifecycle"; WWW2002, Honolulu, Hawaii; May 7-11, 2002; pp. 89-98.
Jaeger, Dirl et al.; "Using UML for Software Process Modeling"; pp. 91-108.
Han, Zaw Z. et al.; "Interoperability from Electronic Commerce to Litigation Using XML Rules"; 2003; pp. 93-94.
Carlson, David A.; "Designing XML Vocabularies with UML"; OOPSLA 2000 Companion; Minneapolis, Minnesota; 2000; pp. 95-96.
Stonebraker, Michael; "Too Much Middleware"; SIGMOD Record; vol. 31, No. 1; Mar. 2002; pp. 97-106.
Maamar, Zakaria et al.; "Toward Intelligent Business Objects"; Communications of the ACM; vol. 43, No. 10; Oct. 2000; pp. 99-101.
Tenenbaum, Jay M. et al.; "Eco System: An Internet Commerce Architecture"; IEEE; May 1997; pp. 48-55.
Eyal, Anat et al.; "Integrating and Customizing Heterogeneous E-Commerce Applications"; The VLDB Journal; Aug. 2001; pp. 16-38.
Office Action issued in related U.S. Appl. No. 11/145,464 on Jan. 22, 2009; 49 pages.
International Search Report and Written Opinion of the International Searching Authority issued in International Application No. PCT/US2007/011378 on Apr. 30, 2008; 17 pages.
International Preliminary Report on Patentability under Chapter I issued in International Application No. PCT/US2007/011378 on Nov. 17, 2008; 11 pages.
International Search Report and Written Opinion of the International Searching Authority issued in International Application No. PCT/IB2006/001401 on Aug. 27, 2008; 8 pages.
International Search Report and Written Opinion of the International Searching Authority issued in International Application No. PCT/US2005/019961 on Sep. 22, 2005; 8 pages.
International Preliminary Report on Patentability under Chapter I issued in International Application No. PCT/US2005/019961 on Dec. 4, 2006; 6 pages.
International Search Report and Written Opinion of the International Searching Authority issued in International Application No. PCT/US2005/021481 on Apr. 11, 2006; 7 pages.
International Search Report and Written Opinion of the International Searching Authority issued in International Application No. PCT/US2005/021481 on May 29, 2007; 6 pages.
International Preliminary Report on Patentability under Chapter I issued in International Application No. PCT/US2005/021481 on Dec. 20, 2006; 6 pages.
International Preliminary Report on Patentability under Chapter I issued in International Application No. PCT/US2005/021481 on Jul. 15, 2008; 5 pages.
International Search Report and Written Opinion of the International Searching Authority issued in International Application No. PCT/US2005/022137 on Sep. 23, 2005; 7 pages.
International Search Report and Written Opinion of the International Searching Authority issued in International Application No. PCT/US2005/022137 on May 12, 2006; 7 pages.
International Preliminary Report on Patentability under Chapter I issued in International Application No. PCT/US2005/022137 on Dec. 28, 2006; 5 pages.
Office Action issued in related U.S. Appl. No. 12/060,155 on May 10, 2011; 8 pages.
SAP; "BC-Central Maintenance and Transport Objects"; Release 4.6C; Apr. 200; 15 pages.
Annevelink et al.; "Heterogeneous Database Intergration in a Physician Workstation"; 1992; 5 pages.
Ketabchi et al.; "Object-Oriented Database Management Support for Software Maintenance and Reverse Engineering"; Department of Electrical Engineering and Computer Science, Santa Clara University; 1989; 4 pages.
Diehl et al.; "Service Architecture for an Object-Oriented Next Generation Profile Register"; date unknown; 8 pages.
Communication Pursuant to Article 94(3) issued in European Application No. 05757432.9 on Apr. 12, 2011; 5 pages.
Notice of Allowance issued in U.S. Appl. No. 12/147,395 on May 4, 2011; 10 pages.
Office Action issued in related U.S. Appl. No. 12/334,175 on May 27, 2011; 12 pages.
Office Action issued in U.S. Appl. No. 12/147,378 on Jun. 17, 2011; 10 pages.
Office Action issued in related U.S. Appl. No. 12/060,054 on Jun. 29, 2011; 15 pages.

(56) References Cited

OTHER PUBLICATIONS

Office Action issued in U.S. Appl. No. 12/060,144 on Jun. 23, 2011; 16 pages.
Office Action issued in related U.S. Appl. No. 12/059,860 on Aug. 3, 2011; 15 pages.
Office Action issued in related U.S. Appl. No. 12/060,062 on Jul. 13, 2011; 16 pages.
Notice of Allowance issued in related U.S. Appl. No. 11/864,866 on Jul. 22, 2011; 6 pages.
Notice of Allowance issued in related U.S. Appl. No. 11/364,538 on Jul. 26, 2011; 6 pages.
Office Action issued in U.S. Appl. No. 11/864,811 on Jul. 26, 2011; 7 pages.
Notice of Allowance issued in related U.S. Appl. No. 11/864,832 on Jul. 7, 2011;11 pages.
Office Action issued in related U.S. Appl. No. 11/864,863 on Jul. 21, 2011; 29 pages.
Notice of Allowance issued in related U.S. Appl. No. 11/803,178 on May 17, 2011; 13 pages.
Newton's Telecom Dictionary; 18th Edition; 2002; pp. 347, 454.
Notice of Allowance issued in related U.S. Appl. No. 12/147,395 on Oct. 26, 2010; 10 pages.
Office Action issued in related U.S. Appl. No. 12/147,399 on Jan. 26, 2011; 16 pages.
Notice of Allowance issued in related U.S. Appl. No. 11/775,821 on Oct. 22, 2010; 4 pages.
Notice of Allowance issued in related U.S. Appl. No. 11/775,821 on Feb. 4, 2011; 4 pages.
Notice of Allowance issued in related U.S. Appl. No. 11/864,832 on Aug. 23, 2010; 4 pages.
Notice of Allowance issued in related U.S. Appl. No. 11/864,832 on Dec. 3, 2010; 9 pages.
Notice of Allowance issued in related U.S. Appl. No. 11/364,538 on Dec. 13, 2010; 5 pages.
Notice of Allowance issued in related U.S. Appl. No. 11/731,857 on Nov. 29, 2010; 4 pages.
Office Action issued in related U.S. Appl. No. 11/864,871 on Oct. 1, 2010; 30 pages.
Office Action issued in related U.S. Appl. No. 12/060,149 on Aug. 26, 2010; 15 pages.
Office Action issued in related U.S. Appl. No. 12/060,149 on Feb. 4, 2011; 19 pages.
Notice of Allowance issued in related U.S. Appl. No. 12/060,178 on Dec. 6, 2010; 4 pages.
Office Action issued in related U.S. Appl. No. 12/060,171 on Jan. 26, 2011; 17 pages.
Notice of Allowance issued in related U.S. Appl. No. 11/145,464 on Nov. 1, 2010; 4 pages.
Notice of Allowance issued in U.S. Appl. No. 11/155,368 on Oct. 7, 2010; 4 pages.
Notice of Allowance issued in related U.S. Appl. No. 11/166,065 on Sep. 20, 2010; 6 pages.
Office Action issued in related U.S. Appl. No. 11/864,866 on Feb. 3, 2011; 20 pages.
Baker, Stacy; "Benefits of Assortment Planning"; Assortment Planning for Apparel Retailers—2005 Management Briefing; Just Style; Jun. 2005; 3 pages.
"Visual and Quantitative Assortment Planning Applications Drive Partnership and Profit"; PR Newswire; Jan. 12, 2006; 3 pages.
"DOTS Inc. Selects Compass Software's smartmerchandising for Merchandise Planning and Assortment Planning"; PR Newswire; Dec. 11, 2002; 2 pages.
Notice of Allowance issued in related U.S. Appl. No. 12/147,449 on Apr. 28, 2011; 9 pages.
Notice of Allowance issued in related U.S. Appl. No. 11/731,857 on Apr. 11, 2011; 8 pages.
Notice of Allowance issued in U.S. Appl. No. 12/323,139 on Mar. 4, 2011; 13 pages.
Office Action issued in related U.S. Appl. No. 12/059,804 on Apr. 28, 2011; 14 pages.
Office Action issued in related U.S. Appl. No. 12/060,192 on Apr. 14, 2011; 18 pages.
Notice of Allowance issued in related U.S. Appl. No. 11/145,464 on Feb. 23, 2011; 7 pages.
Notice of Allowance issued in U.S. Appl. No. 11/155,368 on Mar. 14, 2011; 7 pages.
Notice of Allowance issued in U.S. Appl. No. 11/166,065 on Mar. 8, 2011; 5 pages.
Office Action issued in U.S. Appl. No. 12/147,414 on Apr. 14, 2011; 30 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.
International Search Report and Written Opinion of the International Searching Authority issued in International Application No. PCT/CN2010/073868 on Mar. 17, 2011; 10 pages.
Office Action issued in U.S. Appl. No. 11/864,811 on Mar. 18, 2011; 10 pages.
Communication Pursuant to Rules 70(2) and 70a(2) EPC issued in related European Application No. 07835755.5 on Feb. 28, 2011; 6 pages.
Altintas et al.; "Aurora Software Product Line"; Cybersoft Information Technologies Co.; 2005; pp. 1-8.
Gable, Julie; "Enterprise Application Integration"; Information Management Journal; Mar./Apr. 2002; pp. 48-52.
Himoff et al.; "MAGENTA Technology: Multi-Agent Systems for Industrial Logistics"; AAMAS'05; Jul. 25-29, 2005; 2005 ACM; pp. 60-66:1-7).
Lockemann et al.; "Flexibility through Multi-Agent Systems: Solutions or Illusions"; SOFSEM 2004; pp. 41-56.
Mascolo et al.; "An Analytical Method for Performance Evaluation of Kanban Controlled Production Systems"; Operations Research; vol. 44, No. 1; 1996; pp. 50-64.
SAP 2008 Annual Report; 256 pages.
"SAP Labs and HP Team to Advance Internet-Based Supply Chain Collaboration"; Business Editors and Technology Writers; Business Wire; New York; Feb. 3, 2000; 4 pages.
Shi, Min-Hua et al.; "MQML-Message Queuing Markup Language"; Proceedings of the 4th IEEE International Workshop on Advanced Issues of E-Commerce and Web-Based Information Systems (WECWIS 2002); 2002; 8 pages.
Communication Pursuant to Article 94(3) EPC issued in European Application No. 07835755.5 on Feb. 22, 2012; 7 pages.
Communication Pursuant to Article 94(3) issued in European Application No. 05766672.9 on Jul. 14, 2011; 4 pages.
International Search Report and Written Opinion issued in International Application No. PCT/CN2011/001238 on May 3, 2012; 9 pages.
Notice of Allowance issued in related U.S. Appl. No. 11/864,866 on Mar. 13, 2012; 7 pages.
Notice of Allowance issued in related U.S. Appl. No. 12/060,178 on Sep. 2, 2011; 9 pages.
Notice of Allowance issued in related U.S. Appl. No. 11/145,464 on Feb. 6, 2012; 7 pages.
Notice of Allowance issued in related U.S. Appl. No. 11/364,538 on Jul. 23, 2012; 7 pages.
Notice of Allowance issued in related U.S. Appl. No. 11/731,857 on Dec. 14, 2011; 7 pages.
Notice of Allowance issued in related U.S. Appl. No. 11/803,178 on Jul. 17, 2012; 15 pages.
Notice of Allowance issued in related U.S. Appl. No. 11/864,832 on Jan. 9, 2012; 12 pages.
Notice of Allowance issued in related U.S. Appl. No. 11/864,832 on Jul. 30, 2012; 12 pages.
Notice of Allowance issued in U.S. Appl. No. 11/155,368 on Jul. 23, 2012; 7 pages.
Notice of Allowance issued in U.S. Appl. No. 11/155,368 on Nov. 8, 2011; 7 pages.
Notice of Allowance issued in U.S. Appl. No. 11/166,065 on Feb. 15, 2012; 7 pages.

(56) References Cited

OTHER PUBLICATIONS

Notice of Allowance issued in U.S. Appl. No. 11/640,422 on May 22, 2012; 7 pages.
Notice of Allowance issued in U.S. Appl. No. 11/640,422 on Sep. 29, 2011; 7 pages.
Notice of Allowance issued in U.S. Appl. No. 11/775,821 on Dec. 30, 2011; 5 pages.
Notice of Allowance issued in U.S. Appl. No. 11/775,821 on Sep. 21, 2011; 5 pages.
Notice of Allowance issued in U.S. Appl. No. 11/864,811 on Mar. 2, 2012; 8 pages.
Notice of Allowance issued in U.S. Appl. No. 11/864,811 on Nov. 14, 2011; 8 pages.
Notice of Allowance issued in U.S. Appl. No. 12/060,062 on Mar. 20, 2012; 16 pages.
Notice of Allowance issued in U.S. Appl. No. 12/060,155 on Apr. 24, 2012; 15 pages.
Notice of Allowance issued in U.S. Appl. No. 12/060,192 on Mar. 2, 2012; 18 pages.
Notice of Allowance issued in U.S. Appl. No. 12/147,378 on Aug. 31, 2012; 9 pages.
Notice of Allowance issued in U.S. Appl. No. 12/147,378 on Nov. 9, 2011; 16 pages.
Notice of Allowance issued in U.S. Appl. No. 12/323,116 on Jun. 11, 2012; 10 pages.
Notice of Allowance issued in U.S. Appl. No. 12/323,139 on Mar. 14, 2012; 10 pages.
Notice of Allowance issued in U.S. Appl. No. 12/571,140 on Mar. 20, 2012; 16 pages.
Notice of Allowance issued in U.S. Appl. No. 12/815,618 on May 10, 2012; 7 pages.
Office Action issued in related U.S. Appl. No. 11/864,863 on Dec. 22, 2011; 20 pages.
Office Action issued in related U.S. Appl. No. 12/059,860 on Jan. 23, 2012; 16 pages.
Office Action issued in related U.S. Appl. No. 12/060,054 on Dec. 7, 2011; 15 pages.
Office Action issued in related U.S. Appl. No. 12/060,155 on Oct. 31, 2011; 15 pages.
Office Action issued in related U.S. Appl. No. 12/060,171 on Mar. 1, 2012; 19 pages.
Office Action issued in related U.S. Appl. No. 12/060,192 on Sep. 6, 2011; 18 pages.
Office Action issued in U.S. Appl. No. 11/864,786 on Mar. 30, 2012; 12 pages.
Office Action issued in U.S. Appl. No. 12/059,804 on Nov. 14, 2011; 15 pages.
Office Action issued in U.S. Appl. No. 12/060,144 on Dec. 8, 2011; 18 pages.
Office Action issued in U.S. Appl. No. 12/147,414 on Oct. 26, 2011; 27 pages.
Office Action issued in U.S. Appl. No. 12/323,116 on Jan. 27, 2012; 7 pages.
Office Action issued in U.S. Appl. No. 12/323,116 on Sep. 6, 2011; 8 pages.
Office Action issued in U.S. Appl. No. 12/571,140 on Sep. 26, 2011; 14 pages.
Office Action issued in U.S. Appl. No. 12/571,154 on Apr. 2, 2012; 13 pages.
Office Action issued in U.S. Appl. No. 12/571,154 on Aug. 15, 2012; 15 pages.
Office Action issued in U.S. Appl. No. 12/815,618 on Dec. 22, 2011; 8 pages.
Office Action issued in U.S. Appl. No. 12/815,639 on May 24, 2012; 7 pages.
Office Action issued in U.S. Appl. No. 12/815,698 on Jan. 20, 2012; 10 pages.
Office Action issued in U.S. Appl. No. 12/815,698 on Jul. 20, 2012; 13 pages.
Office Action issued in U.S. Appl. No. 12/815,802 on Jul. 20, 2012; 16 pages.
Office Action issued in U.S. Appl. No. 12/816,083 on May 9, 2012; 20 pages.
Office Action issued in U.S. Appl. No. 12/816,170 on Jul. 24, 2012; 9 pages.
Office Action issued in U.S. Appl. No. 12/816,293 on Apr. 25, 2012; 10 pages.
Office Action issued in U.S. Appl. No. 13/192,543 on Aug. 28, 2012; 14 pages.
Office Action issued in U.S. Appl. No. 13/192,555 on Jul. 20, 2012; 7 pages.
Office Action issued in U.S. Appl. No. 13/349,477 on Jun. 29, 2012; 13 pages.

* cited by examiner

FIG. 27E
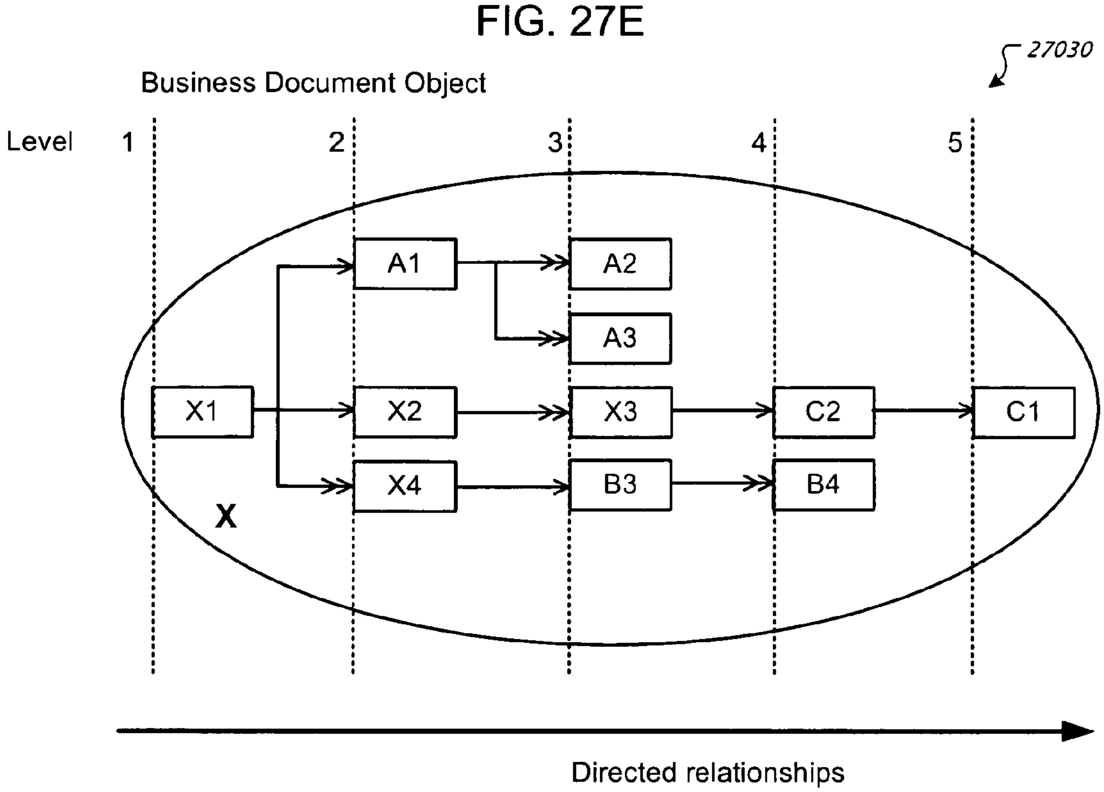
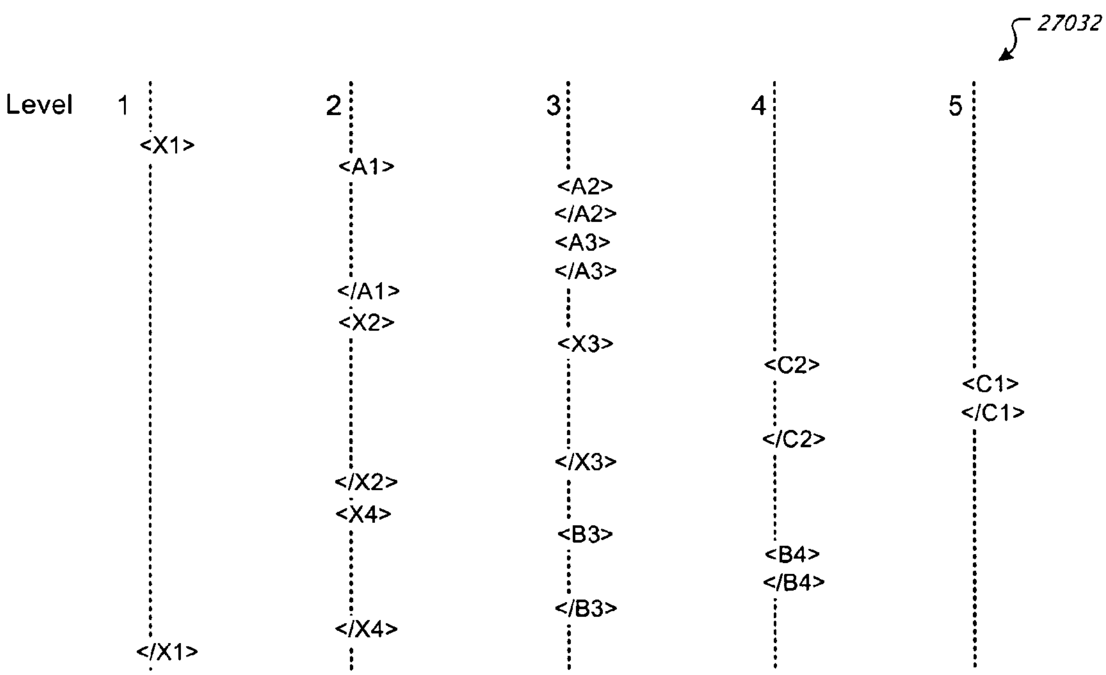

FIG. 45-1

| Package | | level1 | level2 | level3 | level4 | Cardinality | Data Type Name |
|---|---|---|---|---|---|---|---|
| SupplyNetworkPlanCancelConfirmationMessage 45000 | | SupplyNetworkPlanCancelConfirmationMessage 45002 | | | | | SupplyNetworkPlanCancelConfirmationMessage 45004 |
| | MessageHeader 45006 | | MessageHeader 45008 | | | 1..1 45010 | BusinessDocumentMessageHeader 45012 |
| | | | | ID 45014 | | 1..1 45016 | BusinessDocumentMessageID 45018 |
| | | | | ReferenceID 45020 | | 0..1 45022 | BusinessDocumentMessageID 45024 |

FIG. 45-2

| Package | | level1 | level2 | level3 | level4 | Cardinality | Data Type Name |
|---|---|---|---|---|---|---|---|
| | | | | Creation-DateTime 45026 | | 1..1 45028 | GLOBAL_DateTime 45030 |
| | | | | TestDataIndi-cator 45032 | | 0..1 45034 | Indicator 45036 |
| | | | | Reconciliation-Indicator 45038 | | 0..1 45040 | Indicator 45042 |
| | | | | SenderParty 45044 | | 0..1 45046 | Business-Document-Message-HeaderParty 45048 |
| | | | | | InternalID 45050 | 0..1 45052 | PartyInternalID 45054 |

FIG. 45-3

| Package | | level1 | level2 | level3 | level4 | Cardinality | Data Type Name |
|---|---|---|---|---|---|---|---|
| | | | | | StandardID 45056 | 0..n 45058 | PartyStan-dardID 45060 |
| | | | | | ContactPerson 45062 | 0..1 45064 | Business-Document-Message-HeaderParty-ContactPerson 45066 |
| | | | | RecipientParty 45068 | | 0..n 45070 | Business-Document-Message-HeaderParty 45072 |
| | | | | | InternalID 45074 | 0..1 45076 | PartyInternalID 45078 |
| | | | | | StandardID 45080 | 0..n 45082 | PartyStan-dardID 45084 |

FIG. 45-4

| Package | | level1 | level2 | level3 | level4 | Cardinality | Data Type Name |
|---|---|---|---|---|---|---|---|
| | | | | | ContactPerson 45086 | 0..1 45088 | Business-Document-Message-HeaderParty-ContactPerson 45090 |
| | | | | BusinessScopeBusinessProcess 45092 | | 0..n 45094 | BusinessScopeBusinessProcess 45096 |
| | | | | | TypeCode 45098 | 1..1 45100 | BusinessScopeBusinessProcessTypeCode 45102 |
| | | | | | InstanceID 45104 | 0..1 45106 | BusinessScopeBusinessProcessInstanceID 45108 |

FIG. 45-5

| Package | | level1 | level2 | level3 | level4 | Cardinality | Data Type Name |
|---|---|---|---|---|---|---|---|
| | | | | | ID 45110 | 0..1 45112 | BusinessScopeBusinessProcessID 45114 |
| | SupplyNetworkPlan 45116 | | SupplyNetworkPlan 45118 | | | 0..1 45120 | |
| | | | | ID 45122 | | 1..1 45124 | SupplyNetworkPlanID 45126 |
| | Log 45128 | | Log 45130 | | | 1..1 45132 | Log 45134 |
| | | | | Business-Document-ProcessingResultCode 45136 | | 0..1 45138 | ProcessingResultCode 45140 |

FIG. 45-6

| Package | | | | level1 | level2 | level3 | level4 | Cardinality | Data Type Name |
|---|---|---|---|---|---|---|---|---|---|
| | | | | | | Maximum-LogItemSeverityCode 45142 | | 0..1 45144 | LogItemSeverityCode 45146 |
| | | | | | | Item 45148 | | 0..n 45150 | LogItem 45152 |

FIG. 46-1

| Package | | level1 | level2 | level3 | level4 | Cardinality | Data Type Name |
|---|---|---|---|---|---|---|---|
| SupplyNetworkPlanCancelRequest-Message 46000 | | SupplyNetwork-PlanCancelRe-questMessage 46002 | | | | | SupplyNetwork-PlanCancelRe-questMessage 46004 |
| | MessageHeader 46006 | | MessageHeader 46008 | | | 1..1 46010 | BusinessDocu-mentMessage-Header 46012 |
| | | | | ID 46014 | | 1..1 46016 | BusinessDocu-mentMessageID 46018 |
| | | | | ReferenceID 46020 | | 0..1 46022 | BusinessDocu-mentMessageID 46024 |
| | | | | CreationDateTime 46026 | | 1..1 46028 | GLOBAL_DateTim e 46030 |

FIG. 46-2

| Package | | level1 | level2 | level3 | level4 | Cardinality | Data Type Name |
|---|---|---|---|---|---|---|---|
| | | | | TestDataIndicator 46032 | | 0..1 46034 | Indicator 46036 |
| | | | | ReconciliationIndicator 46038 | | 0..1 46040 | Indicator 46042 |
| | | | | SenderParty 46044 | | 0..1 46046 | BusinessDocumentMessageHeaderParty 46048 |
| | | | | | InternalID 46050 | 0..1 46052 | PartyInternalID 46054 |
| | | | | | StandardID 46056 | 0..n 46058 | PartyStandardID 46060 |

FIG. 46-3

| Package | | level1 | level2 | level3 | level4 | Cardinality | Data Type Name |
|---|---|---|---|---|---|---|---|
| | | | | | ContactPerson 46062 | 0..1 46064 | BusinessDocumentMessageHeaderPartyContactPerson 46066 |
| | | | | RecipientParty 46068 | | 0..n 46070 | BusinessDocumentMessageHeaderParty 46072 |
| | | | | | InternalID 46074 | 0..1 46076 | PartyInternalID 46078 |
| | | | | | StandardID 46080 | 0..n 46082 | PartyStandardID 46084 |
| | | | | | ContactPerson 46086 | 0..1 46088 | BusinessDocumentMessageHeaderPartyContactPerson 46090 |

FIG. 46-4

| Package | | level1 | level2 | level3 | level4 | Cardinality | Data Type Name |
|---|---|---|---|---|---|---|---|
| | | | | BusinessScope-BusinessProcess 46092 | | 0..n 46094 | BusinessScope-BusinessProcess 46096 |
| | | | | | TypeCode 46098 | 1..1 46100 | BusinessScope-BusinessProc-essTypeCode 46102 |
| | | | | | InstanceID 46104 | 0..1 46106 | BusinessScope-BusinessProc-essInstanceID 46108 |
| | | | | | ID 46110 | 0..1 46112 | BusinessScope-BusinessProces-sID 46114 |
| | SupplyNetwork-Plan 46116 | | SupplyNetwork-Plan 46118 | | | 1..1 46120 | |

FIG. 46-5

| Package | | level1 | level2 | level3 | level4 | Cardinality | Data Type Name |
|---|---|---|---|---|---|---|---|
| | | | | ID 46122 | | 1..1 46124 | SupplyNetwork-PlanID 46126 |

FIG. 47-1

| Package | | level1 | level2 | level3 | level4 | Cardinality | Data Type Name |
|---|---|---|---|---|---|---|---|
| SupplyNetworkPlanCreateConfirmationMessage 47000 | | SupplyNetworkPlanCreateConfirmationMessage 47002 | | | | | SupplyNetworkPlanCreateConfirmationMessage 47004 |
| | MessageHeader 47006 | | MessageHeader 47008 | | | 1..1 47010 | BusinessDocumentMessageHeader 47012 |
| | | | | ID 47014 | | 1..1 47016 | BusinessDocumentMessageID 47018 |
| | | | | ReferenceID 47020 | | 0..1 47022 | BusinessDocumentMessageID 47024 |

FIG. 47-2

| Package | | level1 | level2 | level3 | level4 | Cardinality | Data Type Name |
|---|---|---|---|---|---|---|---|
| | | | | Creation-DateTime 47026 | | 1..1 47028 | GLOBAL_DateTime 47030 |
| | | | | TestDataIndi-cator 47032 | | 0..1 47034 | Indicator 47036 |
| | | | | Reconciliation-Indicator 47038 | | 0..1 47040 | Indicator 47042 |
| | | | | SenderParty 47044 | | 0..1 47046 | Business-Document-Message-HeaderParty 47048 |
| | | | | | InternalID 47050 | 0..1 47052 | PartyInternalID 47054 |

FIG. 47-3

| Package | | level1 | level2 | level3 | level4 | Cardinality | Data Type Name |
|---|---|---|---|---|---|---|---|
| | | | | | StandardID 47056 | 0..n 47058 | PartyStandardID 47060 |
| | | | | | ContactPerson 47062 | 0..1 47064 | BusinessDocumentMessageHeaderPartyContactPerson 47066 |
| | | | | RecipientParty 47068 | | 0..n 47070 | BusinessDocumentMessageHeaderParty 47072 |
| | | | | | InternalID 47074 | 0..1 47076 | PartyInternalID 47078 |
| | | | | | StandardID 47080 | 0..n 47082 | PartyStandardID 47084 |

FIG. 47-4

| Package | | level1 | level2 | level3 | level4 | Cardinality | Data Type Name |
|---|---|---|---|---|---|---|---|
| | | | | | ContactPerson 47086 | 0..1 47088 | Business-Document-Message-HeaderParty-ContactPerson 47090 |
| | | | | BusinessScopeBusinessProcess 47092 | | 0..n 47094 | BusinessScopeBusinessProcess 47096 |
| | | | | | TypeCode 47098 | 1..1 47100 | BusinessScopeBusinessProcessTypeCode 47102 |
| | | | | | InstanceID 47104 | 0..1 47106 | BusinessScopeBusinessProcessInstanceID 47108 |

FIG. 47-5

| Package | | level1 | level2 | level3 | level4 | Cardinality | Data Type Name |
|---|---|---|---|---|---|---|---|
| | | | | | ID 47110 | 0..1 47112 | BusinessScopeBusinessProcessID 47114 |
| | SupplyNetworkPlan 47116 | | SupplyNetworkPlan 47118 | | | 0..1 47120 | |
| | | | | ID 47122 | | 1..1 47124 | SupplyNetworkPlanID 47126 |
| | Log 47128 | | Log 47130 | | | 1..1 47132 | Log 47134 |
| | | | | BusinessDocumentProcessingResultCode 47136 | | 0..1 47138 | ProcessingResultCode 47140 |

FIG. 47-6

| Package | | | | level1 | level2 | level3 | level4 | Cardinality | Data Type Name |
|---|---|---|---|---|---|---|---|---|---|
| | | | | | | Maximum-LogItem-SeverityCode 47142 | | 0..1 47144 | LogItem-SeverityCode 47146 |
| | | | | | | Item 47148 | | 0..n 47150 | LogItem 47152 |

FIG. 48-1

| Package | | level1 | level2 | level3 | level4 | Cardinality | Data Type Name |
|---|---|---|---|---|---|---|---|
| SupplyNetworkPlanCreateRequest-Message 48000 | | SupplyNetwork-PlanCreateRe-questMessage 48002 | | | | | SupplyNetwork-PlanCreateRe-questMessage 48004 |
| | MessageHeader 48006 | | MessageHeader 48008 | | | 1..1 48010 | BusinessDocu-mentMessage-Header 48012 |
| | | | | ID 48014 | | 1..1 48016 | BusinessDocu-mentMessageID 48018 |
| | | | | ReferenceID 48020 | | 0..1 48022 | BusinessDocu-mentMessageID 48024 |
| | | | | CreationDateTime 48026 | | 1..1 48028 | GLOBAL_DateTim e 48030 |

FIG. 48-2

| Package | | level1 | level2 | level3 | level4 | Cardinality | Data Type Name |
|---|---|---|---|---|---|---|---|
| | | | | TestDataIndicator 48032 | | 0..1 48034 | Indicator 48036 |
| | | | | ReconciliationIndicator 48038 | | 0..1 48040 | Indicator 48042 |
| | | | | SenderParty 48044 | | 0..1 48046 | BusinessDocumentMessageHeaderParty 48048 |
| | | | | | InternalID 48050 | 0..1 48052 | PartyInternalID 48054 |
| | | | | | StandardID 48056 | 0..n 48058 | PartyStandardID 48060 |

FIG. 48-3

| Package | | level1 | level2 | level3 | level4 | Cardinality | Data Type Name |
|---|---|---|---|---|---|---|---|
| | | | | | ContactPerson 48062 | 0..1 48064 | BusinessDocumentMessageHeaderPartyContactPerson 48066 |
| | | | | RecipientParty 48068 | | 0..n 48070 | BusinessDocumentMessageHeaderParty 48072 |
| | | | | | InternalID 48074 | 0..1 48076 | PartyInternalID 48078 |
| | | | | | StandardID 48080 | 0..n 48082 | PartyStandardID 48084 |
| | | | | | ContactPerson 48086 | 0..1 48088 | BusinessDocumentMessageHeaderPartyContactPerson 48090 |

FIG. 48-4

| Package | | level1 | level2 | level3 | level4 | Cardinality | Data Type Name |
|---|---|---|---|---|---|---|---|
| | | | | BusinessScope-BusinessProcess 48092 | | 0..n 48094 | BusinessScope-BusinessProcess 48096 |
| | | | | | TypeCode 48098 | 1..1 48100 | BusinessScope-BusinessProc-essTypeCode 48102 |
| | | | | | InstanceID 48104 | 0..1 48106 | BusinessScope-BusinessProc-essInstanceID 48108 |
| | | | | | ID 48110 | 0..1 48112 | BusinessScope-BusinessProces-sID 48114 |
| | SupplyNetwork-Plan 48116 | | SupplyNetwork-Plan 48118 | | | 1..1 48120 | |

FIG. 48-5

| Package | | level1 | level2 | level3 | level4 | Cardinality | Data Type Name |
|---|---|---|---|---|---|---|---|
| | | | | SupplyNetwork-PlanConfigura-tionID 48122 | | 1..1 48124 | SupplyNetwork-PlanConfigura-tionID 48126 |

FIG. 49-1

| Package | | level1 | level2 | level3 | level4 | Cardinality | Data Type Name |
|---|---|---|---|---|---|---|---|
| SupplyNetworkPlanFunctionExecuteConfirmationMessage 49000 | | SupplyNetworkPlanFunctionExecuteConfirmationMessage 49002 | | | | | SupplyNetworkPlanFunctionExecuteConfirmationMessage 49004 |
| | MessageHeader 49006 | | MessageHeader 49008 | | | 1..1 49010 | BusinessDocumentMessageHeader 49012 |
| | | | | ID 49014 | | 1..1 49016 | BusinessDocumentMessageID 49018 |
| | | | | ReferenceID 49020 | | 0..1 49022 | BusinessDocumentMessageID 49024 |

FIG. 49-2

| Package | | level1 | level2 | level3 | level4 | Cardinality | Data Type Name |
|---|---|---|---|---|---|---|---|
| | | | | Creation-DateTime 49026 | | 1..1 49028 | GLOBAL_Date Time 49030 |
| | | | | TestDataIndi-cator 49032 | | 0..1 49034 | Indicator 49036 |
| | | | | Reconciliation-Indicator 49038 | | 0..1 49040 | Indicator 49042 |
| | | | | SenderParty 49044 | | 0..1 49046 | Business-Document-Message-HeaderParty 49048 |
| | | | | | InternalID 49050 | 0..1 49052 | PartyInternalID 49054 |

FIG. 49-3

| Package | | level1 | level2 | level3 | level4 | Cardinality | Data Type Name |
|---|---|---|---|---|---|---|---|
| | | | | | StandardID 49056 | 0..n 49058 | PartyStandardID 49060 |
| | | | | | ContactPerson 49062 | 0..1 49064 | BusinessDocumentMessageHeaderParty-ContactPerson 49066 |
| | | | | RecipientParty 49068 | | 0..n 49070 | BusinessDocumentMessageHeaderParty 49072 |
| | | | | | InternalID 49074 | 0..1 49076 | PartyInternalID 49078 |
| | | | | | StandardID 49080 | 0..n 49082 | PartyStandardID 49084 |

FIG. 49-4

| Package | | level1 | level2 | level3 | level4 | Cardinality | Data Type Name |
|---|---|---|---|---|---|---|---|
| | | | | | ContactPerson 49086 | 0..1 49088 | Business-Document-Message-HeaderParty-ContactPerson 49090 |
| | | | | BusinessS-copeBusi-nessProcess 49092 | | 0..n 49094 | BusinessS-copeBusi-nessProcess 49096 |
| | | | | | TypeCode 49098 | 1..1 49100 | BusinessS-copeBusi-nessProc-essTypeCode 49102 |
| | | | | | InstanceID 49104 | 0..1 49106 | BusinessS-copeBusi-nessProc-essInstanceID 49108 |

FIG. 49-5

| Package | | | | level1 | level2 | level3 | level4 | Cardinality | Data Type Name |
|---|---|---|---|---|---|---|---|---|---|
| | | | | | | | ID 49110 | 0..1 49112 | BusinessScopeBusinessProcessID 49114 |
| | SupplyNetworkPlan 49116 | | | | SupplyNetworkPlan 49118 | | | 0..1 49120 | |
| | | | | | | ID 49122 | | 1..1 49124 | SupplyNetworkPlanID 49126 |
| | | | | | | SupplyNetworkPlanningAggregateHierarchyID 49128 | | 1..1 49130 | SupplyNetworkPlanningAggregateHierarchyID 49132 |
| | | Function 49134 | | | | Function 49136 | | 1..n 49138 | |

FIG. 49-6

| Package | | | | level1 | level2 | level3 | level4 | Cardinality | Data Type Name |
|---|---|---|---|---|---|---|---|---|---|
| | | | | | | | RowOrdinal-NumberValue 49140 | 1..1 49142 | OrdinalNum-ber-Value,Qualifier:Row 49144 |
| | | | | | | | SupplyNet-workPlanCon-figurationFunc-tionID 49146 | 1..1 49148 | SupplyNet-workPlanCon-figurationFunc-tionID 49150 |
| | Log 49152 | | | | Log 49154 | | | 1..1 49156 | Log 49158 |
| | | | | | | Business-Document-ProcessingRe-sultCode 49160 | | 0..1 49162 | ProcessingRe-sultCode 49164 |

FIG. 49-7

| Package | | | | level1 | level2 | level3 | level4 | Cardinality | Data Type Name |
|---|---|---|---|---|---|---|---|---|---|
| | | | | | | Maximum-LogItem-SeverityCode 49166 | | 0..1 49168 | LogItem-SeverityCode 49170 |
| | | | | | | Item 49172 | | 0..n 49174 | LogItem 49176 |

FIG. 50-1

| Package | | level1 | level2 | level3 | level4 | Cardinality | Data Type Name |
|---|---|---|---|---|---|---|---|
| SupplyNetworkPlanFunctionExecuteRequestMessage 50000 | | SupplyNetworkPlanFunctionExecuteRequestMessage 50002 | | | | | SupplyNetworkPlanFunctionExecuteRequestMessage 50004 |
| | MessageHeader 50006 | | MessageHeader 50008 | | | 1..1 50010 | BusinessDocumentMessageHeader 50012 |
| | | | | ID 50014 | | 1..1 50016 | BusinessDocumentMessageID 50018 |
| | | | | ReferenceID 50020 | | 0..1 50022 | BusinessDocumentMessageID 50024 |

FIG. 50-2

| Package | | level1 | level2 | level3 | level4 | Cardinality | Data Type Name |
|---|---|---|---|---|---|---|---|
| | | | | Creation-DateTime 50026 | | 1..1 50028 | GLOBAL_DateTime 50030 |
| | | | | TestDataIndicator 50032 | | 0..1 50034 | Indicator 50036 |
| | | | | Reconciliation-Indicator 50038 | | 0..1 50040 | Indicator 50042 |
| | | | | SenderParty 50044 | | 0..1 50046 | Business-Document-Message-HeaderParty 50048 |
| | | | | | InternalID 50050 | 0..1 50052 | PartyInternalID 50054 |

FIG. 50-3

| Package | | level1 | level2 | level3 | level4 | Cardinality | Data Type Name |
|---|---|---|---|---|---|---|---|
| | | | | | StandardID 50056 | 0..n 50058 | PartyStandardID 50060 |
| | | | | | ContactPerson 50062 | 0..1 50064 | BusinessDocumentMessageHeaderParty-ContactPerson 50066 |
| | | | | RecipientParty 50068 | | 0..n 50070 | BusinessDocumentMessageHeaderParty 50072 |
| | | | | | InternalID 50074 | 0..1 50076 | PartyInternalID 50078 |
| | | | | | StandardID 50080 | 0..n 50082 | PartyStandardID 50084 |

FIG. 50-4

| Package | | level1 | level2 | level3 | level4 | Cardinality | Data Type Name |
|---|---|---|---|---|---|---|---|
| | | | | | ContactPerson 50086 | 0..1 50088 | Business-Document-Message-HeaderParty-ContactPerson 50090 |
| | | | | BusinessScopeBusinessProcess 50092 | | 0..n 50094 | BusinessScopeBusinessProcess 50096 |
| | | | | | TypeCode 50098 | 1..1 50100 | BusinessScopeBusinessProcessTypeCode 50102 |
| | | | | | InstanceID 50104 | 0..1 50106 | BusinessScopeBusinessProcessInstanceID 50108 |

FIG. 50-5

| Package | | | | level1 | level2 | level3 | level4 | Cardinality | Data Type Name |
|---|---|---|---|---|---|---|---|---|---|
| | | | | | | | ID 50110 | 0..1 50112 | BusinessScopeBusinessProcessID 50114 |
| | SupplyNetworkPlan 50116 | | | | SupplyNetworkPlan 50118 | | | 1..1 50120 | |
| | | | | | | ID 50122 | | 1..1 50124 | SupplyNetworkPlanID 50126 |
| | | | | | | SupplyNetworkPlanningAggregateHierarchyID 50128 | | 1..1 50130 | SupplyNetworkPlanningAggregateHierarchyID 50132 |
| | | Function 50134 | | | | Function 50136 | | 1..n 50138 | |

FIG. 50-6

| Package | | | | level1 | level2 | level3 | level4 | Cardinality | Data Type Name |
|---|---|---|---|---|---|---|---|---|---|
| | | | | | | | RowOrdinal-NumberValue 50140 | 1..1 50142 | OrdinalNum-ber-Value,Qualifier:Row 50144 |
| | | | | | | | SupplyNet-workPlanCon-figurationFunc-tionID 50146 | 1..1 50148 | SupplyNet-workPlanCon-figurationFunc-tionID 50150 |

FIG. 51-1

| Package | | level1 | level2 | level3 | level4 | Cardinality | Data Type Name |
|---|---|---|---|---|---|---|---|
| SupplyNetworkPlanKeyFigureValue-ByElementsQueryMessage 51000 | | SupplyNetwork-PlanKeyFigure-ValueByElement-sQueryMessage 51002 | | | | | SupplyNetwork-PlanKeyFigure-ValueByElement-sQueryMessage 51004 |
| | MessageHeader 51006 | | MessageHeader 51008 | | | 1..1 51010 | BusinessDocu-mentMessage-Header 51012 |
| | | | | ID 51014 | | 1..1 51016 | BusinessDocu-mentMessageID 51018 |
| | | | | ReferenceID 51020 | | 0..1 51022 | BusinessDocu-mentMessageID 51024 |
| | | | | CreationDateTime 51026 | | 1..1 51028 | GLOBAL_DateTim e 51030 |

FIG. 51-2

| Package | | level1 | level2 | level3 | level4 | Cardinality | Data Type Name |
|---|---|---|---|---|---|---|---|
| | | | | TestDataIndicator 51032 | | 0..1 51034 | Indicator 51036 |
| | | | | ReconciliationIndicator 51038 | | 0..1 51040 | Indicator 51042 |
| | | | | SenderParty 51044 | | 0..1 51046 | BusinessDocumentMessageHeaderParty 51048 |
| | | | | | InternalID 51050 | 0..1 51052 | PartyInternalID 51054 |
| | | | | | StandardID 51056 | 0..n 51058 | PartyStandardID 51060 |

FIG. 51-3

| Package | | level1 | level2 | level3 | level4 | Cardinality | Data Type Name |
|---|---|---|---|---|---|---|---|
| | | | | | ContactPerson 51062 | 0..1 51064 | BusinessDocumentMessageHeaderPartyContactPerson 51066 |
| | | | | RecipientParty 51068 | | 0..n 51070 | BusinessDocumentMessageHeaderParty 51072 |
| | | | | | InternalID 51074 | 0..1 51076 | PartyInternalID 51078 |
| | | | | | StandardID 51080 | 0..n 51082 | PartyStandardID 51084 |
| | | | | | ContactPerson 51086 | 0..1 51088 | BusinessDocumentMessageHeaderPartyContactPerson 51090 |

FIG. 51-4

| Package | | level1 | level2 | level3 | level4 | Cardinality | Data Type Name |
|---|---|---|---|---|---|---|---|
| | | | | BusinessScope-BusinessProcess 51092 | | 0..n 51094 | BusinessScope-BusinessProcess 51096 |
| | | | | | TypeCode 51098 | 1..1 51100 | BusinessScope-BusinessProc-essTypeCode 51102 |
| | | | | | InstanceID 51104 | 0..1 51106 | BusinessScope-BusinessProc-essInstanceID 51108 |
| | | | | | ID 51110 | 0..1 51112 | BusinessScope-BusinessProces-sID 51114 |

FIG. 51-5

| Package | | level1 | level2 | level3 | level4 | Cardinality | Data Type Name |
|---|---|---|---|---|---|---|---|
| | Selection 51116 | | SupplyNetwork-PlanKeyFigure-ValueSelection-ByElements 51118 | | | 1..1 51120 | |
| | | | | SelectionByID 51122 | | 1..1 51124 | SupplyNetwork-PlanID 51126 |
| | | | | SelectionBySup-plyNetworkPlan-ningAggregate-HierarchyID 51128 | | 1..1 51130 | SupplyNetwork-PlanningAggre-gateHierarchyID 51132 |
| | | | | SelectionByKey-FigureID 51134 | | 1..n 51136 | |
| | | | | | InclusionExclu-sionCode 51138 | 0..1 51140 | InclusionExclu-sionCode 51142 |

FIG. 51-6

| Package | | level1 | level2 | level3 | level4 | Cardinality | Data Type Name |
|---|---|---|---|---|---|---|---|
| | | | | | IntervalBound-aryTypeCode 51144 | 1..1 51146 | IntervalBound-aryTypeCode 51148 |
| | | | | | LowerBound-aryKeyFigureID 51150 | 0..1 51152 | SupplyNetwork-PlanKeyFigureID 51154 |
| | | | | | UpperBound-aryKeyFigureID 51156 | 0..1 51158 | SupplyNetwork-PlanKeyFigureID 51160 |
| | | | | SelectionByTime-SeriesPeriodID 51162 | | 1..n 51164 | |
| | | | | | InclusionExclu-sionCode 51166 | 0..1 51168 | InclusionExclu-sionCode 51170 |

FIG. 51-7

| Package | | level1 | level2 | level3 | level4 | Cardinality | Data Type Name |
|---|---|---|---|---|---|---|---|
| | | | | | IntervalBoundaryTypeCode 51172 | 1..1 51174 | IntervalBoundaryTypeCode 51176 |
| | | | | | LowerBoundaryTimeSeriesPeriodID 51178 | 0..1 51180 | TimeSeriesPeriodID 51182 |
| | | | | | UpperBoundaryTimeSeriesPeriodID 51184 | 0..1 51186 | TimeSeriesPeriodID 51188 |

FIG. 52-1

| Package | | level1 | level2 | level3 | level4 | level5 | Cardinality | Data Type Name |
|---|---|---|---|---|---|---|---|---|
| SupplyNetworkPlanKeyFigureValueByElementsResponseMessage 52000 | | SupplyNetworkPlanKeyFigureValueByElementsResponseMessage 52002 | | | | | | SupplyNetworkPlanKeyFigureValueByElementsResponseMessage 52004 |
| | MessageHeader 52006 | | MessageHeader 52008 | | | | 1..1 52010 | BusinessDocumentMessageHeader 52012 |
| | | | | ID 52014 | | | 1..1 52016 | BusinessDocumentMessageID 52018 |
| | | | | ReferenceID 52020 | | | 0..1 52022 | BusinessDocumentMessageID 52024 |

FIG. 52-2

| Package | | level1 | level2 | level3 | level4 | level5 | Cardinality | Data Type Name |
|---|---|---|---|---|---|---|---|---|
| | | | | Creation-DateTime 52026 | | | 1..1 52028 | GLOBAL_DateTime 52030 |
| | | | | TestDataIn-dicator 52032 | | | 0..1 52034 | Indicator 52036 |
| | | | | Reconcilia-tionIndicator 52038 | | | 0..1 52040 | Indicator 52042 |
| | | | | SenderParty 52044 | | | 0..1 52046 | Business-Document-Message-HeaderParty 52048 |
| | | | | | InternalID 52050 | | 0..1 52052 | PartyInter-nalID 52054 |

FIG. 52-3

| Package | | level1 | level2 | level3 | level4 | level5 | Cardinality | Data Type Name |
|---|---|---|---|---|---|---|---|---|
| | | | | | StandardID 52056 | | 0..n 52058 | PartyStandardID 52060 |
| | | | | | ContactPerson 52062 | | 0..1 52064 | BusinessDocumentMessageHeaderPartyContactPerson 52066 |
| | | | | RecipientParty 52068 | | | 0..n 52070 | BusinessDocumentMessageHeaderParty 52072 |
| | | | | | InternalID 52074 | | 0..1 52076 | PartyInternalID 52078 |

FIG. 52-4

| Package | | level1 | level2 | level3 | level4 | level5 | Cardinality | Data Type Name |
|---|---|---|---|---|---|---|---|---|
| | | | | | StandardID 52080 | | 0..n 52082 | PartyStandardID 52084 |
| | | | | | ContactPerson 52086 | | 0..1 52088 | BusinessDocumentMessageHeaderPartyContactPerson 52090 |
| | | | | BusinessScopeBusinessProcess 52092 | | | 0..n 52094 | BusinessScopeBusinessProcess 52096 |
| | | | | | TypeCode 52098 | | 1..1 52100 | BusinessScopeBusinessProcessTypeCode 52102 |

FIG. 52-5

| Package | | level1 | level2 | level3 | level4 | level5 | Cardinality | Data Type Name |
|---|---|---|---|---|---|---|---|---|
| | | | | | InstanceID 52104 | | 0..1 52106 | BusinessScopeBusinessProcessInstanceID 52108 |
| | | | | | ID 52110 | | 0..1 52112 | BusinessScopeBusinessProcessID 52114 |
| | SupplyNetworkPlan 52116 | | SupplyNetworkPlan 52118 | | | | 0..1 52120 | |
| | | | | ID 52122 | | | 1..1 52124 | SupplyNetworkPlanID 52126 |

FIG. 52-6

| Package | | | level1 | level2 | level3 | level4 | level5 | Cardinality | Data Type Name |
|---|---|---|---|---|---|---|---|---|---|
| | | KeyFigureValue 52128 | | | KeyFigure-Value 52130 | | | 1..n 52132 | |
| | | | | | | SupplyNet-work-PlanKeyFig-ureID 52134 | | 1..1 52136 | SupplyNet-work-PlanKeyFig-ureID 52138 |
| | | | | | | TimeSeries-PeriodID 52140 | | 1..1 52142 | TimeSeries-PeriodID 52144 |
| | | | | | | SupplyNet-workPlannin-gAggregate-HierarchyAg-gregateIn-stanceID 52146 | | 1..1 52148 | SupplyNet-workPlannin-gAggregate-HierarchyAg-gregateIn-stanceID 52150 |

FIG. 52-7

| Package | | | level1 | level2 | level3 | level4 | level5 | Cardinality | Data Type Name |
|---|---|---|---|---|---|---|---|---|---|
| | | | | | | FloatValue 52152 | | 1..1 52154 | FloatValue 52156 |
| | | | | | | Measure-UnitCode 52158 | | 0..1 52160 | Measure-UnitCode 52162 |
| | | | | | | Measure-UnitName 52164 | | 0..1 52166 | MEDIUM_Name 52168 |
| | | | | | | KeyFigure-ValueProperty 52170 | | 0..n 52172 | |
| | | | | | | | ID 52174 | 1..1 52176 | PropertyID 52178 |

FIG. 52-8

| Package | | | | level1 | level2 | level3 | level4 | level5 | Cardinality | Data Type Name |
|---|---|---|---|---|---|---|---|---|---|---|
| | | | | | | | | Value 52180 | 1..1 52182 | Property-Value 52184 |
| | Log 52186 | | | | Log 52188 | | | | 1..1 52190 | Log 52192 |
| | | | | | | Business-Document-ProcessingResultCode 52194 | | | 0..1 52196 | ProcessingResultCode 52198 |
| | | | | | | Maximum-LogItem-SeverityCode 52200 | | | 0..1 52202 | LogItem-SeverityCode 52204 |
| | | | | | | Item 52206 | | | 0..n 52208 | LogItem 52210 |

FIG. 53-1

| Package | | level1 | level2 | level3 | level4 | level5 | Cardinality | Data Type Name |
|---|---|---|---|---|---|---|---|---|
| SupplyNetworkPlanKeyFigureValueChangeConfirmationMessage 53000 | | SupplyNetworkPlanKeyFigureValueChangeConfirmationMessage 53002 | | | | | | SupplyNetworkPlanKeyFigureValueChangeConfirmationMessage 53004 |
| | MessageHeader 53006 | | MessageHeader 53008 | | | | 1..1 53010 | BusinessDocumentMessageHeader 53012 |
| | | | | ID 53014 | | | 1..1 53016 | BusinessDocumentMessageID 53018 |
| | | | | ReferenceID 53020 | | | 0..1 53022 | BusinessDocumentMessageID 53024 |

FIG. 53-2

| Package | | level1 | level2 | level3 | level4 | level5 | Cardinality | Data Type Name |
|---|---|---|---|---|---|---|---|---|
| | | | | Creation-DateTime 53026 | | | 1..1 53028 | GLOBAL_DateTime 53030 |
| | | | | TestDataIn-dicator 53032 | | | 0..1 53034 | Indicator 53036 |
| | | | | Reconcilia-tionIndicator 53038 | | | 0..1 53040 | Indicator 53042 |
| | | | | SenderParty 53044 | | | 0..1 53046 | Business-Document-Message-HeaderParty 53048 |
| | | | | | InternalID 53050 | | 0..1 53052 | PartyInter-nalID 53054 |

FIG. 53-3

| Package | | level1 | level2 | level3 | level4 | level5 | Cardinality | Data Type Name |
|---|---|---|---|---|---|---|---|---|
| | | | | | StandardID 53056 | | 0..n 53058 | PartyStandardID 53060 |
| | | | | | ContactPerson 53062 | | 0..1 53064 | BusinessDocumentMessageHeaderPartyContactPerson 53066 |
| | | | | RecipientParty 53068 | | | 0..n 53070 | BusinessDocumentMessageHeaderParty 53072 |
| | | | | | InternalID 53074 | | 0..1 53076 | PartyInternalID 53078 |

FIG. 53-4

| Package | | level1 | level2 | level3 | level4 | level5 | Cardinality | Data Type Name |
|---|---|---|---|---|---|---|---|---|
| | | | | | StandardID 53080 | | 0..n 53082 | PartyStandardID 53084 |
| | | | | | ContactPerson 53086 | | 0..1 53088 | BusinessDocumentMessageHeaderPartyContactPerson 53090 |
| | | | | BusinessScopeBusinessProcess 53092 | | | 0..n 53094 | BusinessScopeBusinessProcess 53096 |
| | | | | | TypeCode 53098 | | 1..1 53100 | BusinessScopeBusinessProcessTypeCode 53102 |

FIG. 53-5

| Package | | level1 | level2 | level3 | level4 | level5 | Cardinality | Data Type Name |
|---|---|---|---|---|---|---|---|---|
| | | | | | InstanceID 53104 | | 0..1 53106 | BusinessScopeBusinessProcessInstanceID 53108 |
| | | | | | ID 53110 | | 0..1 53112 | BusinessScopeBusinessProcessID 53114 |
| | SupplyNetworkPlan 53116 | | SupplyNetworkPlan 53118 | | | | 0..1 53120 | |
| | | | | ID 53122 | | | 1..1 53124 | SupplyNetworkPlanID 53126 |

FIG. 53-6

| Package | | | level1 | level2 | level3 | level4 | level5 | Cardinality | Data Type Name |
|---|---|---|---|---|---|---|---|---|---|
| | | KeyFigureValue 53128 | | | KeyFigure-Value 53130 | | | 1..n 53132 | |
| | | | | | | KeyFigureID 53134 | | 1..1 53136 | SupplyNet-work-PlanKeyFig-ureID 53138 |
| | | | | | | TimeSeries-PeriodID 53140 | | 1..1 53142 | TimeSeries-PeriodID 53144 |
| | | | | | | SupplyNet-workPlannin-gAggregate-HierarchyAg-gregateIn-stanceID 53146 | | 1..1 53148 | SupplyNet-workPlannin-gAggregate-HierarchyAg-gregateIn-stanceID 53150 |

FIG. 53-7

| Package | | | level1 | level2 | level3 | level4 | level5 | Cardinality | Data Type Name |
|---|---|---|---|---|---|---|---|---|---|
| | | | | | | FloatValue 53152 | | 1..1 53154 | FloatValue 53156 |
| | | | | | | Measure-UnitCode 53158 | | 0..1 53160 | Measure-UnitCode 53162 |
| | | | | | | Measure-UnitName 53164 | | 0..1 53166 | MEDIUM_Name 53168 |
| | | | | | | SourceOf-SupplyRefer-ence 53170 | | 0..1 53172 | SourceOf-SupplyRefer-ence 53174 |
| | | | | | | | UUID 53176 | 0..1 53178 | UUID 53180 |

FIG. 53-8

| Package | | | | level1 | level2 | level3 | level4 | level5 | Cardinality | Data Type Name |
|---|---|---|---|---|---|---|---|---|---|---|
| | | | | | | | | LogisticRela-tionshipUUID 53182 | 0..1 53184 | UUID 53186 |
| | Log 53188 | | | | Log 53190 | | | | 1..1 53192 | Log 53194 |
| | | | | | | Business-Document-Processin-gResultCode 53196 | | | 0..1 53198 | Processin-gResultCode 53200 |
| | | | | | | Maximum-LogItem-SeverityCode 53202 | | | 0..1 53204 | LogItem-SeverityCode 53206 |
| | | | | | | Item 53208 | | | 0..n 53210 | LogItem 53212 |

FIG. 54-1

| Package | | level1 | level2 | level3 | level4 | level5 | Cardinality | Data Type Name |
|---|---|---|---|---|---|---|---|---|
| SupplyNetworkPlanKeyFigureValueChangeRequestMessage 54000 | | SupplyNetworkPlanKeyFigureValueChangeRequestMessage 54002 | | | | | | SupplyNetworkPlanKeyFigureValueChangeRequestMessage 54004 |
| | MessageHeader 54006 | | MessageHeader 54008 | | | | 1..1 54010 | BusinessDocumentMessageHeader 54012 |
| | | | | ID 54014 | | | 1..1 54016 | BusinessDocumentMessageID 54018 |
| | | | | ReferenceID 54020 | | | 0..1 54022 | BusinessDocumentMessageID 54024 |

FIG. 54-2

| Package | | level1 | level2 | level3 | level4 | level5 | Cardinality | Data Type Name |
|---|---|---|---|---|---|---|---|---|
| | | | | Creation-DateTime 54026 | | | 1..1 54028 | GLOBAL_Date Time 54030 |
| | | | | TestDataIndi-cator 54032 | | | 0..1 54034 | Indicator 54036 |
| | | | | Reconciliation-Indicator 54038 | | | 0..1 54040 | Indicator 54042 |
| | | | | SenderParty 54044 | | | 0..1 54046 | Business-Document-Message-HeaderParty 54048 |
| | | | | | InternalID 54050 | | 0..1 54052 | PartyInternalID 54054 |

FIG. 54-3

| Package | | level1 | level2 | level3 | level4 | level5 | Cardinality | Data Type Name |
|---|---|---|---|---|---|---|---|---|
| | | | | | StandardID 54056 | | 0..n 54058 | PartyStan-dardID 54060 |
| | | | | | ContactPerson 54062 | | 0..1 54064 | Business-Document-Message-HeaderParty-ContactPerson 54066 |
| | | | | RecipientParty 54068 | | | 0..n 54070 | Business-Document-Message-HeaderParty 54072 |
| | | | | | InternalID 54074 | | 0..1 54076 | PartyInternalID 54078 |
| | | | | | StandardID 54080 | | 0..n 54082 | PartyStan-dardID 54084 |

FIG. 54-4

| Package | | level1 | level2 | level3 | level4 | level5 | Cardinality | Data Type Name |
|---|---|---|---|---|---|---|---|---|
| | | | | | ContactPerson 54086 | | 0..1 54088 | Business-Document-Message-HeaderParty-ContactPerson 54090 |
| | | | | BusinessScopeBusinessProcess 54092 | | | 0..n 54094 | BusinessScopeBusinessProcess 54096 |
| | | | | | TypeCode 54098 | | 1..1 54100 | BusinessScopeBusinessProcessTypeCode 54102 |
| | | | | | InstanceID 54104 | | 0..1 54106 | BusinessScopeBusinessProcessInstanceID 54108 |

FIG. 54-5

| Package | | | level1 | level2 | level3 | level4 | level5 | Cardinality | Data Type Name |
|---|---|---|---|---|---|---|---|---|---|
| | | | | | | ID 54110 | | 0..1 54112 | BusinessScopeBusinessProcessID 54114 |
| | SupplyNetworkPlan 54116 | | | SupplyNetworkPlan 54118 | | | | 1..1 54120 | |
| | | | | | ID 54122 | | | 1..1 54124 | SupplyNetworkPlanID 54126 |
| | | KeyFigureValue 54128 | | | KeyFigureValue 54130 | | | 1..n 54132 | |
| | | | | | | KeyFigureID 54134 | | 1..1 54136 | SupplyNetworkPlanKeyFigureID 54138 |

FIG. 54-6

| Package | | | level1 | level2 | level3 | level4 | level5 | Cardinality | Data Type Name |
|---|---|---|---|---|---|---|---|---|---|
| | | | | | | SupplyNetworkPlanningAggregateHierarchyAggregateInstanceID 54140 | | 1..1 54142 | SupplyNetworkPlanningAggregateHierarchyAggregateInstanceID 54144 |
| | | | | | | TimeSeriesPeriodID 54146 | | 1..1 54148 | TimeSeriesPeriodID 54150 |
| | | | | | | FloatValue 54152 | | 1..1 54154 | FloatValue 54156 |
| | | | | | | MeasureUnitCode 54158 | | 0..1 54160 | MeasureUnitCode 54162 |
| | | | | | | SourceOfSupplyReference 54164 | | 0..1 54166 | SourceOfSupplyReference 54168 |

FIG. 54-7

| Package | | | level1 | level2 | level3 | level4 | level5 | Cardinality | Data Type Name |
|---|---|---|---|---|---|---|---|---|---|
| | | | | | | | UUID 54170 | 0..1 54172 | UUID 54174 |
| | | | | | | | LogisticRelationshipUUID 54176 | 0..1 54178 | UUID 54180 |

FIG. 55-1

| Package | level1 | level2 | level3 | level4 | Cardinality | Data Type Name |
|---|---|---|---|---|---|---|
| SupplyNetworkPlanKeyFigureValueDetailByElementsQueryMessage 55000 | SupplyNetwork-PlanKeyFigure-ValueDetailByE-lementsQuery-Message 55002 | | | | | SupplyNetwork-PlanKeyFigure-ValueDetailByE-lementsQuery-Message 55004 |
| MessageHeader 55006 | | MessageHeader 55008 | | | 1..1 55010 | BusinessDocu-mentMessage-Header 55012 |
| | | | ID 55014 | | 1..1 55016 | BusinessDocu-mentMessageID 55018 |
| | | | ReferenceID 55020 | | 0..1 55022 | BusinessDocu-mentMessageID 55024 |
| | | | CreationDateTime 55026 | | 1..1 55028 | GLOBAL_DateTim e 55030 |

FIG. 55-2

| Package | | level1 | level2 | level3 | level4 | Cardinality | Data Type Name |
|---|---|---|---|---|---|---|---|
| | | | | TestDataIndicator 55032 | | 0..1 55034 | Indicator 55036 |
| | | | | ReconciliationIndicator 55038 | | 0..1 55040 | Indicator 55042 |
| | | | | SenderParty 55044 | | 0..1 55046 | BusinessDocumentMessageHeaderParty 55048 |
| | | | | | InternalID 55050 | 0..1 55052 | PartyInternalID 55054 |
| | | | | | StandardID 55056 | 0..n 55058 | PartyStandardID 55060 |

FIG. 55-3

| Package | | level1 | level2 | level3 | level4 | Cardinality | Data Type Name |
|---|---|---|---|---|---|---|---|
| | | | | | ContactPerson 55062 | 0..1 55064 | BusinessDocumentMessageHeaderPartyContactPerson 55066 |
| | | | | RecipientParty 55068 | | 0..n 55070 | BusinessDocumentMessageHeaderParty 55072 |
| | | | | | InternalID 55074 | 0..1 55076 | PartyInternalID 55078 |
| | | | | | StandardID 55080 | 0..n 55082 | PartyStandardID 55084 |
| | | | | | ContactPerson 55086 | 0..1 55088 | BusinessDocumentMessageHeaderPartyContactPerson 55090 |

FIG. 55-4

| Package | | level1 | level2 | level3 | level4 | Cardinality | Data Type Name |
|---|---|---|---|---|---|---|---|
| | | | | BusinessScope-BusinessProcess 55092 | | 0..n 55094 | BusinessScope-BusinessProcess 55096 |
| | | | | | TypeCode 55098 | 1..1 55100 | BusinessScope-BusinessProc-essTypeCode 55102 |
| | | | | | InstanceID 55104 | 0..1 55106 | BusinessScope-BusinessProc-essInstanceID 55108 |
| | | | | | ID 55110 | 0..1 55112 | BusinessScope-BusinessProces-sID 55114 |

FIG. 55-5

| Package | | level1 | level2 | level3 | level4 | Cardinality | Data Type Name |
|---|---|---|---|---|---|---|---|
| | Selection 55116 | | SupplyNetwork-PlanKeyFigure-ValueDetailSelec-tionByElements 55118 | | | 1..1 55120 | |
| | | | | SelectionByID 55122 | | 1..1 55124 | SupplyNetwork-PlanID 55126 |
| | | | | SelectionByKey-FigureID 55128 | | 1..n 55130 | |
| | | | | | InclusionExclu-sionCode 55132 | 0..1 55134 | InclusionExclu-sionCode 55136 |
| | | | | | IntervalBound-aryTypeCode 55138 | 1..1 55140 | IntervalBound-aryTypeCode 55142 |

FIG. 55-6

| Package | | level1 | level2 | level3 | level4 | Cardinality | Data Type Name |
|---|---|---|---|---|---|---|---|
| | | | | | LowerBoundaryKeyFigureID 55144 | 0..1 55146 | SupplyNetworkPlanKeyFigureID 55148 |
| | | | | | UpperBoundaryKeyFigureID 55150 | 0..1 55152 | SupplyNetworkPlanKeyFigureID 55154 |
| | | | | SelectionByTimeSeriesPeriodID 55156 | | 1..n 55158 | |
| | | | | | InclusionExclusionCode 55160 | 0..1 55162 | InclusionExclusionCode 55164 |
| | | | | | IntervalBoundaryTypeCode 55166 | 1..1 55168 | IntervalBoundaryTypeCode 55170 |

FIG. 55-7

| Package | | level1 | level2 | level3 | level4 | Cardinality | Data Type Name |
|---|---|---|---|---|---|---|---|
| | | | | | LowerBoundary-TimeSeriesPerio-dID 55172 | 0..1 55174 | TimeSeriesPerio-dID 55176 |
| | | | | | UpperBoundary-TimeSeriesPerio-dID 55178 | 0..1 55180 | TimeSeriesPerio-dID 55182 |
| | | | | SelectionBySupplyNetworkPlannin-gAggregateHier-archyAggregateIn-stanceID 55184 | | 1..n 55186 | |
| | | | | | InclusionExclu-sionCode 55188 | 0..1 55190 | InclusionExclu-sionCode 55192 |

FIG. 55-8

| Package | | level1 | level2 | level3 | level4 | Cardinality | Data Type Name |
|---|---|---|---|---|---|---|---|
| | | | | | IntervalBoundaryTypeCode 55194 | 1..1 55196 | IntervalBoundaryTypeCode 55198 |
| | | | | | LowerBoundarySupplyNetworkPlanningAggregateHierarchyAggregateInstanceID 55200 | 0..1 55202 | SupplyNetworkPlanningAggregateHierarchyAggregateInstanceID 55204 |
| | | | | | UpperBoundarySupplyNetworkPlanningAggregateHierarchyAggregateInstanceID 55206 | 0..1 55208 | SupplyNetworkPlanningAggregateHierarchyAggregateInstanceID 55210 |

FIG. 56-1

| Package | level1 | level2 | level3 | level4 | level5 | level6 | Cardinality | Data Type Name |
|---|---|---|---|---|---|---|---|---|
| SupplyNetworkPlanKeyFigureValueDetailByElementsResponseMessage 56000 | SupplyNetworkPlanKeyFigureValueDetailByElementsResponseMessage 56002 | | | | | | | SupplyNetworkPlanKeyFigureValueDetailByElementsResponseMessage 56004 |
| MessageHeader 56006 | | MessageHeader 56008 | | | | | 1..1 56010 | BusinessDocumentMessageHeader 56012 |
| | | | ID 56014 | | | | 1..1 56016 | BusinessDocumentMessageID 56018 |

FIG. 56-2

| Package | | level1 | level2 | level3 | level4 | level5 | level6 | Cardinality | Data Type Name |
|---|---|---|---|---|---|---|---|---|---|
| | | | | Referen-celD 56020 | | | | 0..1 56022 | Business-Document-MessageID 56024 |
| | | | | Creation-DateTime 56026 | | | | 1..1 56028 | GLOBAL_DateTime 56030 |
| | | | | TestDataIn-dicator 56032 | | | | 0..1 56034 | Indicator 56036 |
| | | | | Reconcilia-tionIndicator 56038 | | | | 0..1 56040 | Indicator 56042 |
| | | | | SenderParty 56044 | | | | 0..1 56046 | Business-Document-Message-Header-Party 56048 |

FIG. 56-3

| Package | | level1 | level2 | level3 | level4 | level5 | level6 | Cardinality | Data Type Name |
|---|---|---|---|---|---|---|---|---|---|
| | | | | | InternalID 56050 | | | 0..1 56052 | PartyInternalID 56054 |
| | | | | | StandardID 56056 | | | 0..n 56058 | PartyStandardID 56060 |
| | | | | | ContactPerson 56062 | | | 0..1 56064 | BusinessDocumentMessageHeaderPartyContactPerson 56066 |
| | | | | RecipientParty 56068 | | | | 0..n 56070 | BusinessDocumentMessageHeaderParty 56072 |

FIG. 56-4

| Package | | level1 | level2 | level3 | level4 | level5 | level6 | Cardinality | Data Type Name |
|---|---|---|---|---|---|---|---|---|---|
| | | | | | InternalID 56074 | | | 0..1 56076 | PartyInternalID 56078 |
| | | | | | StandardID 56080 | | | 0..n 56082 | PartyStandardID 56084 |
| | | | | | ContactPerson 56086 | | | 0..1 56088 | BusinessDocumentMessageHeaderPartyContactPerson 56090 |
| | | | | BusinessScopeBusinessProcess 56092 | | | | 0..n 56094 | BusinessScopeBusinessProcess 56096 |

FIG. 56-5

| Package | | level1 | level2 | level3 | level4 | level5 | level6 | Cardinality | Data Type Name |
|---|---|---|---|---|---|---|---|---|---|
| | | | | | TypeCode 56098 | | | 1..1 56100 | BusinessScopeBusinessProcessTypeCode 56102 |
| | | | | | InstanceID 56104 | | | 0..1 56106 | BusinessScopeBusinessProcessInstanceID 56108 |
| | | | | | ID 56110 | | | 0..1 56112 | BusinessScopeBusinessProcessID 56114 |
| | SupplyNetworkPlan 56116 | | SupplyNetworkPlan 56118 | | | | | 0..1 56120 | |

FIG. 56-6

| Package | | level1 | level2 | level3 | level4 | level5 | level6 | Cardinality | Data Type Name |
|---|---|---|---|---|---|---|---|---|---|
| | | | | ID 56122 | | | | 1..1 56124 | SupplyNetworkPlanID 56126 |
| | | | | KeyFigureValue 56128 | | | | 1..n 56130 | |
| | | | | | KeyFigureID 56132 | | | 1..1 56134 | SupplyNetworkPlanKeyFigureID 56136 |
| | | | | | TimeSeriesPeriodID 56138 | | | 1..1 56140 | TimeSeriesPeriodID 56142 |

FIG. 56-7

| Package | | | level1 | level2 | level3 | level4 | level5 | level6 | Cardinality | Data Type Name |
|---|---|---|---|---|---|---|---|---|---|---|
| | | | | | | SupplyNetworkPlanningAggregateHierarchyAggregateInstanceID 56144 | | | 1..1 56146 | SupplyNetworkPlanningAggregateHierarchyAggregateInstanceID 56148 |
| | | KeyFigureValueDetail 56150 | | | | KeyFigureValueDetail 56152 | | | 1..n 56154 | |
| | | | | | | | ID 56156 | | 1..1 56158 | SupplyNetworkPlanKeyFigureValueDetailID 56160 |
| | | | | | | | Description 56162 | | 1..1 56164 | SHORT_Description 56166 |

FIG. 56-8

| Package | | | level1 | level2 | level3 | level4 | level5 | level6 | Cardinality | Data Type Name |
|---|---|---|---|---|---|---|---|---|---|---|
| | | | | | | | GroupID 56168 | | 0..1 56170 | SupplyNetwork-PlanKey-FigureValueDetail-GroupID 56172 |
| | | | | | | | Product-InternalID 56174 | | 1..1 56176 | Product-InternalID 56178 |
| | | | | | | | PredecessorProduct-InternalID 56180 | | 0..1 56182 | Product-InternalID 56184 |
| | | | | | | | Successor-Product-InternalID 56186 | | 0..1 56188 | Product-InternalID 56190 |

FIG. 56-9

| Package | | | level1 | level2 | level3 | level4 | level5 | level6 | Cardinality | Data Type Name |
| --- | --- | --- | --- | --- | --- | --- | --- | --- | --- | --- |
| | | | | | | | SourceSupplyPlanningAreaID 56192 | | 0..1 56194 | Supply-PlanningAreaID 56196 |
| | | | | | | | DestinationSupplyPlanningAreaID 56198 | | 1..1 56200 | Supply-PlanningAreaID 56202 |
| | | | | | | | FixedIndicator 56204 | | 1..1 56206 | Indicator 56208 |
| | | | | | | | RequirementQuantity 56210 | | 1..1 56212 | Quantity 56214 |
| | | | | | | | Original-Quantity 56216 | | 1..1 56218 | Quantity 56220 |

FIG. 56-10

| Package | | | level1 | level2 | level3 | level4 | level5 | level6 | Cardinality | Data Type Name |
|---|---|---|---|---|---|---|---|---|---|---|
| | | | | | | | Confirmed-Quantity 56222 | | 1..1 56224 | Quantity 56226 |
| | | | | | | | Request-edQuantity 56228 | | 1..1 56230 | Quantity 56232 |
| | | | | | | | Variable-Quantity 56234 | | 1..1 56236 | Quantity 56238 |
| | | | | | | | SourceOf-SupplyRefer ence 56240 | | 0..1 56242 | SourceOf-SupplyRefer ence 56244 |
| | | | | | | | | SourceOf-SupplyUUID 56246 | 0..1 56248 | UUID 56250 |

FIG. 56-11

| Package | | | level1 | level2 | level3 | level4 | level5 | level6 | Cardinality | Data Type Name |
|---|---|---|---|---|---|---|---|---|---|---|
| | | | | | | | | SourceOf-SupplyLo-gisticRela-tion-shipUUID 56252 | 0..1 56254 | UUID 56256 |
| | | | | | | | SourceOf-SupplyDe-scription 56258 | | 0..1 56260 | MEDIUM_Description 56262 |
| | | | | | | | Transport-MeansDe-scription-Code 56264 | | 0..1 56266 | Transport-MeansDe-scription-Code 56268 |
| | | | | | | | Transport-MeansDe-scription-CodeName 56270 | | 0..1 56272 | MEDIUM_Name 56274 |

FIG. 56-12

| Package | | | level1 | level2 | level3 | level4 | level5 | level6 | Cardinality | Data Type Name |
|---|---|---|---|---|---|---|---|---|---|---|
| | | | | | | | Transporta-tionPriority-Value 56276 | | 0..1 56278 | Priority-Value 56280 |
| | | | | | | | Availability-DateTime 56282 | | 1..1 56284 | GLOBAL_DateTime 56286 |
| | | | | | | | Processing-DateTimePeriod 56288 | | 1..1 56290 | UPPEROPEN_GLOBAL_DateTimePeriod 56292 |
| | Log 56294 | | | Log 56296 | | | | | 1..1 56298 | Log 56300 |

FIG. 56-13

| Package | | | | level1 | level2 | level3 | level4 | level5 | level6 | Cardinality | Data Type Name |
|---|---|---|---|---|---|---|---|---|---|---|---|
| | | | | | | Business-Document-Processin-gResult-Code 56302 | | | | 0..1 56304 | Processin-gResult-Code 56306 |
| | | | | | | Maximum-LogItem-Severity-Code 56308 | | | | 0..1 56310 | LogItem-Severity-Code 56312 |
| | | | | | | Item 56314 | | | | 0..n 56316 | LogItem 56318 |

FIG. 71

| Package | | level1 | level2 | level3 | Cardinality | Data Type Name |
|---|---|---|---|---|---|---|
| SupplyNetworkPlanConfigurationByIDQueryMessage_sync 71000 | | SupplyNetworkPlan-ConfigurationByID-QueryMessage_sync 71002 | | | | SupplyNetworkPlan-ConfigurationByID-QueryMessage_sync 71004 |
| | Selection 71006 | | SupplyNetworkPlan-ConfigurationSelec-tionByID 71008 | | 1..1 71010 | |
| | | | | SupplyNetworkPlan-ConfigurationID 71012 | 1..1 71014 | SupplyNetworkPlan-ConfigurationID 71016 |

FIG. 72-1

| Package | | level1 | level2 | level3 | level4 | level5 | Cardinality | Data Type Name |
|---|---|---|---|---|---|---|---|---|
| SupplyNetworkPlanConfigurationByIDResponseMessage_sync 72000 | | SupplyNetworkPlanConfigurationByIDResponseMessage_sync 72002 | | | | | | SupplyNetworkPlanConfigurationByIDResponseMessage_sync 72004 |
| | SupplyNetworkPlanConfiguration 72006 | | SupplyNetworkPlanConfiguration 72008 | | | | 0..1 72010 | |
| | | | | ID 72012 | | | 1..1 72014 | SupplyNetworkPlanConfigurationID 72016 |
| | | | | Description 72018 | | | 1..1 72020 | LONG_Description 72022 |

FIG. 72-2

| Package | | | level1 | level2 | level3 | level4 | level5 | Cardinality | Data Type Name |
|---|---|---|---|---|---|---|---|---|---|
| | | | | | MeasureUnit-Code 72024 | | | 1..1 72026 | MeasureUnit-Code 72028 |
| | | | | | MeasureUnit-Name 72030 | | | 1..1 72032 | MEDIUM_Name 72034 |
| | | | | | CurrencyCode 72036 | | | 1..1 72038 | CurrencyCode 72040 |
| | | | | | Currency-CodeName 72042 | | | 1..1 72044 | MEDIUM_Name 72046 |
| | | Characteristic 72048 | | | Characteristic 72050 | | | 1..n 72052 | |

FIG. 72-3

| Package | | | level1 | level2 | level3 | level4 | level5 | Cardinality | Data Type Name |
|---|---|---|---|---|---|---|---|---|---|
| | | | | | | ID 72054 | | 1..1 72056 | SupplyNet-work-PlanCharac-teristicID 72058 |
| | | | | | | Description 72060 | | 1..1 72062 | MEDIUM_Description 72064 |
| | | KeyFigure 72066 | | | KeyFigure 72068 | | | 1..n 72070 | |
| | | | | | | ID 72072 | | 1..1 72074 | SupplyNet-workPlanKey-FigureID 72076 |
| | | | | | | Description 72078 | | 1..1 72080 | MEDIUM_Description 72082 |

FIG. 72-4

| Package | | | level1 | level2 | level3 | level4 | level5 | Cardinality | Data Type Name |
|---|---|---|---|---|---|---|---|---|---|
| | | | | | | GridNumber-Value 72084 | | 1..1 72086 | NumberValue 72088 |
| | | | | | | DetailedIndica-tor 72090 | | 1..1 72092 | Indicator 72094 |
| | | | | | | RowOrdinal-NumberValue 72096 | | 1..1 72098 | OrdinalNum-berValue 72100 |
| | | | | | | PlanningVer-sionID 72102 | | 0..1 72104 | PlanningVer-sionID 72106 |
| | | | | | | Property 72108 | | 0..n 72110 | |
| | | | | | | | ID 72112 | 1..1 72114 | PropertyID 72116 |

FIG. 72-5

| Package | | | level1 | level2 | level3 | level4 | level5 | Cardinality | Data Type Name |
|---|---|---|---|---|---|---|---|---|---|
| | | | | | | | Value 72118 | 1..1 72120 | PropertyValue 72122 |
| | | TimeSeriesPeriod 72124 | | | TimeSeriesPeriod 72126 | | | 1..n 72128 | |
| | | | | | | ID 72130 | | 1..1 72132 | TimeSeriesPeriodID 72134 |
| | | | | | | Description 72136 | | 1..1 72138 | MEDIUM_Description 72140 |
| | | | | | | DateTimePeriod 72142 | | 1..1 72144 | UPPEROPEN_GLOBAL_DateTimePeriod 72146 |

FIG. 72-6

| Package | | | level1 | level2 | level3 | level4 | level5 | Cardinality | Data Type Name |
|---|---|---|---|---|---|---|---|---|---|
| | | | | | | CalendarUnit-Code 72148 | | 1..1 72150 | CalendarUnit-Code 72152 |
| | | | | | | CalendarUnit-CodeName 72154 | | 1..1 72156 | MEDIUM_Name 72158 |
| | | | | | | Property 72160 | | 0..n 72162 | |
| | | | | | | | ID 72164 | 1..1 72166 | PropertyID 72168 |
| | | | | | | | Value 72170 | 1..1 72172 | PropertyValue 72174 |
| | | Function 72176 | | | Function 72178 | | | 0..n 72180 | |

FIG. 72-7

| Package | | | level1 | level2 | level3 | level4 | level5 | Cardinality | Data Type Name |
|---|---|---|---|---|---|---|---|---|---|
| | | | | | | ID 72182 | | 1..1 72184 | SupplyNetworkPlanConfigurationFunctionID 72186 |
| | | | | | | Description 72188 | | 1..1 72190 | MEDIUM_Descripton 72192 |
| | | | | | | ManualExecutionAllowedIndicator 72194 | | 1..1 72196 | Indicator 72198 |
| | | | | | | Event 72200 | | 0..n 72202 | |

FIG. 72-8

| Package | | | level1 | level2 | level3 | level4 | level5 | Cardinality | Data Type Name |
|---|---|---|---|---|---|---|---|---|---|
| | | | | | | | TypeCode 72204 | 1..1 72206 | SupplyNet-workPlanCon-figurationFunc-tionEvent-TypeCode 72208 |
| | | | | | | | TypeName 72210 | 1..1 72212 | MEDIUM_Na me 72214 |
| | | | | | | | TypeDescrip-tion 72216 | 1..1 72218 | LONG_Descri pton 72220 |
| | | | | | | | OrdinalNum-berValue 72222 | 1..1 72224 | OrdinalNum-berValue 72226 |
| | | Selection 72228 | | | Selection 72230 | | | 0..n 72232 | |

FIG. 72-9

| Package | | | level1 | level2 | level3 | level4 | level5 | Cardinality | Data Type Name |
|---|---|---|---|---|---|---|---|---|---|
| | | | | | | ID 72234 | | 1..1 72236 | SupplyNetworkPlanConfiguration-SelectionID 72238 |
| | | | | | | SelectionCriterion 72240 | | 1..n 72242 | |
| | | | | | | | RowOrdinal-NumberValue 72244 | 1..1 72246 | OrdinalNumberValue 72248 |
| | | | | | | | SupplyNetwork-PlanCharacteristicID 72250 | 1..1 72252 | SupplyNetwork-PlanCharacteristicID 72254 |
| | | | | | | | InclusionExclusionCode 72256 | 0..1 72258 | InclusionExclusionCode 72260 |

FIG. 72-10

| Package | | | level1 | level2 | level3 | level4 | level5 | Cardinality | Data Type Name |
|---|---|---|---|---|---|---|---|---|---|
| | | | | | | | InclusionExclusionName 72262 | 0..1 72264 | MEDIUM_Name 72266 |
| | | | | | | | Interval-BoundaryTypeCode 72268 | 1..1 72270 | Interval-BoundaryTypeCode 72272 |
| | | | | | | | Interval-BoundaryTypeName 72274 | 1..1 72276 | MEDIUM_Name 72278 |
| | | | | | | | LowerBoundarySupplyNetwork-PlanCharacteristicValue 72280 | 0..1 72282 | SupplyNetwork-PlanCharacteristicValue 72284 |

FIG. 72-11

| Package | | | level1 | level2 | level3 | level4 | level5 | Cardinality | Data Type Name |
|---|---|---|---|---|---|---|---|---|---|
| | | | | | | | UpperBoundarySupplyNetworkPlanCharacteristicValue 72286 | 0..1 72288 | SupplyNetworkPlanCharacteristicValue 72290 |
| | | | | | | SelectionGroup 72292 | | 1..n 72294 | |
| | | | | | | | RowOrdinalNumberValue 72296 | 1..1 72298 | OrdinalNumberValue 72300 |
| | | | | | | | SupplyNetworkPlanCharacteristicID 72302 | 1..1 72304 | SupplyNetworkPlanCharacteristicID 72306 |
| | Log 72308 | | | Log 72310 | | | | 1..1 72312 | Log 72314 |

FIG. 72-12

| Package | | level1 | level2 | level3 | level4 | level5 | Cardinality | Data Type Name |
|---|---|---|---|---|---|---|---|---|
| | | | | Business-Document-Processin-gResultCode 72316 | | | 0..1 72318 | Processin-gResultCode 72320 |
| | | | | Maximum-LogItemSever-ityCode 72322 | | | 0..1 72324 | LogItemSever-ityCode 72326 |
| | | | | Item 72328 | | | 0..n 72330 | LogItem 72332 |

FIG. 73

| Package | | level1 | level2 | level3 | Cardinality | Data Type Name |
|---|---|---|---|---|---|---|
| SupplyNetworkPlanConfigurationSelectionByIDQueryMessage_sync 73000 | | SupplyNetworkPlanConfigurationSelectionByIDQueryMessage_sync 73002 | | | | SupplyNetworkPlanConfigurationSelectionByIDQueryMessage_sync 73004 |
| | Selection 73006 | | SupplyNetworkPlanConfigurationSelectionByID 73008 | | 1..1 73010 | |
| | | | | SupplyNetworkPlanConfigurationID 73012 | 1..1 73014 | SupplyNetworkPlanConfigurationID 73016 |
| | | | | SupplyNetworkPlanConfigurationSelectionID 73018 | 0..1 73020 | SupplyNetworkPlanConfigurationSelectionID 73022 |

FIG. 74-1

| Package | | | level1 | level2 | level3 | level4 | level5 | Cardinality | Data Type Name |
|---|---|---|---|---|---|---|---|---|---|
| SupplyNetworkPlanConfigurationSelectionBy-IDResponseMessage_sync 74000 | | | SupplyNet-workPlanCon-figuration-SelectionBy-IDResponse-Message_sync 74002 | | | | | | SupplyNet-workPlanCon-figuration-SelectionBy-IDResponse-Message_sync 74004 |
| | SupplyNetworkPlanConfigura-tion 74006 | | | SupplyNet-workPlanCon-figuration 74008 | | | | 0..1 74010 | |
| | | | | | ID 74012 | | | 1..1 74014 | SupplyNet-workPlanCon-figurationID 74016 |
| | | Selection 74018 | | | Selection 74020 | | | 1..n 74022 | |

FIG. 74-2

| Package | | | level1 | level2 | level3 | level4 | level5 | Cardinality | Data Type Name |
|---|---|---|---|---|---|---|---|---|---|
| | | | | | | ID 74024 | | 1..1 74026 | SupplyNetworkPlanConfiguration-SelectionID 74028 |
| | | | | | | SelectionCriterion 74030 | | 1..n 74032 | |
| | | | | | | | RowOrdinal-NumberValue 74034 | 1..1 74036 | OrdinalNumberValue 74038 |
| | | | | | | | SupplyNetwork-PlanCharacteristicID 74040 | 1..1 74042 | SupplyNetwork-PlanCharacteristicID 74044 |
| | | | | | | | InclusionExclusionCode 74046 | 0..1 74048 | InclusionExclusionCode 74050 |

FIG. 74-3

| Package | | | level1 | level2 | level3 | level4 | level5 | Cardinality | Data Type Name |
|---|---|---|---|---|---|---|---|---|---|
| | | | | | | | InclusionExclusionName 74052 | 0..1 74054 | MEDIUM_Name 74056 |
| | | | | | | | IntervalBoundaryTypeCode 74058 | 1..1 74060 | IntervalBoundaryTypeCode 74062 |
| | | | | | | | IntervalBoundaryTypeName 74064 | 1..1 74066 | MEDIUM_Name 74068 |
| | | | | | | | LowerBoundarySupplyNetworkPlanCharacteristicValue 74070 | 0..1 74072 | SupplyNetworkPlanCharacteristicValue 74074 |

FIG. 74-4

| Package | | | level1 | level2 | level3 | level4 | level5 | Cardinality | Data Type Name |
|---|---|---|---|---|---|---|---|---|---|
| | | | | | | | UpperBoundarySupplyNetworkPlanCharacteristicValue 74076 | 0..1 74078 | SupplyNetworkPlanCharacteristicValue 74080 |
| | | | | | | SelectionGroup 74082 | | 1..n 74084 | |
| | | | | | | | RowOrdinalNumberValue 74086 | 1..1 74088 | OrdinalNumberValue 74090 |
| | | | | | | | SupplyNetworkPlanCharacteristicID 74092 | 1..1 74094 | SupplyNetworkPlanCharacteristicID 74096 |
| | Log 74098 | | | Log 74100 | | | | 1..1 74102 | Log 74104 |

FIG. 74-5

| Package | | level1 | level2 | level3 | level4 | level5 | Cardinality | Data Type Name |
|---|---|---|---|---|---|---|---|---|
| | | | | Business-Document-Processin-gResultCode 74106 | | | 0..1 74108 | Processin-gResultCode 74110 |
| | | | | Maximum-LogItemSever-ityCode 74112 | | | 0..1 74114 | LogItemSever-ityCode 74116 |
| | | | | Item 74118 | | | 0..n 74120 | LogItem 74122 |

FIG. 75-1

| Package | level1 | level2 | level3 | level4 | Cardinality | Data Type Name |
|---|---|---|---|---|---|---|
| SupplyNetworkPlanConfigurationSelectionCancelConfirmationMessage_sync 75000 | SupplyNetworkPlanConfigurationSelectionCancelConfirmationMessage_sync 75002 | | | | | SupplyNetworkPlanConfigurationSelectionCancelConfirmationMessage_sync 75004 |
| SupplyNetworkPlanConfiguration 75006 | | SupplyNetworkPlanConfiguration 75008 | | | 0..1 75010 | |
| | | | ID 75012 | | 1..1 75014 | SupplyNetworkPlanConfigurationID 75016 |
| Selection 75018 | | | Selection 75020 | | 1..1 75022 | |

FIG. 75-2

| Package | | | | level1 | level2 | level3 | level4 | Cardinality | Data Type Name |
|---|---|---|---|---|---|---|---|---|---|
| | | | | | | | ID 75024 | 1..1 75026 | SupplyNetworkPlanConfiguration-SelectionID 75028 |
| | Log 75030 | | | | Log 75032 | | | 1..1 75034 | Log 75036 |
| | | | | | | Business-Document-ProcessingResultCode 75038 | | 0..1 75040 | ProcessingResultCode 75042 |
| | | | | | | Maximum-LogItemSeverityCode 75044 | | 0..1 75046 | LogItemSeverityCode 75048 |
| | | | | | | Item 75050 | | 0..n 75052 | LogItem 75054 |

FIG. 76-1

| Package | | | level1 | level2 | level3 | level4 | Cardinality | Data Type Name |
|---|---|---|---|---|---|---|---|---|
| SupplyNetworkPlanConfigurationSelectionCancel-RequestMessage_sync 76000 | | | SupplyNetwork-PlanConfigura-tionSelection-CancelRe-questMes-sage_sync 76002 | | | | | SupplyNetwork-PlanConfigura-tionSelection-CancelRe-questMes-sage_sync 76004 |
| | SupplyNetworkPlanConfiguration 76006 | | | SupplyNetwork-PlanConfigura-tion 76008 | | | 1..1 76010 | |
| | | | | | ID 76012 | | 1..1 76014 | SupplyNetwork-PlanConfigura-tionID 76016 |
| | | Selection 76018 | | | Selection 76020 | | 1..1 76022 | |

FIG. 76-2

| Package | | | level1 | level2 | level3 | level4 | Cardinality | Data Type Name |
|---|---|---|---|---|---|---|---|---|
| | | | | | | ID 76024 | 1..1 76026 | SupplyNetwork-PlanConfigura-tionSelectionID 76028 |

FIG. 77-1

| Package | level1 | level2 | level3 | level4 | Cardinality | Data Type Name |
|---|---|---|---|---|---|---|
| SupplyNetworkPlanConfigurationSelectionChangeConfirmationMessage_sync 77000 | SupplyNetworkPlanConfigurationSelectionChange-Confirmation-Message_sync 77002 | | | | | SupplyNetworkPlanConfigurationSelectionChange-Confirmation-Message_sync 77004 |
| SupplyNetworkPlanConfiguration 77006 | | SupplyNetworkPlanConfiguration 77008 | | | 0..1 77010 | |
| | | | ID 77012 | | 1..1 77014 | SupplyNetworkPlanConfigurationID 77016 |
| Selection 77018 | | | Selection 77020 | | 1..1 77022 | |

FIG. 77-2

| Package | | | | level1 | level2 | level3 | level4 | Cardinality | Data Type Name |
|---|---|---|---|---|---|---|---|---|---|
| | | | | | | | ID 77024 | 1..1 77026 | SupplyNet-workPlanCon-figuration-SelectionID 77028 |
| | Log 77030 | | | | Log 77032 | | | 1..1 77034 | Log 77036 |
| | | | | | | Business-Document-Processin-gResultCode 77038 | | 0..1 77040 | Processin-gResultCode 77042 |
| | | | | | | Maximum-LogItemSever-ityCode 77044 | | 0..1 77046 | LogItemSever-ityCode 77048 |
| | | | | | | Item 77050 | | 0..n 77052 | LogItem 77054 |

FIG. 78-1

| Package | | | level1 | level2 | level3 | level4 | Cardinality | Data Type Name |
|---|---|---|---|---|---|---|---|---|
| SupplyNetworkPlanConfigurationSelection-ChangeRequestMessage_sync 78000 | | | SupplyNetwork-PlanConfiguration-Selection-ChangeRe-questMes-sage_sync 78002 | | | | | SupplyNetwork-PlanConfigura-tionSelection-ChangeRe-questMes-sage_sync 78004 |
| | SupplyNetworkPlanConfiguration 78006 | | | SupplyNetwork-PlanConfigura-tion 78008 | | | 1..1 78010 | |
| | | | | | ID 78012 | | 1..1 78014 | SupplyNetwork-PlanConfigura-tionID 78016 |
| | | Selection 78018 | | Selection 78020 | | | 1..1 78022 | |

FIG. 78-2

| Package | | | level1 | level2 | level3 | level4 | Cardinality | Data Type Name |
|---|---|---|---|---|---|---|---|---|
| | | | | | ID 78024 | | 1..1 78026 | SupplyNetwork-PlanConfiguration-SelectionID 78028 |
| | | | | | SelectionCrite-rion 78030 | | 1..n 78032 | |
| | | | | | | RowOrdinal-NumberValue 78034 | 1..1 78036 | OrdinalNumber-Value 78038 |
| | | | | | | SupplyNetwork-PlanCharacteris-ticID 78040 | 1..1 78042 | SupplyNetwork-PlanCharacteris-ticID 78044 |
| | | | | | | InclusionExclu-sionCode 78046 | 0..1 78048 | InclusionExclu-sionCode 78050 |

FIG. 78-3

| Package | | | level1 | level2 | level3 | level4 | Cardinality | Data Type Name |
|---|---|---|---|---|---|---|---|---|
| | | | | | | InclusionExclusionName 78052 | 0..1 78054 | MEDIUM_Name 78056 |
| | | | | | | IntervalBoundaryTypeCode 78058 | 1..1 78060 | IntervalBoundaryTypeCode 78062 |
| | | | | | | IntervalBoundaryTypeName 78064 | 1..1 78066 | MEDIUM_Name 78068 |
| | | | | | | LowerBoundarySupplyNetworkPlanCharacteristicValue 78070 | 0..1 78072 | SupplyNetworkPlanCharacteristicValue 78074 |
| | | | | | | UpperBoundarySupplyNetworkPlanCharacteristicValue 78076 | 0..1 78078 | SupplyNetworkPlanCharacteristicValue 78080 |

FIG. 78-4

| Package | | | level1 | level2 | level3 | level4 | Cardinality | Data Type Name |
|---|---|---|---|---|---|---|---|---|
| | | | | | SelectionGroup 78082 | | 1..n 78084 | |
| | | | | | | RowOrdinal-NumberValue 78086 | 1..1 78088 | OrdinalNumber-Value 78090 |
| | | | | | | SupplyNetwork-PlanCharacteris-ticID 78092 | 1..1 78094 | SupplyNetwork-PlanCharacteris-ticID 78096 |

FIG. 79-1

| Package | level1 | level2 | level3 | level4 | Cardinality | Data Type Name |
|---|---|---|---|---|---|---|
| SupplyNetworkPlanConfigurationSelectionCreateConfirmationMessage_sync 79000 | SupplyNetworkPlanConfigurationSelectionCreateConfirmationMessage_sync 79002 | | | | | SupplyNetworkPlanConfigurationSelectionCreateConfirmationMessage_sync 79004 |
| SupplyNetworkPlanConfiguration 79006 | | SupplyNetworkPlanConfiguration 79008 | | | 0..1 79010 | |
| | | | ID 79012 | | 1..1 79014 | SupplyNetworkPlanConfigurationID 79016 |
| Selection 79018 | | | Selection 79020 | | 1..1 79022 | |

FIG. 79-2

| Package | | | | level1 | level2 | level3 | level4 | Cardinality | Data Type Name |
|---|---|---|---|---|---|---|---|---|---|
| | | | | | | | ID 79024 | 1..1 79026 | SupplyNetworkPlanConfigurationSelectionID 79028 |
| | Log 79030 | | | | Log 79032 | | | 1..1 79034 | Log 79036 |
| | | | | | | BusinessDocumentProcessingResultCode 79038 | | 0..1 79040 | ProcessingResultCode 79042 |
| | | | | | | MaximumLogItemSeverityCode 79044 | | 0..1 79046 | LogItemSeverityCode 79048 |
| | | | | | | Item 79050 | | 0..n 79052 | LogItem 79054 |

FIG. 80-1

| Package | | | level1 | level2 | level3 | level4 | Cardinality | Data Type Name |
|---|---|---|---|---|---|---|---|---|
| SupplyNetworkPlanConfigurationSelectionCreateRequestMessage_sync 80000 | | | SupplyNetworkPlanConfigurationSelectionCreateRequestMessage_sync 80002 | | | | | SupplyNetworkPlanConfigurationSelectionCreateRequestMessage_sync 80004 |
| | SupplyNetworkPlanConfiguration 80006 | | | SupplyNetworkPlanConfiguration 80008 | | | 1..1 80010 | |
| | | | | | ID 80012 | | 1..1 80014 | SupplyNetworkPlanConfigurationID 80016 |
| | | Selection 80018 | | Selection 80020 | | | 1..1 80022 | |

FIG. 80-2

| Package | | | level1 | level2 | level3 | level4 | Cardinality | Data Type Name |
|---|---|---|---|---|---|---|---|---|
| | | | | | ID 80024 | | 1..1 80026 | SupplyNetwork-PlanConfigura-tionSelectionID 80028 |
| | | | | | SelectionCrite-rion 80030 | | 1..n 80032 | |
| | | | | | | RowOrdinal-NumberValue 80034 | 1..1 80036 | OrdinalNumber-Value 80038 |
| | | | | | | SupplyNetwork-PlanCharacteris-ticID 80040 | 1..1 80042 | SupplyNetwork-PlanConfigura-tionCharacteris-ticID 80044 |
| | | | | | | InclusionExclu-sionCode 80046 | 0..1 80048 | InclusionExclu-sionCode 80050 |

FIG. 80-3

| Package | | | level1 | level2 | level3 | level4 | Cardinality | Data Type Name |
|---|---|---|---|---|---|---|---|---|
| | | | | | | InclusionExclusionName 80052 | 0..1 80054 | MEDIUM_Name 80056 |
| | | | | | | IntervalBoundaryTypeCode 80058 | 1..1 80060 | IntervalBoundaryTypeCode 80062 |
| | | | | | | IntervalBoundaryTypeName 80064 | 1..1 80066 | MEDIUM_Name 80068 |
| | | | | | | LowerBoundarySupplyNetworkPlanCharacteristicValue 80070 | 0..1 80072 | SupplyNetworkPlanCharacteristicValue 80074 |
| | | | | | | UpperBoundarySupplyNetworkPlanCharacteristicValue 80076 | 0..1 80078 | SupplyNetworkPlanCharacteristicValue 80080 |

FIG. 80-4

| Package | | | level1 | level2 | level3 | level4 | Cardinality | Data Type Name |
|---|---|---|---|---|---|---|---|---|
| | | | | | SelectionGroup 80082 | | 1..n 80084 | |
| | | | | | | RowOrdinal-NumberValue 80086 | 1..1 80088 | OrdinalNumber-Value 80090 |
| | | | | | | SupplyNetwork-PlanCharacteris-ticID 80092 | 1..1 80094 | SupplyNetwork-PlanConfigura-tionCharacteris-ticID 80096 |

FIG. 81

| Package | | level1 | level2 | level3 | Cardinality | Data Type Name |
|---|---|---|---|---|---|---|
| SupplyNetworkPlanConfigurationSimpleBy-IDQueryMessage_sync 81000 | | SupplyNetworkPlan-ConfigurationSim-pleByIDQueryMes-sage_sync 81002 | | | | SupplyNetworkPlan-ConfigurationSim-pleByIDQueryMes-sage_sync 81004 |
| | Selection 81006 | | SupplyNetworkPlan-ConfigurationSim-pleSelectionByID 81008 | | 1..1 81010 | |
| | | | | SupplyNetworkPlan-ConfigurationID 81012 | 1..1 81014 | SupplyNetworkPlan-ConfigurationID 81016 |

FIG. 82-1

| Package | | level1 | level2 | level3 | Cardinality | Data Type Name |
|---|---|---|---|---|---|---|
| SupplyNetworkPlanConfigurationSimpleByIDResponseMessage_sync 82000 | | SupplyNetworkPlanConfigurationSimpleByIDResponseMessage_sync 82002 | | | | SupplyNetworkPlanConfigurationSimpleByIDResponseMessage_sync 82004 |
| | SupplyNetworkPlanConfiguration 82006 | | SupplyNetworkPlanConfiguration 82008 | | 0..n 82010 | |
| | | | | ID 82012 | 1..1 82014 | SupplyNetworkPlanConfigurationID 82016 |
| | | | | Description 82018 | 1..1 82020 | MEDIUM_Description 82022 |
| | Log 82024 | | Log 82026 | | 1..1 82028 | Log 82030 |

FIG. 82-2

| Package | | level1 | level2 | level3 | Cardinality | Data Type Name |
|---|---|---|---|---|---|---|
| | | | | BusinessDocument-ProcessingResult-Code 82032 | 0..1 82034 | ProcessingResult-Code 82036 |
| | | | | MaximumLogItem-SeverityCode 82038 | 0..1 82040 | LogItemSeverityCode 82042 |
| | | | | Item 82044 | 0..n 82046 | LogItem 82048 |

FIG. 105-1

| Package | level1 | level2 | level3 | level4 | Cardinality | Data Type Name |
|---|---|---|---|---|---|---|
| SupplyNetworkPlanningAggregateHierarchyByIDQueryMessage_sync 105000 | SupplyNetworkPlanningAggregateHierarchyByIDQueryMessage_sync 105002 | | | | | SupplyNetworkPlanningAggregateHierarchyByIDQueryMessage_sync 105004 |
| MessageHeader 105006 | | MessageHeader 105008 | | | 1 105010 | BusinessDocumentMessageHeader 105012 |
| | | | ID 105014 | | 1..1 105016 | BusinessDocumentMessageID 105018 |
| | | | ReferenceID 105020 | | 0..1 105022 | BusinessDocumentMessageID 105024 |
| | | | CreationDateTime 105026 | | 1..1 105028 | GLOBAL_DateTime 105030 |
| | | | TestDataIndicator 105032 | | 0..1 105034 | Indicator 105036 |

FIG. 105-2

| Package | level1 | level2 | level3 | level4 | Cardinality | Data Type Name |
|---|---|---|---|---|---|---|
| | | | ReconciliationIndicator 105038 | | 0..1 105040 | Indicator 105042 |
| | | | SenderParty 105044 | | 0..1 105046 | BusinessDocumentMessageHeader-Party 105048 |
| | | | | InternalID 105050 | 0..1 105052 | PartyInternalID 105054 |
| | | | | StandardID 105056 | 0..n 105058 | PartyStandardID 105060 |
| | | | | ContactPerson 105062 | 0..1 105064 | BusinessDocumentMessageHeader-PartyContactPerson 105066 |
| | | | RecipientParty 105068 | | 0..n 105070 | BusinessDocumentMessageHeader-Party 105072 |

FIG. 105-3

| Package | level1 | level2 | level3 | level4 | Cardinality | Data Type Name |
|---|---|---|---|---|---|---|
| | | | | InternalID 105074 | 0..1 105076 | PartyInternalID 105078 |
| | | | | StandardID 105080 | 0..n 105082 | PartyStandardID 105084 |
| | | | | ContactPerson 105086 | 0..1 105088 | BusinessDocumentMessageHeader-PartyContactPerson 105090 |
| | | | BusinessScopeBusi-nessProcess 105092 | | 0..n 105094 | BusinessScopeBusinessProcess 105096 |
| | | | | TypeCode 105098 | 1..1 105100 | BusinessScopeBusinessProc-essTypeCode 105102 |
| | | | | InstanceID 105104 | 0..1 105106 | BusinessScopeBusinessProcessIn-stanceID 105108 |

FIG. 105-4

| Package | level1 | level2 | level3 | level4 | Cardinality | Data Type Name |
|---|---|---|---|---|---|---|
| | | | | ID 105110 | 0..1 105112 | BusinessScopeBusinessProcessID 105114 |
| Selection 105116 | | SupplyNetworkPlanningAggregateHierarchySelectionByID 105118 | | | 1 105120 | ... |
| | | | ID 105122 | | 1 105124 | SupplyNetworkPlanningAggregateHierarchyID 105126 |

FIG. 106-1

| Package | level1 | level2 | level3 | level4 | level5 | Cardinality | Data Type Name |
|---|---|---|---|---|---|---|---|
| SupplyNetwork-PlanningAggre-gateHierarchyBy-IDResponseMes-sage_sync 106000 | SupplyNet-workPlannin-gAggregate-HierarchyBy-IDResponse-Message_sync 106002 | | | | | | SupplyNetworkPlanningAggregate-HierarchyByIDResponseMes-sage_sync 106004 |
| MessageHeader 106006 | | Message-Header 106008 | | | | 1 106010 | BusinessDocumentMessageHeader 106012 |
| | | | ID 106014 | | | 1..1 106016 | BusinessDocumentMessageID 106018 |
| | | | ReferenceID 106020 | | | 0..1 106022 | BusinessDocumentMessageID 106024 |
| | | | CreationDateTime 106026 | | | 1..1 106028 | GLOBAL_DateTime 106030 |

FIG. 106-2

| Package | level1 | level2 | level3 | level4 | level5 | Cardinality | Data Type Name |
|---|---|---|---|---|---|---|---|
| | | | TestDataIndicator 106032 | | | 0..1 106034 | Indicator 106036 |
| | | | ReconciliationIndicator 106038 | | | 0..1 106040 | Indicator 106042 |
| | | | SenderParty 106044 | | | 0..1 106046 | BusinessDocumentMessageHeaderParty 106048 |
| | | | | InternalID 106050 | | 0..1 106052 | PartyInternalID 106054 |
| | | | | StandardID 106056 | | 0..n 106058 | PartyStandardID 106060 |
| | | | | ContactPerson 106062 | | 0..1 106064 | BusinessDocumentMessageHeaderPartyContactPerson 106066 |

FIG. 106-3

| Package | level1 | level2 | level3 | level4 | level5 | Cardinality | Data Type Name |
|---|---|---|---|---|---|---|---|
| | | | RecipientParty 106068 | | | 0..n 106070 | BusinessDocumentMessageHeaderParty 106072 |
| | | | | InternalID 106074 | | 0..1 106076 | PartyInternalID 106078 |
| | | | | StandardID 106080 | | 0..n 106082 | PartyStandardID 106084 |
| | | | | ContactPerson 106086 | | 0..1 106088 | BusinessDocumentMessageHeaderPartyContactPerson 106090 |
| | | | BusinessScopeBusinessProcess 106092 | | | 0..n 106094 | BusinessScopeBusinessProcess 106096 |
| | | | | TypeCode 106098 | | 1..1 106100 | BusinessScopeBusinessProcessTypeCode 106102 |

FIG. 106-4

| Package | level1 | level2 | level3 | level4 | level5 | Cardinality | Data Type Name |
|---|---|---|---|---|---|---|---|
| | | | | InstanceID 106104 | | 0..1 106106 | BusinessScopeBusinessProcessInstanceID 106108 |
| | | | | ID 106110 | | 0..1 106112 | BusinessScopeBusinessProcessID 106114 |
| SupplyNetworkPlanningAggregateHierarchy 106116 | | SupplyNetworkPlanningAggregateHierarchy 106118 | | | | 0..1 106120 | ... |
| | | | ID 106122 | | | 1 106124 | SupplyNetworkPlanningAggregateHierarchyID 106126 |
| | | | UsageCode 106128 | | | 1 106130 | SupplyNetworkPlanningAggregateHierarchyUsageCode 106132 |

FIG. 106-5

| Package | level1 | level2 | level3 | level4 | level5 | Cardinality | Data Type Name |
|---|---|---|---|---|---|---|---|
| AggregateIn-stance 106134 | | | AggregateInstance 106136 | | | 1..n 106138 | |
| | | | | ID 106140 | | 1 106142 | SupplyNetworkPlanningAggregate-HierarchyAggregateInstanceID 106144 |
| | | | | ParentSupplyNetwork PlanningAggregate-HierarchyAggre-gateInstanceID 106146 | | 1 106148 | SupplyNetworkPlanningAggregate-HierarchyAggregateInstanceID 106150 |
| | | | | ApplyIndicator 106152 | | 1 106154 | ApplyIndicator 106156 |
| | | | | CharacteristicValue 106158 | | 0..n 106160 | |

FIG. 106-6

| Package | level1 | level2 | level3 | level4 | level5 | Cardinality | Data Type Name |
|---|---|---|---|---|---|---|---|
| | | | | | SupplyNetwork-PlanCharacteristicID 106162 | 1 106164 | SupplyNetworkPlanCharacteristicID 106166 |
| | | | | | SupplyNetwork-PlanCharacteris-ticValue 106168 | 1 106170 | SupplyNetworkPlanCharacteris-ticValue 106172 |
| NavigationStep 106174 | | | NavigationStep 106176 | | | 0..n 106178 | |
| | | | | OrdinalNumberValue 106180 | | 1 106182 | OrdinalNumberValue 106184 |
| | | | | ID 106186 | | 1 106188 | SupplyNetworkPlanningAggregate-HierarchyNavigationStepID 106190 |

FIG. 106-7

| Package | level1 | level2 | level3 | level4 | level5 | Cardinality | Data Type Name |
|---|---|---|---|---|---|---|---|
| | | | | SupplyNetworkPlanningAggregateHierarchyActionStepTypeCode 106192 | | 1 106194 | SupplyNetworkPlanningAggregateHierarchyActionStepTypeCode 106196 |
| | | | | SupplyNetworkPlanCharacteristicID 106198 | | 1 106200 | SupplyNetworkPlanCharacteristicID 106202 |
| ExpandStep 106204 | | | ExpandStep 106206 | | | 0..n 106208 | |
| | | | | OrdinalNumberValue 106210 | | 1 106212 | OrdinalNumberValue 106214 |
| | | | | ID 106216 | | 1 106218 | SupplyNetworkPlanningAggregateHierarchyExpandStepID 106220 |

FIG. 106-8

| Package | level1 | level2 | level3 | level4 | level5 | Cardinality | Data Type Name |
|---|---|---|---|---|---|---|---|
| | | | | SupplyNetworkPlanningAggregateHierarchyActionStepTypeCode 106222 | | 1 106224 | SupplyNetworkPlanningAggregateHierarchyActionStepTypeCode 106226 |
| | | | | SupplyNetworkPlanCharacteristicID 106228 | | 1 106230 | SupplyNetworkPlanCharacteristicID 106232 |
| Log 106234 | | Log 106236 | | | | 1 106238 | Log 106240 |
| | | | BusinessDocumentProcessingResultCode 106242 | | | 0..1 106244 | ProcessingResultCode 106246 |
| | | | MaximumLogItemSeverityCode 106248 | | | 0..1 106250 | LogItemSeverityCode 106252 |

FIG. 106-9

| Package | level1 | level2 | level3 | level4 | level5 | Cardinality | Data Type Name |
|---|---|---|---|---|---|---|---|
| | | | Item 106254 | | | 0..n 106256 | LogItem 106258 |

FIG. 107-1

| Package | level1 | level2 | level3 | level4 | Cardinality | Data Type Name |
|---|---|---|---|---|---|---|
| SupplyNetworkPlanningAggregateHierarchyCancelConfirmationMessage_sync 107000 | SupplyNetworkPlanningAggregateHierarchyCancelConfirmationMessage_sync 107002 | | | | | SupplyNetworkPlanningAggregateHierarchyCancelConfirmationMessage_sync 107004 |
| MessageHeader 107006 | | MessageHeader 107008 | | | 1 107010 | BusinessDocumentMessageHeader 107012 |
| | | | ID 107014 | | 1..1 107016 | BusinessDocumentMessageID 107018 |
| | | | ReferenceID 107020 | | 0..1 107022 | BusinessDocumentMessageID 107024 |
| | | | CreationDateTime 107026 | | 1..1 107028 | GLOBAL_DateTime 107030 |
| | | | TestDataIndicator 107032 | | 0..1 107034 | Indicator 107036 |

FIG. 107-2

| Package | level1 | level2 | level3 | level4 | Cardinality | Data Type Name |
|---|---|---|---|---|---|---|
| | | | ReconciliationIndicator 107038 | | 0..1 107040 | Indicator 107042 |
| | | | SenderParty 107044 | | 0..1 107046 | BusinessDocumentMessageHead-erParty 107048 |
| | | | | InternalID 107050 | 0..1 107052 | PartyInternalID 107054 |
| | | | | StandardID 107056 | 0..n 107058 | PartyStandardID 107060 |
| | | | | ContactPerson 107062 | 0..1 107064 | BusinessDocumentMessageHead-erPartyContactPerson 107066 |
| | | | RecipientParty 107068 | | 0..n 107070 | BusinessDocumentMessageHead-erParty 107072 |

FIG. 107-3

| Package | level1 | level2 | level3 | level4 | Cardinality | Data Type Name |
|---|---|---|---|---|---|---|
| | | | | InternalID 107074 | 0..1 107076 | PartyInternalID 107078 |
| | | | | StandardID 107080 | 0..n 107082 | PartyStandardID 107084 |
| | | | | ContactPerson 107086 | 0..1 107088 | BusinessDocumentMessageHead-erPartyContactPerson 107090 |
| | | | BusinessScopeBusi-nessProcess 107092 | | 0..n 107094 | BusinessScopeBusinessProcess 107096 |
| | | | | TypeCode 107098 | 1..1 107100 | BusinessScopeBusinessProc-essTypeCode 107102 |
| | | | | InstanceID 107104 | 0..1 107106 | BusinessScopeBusinessProcessIn-stanceID 107108 |

FIG. 107-4

| Package | level1 | level2 | level3 | level4 | Cardinality | Data Type Name |
|---|---|---|---|---|---|---|
| | | | | ID 107110 | 0..1 107112 | BusinessScopeBusinessProcessID 107114 |
| SupplyNetworkPlanningAggregateHierarchy 107116 | | SupplyNetworkPlanningAggregateHierarchy 107118 | | | 0..1 107120 | ... |
| | | | ID 107122 | | 1 107124 | SupplyNetworkPlanningAggregateHierarchyID 107126 |
| Log 107128 | | Log 107130 | | | 1 107132 | Log 107134 |
| | | | BusinessDocumentProcessingResultCode 107136 | | 0..1 107138 | ProcessingResultCode 107140 |

FIG. 107-5

| Package | level1 | level2 | level3 | level4 | Cardinality | Data Type Name |
|---|---|---|---|---|---|---|
| | | | MaximumLogItem-SeverityCode 107142 | | 0..1 107144 | LogItemSeverityCode 107146 |
| | | | Item 107148 | | 0..n 107150 | LogItem 107152 |

FIG. 108-1

| Package | level1 | level2 | level3 | level4 | Cardinality | Data Type Name |
|---|---|---|---|---|---|---|
| SupplyNetworkPlanningAggregateHierarchyCancelRequestMessage_sync 108000 | SupplyNetworkPlanningAggregateHierarchyCancelRequestMessage_sync 108002 | | | | | SupplyNetworkPlanningAggregateHierarchyCancelRequestMessage_sync 108004 |
| MessageHeader 108006 | | MessageHeader 108008 | | | 1 108010 | BusinessDocumentMessageHeader 108012 |
| | | | ID 108014 | | 1..1 108016 | BusinessDocumentMessageID 108018 |
| | | | ReferenceID 108020 | | 0..1 108022 | BusinessDocumentMessageID 108024 |
| | | | CreationDateTime 108026 | | 1..1 108028 | GLOBAL_DateTime 108030 |
| | | | TestDataIndicator 108032 | | 0..1 108034 | Indicator 108036 |

FIG. 108-2

| Package | level1 | level2 | level3 | level4 | Cardinality | Data Type Name |
|---|---|---|---|---|---|---|
| | | | ReconciliationIndicator 108038 | | 0..1 108040 | Indicator 108042 |
| | | | SenderParty 108044 | | 0..1 108046 | BusinessDocumentMessageHeaderParty 108048 |
| | | | | InternalID 108050 | 0..1 108052 | PartyInternalID 108054 |
| | | | | StandardID 108056 | 0..n 108058 | PartyStandardID 108060 |
| | | | | ContactPerson 108062 | 0..1 108064 | BusinessDocumentMessageHeaderParty-ContactPerson 108066 |
| | | | RecipientParty 108068 | | 0..n 108070 | BusinessDocumentMessageHeaderParty 108072 |

FIG. 108-3

| Package | level1 | level2 | level3 | level4 | Cardinality | Data Type Name |
|---|---|---|---|---|---|---|
| | | | | InternalID 108074 | 0..1 108076 | PartyInternalID 108078 |
| | | | | StandardID 108080 | 0..n 108082 | PartyStandardID 108084 |
| | | | | ContactPerson 108086 | 0..1 108088 | BusinessDocumentMessageHeaderParty-ContactPerson 108090 |
| | | | BusinessScopeBusi-nessProcess 108092 | | 0..n 108094 | BusinessScopeBusinessProcess 108096 |
| | | | | TypeCode 108098 | 1..1 108100 | BusinessScopeBusinessProcessTypeCode 108102 |
| | | | | InstanceID 108104 | 0..1 108106 | BusinessScopeBusinessProcessInstanceID 108108 |

FIG. 108-4

| Package | level1 | level2 | level3 | level4 | Cardinality | Data Type Name |
|---|---|---|---|---|---|---|
| | | | | ID 108110 | 0..1 108112 | BusinessScopeBusinessProcessID 108114 |
| SupplyNetworkPlanningAggregateHierarchy 108116 | | SupplyNetworkPlanningAggregateHierarchy 108118 | | | 1 108120 | ... |
| | | | ID 108122 | | 1 108124 | SupplyNetworkPlanningAggregateHierarchyID 108126 |

FIG. 109-1

| Package | level1 | level2 | level3 | level4 | Cardinality | Data Type Name |
|---|---|---|---|---|---|---|
| SupplyNetworkPlanningAggregateHierarchy-ChangeConfirmation-Message_sync 109000 | SupplyNetworkPlanningAggregateHierarchy-ChangeConfirmation-Message_sync 109002 | | | | | SupplyNetworkPlanningAggregateHierarchyChangeConfirmationMessage_sync 109004 |
| MessageHeader 109006 | | MessageHeader 109008 | | | 1 109010 | BusinessDocumentMessageHeader 109012 |
| | | | ID 109014 | | 1..1 109016 | BusinessDocumentMessageID 109018 |
| | | | ReferenceID 109020 | | 0..1 109022 | BusinessDocumentMessageID 109024 |
| | | | CreationDateTime 109026 | | 1..1 109028 | GLOBAL_DateTime 109030 |
| | | | TestDataIndicator 109032 | | 0..1 109034 | Indicator 109036 |

FIG. 109-2

| Package | level1 | level2 | level3 | level4 | Cardinality | Data Type Name |
|---|---|---|---|---|---|---|
| | | | ReconciliationIndicator 109038 | | 0..1 109040 | Indicator 109042 |
| | | | SenderParty 109044 | | 0..1 109046 | BusinessDocumentMessageHeaderParty 109048 |
| | | | | InternalID 109050 | 0..1 109052 | PartyInternalID 109054 |
| | | | | StandardID 109056 | 0..n 109058 | PartyStandardID 109060 |
| | | | | ContactPerson 109062 | 0..1 109064 | BusinessDocumentMessageHeaderPartyContactPerson 109066 |
| | | | RecipientParty 109068 | | 0..n 109070 | BusinessDocumentMessageHeaderParty 109072 |

FIG. 109-3

| Package | level1 | level2 | level3 | level4 | Cardinality | Data Type Name |
|---|---|---|---|---|---|---|
| | | | | InternalID 109074 | 0..1 109076 | PartyInternalID 109078 |
| | | | | StandardID 109080 | 0..n 109082 | PartyStandardID 109084 |
| | | | | ContactPerson 109086 | 0..1 109088 | BusinessDocumentMessageHeaderPartyCon-tactPerson 109090 |
| | | | BusinessScopeBusi-nessProcess 109092 | | 0..n 109094 | BusinessScopeBusinessProcess 109096 |
| | | | | TypeCode 109098 | 1..1 109100 | BusinessScopeBusinessProcessTypeCode 109102 |
| | | | | InstanceID 109104 | 0..1 109106 | BusinessScopeBusinessProcessInstanceID 109108 |

FIG. 109-4

| Package | level1 | level2 | level3 | level4 | Cardinality | Data Type Name |
|---|---|---|---|---|---|---|
| | | | | ID 109110 | 0..1 109112 | BusinessScopeBusinessProcessID 109114 |
| SupplyNetworkPlanningAggregateHierarchy 109116 | | SupplyNetworkPlanningAggregateHierarchy 109118 | | | 0..1 109120 | ... |
| | | | ID 109122 | | 1 109124 | SupplyNetworkPlanningAggregateHierarchyID 109126 |
| Log 109128 | | Log 109130 | | | 1 109132 | Log 109134 |
| | | | BusinessDocumentProcessingResultCode 109136 | | 0..1 109138 | ProcessingResultCode 109140 |
| | | | MaximumLogItemSeverityCode 109142 | | 0..1 109144 | LogItemSeverityCode 109146 |

FIG. 109-5

| Package | level1 | level2 | level3 | level4 | Cardinality | Data Type Name |
|---|---|---|---|---|---|---|
| | | | Item 109148 | | 0..n 109150 | LogItem 109152 |

FIG. 110-1

| Package | level1 | level2 | level3 | level4 | Cardinality | Data Type Name |
|---|---|---|---|---|---|---|
| SupplyNetworkPlanningAggregateHierarchyChangeRequest-Message_sync 110000 | SupplyNetworkPlanningAggregateHierarchyChangeRequest-Message_sync 110002 | | | | | SupplyNetworkPlanningAggregateHierarchy-ChangeRequestMessage_sync 110004 |
| MessageHeader 110006 | | MessageHeader 110008 | | | 1 110010 | BusinessDocumentMessageHeader 110012 |
| | | | ID 110014 | | 1..1 110016 | BusinessDocumentMessageID 110018 |
| | | | ReferenceID 110020 | | 0..1 110022 | BusinessDocumentMessageID 110024 |
| | | | CreationDateTime 110026 | | 1..1 110028 | GLOBAL_DateTime 110030 |
| | | | TestDataIndicator 110032 | | 0..1 110034 | Indicator 110036 |

FIG. 110-2

| Package | level1 | level2 | level3 | level4 | Cardinality | Data Type Name |
|---|---|---|---|---|---|---|
| | | | ReconciliationIndicator 110038 | | 0..1 110040 | Indicator 110042 |
| | | | SenderParty 110044 | | 0..1 110046 | BusinessDocumentMessageHeaderParty 110048 |
| | | | | InternalID 110050 | 0..1 110052 | PartyInternalID 110054 |
| | | | | StandardID 110056 | 0..n 110058 | PartyStandardID 110060 |
| | | | | ContactPerson 110062 | 0..1 110064 | BusinessDocumentMessageHeaderPartyCon-tactPerson 110066 |
| | | | RecipientParty 110068 | | 0..n 110070 | BusinessDocumentMessageHeaderParty 110072 |

FIG. 110-3

| Package | level1 | level2 | level3 | level4 | Cardinality | Data Type Name |
|---|---|---|---|---|---|---|
| | | | | InternalID 110074 | 0..1 110076 | PartyInternalID 110078 |
| | | | | StandardID 110080 | 0..n 110082 | PartyStandardID 110084 |
| | | | | ContactPerson 110086 | 0..1 110088 | BusinessDocumentMessageHeaderPartyContactPerson 110090 |
| | | | BusinessScopeBusinessProcess 110092 | | 0..n 110094 | BusinessScopeBusinessProcess 110096 |
| | | | | TypeCode 110098 | 1..1 110100 | BusinessScopeBusinessProcessTypeCode 110102 |
| | | | | InstanceID 110104 | 0..1 110106 | BusinessScopeBusinessProcessInstanceID 110108 |

FIG. 110-4

| Package | level1 | level2 | level3 | level4 | Cardinality | Data Type Name |
|---|---|---|---|---|---|---|
| | | | | ID 110110 | 0..1 110112 | BusinessScopeBusinessProcessID 110114 |
| SupplyNetworkPlanningAggregateHierarchy 110116 | | SupplyNetworkPlanningAggregateHierarchy 110118 | | | 1 110120 | ... |
| | | | ID 110122 | | 1 110124 | SupplyNetworkPlanningAggregateHierarchyID 110126 |
| AggregateInstance 110128 | | | AggregateInstance 110130 | | 1..n 110132 | |
| | | | | ID 110134 | 1 110136 | SupplyNetworkPlanningAggregateHierarchyAggregateInstanceID 110138 |
| | | | | ApplyIndicator 110140 | 1 110142 | ApplyIndicator 110144 |

FIG. 111-1

| Package | level1 | level2 | level3 | level4 | Cardinality | Data Type Name |
|---|---|---|---|---|---|---|
| SupplyNetworkPlanningAggregateHierarchyCreateConfirmationMessage_sync 111000 | SupplyNetworkPlanningAggregateHierarchyCreateConfirmationMessage_sync 111002 | | | | | SupplyNetworkPlanningAggregateHierarchyCreateConfirmationMessage_sync 111004 |
| MessageHeader 111006 | | MessageHeader 111008 | | | 1 111010 | BusinessDocumentMessageHeader 111012 |
| | | | ID 111014 | | 1..1 111016 | BusinessDocumentMessageID 111018 |
| | | | ReferenceID 111020 | | 0..1 111022 | BusinessDocumentMessageID 111024 |
| | | | CreationDateTime 111026 | | 1..1 111028 | GLOBAL_DateTime 111030 |
| | | | TestDataIndicator 111032 | | 0..1 111034 | Indicator 111036 |

FIG. 111-2

| Package | level1 | level2 | level3 | level4 | Cardinality | Data Type Name |
|---|---|---|---|---|---|---|
| | | | ReconciliationIndicator 111038 | | 0..1 111040 | Indicator 111042 |
| | | | SenderParty 111044 | | 0..1 111046 | BusinessDocumentMessageHead-erParty 111048 |
| | | | | InternalID 111050 | 0..1 111052 | PartyInternalID 111054 |
| | | | | StandardID 111056 | 0..n 111058 | PartyStandardID 111060 |
| | | | | ContactPerson 111062 | 0..1 111064 | BusinessDocumentMessageHead-erPartyContactPerson 111066 |
| | | | RecipientParty 111068 | | 0..n 111070 | BusinessDocumentMessageHead-erParty 111072 |

FIG. 111-3

| Package | level1 | level2 | level3 | level4 | Cardinality | Data Type Name |
|---|---|---|---|---|---|---|
| | | | | InternalID 111074 | 0..1 111076 | PartyInternalID 111078 |
| | | | | StandardID 111080 | 0..n 111082 | PartyStandardID 111084 |
| | | | | ContactPerson 111086 | 0..1 111088 | BusinessDocumentMessageHeaderPartyContactPerson 111090 |
| | | | BusinessScopeBusinessProcess 111092 | | 0..n 111094 | BusinessScopeBusinessProcess 111096 |
| | | | | TypeCode 111098 | 1..1 111100 | BusinessScopeBusinessProcessTypeCode 111102 |
| | | | | InstanceID 111104 | 0..1 111106 | BusinessScopeBusinessProcessInstanceID 111108 |

FIG. 111-4

| Package | level1 | level2 | level3 | level4 | Cardinality | Data Type Name |
|---|---|---|---|---|---|---|
| | | | | ID 111110 | 0..1 111112 | BusinessScopeBusinessProcessID 111114 |
| SupplyNetworkPlannin-gAggregateHierarchy 111116 | | SupplyNetwork-PlanningAggre-gateHierarchy 111118 | | | 0..1 111120 | ... |
| | | | ID 111122 | | 1 111124 | SupplyNetworkPlanningAggregate-HierarchyID 111126 |
| Log 111128 | | Log 111130 | | | 1 111132 | Log 111134 |
| | | | BusinessDocument-ProcessingResultCode 111136 | | 0..1 111138 | ProcessingResultCode 111140 |

FIG. 111-5

| Package | level1 | level2 | level3 | level4 | Cardinality | Data Type Name |
|---|---|---|---|---|---|---|
| | | | MaximumLogItem-SeverityCode 111142 | | 0..1 111144 | LogItemSeverityCode 111146 |
| | | | Item 111148 | | 0..n 111150 | LogItem 111152 |

FIG. 112-1

| Package | level1 | level2 | level3 | level4 | Cardinality | Data Type Name |
|---|---|---|---|---|---|---|
| SupplyNetworkPlanningAggregateHierarchyCreateRequestMessage_sync 112000 | SupplyNetworkPlanningAggregateHierarchyCreateRequestMessage_sync 112002 | | | | | SupplyNetworkPlanningAggregateHierarchyCreateRequestMessage_sync 112004 |
| MessageHeader 112006 | | MessageHeader 112008 | | | 1 112010 | BusinessDocumentMessageHeader 112012 |
| | | | ID 112014 | | 1..1 112016 | BusinessDocumentMessageID 112018 |
| | | | ReferenceID 112020 | | 0..1 112022 | BusinessDocumentMessageID 112024 |
| | | | CreationDateTime 112026 | | 1..1 112028 | GLOBAL_DateTime 112030 |
| | | | TestDataIndicator 112032 | | 0..1 112034 | Indicator 112036 |

FIG. 112-2

| Package | level1 | level2 | level3 | level4 | Cardinality | Data Type Name |
|---|---|---|---|---|---|---|
| | | | ReconciliationIndicator 112038 | | 0..1 112040 | Indicator 112042 |
| | | | SenderParty 112044 | | 0..1 112046 | BusinessDocumentMessageHead-erParty 112048 |
| | | | | InternalID 112050 | 0..1 112052 | PartyInternalID 112054 |
| | | | | StandardID 112056 | 0..n 112058 | PartyStandardID 112060 |
| | | | | ContactPerson 112062 | 0..1 112064 | BusinessDocumentMessageHead-erPartyContactPerson 112066 |
| | | | RecipientParty 112068 | | 0..n 112070 | BusinessDocumentMessageHead-erParty 112072 |

FIG. 112-3

| Package | level1 | level2 | level3 | level4 | Cardinality | Data Type Name |
|---|---|---|---|---|---|---|
| | | | | InternalID 112074 | 0..1 112076 | PartyInternalID 112078 |
| | | | | StandardID 112080 | 0..n 112082 | PartyStandardID 112084 |
| | | | | ContactPerson 112086 | 0..1 112088 | BusinessDocumentMessageHeaderPartyContactPerson 112090 |
| | | | BusinessScopeBusinessProcess 112092 | | 0..n 112094 | BusinessScopeBusinessProcess 112096 |
| | | | | TypeCode 112098 | 1..1 112100 | BusinessScopeBusinessProcessTypeCode 112102 |
| | | | | InstanceID 112104 | 0..1 112106 | BusinessScopeBusinessProcessInstanceID 112108 |

FIG. 112-4

| Package | level1 | level2 | level3 | level4 | Cardinality | Data Type Name |
|---|---|---|---|---|---|---|
| | | | | ID 112110 | 0..1 112112 | BusinessScopeBusinessProcessID 112114 |
| SupplyNetworkPlanningAggregateHierarchy 112116 | | SupplyNetworkPlanningAggregateHierarchy 112118 | | | 1 112120 | ... |
| | | | UsageCode 112122 | | 1 112124 | SupplyNetworkPlanningAggregateHierarchyUsageCode 112126 |
| | | | SupplyNetworkPlanConfigurationID 112128 | | 0..1 112130 | SupplyNetworkPlanConfigurationID 112132 |
| | | | SupplyNetworkPlanConfigurationSelectionID 112134 | | 0..1 112136 | SupplyNetworkPlanConfigurationSelectionID 112138 |

FIG. 112-5

| Package | level1 | level2 | level3 | level4 | Cardinality | Data Type Name |
|---|---|---|---|---|---|---|
| | | | TemplateSupplyNetworkPlanningAggregateHierarchyID 112140 | | 0..1 112142 | SupplyNetworkPlanningAggregateHierarchyID 112144 |

FIG. 113-1

| Package | level1 | level2 | level3 | level4 | Cardinality | Data Type Name |
|---|---|---|---|---|---|---|
| SupplyNetworkPlanningAggregateHierarchyExpandConfirmationMessage_sync 113000 | SupplyNetworkPlanningAggregateHierarchyExpandConfirmationMessage_sync 113002 | | | | | SupplyNetworkPlanningAggregateHierarchyExpandConfirmationMessage_sync 113004 |
| MessageHeader 113006 | | MessageHeader 113008 | | | 1 113010 | BusinessDocumentMessageHeader 113012 |
| | | | ID 113014 | | 1..1 113016 | BusinessDocumentMessageID 113018 |
| | | | ReferenceID 113020 | | 0..1 113022 | BusinessDocumentMessageID 113024 |
| | | | CreationDateTime 113026 | | 1..1 113028 | GLOBAL_DateTime 113030 |
| | | | TestDataIndicator 113032 | | 0..1 113034 | Indicator 113036 |

FIG. 113-2

| Package | level1 | level2 | level3 | level4 | Cardinality | Data Type Name |
|---|---|---|---|---|---|---|
| | | | ReconciliationIndicator 113038 | | 0..1 113040 | Indicator 113042 |
| | | | SenderParty 113044 | | 0..1 113046 | BusinessDocumentMessageHeaderParty 113048 |
| | | | | InternalID 113050 | 0..1 113052 | PartyInternalID 113054 |
| | | | | StandardID 113056 | 0..n 113058 | PartyStandardID 113060 |
| | | | | ContactPerson 113062 | 0..1 113064 | BusinessDocumentMessageHeaderPartyCon-tactPerson 113066 |
| | | | RecipientParty 113068 | | 0..n 113070 | BusinessDocumentMessageHeaderParty 113072 |

FIG. 113-3

| Package | level1 | level2 | level3 | level4 | Cardinality | Data Type Name |
|---|---|---|---|---|---|---|
| | | | | InternalID 113074 | 0..1 113076 | PartyInternalID 113078 |
| | | | | StandardID 113080 | 0..n 113082 | PartyStandardID 113084 |
| | | | | ContactPerson 113086 | 0..1 113088 | BusinessDocumentMessageHeaderPartyContactPerson 113090 |
| | | | BusinessScopeBusinessProcess 113092 | | 0..n 113094 | BusinessScopeBusinessProcess 113096 |
| | | | | TypeCode 113098 | 1..1 113100 | BusinessScopeBusinessProcessTypeCode 113102 |
| | | | | InstanceID 113104 | 0..1 113106 | BusinessScopeBusinessProcessInstanceID 113108 |

FIG. 113-4

| Package | level1 | level2 | level3 | level4 | Cardinality | Data Type Name |
|---|---|---|---|---|---|---|
| | | | | ID 113110 | 0..1 113112 | BusinessScopeBusinessProcessID 113114 |
| SupplyNetworkPlanningAggregateHierarchy 113116 | | SupplyNetworkPlanningAggregateHierarchy 113118 | | | 0..1 113120 | ... |
| | | | ID 113122 | | 1 113124 | SupplyNetworkPlanningAggregateHierarchyID 113126 |
| Log 113128 | | Log 113130 | | | 1 113132 | Log 113134 |
| | | | BusinessDocumentProcessingResultCode 113136 | | 0..1 113138 | ProcessingResultCode 113140 |
| | | | MaximumLogItemSeverityCode 113142 | | 0..1 113144 | LogItemSeverityCode 113146 |

FIG. 113-5

| Package | level1 | level2 | level3 | level4 | Cardinality | Data Type Name |
|---|---|---|---|---|---|---|
| | | | Item 113148 | | 0..n 113150 | LogItem 113152 |

FIG. 114-1

| Package | level1 | level2 | level3 | level4 | Cardinality | Data Type Name |
|---|---|---|---|---|---|---|
| SupplyNetworkPlanningAggregateHierarchyExpandRequest-Message_sync 114000 | SupplyNetworkPlanningAggregateHierarchyExpandRequest-Message_sync 114002 | | | | | SupplyNetworkPlanningAggregateHierarchyExpandRequestMessage_sync 114004 |
| MessageHeader 114006 | | MessageHeader 114008 | | | 1 114010 | BusinessDocumentMessageHeader 114012 |
| | | | ID 114014 | | 1..1 114016 | BusinessDocumentMessageID 114018 |
| | | | ReferenceID 114020 | | 0..1 114022 | BusinessDocumentMessageID 114024 |
| | | | CreationDateTime 114026 | | 1..1 114028 | GLOBAL_DateTime 114030 |
| | | | TestDataIndicator 114032 | | 0..1 114034 | Indicator 114036 |

FIG. 114-2

| Package | level1 | level2 | level3 | level4 | Cardinality | Data Type Name |
|---|---|---|---|---|---|---|
| | | | ReconciliationIndicator 114038 | | 0..1 114040 | Indicator 114042 |
| | | | SenderParty 114044 | | 0..1 114046 | BusinessDocumentMessageHeaderParty 114048 |
| | | | | InternalID 114050 | 0..1 114052 | PartyInternalID 114054 |
| | | | | StandardID 114056 | 0..n 114058 | PartyStandardID 114060 |
| | | | | ContactPerson 114062 | 0..1 114064 | BusinessDocumentMessageHeaderPartyCon-tactPerson 114066 |
| | | | RecipientParty 114068 | | 0..n 114070 | BusinessDocumentMessageHeaderParty 114072 |

FIG. 114-3

| Package | level1 | level2 | level3 | level4 | Cardinality | Data Type Name |
|---|---|---|---|---|---|---|
| | | | | InternalID 114074 | 0..1 114076 | PartyInternalID 114078 |
| | | | | StandardID 114080 | 0..n 114082 | PartyStandardID 114084 |
| | | | | ContactPerson 114086 | 0..1 114088 | BusinessDocumentMessageHeaderPartyContactPerson 114090 |
| | | | BusinessScopeBusinessProcess 114092 | | 0..n 114094 | BusinessScopeBusinessProcess 114096 |
| | | | | TypeCode 114098 | 1..1 114100 | BusinessScopeBusinessProcessTypeCode 114102 |
| | | | | InstanceID 114104 | 0..1 114106 | BusinessScopeBusinessProcessInstanceID 114108 |

FIG. 114-4

| Package | level1 | level2 | level3 | level4 | Cardinality | Data Type Name |
|---|---|---|---|---|---|---|
| | | | | ID 114110 | 0..1 114112 | BusinessScopeBusinessProcessID 114114 |
| SupplyNetworkPlanningAggregateHierarchy 114116 | | SupplyNetworkPlanningAggregateHierarchy 114118 | | | 1 114120 | ... |
| | | | ID 114122 | | 1 114124 | SupplyNetworkPlanningAggregateHierarchyID 114126 |
| ExpandStep 114128 | | | ExpandStep 114130 | | 1 114132 | |
| | | | | ID 114134 | 1 114136 | SupplyNetworkPlanningAggregateHierarchyExpandStepID 114138 |

FIG. 115-1

| Package | level1 | level2 | level3 | level4 | Cardinality | Data Type Name |
|---|---|---|---|---|---|---|
| SupplyNetworkPlanningAggregateHierarchyExpandStepByID-QueryMessage_sync 115000 | SupplyNetworkPlanningAggregateHierarchyExpandStepByID-QueryMessage_sync 115002 | | | | | SupplyNetworkPlanningAggregateHierarchyExpandStepByIDQueryMessage_sync 115004 |
| MessageHeader 115006 | | MessageHeader 115008 | | | 1 115010 | BusinessDocumentMessageHeader 115012 |
| | | | ID 115014 | | 1..1 115016 | BusinessDocumentMessageID 115018 |
| | | | ReferenceID 115020 | | 0..1 115022 | BusinessDocumentMessageID 115024 |
| | | | CreationDateTime 115026 | | 1..1 115028 | GLOBAL_DateTime 115030 |
| | | | TestDataIndicator 115032 | | 0..1 115034 | Indicator 115036 |

FIG. 115-2

| Package | level1 | level2 | level3 | level4 | Cardinality | Data Type Name |
|---|---|---|---|---|---|---|
| | | | ReconciliationIndicator 115038 | | 0..1 115040 | Indicator 115042 |
| | | | SenderParty 115044 | | 0..1 115046 | BusinessDocumentMessageHeaderParty 115048 |
| | | | | InternalID 115050 | 0..1 115052 | PartyInternalID 115054 |
| | | | | StandardID 115056 | 0..n 115058 | PartyStandardID 115060 |
| | | | | ContactPerson 115062 | 0..1 115064 | BusinessDocumentMessageHeaderParty-ContactPerson 115066 |
| | | | RecipientParty 115068 | | 0..n 115070 | BusinessDocumentMessageHeaderParty 115072 |

FIG. 115-3

| Package | level1 | level2 | level3 | level4 | Cardinality | Data Type Name |
|---|---|---|---|---|---|---|
| | | | | InternalID 115074 | 0..1 115076 | PartyInternalID 115078 |
| | | | | StandardID 115080 | 0..n 115082 | PartyStandardID 115084 |
| | | | | ContactPerson 115086 | 0..1 115088 | BusinessDocumentMessageHeaderParty-ContactPerson 115090 |
| | | | BusinessScopeBusi-nessProcess 115092 | | 0..n 115094 | BusinessScopeBusinessProcess 115096 |
| | | | | TypeCode 115098 | 1..1 115100 | BusinessScopeBusinessProcessTypeCode 115102 |
| | | | | InstanceID 115104 | 0..1 115106 | BusinessScopeBusinessProcessInstanceID 115108 |

FIG. 115-4

| Package | level1 | level2 | level3 | level4 | Cardinality | Data Type Name |
|---|---|---|---|---|---|---|
| | | | | ID 115110 | 0..1 115112 | BusinessScopeBusinessProcessID 115114 |
| Selection 115116 | | SupplyNetworkPlanningAggregateHierarchyExpandStepSelectionByID 115118 | | | 1 115120 | ... |
| | | | ID 115122 | | 1 115124 | SupplyNetworkPlanningAggregateHierarchyID 115126 |

FIG. 116-1

| Package | level1 | level2 | level3 | level4 | Cardinality | Data Type Name |
|---|---|---|---|---|---|---|
| SupplyNetworkPlanningAggregateHierarchyExpandStepByIDResponse-Message_sync 116000 | SupplyNetworkPlanningAggregate-HierarchyExpand-StepByIDResponseMessage_sync 116002 | | | | | SupplyNetworkPlanningAggregateHierarchyExpandStepByIDResponseMessage_sync 116004 |
| MessageHeader 116006 | | MessageHeader 116008 | | | 1 116010 | BusinessDocumentMessageHeader 116012 |
| | | | ID 116014 | | 1..1 116016 | BusinessDocumentMessageID 116018 |
| | | | ReferenceID 116020 | | 0..1 116022 | BusinessDocumentMessageID 116024 |
| | | | CreationDateTime 116026 | | 1..1 116028 | GLOBAL_DateTime 116030 |
| | | | TestDataIndicator 116032 | | 0..1 116034 | Indicator 116036 |

FIG. 116-2

| Package | level1 | level2 | level3 | level4 | Cardinality | Data Type Name |
|---|---|---|---|---|---|---|
| | | | ReconciliationIndicator 116038 | | 0..1 116040 | Indicator 116042 |
| | | | SenderParty 116044 | | 0..1 116046 | BusinessDocumentMessageHeaderParty 116048 |
| | | | | InternalID 116050 | 0..1 116052 | PartyInternalID 116054 |
| | | | | StandardID 116056 | 0..n 116058 | PartyStandardID 116060 |
| | | | | ContactPerson 116062 | 0..1 116064 | BusinessDocumentMessageHeaderParty-ContactPerson 116066 |
| | | | RecipientParty 116068 | | 0..n 116070 | BusinessDocumentMessageHeaderParty 116072 |

FIG. 116-3

| Package | level1 | level2 | level3 | level4 | Cardinality | Data Type Name |
|---|---|---|---|---|---|---|
| | | | | InternalID 116074 | 0..1 116076 | PartyInternalID 116078 |
| | | | | StandardID 116080 | 0..n 116082 | PartyStandardID 116084 |
| | | | | ContactPerson 116086 | 0..1 116088 | BusinessDocumentMessageHeaderParty-ContactPerson 116090 |
| | | | BusinessScopeBusi-nessProcess 116092 | | 0..n 116094 | BusinessScopeBusinessProcess 116096 |
| | | | | TypeCode 116098 | 1..1 116100 | BusinessScopeBusinessProcessTypeCode 116102 |
| | | | | InstanceID 116104 | 0..1 116106 | BusinessScopeBusinessProcessInstanceID 116108 |

FIG. 116-4

| Package | level1 | level2 | level3 | level4 | Cardinality | Data Type Name |
|---|---|---|---|---|---|---|
| | | | | ID 116110 | 0..1 116112 | BusinessScopeBusinessProcessID 116114 |
| SupplyNetwork-PlanningAggre-gateHierarchy 116116 | | SupplyNetwork-PlanningAggre-gateHierarchy 116118 | | | 0..1 116120 | ... |
| | | | ID 116122 | | 1 116124 | SupplyNetworkPlanningAggregateHierar-chyID 116126 |
| ExpandStep 116128 | | | ExpandStep 116130 | | 1..n 116132 | |
| | | | | ID 116134 | 1 116136 | SupplyNetworkPlanningAggregateHierar-chyExpandStepID 116138 |

FIG. 116-5

| Package | level1 | level2 | level3 | level4 | Cardinality | Data Type Name |
|---|---|---|---|---|---|---|
| | | | | SupplyNetworkPlanningAggregateHierarchyActionStepTypeCode 116140 | 1 116142 | SupplyNetworkPlanningAggregateHierarchyActionStepTypeCode 116144 |
| | | | | SupplyNetworkPlanCharacteristicID 116146 | 1 116148 | SupplyNetworkPlanCharacteristicID 116150 |
| Log 116152 | | Log 116154 | | | 1 116156 | Log 116158 |
| | | | BusinessDocumentProcessingResultCode 116160 | | 0..1 116162 | ProcessingResultCode 116164 |
| | | | MaximumLogItemSeverityCode 116166 | | 0..1 116168 | LogItemSeverityCode 116170 |

| Package | level1 | level2 | level3 | level4 | Cardinality | Data Type Name |
|---|---|---|---|---|---|---|
| | | | Item 116172 | | 0..n 116174 | LogItem 116176 |

| Package | level1 | level2 | level3 | level4 | Cardinality | Data Type Name |
|---|---|---|---|---|---|---|
| SupplyNetworkPlanningAggregateHierarchyNavigate-ConfirmationMessage_sync 117000 | SupplyNetworkPlanningAggregateHierarchyNavigate-ConfirmationMessage_sync 117002 | | | | | SupplyNetworkPlanningAggregateHierarchyNavigateConfirmationMes-sage_sync 117004 |
| MessageHeader 117006 | | MessageHeader 117008 | | | 1 117010 | BusinessDocumentMessageHeader 117012 |
| | | | ID 117014 | | 1..1 117016 | BusinessDocumentMessageID 117018 |
| | | | ReferenceID 117020 | | 0..1 117022 | BusinessDocumentMessageID 117024 |
| | | | CreationDateTime 117026 | | 1..1 117028 | GLOBAL_DateTime 117030 |
| | | | TestDataIndicator 117032 | | 0..1 117034 | Indicator 117036 |

FIG. 117-2

| Package | level1 | level2 | level3 | level4 | Cardinality | Data Type Name |
|---|---|---|---|---|---|---|
| | | | ReconciliationIndicator 117038 | | 0..1 117040 | Indicator 117042 |
| | | | SenderParty 117044 | | 0..1 117046 | BusinessDocumentMessageHeader-Party 117048 |
| | | | | InternalID 117050 | 0..1 117052 | PartyInternalID 117054 |
| | | | | StandardID 117056 | 0..n 117058 | PartyStandardID 117060 |
| | | | | ContactPerson 117062 | 0..1 117064 | BusinessDocumentMessageHeader-PartyContactPerson 117066 |
| | | | RecipientParty 117068 | | 0..n 117070 | BusinessDocumentMessageHeader-Party 117072 |

FIG. 117-3

| Package | level1 | level2 | level3 | level4 | Cardinality | Data Type Name |
|---|---|---|---|---|---|---|
| | | | | InternalID 117074 | 0..1 117076 | PartyInternalID 117078 |
| | | | | StandardID 117080 | 0..n 117082 | PartyStandardID 117084 |
| | | | | ContactPerson 117086 | 0..1 117088 | BusinessDocumentMessageHeader-PartyContactPerson 117090 |
| | | | BusinessScopeBusi-nessProcess 117092 | | 0..n 117094 | BusinessScopeBusinessProcess 117096 |
| | | | | TypeCode 117098 | 1..1 117100 | BusinessScopeBusinessProc-essTypeCode 117102 |
| | | | | InstanceID 117104 | 0..1 117106 | BusinessScopeBusinessProcessIn-stanceID 117108 |

FIG. 117-4

| Package | level1 | level2 | level3 | level4 | Cardinality | Data Type Name |
|---|---|---|---|---|---|---|
| | | | | ID 117110 | 0..1 117112 | BusinessScopeBusinessProcessID 117114 |
| SupplyNetworkPlanningAggregateHierarchy 117116 | | SupplyNetworkPlanningAggregateHierarchy 117118 | | | 0..1 117120 | ... |
| | | | ID 117122 | | 1 117124 | SupplyNetworkPlanningAggregateHierarchyID 117126 |
| Log 117128 | | Log 117130 | | | 1 117132 | Log 117134 |
| | | | BusinessDocumentProcessingResultCode 117136 | | 0..1 117138 | ProcessingResultCode 117140 |

FIG. 117-5

| Package | level1 | level2 | level3 | level4 | Cardinality | Data Type Name |
|---|---|---|---|---|---|---|
| | | | MaximumLogItem-SeverityCode 117142 | | 0..1 117144 | LogItemSeverityCode 117146 |
| | | | Item 117148 | | 0..n 117150 | LogItem 117152 |

FIG. 118-1

| Package | level1 | level2 | level3 | level4 | Cardinality | Data Type Name |
|---|---|---|---|---|---|---|
| SupplyNetworkPlanningAggregateHierarchyNavigateRequestMessage_sync 118000 | SupplyNetworkPlanningAggregateHierarchyNavigateRequestMessage_sync 118002 | | | | | SupplyNetworkPlanningAggregateHierarchyNavigateRequestMessage_sync 118004 |
| MessageHeader 118006 | | MessageHeader 118008 | | | 1 118010 | BusinessDocumentMessageHeader 118012 |
| | | | ID 118014 | | 1..1 118016 | BusinessDocumentMessageID 118018 |
| | | | ReferenceID 118020 | | 0..1 118022 | BusinessDocumentMessageID 118024 |
| | | | CreationDateTime 118026 | | 1..1 118028 | GLOBAL_DateTime 118030 |
| | | | TestDataIndicator 118032 | | 0..1 118034 | Indicator 118036 |

FIG. 118-2

| Package | level1 | level2 | level3 | level4 | Cardinality | Data Type Name |
|---|---|---|---|---|---|---|
| | | | ReconciliationIndicator 118038 | | 0..1 118040 | Indicator 118042 |
| | | | SenderParty 118044 | | 0..1 118046 | BusinessDocumentMessageHeaderParty 118048 |
| | | | | InternalID 118050 | 0..1 118052 | PartyInternalID 118054 |
| | | | | StandardID 118056 | 0..n 118058 | PartyStandardID 118060 |
| | | | | ContactPerson 118062 | 0..1 118064 | BusinessDocumentMessageHeaderPartyContactPerson 118066 |
| | | | RecipientParty 118068 | | 0..n 118070 | BusinessDocumentMessageHeaderParty 118072 |

FIG. 118-3

| Package | level1 | level2 | level3 | level4 | Cardinality | Data Type Name |
|---|---|---|---|---|---|---|
| | | | | InternalID 118074 | 0..1 118076 | PartyInternalID 118078 |
| | | | | StandardID 118080 | 0..n 118082 | PartyStandardID 118084 |
| | | | | ContactPerson 118086 | 0..1 118088 | BusinessDocumentMessageHeaderPartyContactPerson 118090 |
| | | | BusinessScopeBusinessProcess 118092 | | 0..n 118094 | BusinessScopeBusinessProcess 118096 |
| | | | | TypeCode 118098 | 1..1 118100 | BusinessScopeBusinessProcessTypeCode 118102 |
| | | | | InstanceID 118104 | 0..1 118106 | BusinessScopeBusinessProcessInstanceID 118108 |

FIG. 118-4

| Package | level1 | level2 | level3 | level4 | Cardinality | Data Type Name |
|---|---|---|---|---|---|---|
| | | | | ID 118110 | 0..1 118112 | BusinessScopeBusinessProcessID 118114 |
| SupplyNetworkPlanningAggregateHierarchy 118116 | | SupplyNetworkPlanningAggregateHierarchy 118118 | | | 1 118120 | ... |
| | | | ID 118122 | | 1 118124 | SupplyNetworkPlanningAggregateHierarchyID 118126 |
| ExpandStep 118128 | | | ExpandStep 118130 | | 1 118132 | |
| | | | | ID 118134 | 1 118136 | SupplyNetworkPlanningAggregateHierarchyNavigationStepID 118138 |

FIG. 119-1

| Package | level1 | level2 | level3 | level4 | Cardinality | Data Type Name |
|---|---|---|---|---|---|---|
| SupplyNetworkPlanningAggregateHierarchyNavigationStepByIDQuery-Message_sync 119000 | SupplyNetworkPlanningAggregateHierarchyNavigationStepByIDQuery-Message_sync 119002 | | | | | SupplyNetworkPlanningAggregateHierarchyNavigationStepByIDQuery-Message_sync 119004 |
| MessageHeader 119006 | | MessageHeader 119008 | | | 1 119010 | BusinessDocumentMessageHeader 119012 |
| | | | ID 119014 | | 1..1 119016 | BusinessDocumentMessageID 119018 |
| | | | ReferenceID 119020 | | 0..1 119022 | BusinessDocumentMessageID 119024 |
| | | | CreationDateTime 119026 | | 1..1 119028 | GLOBAL_DateTime 119030 |
| | | | TestDataIndicator 119032 | | 0..1 119034 | Indicator 119036 |

FIG. 119-2

| Package | level1 | level2 | level3 | level4 | Cardinality | Data Type Name |
|---|---|---|---|---|---|---|
| | | | ReconciliationIndicator 119038 | | 0..1 119040 | Indicator 119042 |
| | | | SenderParty 119044 | | 0..1 119046 | BusinessDocumentMessageHead-erParty 119048 |
| | | | | InternalID 119050 | 0..1 119052 | PartyInternalID 119054 |
| | | | | StandardID 119056 | 0..n 119058 | PartyStandardID 119060 |
| | | | | ContactPerson 119062 | 0..1 119064 | BusinessDocumentMessageHead-erPartyContactPerson 119066 |
| | | | RecipientParty 119068 | | 0..n 119070 | BusinessDocumentMessageHead-erParty 119072 |

FIG. 119-3

| Package | level1 | level2 | level3 | level4 | Cardinality | Data Type Name |
|---|---|---|---|---|---|---|
| | | | | InternalID 119074 | 0..1 119076 | PartyInternalID 119078 |
| | | | | StandardID 119080 | 0..n 119082 | PartyStandardID 119084 |
| | | | | ContactPerson 119086 | 0..1 119088 | BusinessDocumentMessageHead-erPartyContactPerson 119090 |
| | | | BusinessScopeBusi-nessProcess 119092 | | 0..n 119094 | BusinessScopeBusinessProcess 119096 |
| | | | | TypeCode 119098 | 1..1 119100 | BusinessScopeBusinessProc-essTypeCode 119102 |
| | | | | InstanceID 119104 | 0..1 119106 | BusinessScopeBusinessProcessIn-stanceID 119108 |

FIG. 119-4

| Package | level1 | level2 | level3 | level4 | Cardinality | Data Type Name |
|---|---|---|---|---|---|---|
| | | | | ID 119110 | 0..1 119112 | BusinessScopeBusinessProcessID 119114 |
| Selection 119116 | | SupplyNetworkPlanningAggregateHierarchyExpandStepSelectionByID 119118 | | | 1 119120 | ... |
| | | | ID 119122 | | 1 119124 | SupplyNetworkPlanningAggregateHierarchyID 119126 |

FIG. 120-1

| Package | level1 | level2 | level3 | level4 | Cardinality | Data Type Name |
|---|---|---|---|---|---|---|
| SupplyNetworkPlanningAggregateHierarchy-NavigationStepByIDRe-sponseMessage_sync 120000 | SupplyNetworkPlanningAggregateHierarchy-NavigationStepBy-IDResponseMes-sage_sync 120002 | | | | | SupplyNetworkPlanningAggregateHierarchyNavigationStepByIDRespon-seMessage_sync 120004 |
| MessageHeader 120006 | | MessageHeader 120008 | | | 1 120010 | BusinessDocumentMessageHeader 120012 |
| | | | ID 120014 | | 1..1 120016 | BusinessDocumentMessageID 120018 |
| | | | ReferenceID 120020 | | 0..1 120022 | BusinessDocumentMessageID 120024 |
| | | | CreationDateTime 120026 | | 1..1 120028 | GLOBAL_DateTime 120030 |
| | | | TestDataIndicator 120032 | | 0..1 120034 | Indicator 120036 |

FIG. 120-2

| Package | level1 | level2 | level3 | level4 | Cardinality | Data Type Name |
|---|---|---|---|---|---|---|
| | | | ReconciliationIndicator 120038 | | 0..1 120040 | Indicator 120042 |
| | | | SenderParty 120044 | | 0..1 120046 | BusinessDocumentMessageHead-erParty 120048 |
| | | | | InternalID 120050 | 0..1 120052 | PartyInternalID 120054 |
| | | | | StandardID 120056 | 0..n 120058 | PartyStandardID 120060 |
| | | | | ContactPerson 120062 | 0..1 120064 | BusinessDocumentMessageHead-erPartyContactPerson 120066 |
| | | | RecipientParty 120068 | | 0..n 120070 | BusinessDocumentMessageHead-erParty 120072 |

FIG. 120-3

| Package | level1 | level2 | level3 | level4 | Cardinality | Data Type Name |
|---|---|---|---|---|---|---|
| | | | | InternalID 120074 | 0..1 120076 | PartyInternalID 120078 |
| | | | | StandardID 120080 | 0..n 120082 | PartyStandardID 120084 |
| | | | | ContactPerson 120086 | 0..1 120088 | BusinessDocumentMessageHeaderPartyContactPerson 120090 |
| | | | BusinessScopeBusinessProcess 120092 | | 0..n 120094 | BusinessScopeBusinessProcess 120096 |
| | | | | TypeCode 120098 | 1..1 120100 | BusinessScopeBusinessProcessTypeCode 120102 |
| | | | | InstanceID 120104 | 0..1 120106 | BusinessScopeBusinessProcessInstanceID 120108 |

FIG. 120-4

| Package | level1 | level2 | level3 | level4 | Cardinality | Data Type Name |
|---|---|---|---|---|---|---|
| | | | | ID 120110 | 0..1 120112 | BusinessScopeBusinessProcessID 120114 |
| SupplyNetworkPlanningAggregateHierarchy 120116 | | SupplyNetworkPlanningAggregateHierarchy 120118 | | | 0..1 120120 | ... |
| | | | ID 120122 | | 1 120124 | SupplyNetworkPlanningAggregateHierarchyID 120126 |
| ExpandStep 120128 | | | NavigationStep 120130 | | 1..n 120132 | |
| | | | | ID 120134 | 1 120136 | SupplyNetworkPlanningAggregateHierarchyNavigationStepID 120138 |

FIG. 120-5

| Package | level1 | level2 | level3 | level4 | Cardinality | Data Type Name |
|---|---|---|---|---|---|---|
| | | | | SupplyNetworkPlanningAggregateHierarchyActionStepTypeCode 120140 | 1 120142 | SupplyNetworkPlanningAggregateHierarchyActionStepTypeCode 120144 |
| | | | | SupplyNetworkPlanCharacteristicID 120146 | 1 120148 | SupplyNetworkPlanCharacteristicID 120150 |
| Log 120152 | | Log 120154 | | | 1 120156 | Log 120158 |
| | | | BusinessDocumentProcessingResultCode 120160 | | 0..1 120162 | ProcessingResultCode 120164 |
| | | | MaximumLogItemSeverityCode 120166 | | 0..1 120168 | LogItemSeverityCode 120170 |

FIG. 120-6

| Package | level1 | level2 | level3 | level4 | Cardinality | Data Type Name |
|---|---|---|---|---|---|---|
| | | | Item 120172 | | 0..n 120174 | LogItem 120176 |

FIG. 121-1

| Package | level1 | level2 | level3 | level4 | Cardinality | Data Type Name |
|---|---|---|---|---|---|---|
| SupplyNetworkPlanningAggregateHierarchyUndoExpandConfirmationMessage_sync 121000 | SupplyNetworkPlanningAggregateHierarchyUndoExpandConfirmationMessage_sync 121002 | | | | | SupplyNetworkPlanningAggregateHierarchyUndoExpandConfirmationMessage_sync 121004 |
| MessageHeader 121006 | | MessageHeader 121008 | | | 1 121010 | BusinessDocumentMessageHeader 121012 |
| | | | ID 121014 | | 1..1 121016 | BusinessDocumentMessageID 121018 |
| | | | ReferenceID 121020 | | 0..1 121022 | BusinessDocumentMessageID 121024 |
| | | | CreationDateTime 121026 | | 1..1 121028 | GLOBAL_DateTime 121030 |
| | | | TestDataIndicator 121032 | | 0..1 121034 | Indicator 121036 |

FIG. 121-2

| Package | level1 | level2 | level3 | level4 | Cardinality | Data Type Name |
|---|---|---|---|---|---|---|
| | | | ReconciliationIndicator 121038 | | 0..1 121040 | Indicator 121042 |
| | | | SenderParty 121044 | | 0..1 121046 | BusinessDocumentMessageHeaderParty 121048 |
| | | | | InternalID 121050 | 0..1 121052 | PartyInternalID 121054 |
| | | | | StandardID 121056 | 0..n 121058 | PartyStandardID 121060 |
| | | | | ContactPerson 121062 | 0..1 121064 | BusinessDocumentMessageHeaderParty-ContactPerson 121066 |
| | | | RecipientParty 121068 | | 0..n 121070 | BusinessDocumentMessageHeaderParty 121072 |

FIG. 121-3

| Package | level1 | level2 | level3 | level4 | Cardinality | Data Type Name |
|---|---|---|---|---|---|---|
| | | | | InternalID 121074 | 0..1 121076 | PartyInternalID 121078 |
| | | | | StandardID 121080 | 0..n 121082 | PartyStandardID 121084 |
| | | | | ContactPerson 121086 | 0..1 121088 | BusinessDocumentMessageHeaderParty-ContactPerson 121090 |
| | | | BusinessScopeBusi-nessProcess 121092 | | 0..n 121094 | BusinessScopeBusinessProcess 121096 |
| | | | | TypeCode 121098 | 1..1 121100 | BusinessScopeBusinessProcessTypeCode 121102 |
| | | | | InstanceID 121104 | 0..1 121106 | BusinessScopeBusinessProcessInstanceID 121108 |

FIG. 121-4

| Package | level1 | level2 | level3 | level4 | Cardinality | Data Type Name |
|---|---|---|---|---|---|---|
| | | | | ID 121110 | 0..1 121112 | BusinessScopeBusinessProcessID 121114 |
| SupplyNetworkPlanningAggregateHierarchy 121116 | | SupplyNetworkPlanningAggregateHierarchy 121118 | | | 0..1 121120 | ... |
| | | | ID 121122 | | 1 121124 | SupplyNetworkPlanningAggregateHierarchyID 121126 |
| Log 121128 | | Log 121130 | | | 1 121132 | Log 121134 |
| | | | BusinessDocumentProcessingResultCode 121136 | | 0..1 121138 | ProcessingResultCode 121140 |

FIG. 121-5

| Package | level1 | level2 | level3 | level4 | Cardinality | Data Type Name |
|---|---|---|---|---|---|---|
| | | | MaximumLogItem-SeverityCode 121142 | | 0..1 121144 | LogItemSeverityCode 121146 |
| | | | Item 121148 | | 0..n 121150 | LogItem 121152 |

FIG. 122-1

| Package | level1 | level2 | level3 | level4 | Cardinality | Data Type Name |
|---|---|---|---|---|---|---|
| SupplyNetworkPlanningAggregateHierarchyUndoExpandRequestMessage_sync 122000 | SupplyNetworkPlanningAggregateHierarchyUndoExpandRequestMessage_sync 122002 | | | | | SupplyNetworkPlanningAggregateHierarchyUndoExpandRequestMessage_sync 122004 |
| MessageHeader 122006 | | MessageHeader 122008 | | | 1 122010 | BusinessDocumentMessageHeader 122012 |
| | | | ID 122014 | | 1..1 122016 | BusinessDocumentMessageID 122018 |
| | | | ReferenceID 122020 | | 0..1 122022 | BusinessDocumentMessageID 122024 |
| | | | CreationDateTime 122026 | | 1..1 122028 | GLOBAL_DateTime 122030 |
| | | | TestDataIndicator 122032 | | 0..1 122034 | Indicator 122036 |

FIG. 122-2

| Package | level1 | level2 | level3 | level4 | Cardinality | Data Type Name |
|---|---|---|---|---|---|---|
| | | | ReconciliationIndicator 122038 | | 0..1 122040 | Indicator 122042 |
| | | | SenderParty 122044 | | 0..1 122046 | BusinessDocumentMessageHeaderParty 122048 |
| | | | | InternalID 122050 | 0..1 122052 | PartyInternalID 122054 |
| | | | | StandardID 122056 | 0..n 122058 | PartyStandardID 122060 |
| | | | | ContactPerson 122062 | 0..1 122064 | BusinessDocumentMessageHeaderPartyContactPerson 122066 |
| | | | RecipientParty 122068 | | 0..n 122070 | BusinessDocumentMessageHeaderParty 122072 |

FIG. 122-3

| Package | level1 | level2 | level3 | level4 | Cardinality | Data Type Name |
|---|---|---|---|---|---|---|
| | | | | InternalID 122074 | 0..1 122076 | PartyInternalID 122078 |
| | | | | StandardID 122080 | 0..n 122082 | PartyStandardID 122084 |
| | | | | ContactPerson 122086 | 0..1 122088 | BusinessDocumentMessageHeaderPartyContactPerson 122090 |
| | | | BusinessScopeBusinessProcess 122092 | | 0..n 122094 | BusinessScopeBusinessProcess 122096 |
| | | | | TypeCode 122098 | 1..1 122100 | BusinessScopeBusinessProcessTypeCode 122102 |
| | | | | InstanceID 122104 | 0..1 122106 | BusinessScopeBusinessProcessInstanceID 122108 |

FIG. 122-4

| Package | level1 | level2 | level3 | level4 | Cardinality | Data Type Name |
| --- | --- | --- | --- | --- | --- | --- |
| | | | | ID 122110 | 0..1 122112 | BusinessScopeBusinessProcessID 122114 |
| SupplyNetworkPlanningAggregateHierarchy 122116 | | SupplyNetworkPlanningAggregateHierarchy 122118 | | | 1 122120 | ... |
| | | | ID 122122 | | 1 122124 | SupplyNetworkPlanningAggregateHierarchyID 122126 |

FIG. 123-1

| Package | level1 | level2 | level3 | level4 | Cardinality | Data Type Name |
|---|---|---|---|---|---|---|
| SupplyNetworkPlanningAggregateHierarchyUndoNavigateConfirmationMessage_sync 123000 | SupplyNetworkPlanningAggregateHierarchyUndoNavigateConfirmationMessage_sync 123002 | | | | | SupplyNetworkPlanningAggregateHierarchyUndoNavigateConfirmationMessage_sync 123004 |
| MessageHeader 123006 | | MessageHeader 123008 | | | 1 123010 | BusinessDocumentMessageHeader 123012 |
| | | | ID 123014 | | 1..1 123016 | BusinessDocumentMessageID 123018 |
| | | | ReferenceID 123020 | | 0..1 123022 | BusinessDocumentMessageID 123024 |
| | | | CreationDateTime 123026 | | 1..1 123028 | GLOBAL_DateTime 123030 |
| | | | TestDataIndicator 123032 | | 0..1 123034 | Indicator 123036 |

FIG. 123-2

| Package | level1 | level2 | level3 | level4 | Cardinality | Data Type Name |
|---|---|---|---|---|---|---|
| | | | ReconciliationIndicator 123038 | | 0..1 123040 | Indicator 123042 |
| | | | SenderParty 123044 | | 0..1 123046 | BusinessDocumentMessage-HeaderParty 123048 |
| | | | | InternalID 123050 | 0..1 123052 | PartyInternalID 123054 |
| | | | | StandardID 123056 | 0..n 123058 | PartyStandardID 123060 |
| | | | | ContactPerson 123062 | 0..1 123064 | BusinessDocumentMessage-HeaderPartyContactPerson 123066 |
| | | | RecipientParty 123068 | | 0..n 123070 | BusinessDocumentMessage-HeaderParty 123072 |

FIG. 123-3

| Package | level1 | level2 | level3 | level4 | Cardinality | Data Type Name |
|---|---|---|---|---|---|---|
| | | | | InternalID 123074 | 0..1 123076 | PartyInternalID 123078 |
| | | | | StandardID 123080 | 0..n 123082 | PartyStandardID 123084 |
| | | | | ContactPerson 123086 | 0..1 123088 | BusinessDocumentMessage-HeaderPartyContactPerson 123090 |
| | | | BusinessScopeBusi-nessProcess 123092 | | 0..n 123094 | BusinessScopeBusinessProcess 123096 |
| | | | | TypeCode 123098 | 1..1 123100 | BusinessScopeBusinessProc-essTypeCode 123102 |
| | | | | InstanceID 123104 | 0..1 123106 | BusinessScopeBusinessProc-essInstanceID 123108 |

FIG. 123-4

| Package | level1 | level2 | level3 | level4 | Cardinality | Data Type Name |
|---|---|---|---|---|---|---|
| | | | | ID 123110 | 0..1 123112 | BusinessScopeBusinessProces-sID 123114 |
| SupplyNetworkPlanningAg-gregateHierarchy 123116 | | SupplyNetwork-PlanningAggre-gateHierarchy 123118 | | | 0..1 123120 | ... |
| | | | ID 123122 | | 1 123124 | SupplyNetworkPlanningAggre-gateHierarchyID 123126 |
| Log 123128 | | Log 123130 | | | 1 123132 | Log 123134 |
| | | | BusinessDocument-ProcessingResultCode 123136 | | 0..1 123138 | ProcessingResultCode 123140 |

FIG. 123-5

| Package | level1 | level2 | level3 | level4 | Cardinality | Data Type Name |
|---|---|---|---|---|---|---|
| | | | MaximumLogItem-SeverityCode 123142 | | 0..1 123144 | LogItemSeverityCode 123146 |
| | | | Item 123148 | | 0..n 123150 | LogItem 123152 |

FIG. 124-1

| Package | level1 | level2 | level3 | level4 | Cardinality | Data Type Name |
|---|---|---|---|---|---|---|
| SupplyNetworkPlanningAggregateHierarchyUndoNavigateRequestMessage_sync 124000 | SupplyNetworkPlanningAggregateHierarchyUndoNavigateRequestMessage_sync 124002 | | | | | SupplyNetworkPlanningAggregateHierarchyUndoNavigateRequestMessage_sync 124004 |
| MessageHeader 124006 | | MessageHeader 124008 | | | 1 124010 | BusinessDocumentMessageHeader 124012 |
| | | | ID 124014 | | 1..1 124016 | BusinessDocumentMessageID 124018 |
| | | | ReferenceID 124020 | | 0..1 124022 | BusinessDocumentMessageID 124024 |
| | | | CreationDateTime 124026 | | 1..1 124028 | GLOBAL_DateTime 124030 |
| | | | TestDataIndicator 124032 | | 0..1 124034 | Indicator 124036 |

FIG. 124-2

| Package | level1 | level2 | level3 | level4 | Cardinality | Data Type Name |
|---|---|---|---|---|---|---|
| | | | ReconciliationIndicator 124038 | | 0..1 124040 | Indicator 124042 |
| | | | SenderParty 124044 | | 0..1 124046 | BusinessDocumentMessageHeaderParty 124048 |
| | | | | InternalID 124050 | 0..1 124052 | PartyInternalID 124054 |
| | | | | StandardID 124056 | 0..n 124058 | PartyStandardID 124060 |
| | | | | ContactPerson 124062 | 0..1 124064 | BusinessDocumentMessageHeaderPartyContactPerson 124066 |
| | | | RecipientParty 124068 | | 0..n 124070 | BusinessDocumentMessageHeaderParty 124072 |

FIG. 124-3

| Package | level1 | level2 | level3 | level4 | Cardinality | Data Type Name |
|---|---|---|---|---|---|---|
| | | | | InternalID 124074 | 0..1 124076 | PartyInternalID 124078 |
| | | | | StandardID 124080 | 0..n 124082 | PartyStandardID 124084 |
| | | | | ContactPerson 124086 | 0..1 124088 | BusinessDocumentMessageHeaderPartyContactPerson 124090 |
| | | | BusinessScopeBusinessProcess 124092 | | 0..n 124094 | BusinessScopeBusinessProcess 124096 |
| | | | | TypeCode 124098 | 1..1 124100 | BusinessScopeBusinessProcessTypeCode 124102 |
| | | | | InstanceID 124104 | 0..1 124106 | BusinessScopeBusinessProcessInstanceID 124108 |

FIG. 124-4

| Package | level1 | level2 | level3 | level4 | Cardinality | Data Type Name |
|---|---|---|---|---|---|---|
| | | | | ID 124110 | 0..1 124112 | BusinessScopeBusinessProcessID 124114 |
| SupplyNetworkPlanningAggregateHierarchy 124116 | | SupplyNetworkPlanningAggregateHierarchy 124118 | | | 1 124120 | ... |
| | | | ID 124122 | | 1 124124 | SupplyNetworkPlanningAggregateHierarchyID 124126 |

MANAGING CONSISTENT INTERFACES FOR SUPPLY NETWORK BUSINESS OBJECTS ACROSS HETEROGENEOUS SYSTEMS

TECHNICAL FIELD

The subject matter described herein relates generally to the generation and use of consistent interfaces (or services) derived from a business object model. More particularly, the present disclosure relates to the generation and use of consistent interfaces or services that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

Currently, many standards exist that offer a variety of interfaces used to exchange business information. Most of these interfaces, however, apply to only one specific industry and are not consistent between the different standards. Moreover, a number of these interfaces are not consistent within an individual standard.

SUMMARY

In a first aspect, software creates a long or midterm production or distribution plan. The software comprises computer readable instructions embodied on tangible media, wherein upon the software executes in a landscape of computer systems providing message-based services. The software invokes a supply network plan business object. The business object is a logically centralized, semantically disjointed object for creating a long or midterm production or distribution plan. The business object comprises data logically organized as a supply network plan root node and a key figure value subordinate node. The key figure value node contains a key figure value property subordinate node and a key figure value detail subordinate node. The software initiates transmission of a message to a heterogeneous second application. The software executes in the environment of computer systems providing message-based services based on the data in the supply network plan business object. The message comprises a supply network plan key figure value by elements response message entity, a message header package, a key figure value package and a log package.

In a second aspect, software creates a long or midterm production or distribution plan. The software comprises computer readable instructions embodied on tangible media. Upon execution, the software executes in a landscape of computer systems providing message-based services. The software initiates transmission of a message to a heterogeneous second application. The software executes in the environment of computer systems providing message-based services, based on data in a supply network plan business object invoked by the second application. The business object is a logically centralized, semantically disjointed object for creating a long or midterm production or distribution plan. The business object comprises data logically organized as a supply network plan root node and a key figure value subordinate node. The key figure value node contains a key figure value property subordinate node and a key figure value detail subordinate node. The message comprises a supply network plan key figure value by elements response message entity, a message header package, a key figure value package and a log package. The software receives a second message from the second application. The second message is associated with the invoked supply network plan business object and is in response to the first message.

In a third aspect, a distributed system operates in a landscape of computer systems providing message-based services. The system processes business objects involving creating a long or midterm production or distribution plan. The system comprises a memory and a graphical user interface remote from the memory. The memory stores a business object repository storing a plurality of business objects. Each business object is a logically centralized, semantically disjointed object of a particular business object type. At least one of the business objects is for creating a long or midterm production or distribution plan. The business object data is logically organized as a supply network plan root node and a key figure value subordinate node. The key figure value node contains a key figure value property subordinate node a key figure value detail subordinate node. The graphical user interface remote from the memory presents data associated with an invoked instance of the supply network plan business object. The interface comprises computer readable instructions embodied on tangible media.

In a fourth aspect, software creates configurations for long-term or mid-term production plans, distribution plans or supply network plans. The software comprises computer readable instructions embodied on tangible media. Upon execution, the software executes in a landscape of computer systems providing message-based services. The software invokes a supply network plan configuration business object.

The business object is a logically centralized, semantically disjointed object for the configuration required to access a supply network plan. The business object comprises data logically organized as a supply network plan configuration root node, a characteristic subordinate node, and a key figure subordinate node. The key figure value node contains a key figure property subordinate node and a period subordinate node. The period value node contains a period property subordinate node and a function subordinate node. The function value node contains an event subordinate node and a selection subordinate node. The selection value node contains a selection criterion subordinate node and a selection group subordinate node. The software initiates transmission of a message to a heterogeneous second application. The software executes in the environment of computer systems providing message-based services, based on the data in the supply network plan configuration business object, the message comprising a supply network plan configuration by identifier response message entity, a supply network plan configuration package and a log package.

In a fifth aspect, software creates configurations for long-term or mid-term production plans, distribution plans or supply network plans. The software comprises computer readable instructions embodied on tangible media. Upon execution, the software executes in a landscape of computer systems providing message-based services. The software initiates transmission of a message to a heterogeneous second application. The software executes in the environment of computer systems providing message-based services, based on data in a supply network plan configuration business object invoked by the second application. The business object is a logically centralized, semantically disjointed object for the configuration required to access a supply network plan. The business object comprises data logically organized as supply network plan configuration root node, a characteristic subordinate node, a key figure subordinate node, a period subordinate node, a function subordinate node, and a selection subordinate node. The message comprises a supply network plan configuration by identifier response message entity, a supply network plan configuration package, and a log package. The key figure value node contains a key figure property subordinate node. The period value node contains a period property subordinate node. The function value node contains an event subordinate node. The selection value node contains a selection criterion subordinate node and a selection group subordinate node. The software receives a second message from the second application. The second message is associated with the invoked supply network plan configuration business object and is in response to the first message.

In a sixth aspect, a distributed system operates in a landscape of computer systems providing message-based services. The system processes business objects involving creating configurations for long-term or mid-term production plans, distribution plans or supply network plans. The system comprises a memory and a graphical user interface remote from the memory. The memory stores a business object repository storing a plurality of business objects. Each business object is a logically centralized, semantically disjointed object of a particular business object type and at least one of the business objects is for the configuration required to access a supply network plan. The business object comprises data logically organized as a supply network plan configuration root node, a characteristic subordinate node, a key figure subordinate node, a period subordinate node, a function subordinate node, and a selection subordinate node. The key figure value node contains a key figure property subordinate node. The period value node contains a period property subordinate node. The function value node contains an event subordinate node. The selection value node contains a selection criterion subordinate node and a selection group subordinate node. The graphical user interface remote from the memory presents data associated with an invoked instance of the supply network plan configuration business object. The interface comprises computer readable instructions embodied on tangible media.

In a seventh aspect, software creates aggregate hierarchies for long-term or mid-term production plans, distribution plans or supply network plans. The software comprises computer readable instructions embodied on tangible media. The software executes in a landscape of computer systems providing message-based services. The software invokes a supply network planning aggregate hierarchy business object. The business object is a logically centralized and a semantically disjointed object for a hierarchy of different planning levels and aggregates in supply network planning. The business object comprises data logically organized as a supply network planning aggregate hierarchy root node, an aggregate instance subordinate node, a navigation step subordinate node and an expand step subordinate node. The aggregate instance node contains a characteristic value subordinate node. The software initiates transmission of a message to a heterogeneous second application, executing in the environment of computer systems providing message-based services, based on the data in the supply network plan configuration business object. The message comprises a supply network planning aggregate hierarchy by identifier response message entity, a message header package, a supply network planning aggregate hierarchy package, and a log package.

In an eighth aspect, software creates aggregate hierarchies for long-term or mid-term production plans, distribution plans or supply network plans. The software comprises computer readable instructions embodied on tangible media. The software executes in a landscape of computer systems providing message-based services. The software initiates transmission of a message to a heterogeneous second application, executing in the environment of computer systems providing message-based services, based on data in a supply network planning aggregate hierarchy business object invoked by the second application. The business object is a logically centralized, semantically disjointed object for a hierarchy of different planning levels and aggregates in supply network planning. The business object comprises data logically organized as a supply network planning aggregate hierarchy root node, an aggregate instance subordinate node, a navigation step subordinate node, an expand step subordinate node. The message comprises a supply network planning aggregate hierarchy by identifier response message entity, a message header package, a supply network planning aggregate hierarchy package, and a log package. The aggregate instance node contains a characteristic value subordinate node. The software receives a second message from the second application. The second message is associated with the invoked supply network planning aggregate hierarchy business object and is in response to the first message.

In a ninth aspect, a distributed system operates in a landscape of computer systems providing message-based services. The system processes business objects involving creating aggregate hierarchies for long-term or mid-term production plans, distribution plans or supply network plans. The system comprises a memory and a graphical user interface remote from the memory. The memory stores a business object repository storing a plurality of business objects. Each business object is a logically centralized, semantically disjointed object of a particular business object type and at least one of the business objects is for a hierarchy of different planning levels and aggregates in supply network planning. The business object comprises data logically organized as a supply network planning aggregate hierarchy root node, an aggregate instance subordinate node, a navigation step subordinate node, and an expand step subordinate node. The aggregate instance node contains a characteristic value subordinate node. The graphical user interface remote from the memory presents data associated with an invoked instance of the supply network planning aggregate hierarchy business object. The interface comprises computer readable instructions embodied on tangible media.

BRIEF DESCRIPTION OF THE DRAWINGS

FIGS. 27A-E depict a hierarchization process in accordance with methods and systems consistent with the subject matter described herein.

FIGS. 45-1 through 45-6 show an exemplary SupplyNetworkPlanCancelConfirmationMessage Element Structure.

FIGS. 46-1 through 46-5 show an exemplary SupplyNetworkPlanCancelRequestMessage Element Structure.

FIGS. 47-1 through 47-6 show an exemplary SupplyNetworkPlanCreateConfirmationMessage Element Structure.

FIGS. 48-1 through 48-5 show an exemplary SupplyNetworkPlanCreateRequestMessage Element Structure.

FIGS. 49-1 through 49-7 show an exemplary SupplyNetworkPlanFunctionExecuteConfirmationMessage Element Structure.

FIGS. 50-1 through 50-6 show an exemplary SupplyNetworkPlanFunctionExecuteRequestMessage Element Structure.

FIGS. 51-1 through 51-7 show an exemplary SupplyNetworkPlanKeyFigureValueByElementsQueryMessage Element Structure.

FIGS. 52-1 through 52-8 show an exemplary SupplyNetworkPlanKeyFigureValueByElementsResponseMessage Element Structure.

FIGS. 53-1 through 53-8 show an exemplary SupplyNetworkPlanKeyFigureValueChangeConfirmationMessage Element Structure.

FIGS. 54-1 through 54-7 show an exemplary SupplyNetworkPlanKeyFigureValueChangeRequestMessage Element Structure.

FIGS. 55-1 through 55-8 show an exemplary SupplyNetworkPlanKeyFigureValueDetailByElementsQueryMessage Element Structure.

FIGS. 56-1 through 56-13 show an exemplary SupplyNetworkPlanKeyFigureValueDetailByElementsResponseMessage Element Structure.

FIG. 71 shows an exemplary SupplyNetworkPlanConfigurationByIDQueryMessage_sync Element Structure.

FIGS. 72-1 through 72-12 show an exemplary SupplyNetworkPlanConfigurationByIDResponseMessage_sync Element Structure.

FIG. 73 shows an exemplary SupplyNetworkPlanConfigurationSelectionByIDQueryMessage_sync Element Structure.

FIGS. 74-1 through 74-5 show an exemplary SupplyNetworkPlanConfigurationSelectionByIDResponseMessage_sync Element Structure.

FIGS. 75-1 through 75-2 show an exemplary SupplyNetworkPlanConfigurationSelectionCancelConfirmationMessage_sync Element Structure.

FIGS. 76-1 through 76-2 show an exemplary SupplyNetworkPlanConfigurationSelectionCancelRequestMessage_sync Element Structure.

FIGS. 77-1 through 77-2 show an exemplary SupplyNetworkPlanConfigurationSelectionChangeConfirmationMessage_sync Element Structure.

FIGS. 78-1 through 78-4 show an exemplary SupplyNetworkPlanConfigurationSelectionChangeRequestMessage_sync Element Structure.

FIGS. 79-1 through 79-2 show an exemplary SupplyNetworkPlanConfigurationSelectionCreateConfirmationMessage_sync Element Structure.

FIGS. 80-1 through 80-4 show an exemplary SupplyNetworkPlanConfigurationSelectionCreateRequestMessage_sync Element Structure.

FIG. 81 shows an exemplary SupplyNetworkPlanConfigurationSimpleByIDQueryMessage_sync Element Structure.

FIGS. 82-1 through 82-2 show an exemplary SupplyNetworkPlanConfigurationSimpleByIDResponseMessage_sync Element Structure.

FIGS. 105-1 through 105-4 show an exemplary SupplyNetworkPlanningAggregateHierarchyByIDQueryMessage_sync Element Structure.

FIGS. 106-1 through 106-9 show an exemplary SupplyNetworkPlanningAggregateHierarchyByIDResponseMessage_sync Element Structure.

FIGS. 107-1 through 107-5 show an exemplary SupplyNetworkPlanningAggregateHierarchyCancelConfirmationMessage_sync Element Structure.

FIGS. 108-1 through 108-4 show an exemplary SupplyNetworkPlanningAggregateHierarchyCancelRequestMessage_sync Element Structure.

FIGS. 109-1 through 109-5 show an exemplary SupplyNetworkPlanningAggregateHierarchyChangeConfirmationMessage_sync Element Structure.

FIGS. 110-1 through 110-4 show an exemplary SupplyNetworkPlanningAggregateHierarchyChangeRequestMessage_sync Element Structure.

FIGS. 111-1 through 111-5 show an exemplary SupplyNetworkPlanningAggregateHierarchyCreateConfirmationMessage_sync Element Structure.

FIGS. 112-1 through 112-5 show an exemplary SupplyNetworkPlanningAggregateHierarchyCreateRequestMessage_sync Element Structure.

FIGS. 113-1 through 113-5 show an exemplary SupplyNetworkPlanningAggregateHierarchyExpandConfirmationMessage_sync Element Structure.

FIGS. 114-1 through 114-4 show an exemplary SupplyNetworkPlanningAggregateHierarchyExpandRequestMessage_sync Element Structure.

FIGS. 115-1 through 115-4 show an exemplary SupplyNetworkPlanningAggregateHierarchyExpandStepByIDQueryMessage_sync Element Structure.

FIGS. 116-1 through 116-6 show an exemplary SupplyNetworkPlanningAggregateHierarchyExpandStepByIDResponseMessage_sync Element Structure.

FIGS. 117-1 through 117-5 show an exemplary SupplyNetworkPlanningAggregateHierarchyNavigateConfirmationMessage_sync Element Structure.

FIGS. 118-1 through 118-4 show an exemplary SupplyNetworkPlanningAggregateHierarchyNavigateRequestMessage_sync Element Structure.

FIGS. 119-1 through 119-4 show an exemplary SupplyNetworkPlanningAggregateHierarchyNavigationStepByIDQueryMessage_sync Element Structure.

FIGS. 120-1 through 120-6 show an exemplary SupplyNetworkPlanningAggregateHierarchyNavigationStepByIDResponseMessage_sync Element Structure.

FIGS. 121-1 through 121-5 show an exemplary SupplyNetworkPlanningAggregateHierarchyUndoExpandConfirmationMessage_sync Element Structure.

FIGS. 122-1 through 122-4 show an exemplary SupplyNetworkPlanningAggregateHierarchyUndoExpandRequestMessage_sync Element Structure.

FIGS. 123-1 through 123-5 show an exemplary SupplyNetworkPlanningAggregateHierarchyUndoNavigateConfirmationMessage_sync Element Structure.

FIGS. 124-1 through 124-4 show an exemplary SupplyNetworkPlanningAggregateHierarchyUndoNavigateRequestMessage_sync Element Structure.

DETAILED DESCRIPTION

A. Overview

Figure 1:
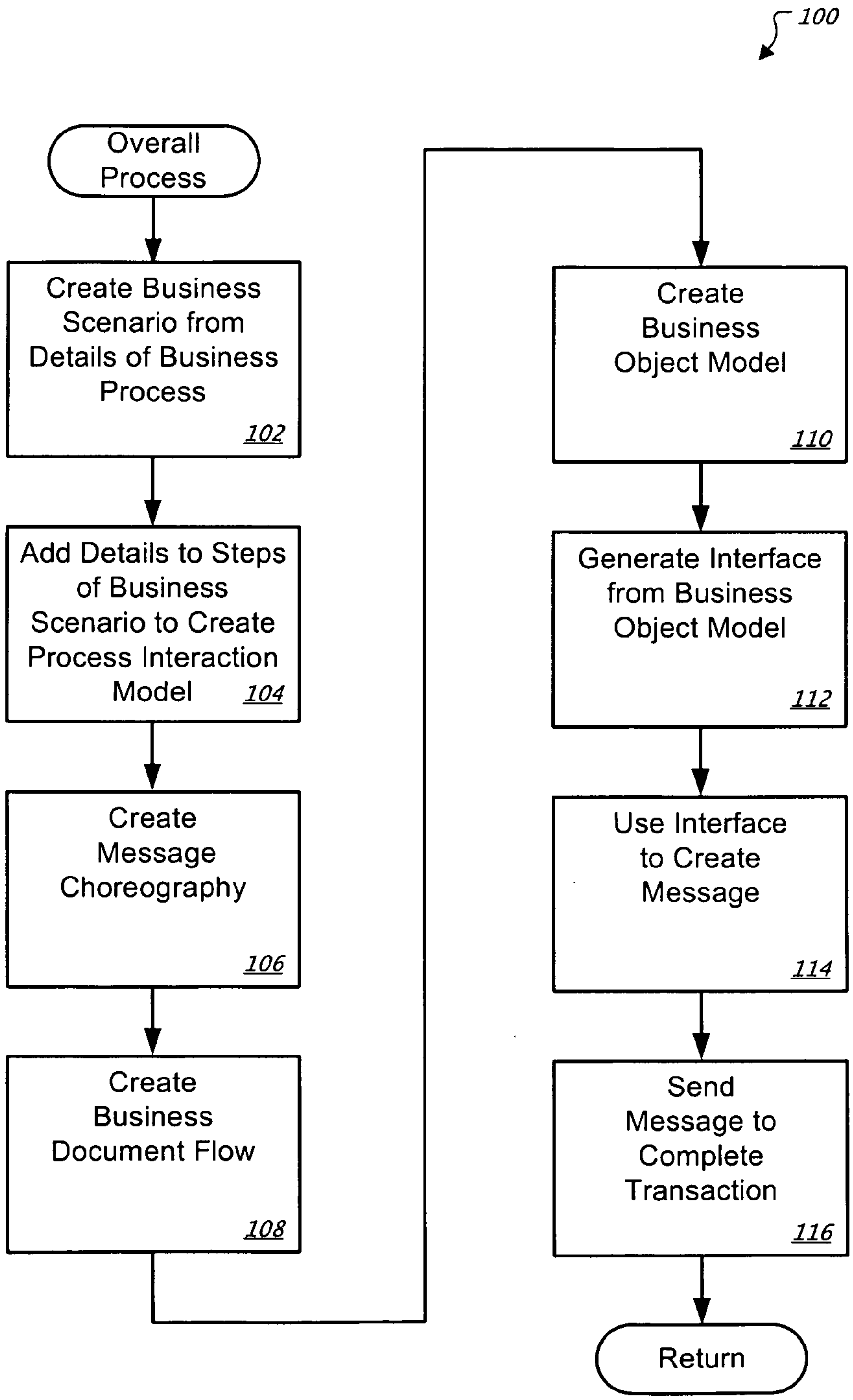
FIG. 1 depicts a flow diagram of the overall steps performed by methods and systems consistent with the subject matter described herein.

Methods and systems consistent with the subject matter described herein facilitate e-commerce by providing consistent interfaces that are suitable for use across industries, across businesses, and across different departments within a business during a business transaction. To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a “create”, “update”, or “delete” of a business object instance. Synchronous outbound process agents are generally triggered directly by business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Each deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

FIG. 1 depicts a flow diagram 100 showing an example technique, perhaps implemented by systems similar to those disclosed herein. Initially, to generate the business object model, design engineers study the details of a business process, and model the business process using a "business scenario" (step 102). The business scenario identifies the steps performed by the different business entities during a business process. Thus, the business scenario is a complete representation of a clearly defined business process.

After creating the business scenario, the developers add details to each step of the business scenario (step 104). In particular, for each step of the business scenario, the developers identify the complete process steps performed by each business entity. A discrete portion of the business scenario reflects a "business transaction," and each business entity is referred to as a "component" of the business transaction. The developers also identify the messages that are transmitted between the components. A "process interaction model" represents the complete process steps between two components.

After creating the process interaction model, the developers create a "message choreography" (step 106), which depicts the messages transmitted between the two components in the process interaction model. The developers then represent the transmission of the messages between the components during a business process in a "business document flow" (step 108). Thus, the business document flow illustrates the flow of information between the business entities during a business process.

Figure 2:
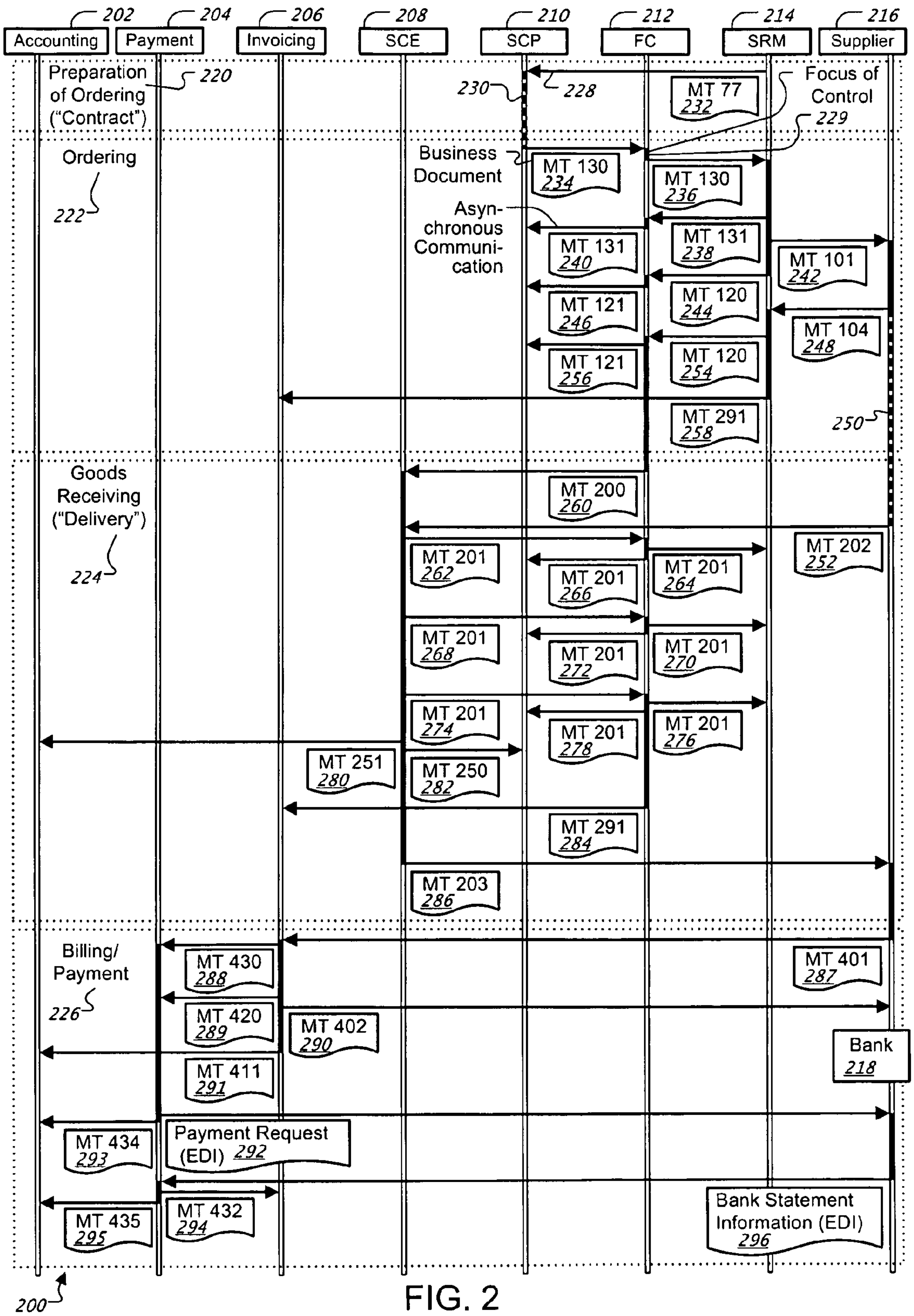
FIG. 2 depicts a business document flow for an invoice request in accordance with methods and systems consistent with the subject matter described herein.

FIG. 2 depicts an example business document flow 200 for the process of purchasing a product or service. The business entities involved with the illustrative purchase process include Accounting 202, Payment 204, Invoicing 206, Supply Chain Execution ("SCE") 208, Supply Chain Planning ("SCP") 210, Fulfillment Coordination ("FC") 212, Supply Relationship Management ("SRM") 214, Supplier 216, and Bank 218. The business document flow 200 is divided into four different transactions: Preparation of Ordering ("Contract") 220, Ordering 222, Goods Receiving ("Delivery") 224, and Billing/Payment 226. In the business document flow, arrows 228 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 229) when the step is required, and a dotted vertical line (e.g., 230) when the step is optional.

During the Contract transaction 220, the SRM 214 sends a Source of Supply Notification 232 to the SCP 210. This step is optional, as illustrated by the optional control line 230 coupling this step to the remainder of the business document flow 200. During the Ordering transaction 222, the SCP 210 sends a Purchase Requirement Request 234 to the FC 212, which forwards a Purchase Requirement Request 236 to the SRM 214. The SRM 214 then sends a Purchase Requirement Confirmation 238 to the FC 212, and the FC 212 sends a Purchase Requirement Confirmation 240 to the SCP 210. The SRM 214 also sends a Purchase Order Request 242 to the Supplier 216, and sends Purchase Order Information 244 to the FC 212. The FC 212 then sends a Purchase Order Planning Notification 246 to the SCP 210. The Supplier 216, after receiving the Purchase Order Request 242, sends a Purchase Order Confirmation 248 to the SRM 214, which sends a Purchase Order Information confirmation message 254 to the FC 212, which sends a message 256 confirming the Purchase Order Planning Notification to the SCP 210. The SRM 214 then sends an Invoice Due Notification 258 to Invoicing 206.

During the Delivery transaction 224, the FC 212 sends a Delivery Execution Request 260 to the SCE 208. The Supplier 216 could optionally (illustrated at control line 250) send a Dispatched Delivery Notification 252 to the SCE 208.

The SCE 208 then sends a message 262 to the FC 212 notifying the FC 212 that the request for the Delivery Information was created. The FC 212 then sends a message 264 notifying the SRM 214 that the request for the Delivery Information was created. The FC 212 also sends a message 266 notifying the SCP 210 that the request for the Delivery Information was created. The SCE 208 sends a message 268 to the FC 212 when the goods have been set aside for delivery. The FC 212 sends a message 270 to the SRM 214 when the goods have been set aside for delivery. The FC 212 also sends a message 272 to the SCP 210 when the goods have been set aside for delivery.

The SCE 208 sends a message 274 to the FC 212 when the goods have been delivered. The FC 212 then sends a message 276 to the SRM 214 indicating that the goods have been delivered, and sends a message 278 to the SCP 210 indicating that the goods have been delivered. The SCE 208 then sends an Inventory Change Accounting Notification 280 to Accounting 202, and an Inventory Change Notification 282 to the SCP 210. The FC 212 sends an Invoice Due Notification 284 to Invoicing 206, and SCE 208 sends a Received Delivery Notification 286 to the Supplier 216.

During the Billing/Payment transaction 226, the Supplier 216 sends an Invoice Request 287 to Invoicing 206. Invoicing 206 then sends a Payment Due Notification 288 to Payment 204, a Tax Due Notification 289 to Payment 204, an Invoice Confirmation 290 to the Supplier 216, and an Invoice Accounting Notification 291 to Accounting 202. Payment 204 sends a Payment Request 292 to the Bank 218, and a Payment Requested Accounting Notification 293 to Accounting 202. Bank 218 sends a Bank Statement Information 296 to Payment 204. Payment 204 then sends a Payment Done Information 294 to Invoicing 206 and a Payment Done Accounting Notification 295 to Accounting 202.

Within a business document flow, business documents having the same or similar structures are marked. For example, in the business document flow 200 depicted in FIG. 2, Purchase Requirement Requests 234, 236 and Purchase Requirement Confirmations 238, 240 have the same structures. Thus, each of these business documents is marked with an "O6." Similarly, Purchase Order Request 242 and Purchase Order Confirmation 248 have the same structures. Thus, both documents are marked with an "O1." Each business document or message is based on a message type.

From the business document flow, the developers identify the business documents having identical or similar structures, and use these business documents to create the business object model (step 110). The business object model includes the objects contained within the business documents. These objects are reflected as packages containing related information, and are arranged in a hierarchical structure within the business object model, as discussed below.

Methods and systems consistent with the subject matter described herein then generate interfaces from the business object model (step 112). The heterogeneous programs use instantiations of these interfaces (called "business document objects" below) to create messages (step 114), which are sent to complete the business transaction (step 116). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages often exceed the standards and thus may provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

B. Implementation Details

As discussed above, methods and systems consistent with the subject matter described herein create consistent interfaces by generating the interfaces from a business object model. Details regarding the creation of the business object model, the generation of an interface from the business object model, and the use of an interface generated from the business object model are provided below.

Figure 3A:
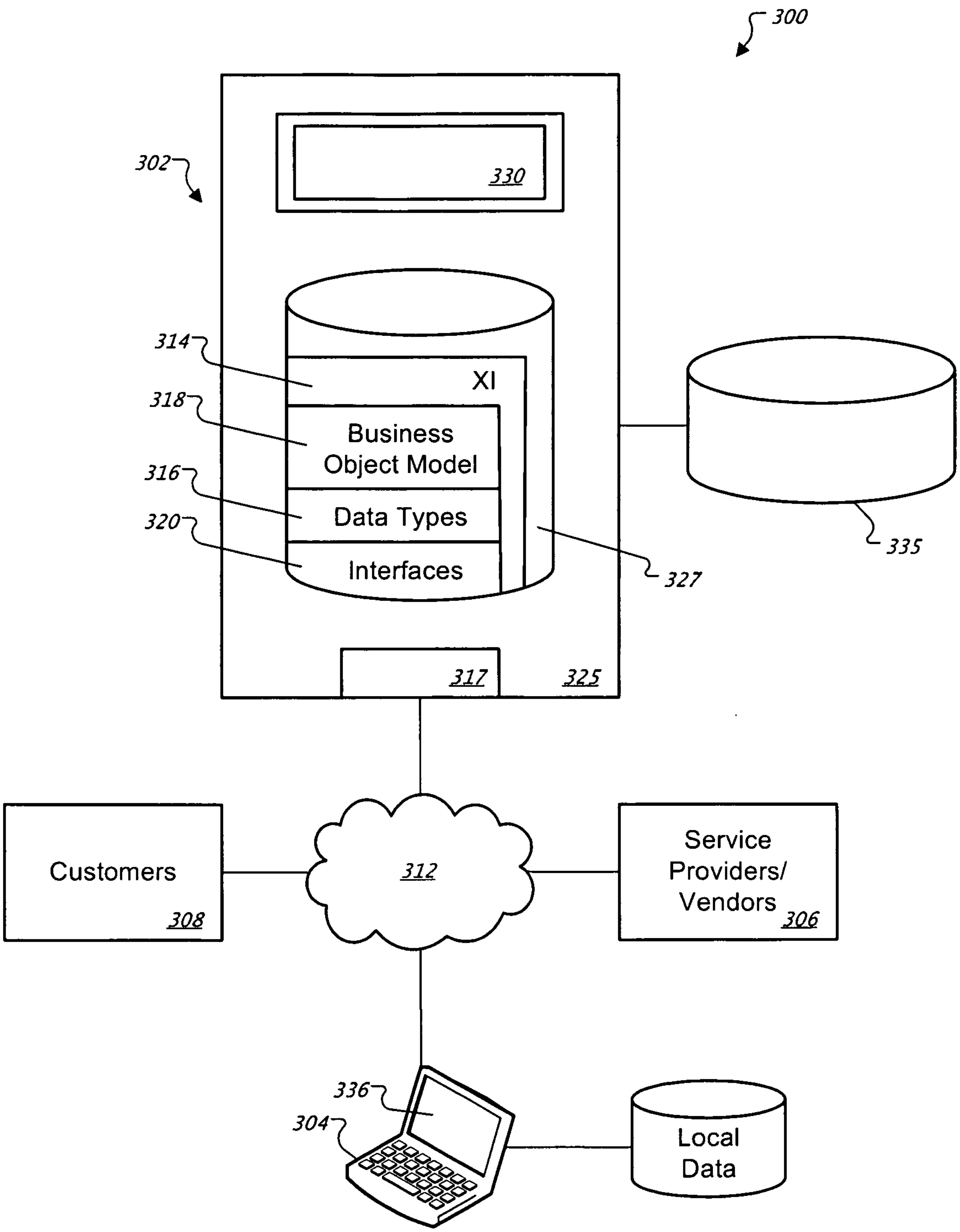
FIGS. 3A-B illustrate example environments implementing the transmission, receipt, and processing of data between heterogeneous applications in accordance with certain embodiments included in the present disclosure.

Turning to the illustrated embodiment in FIG. 3A, environment 300 includes or is communicably coupled (such as via a one-, bi- or multi-directional link or network) with server 302, one or more clients 304, one or more or vendors 306, one or more customers 308, at least some of which communicate across network 312. But, of course, this illustration is for example purposes only, and any distributed system or environment implementing one or more of the techniques described herein may be within the scope of this disclosure. Server 302 comprises an electronic computing device operable to receive, transmit, process and store data associated with environment 300. Generally, FIG. 3A provides merely one example of computers that may be used with the disclosure. Each computer is generally intended to encompass any suitable processing device. For example, although FIG. 3A illustrates one server 302 that may be used with the disclosure, environment 300 can be implemented using computers other than servers, as well as a server pool. Indeed, server 302 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 302 may be adapted to execute any operating system including Linux, UNIX, Windows Server, or any other suitable operating system. According to one embodiment, server 302 may also include or be communicably coupled with a web server and/or a mail server.

As illustrated (but not required), the server 302 is communicably coupled with a relatively remote repository 335 over a portion of the network 312. The repository 335 is any electronic storage facility, data processing center, or archive that may supplement or replace local memory (such as 327). The repository 335 may be a central database communicably coupled with the one or more servers 302 and the clients 304 via a virtual private network (VPN), SSH (Secure Shell) tunnel, or other secure network connection. The repository 335 may be physically or logically located at any appropriate location including in one of the example enterprises or off-shore, so long as it remains operable to store information associated with the environment 300 and communicate such data to the server 302 or at least a subset of plurality of the clients 304.

Illustrated server 302 includes local memory 327. Memory 327 may include any memory or database module and may take the form of volatile or non-volatile memory including, without limitation, magnetic media, optical media, random access memory (RAM), read-only memory (ROM), removable media, or any other suitable local or remote memory component. Illustrated memory 327 includes an exchange infrastructure ("XI") 314, which is an infrastructure that supports the technical interaction of business processes across heterogeneous system environments. XI 314 centralizes the communication between components within a business entity and between different business entities. When appropriate, XI 314 carries out the mapping between the messages. XI 314 integrates different versions of systems implemented on different platforms (e.g., Java and ABAP). XI 314 is based on an open architecture, and makes use of open standards, such as eXtensible Markup Language (XML)™ and Java environments. XI 314 offers services that are useful in a heterogeneous and complex system landscape. In particular, XI 314 offers a runtime infrastructure for message exchange, configuration options for managing business processes and message flow, and options for transforming message contents between sender and receiver systems.

XI 314 stores data types 316, a business object model 318, and interfaces 320. The details regarding the business object model are described below. Data types 316 are the building blocks for the business object model 318. The business object model 318 is used to derive consistent interfaces 320. XI 314 allows for the exchange of information from a first company having one computer system to a second company having a second computer system over network 312 by using the standardized interfaces 320.

While not illustrated, memory 327 may also include business objects and any other appropriate data such as services, interfaces, VPN applications or services, firewall policies, a security or access log, print or other reporting files, HTML files or templates, data classes or object interfaces, child software applications or sub-systems, and others. This stored data may be stored in one or more logical or physical repositories. In some embodiments, the stored data (or pointers thereto) may be stored in one or more tables in a relational database described in terms of SQL statements or scripts. In the same or other embodiments, the stored data may also be formatted, stored, or defined as various data structures in text files, XML documents, Virtual Storage Access Method (VSAM) files, flat files, Btrieve files, comma-separated-value (CSV) files, internal variables, or one or more libraries. For example, a particular data service record may merely be a pointer to a particular piece of third party software stored remotely. In another example, a particular data service may be an internally stored software object usable by authenticated customers or internal development. In short, the stored data may comprise one table or file or a plurality of tables or files stored on one computer or across a plurality of computers in any appropriate format. Indeed, some or all of the stored data may be local or remote without departing from the scope of this disclosure and store any type of appropriate data.

Server 302 also includes processor 325. Processor 325 executes instructions and manipulates data to perform the operations of server 302 such as, for example, a central processing unit (CPU), a blade, an application specific integrated circuit (ASIC), or a field-programmable gate array (FPGA). Although FIG. 3A illustrates a single processor 325 in server 302, multiple processors 325 may be used according to particular needs and reference to processor 325 is meant to include multiple processors 325 where applicable. In the illustrated embodiment, processor 325 executes at least business application 330.

Figure 4:
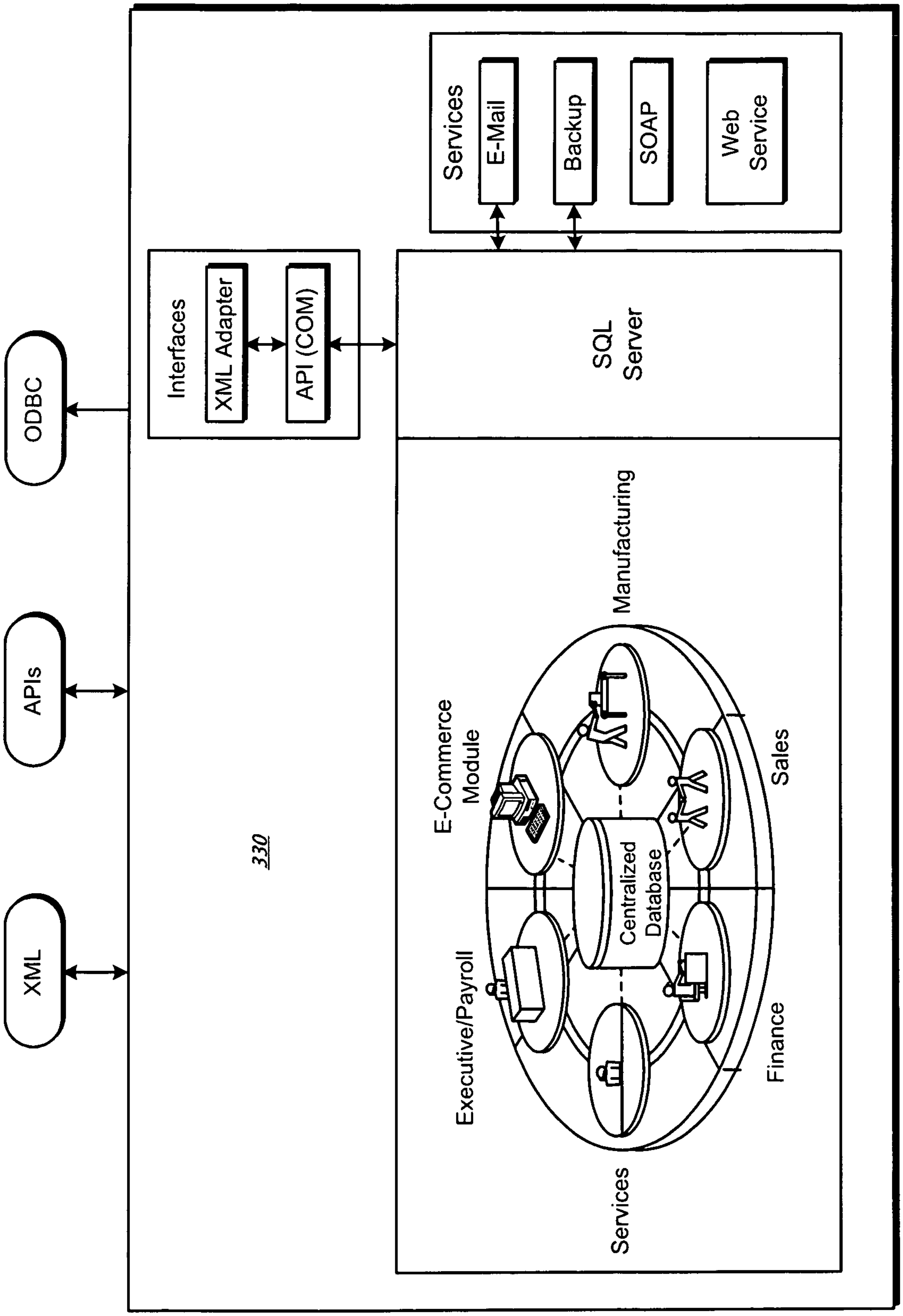
FIG. 4 illustrates an example application implementing certain techniques and components in accordance with one embodiment of the system of FIG. 1.

At a high level, business application 330 is any application, program, module, process, or other software that utilizes or facilitates the exchange of information via messages (or services) or the use of business objects. For example, application 330 may implement, utilize or otherwise leverage an enterprise service-oriented architecture (enterprise SOA), which may be considered a blueprint for an adaptable, flexible, and open IT architecture for developing services-based, enterprise-scale business solutions. This example enterprise service may be a series of web services combined with business logic that can be accessed and used repeatedly to support a particular business process. Aggregating web services into business-level enterprise services helps provide a more meaningful foundation for the task of automating enterprise-scale business scenarios Put simply, enterprise services help provide a holistic combination of actions that are semantically linked to complete the specific task, no matter how many cross-applications are involved. In certain cases, environment 300 may implement a composite application 330, as described below in FIG. 4. Regardless of the particular implementation, "software" may include software, firmware, wired or programmed hardware, or any combination thereof as appropriate. Indeed, application 330 may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's NET. It will be understood that while application 330 is illustrated in FIG. 4 as including various sub-modules, application 330 may include numerous other sub-modules or may instead be a single multi-tasked module that implements the various features and functionality through various objects, methods, or other processes. Further, while illustrated as internal to server 302, one or more processes associated with application 330 may be stored, referenced, or executed remotely. For example, a portion of application 330 may be a web service that is remotely called, while another portion of application 330 may be an interface object bundled for processing at remote client 304. Moreover, application 330 may be a child or sub-module of another software module or enterprise application (not illustrated) without departing from the scope of this disclosure. Indeed, application 330 may be a hosted solution that allows multiple related or third parties in different portions of the process to perform the respective processing.

More specifically, as illustrated in FIG. 4, application 330 may be a composite application, or an application built on other applications, that includes an object access layer (OAL) and a service layer. In this example, application 330 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 330 may run on a heterogeneous IT platform. In doing so, composite application may be cross-functional in that it may drive business processes across different applications, technologies, and organizations. Accordingly, composite application 330 may drive end-to-end business processes across heterogeneous systems or sub-systems. Application 330 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 330, it may instead be a standalone or (relatively) simple software program. Regardless, application 330 may also perform processing automatically, which may indicate that the appropriate processing is substantially performed by at least one component of environment 300. It should be understood that automatically further contemplates any suitable administrator or other user interaction with application 330 or other components of environment 300 without departing from the scope of this disclosure.

Returning to FIG. 3A, illustrated server 302 may also include interface 317 for communicating with other computer systems, such as clients 304, over network 312 in a client-server or other distributed environment. In certain embodiments, server 302 receives data from internal or external senders through interface 317 for storage in memory 327, for storage in DB 335, and/or processing by processor 325. Generally, interface 317 comprises logic encoded in software and/or hardware in a suitable combination and operable to communicate with network 312. More specifically, interface 317 may comprise software supporting one or more communications protocols associated with communications network 312 or hardware operable to communicate physical signals.

Network 312 facilitates wireless or wireline communication between computer server 302 and any other local or remote computer, such as clients 304. Network 312 may be all or a portion of an enterprise or secured network. In another example, network 312 may be a VPN merely between server 302 and client 304 across wireline or wireless link. Such an example wireless link may be via 802.11a, 802.11b, 802.11g, 802.20, WiMax, and many others. While illustrated as a single or continuous network, network 312 may be logically divided into various sub-nets or virtual networks without departing from the scope of this disclosure, so long as at least portion of network 312 may facilitate communications between server 302 and at least one client 304. For example, server 302 may be communicably coupled to one or more "local" repositories through one sub-net while communicably coupled to a particular client 304 or "remote" repositories through another. In other words, network 312 encompasses any internal or external network, networks, sub-network, or combination thereof operable to facilitate communications between various computing components in environment 300. Network 312 may communicate, for example, Internet Protocol (IP) packets, Frame Relay frames, Asynchronous Transfer Mode (ATM) cells, voice, video, data, and other suitable information between network addresses. Network 312 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 312 may be a secure network associated with the enterprise and certain local or remote vendors 306 and customers 308. As used in this disclosure, customer 308 is any person, department, organization, small business, enterprise, or any other entity that may use or request others to use environment 300. As described above, vendors 306 also may be local or remote to customer 308. Indeed, a particular vendor 306 may provide some content to business application 330, while receiving or purchasing other content (at the same or different times) as customer 308. As illustrated, customer 308 and vendor 06 each typically perform some processing (such as uploading or purchasing content) using a computer, such as client 304.

Client 304 is any computing device operable to connect or communicate with server 302 or network 312 using any communication link. For example, client 304 is intended to encompass a personal computer, touch screen terminal, workstation, network computer, kiosk, wireless data port, smart phone, personal data assistant (PDA), one or more processors within these or other devices, or any other suitable processing device used by or for the benefit of business 308, vendor 306, or some other user or entity. At a high level, each client 304 includes or executes at least GUI 336 and comprises an electronic computing device operable to receive, transmit, process and store any appropriate data associated with environment 300. It will be understood that there may be any number of clients 304 communicably coupled to server 302. Further, "client 304," "business," "business analyst," "end user," and "user" may be used interchangeably as appropriate without departing from the scope of this disclosure. Moreover, for ease of illustration, each client 304 is described in terms of being used by one user. But this disclosure contemplates that many users may use one computer or that one user may use multiple computers. For example, client 304 may be a PDA operable to wirelessly connect with external or unsecured network. In another example, client 304 may comprise a laptop that includes an input device, such as a keypad, touch screen, mouse, or other device that can accept information, and an output device that conveys information associated with the operation of server 302 or clients 304, including digital data, visual information, or GUI 336. Both the input device and output device may include fixed or removable storage media such as a magnetic computer disk, CD-ROM, or other suitable media to both receive input from and provide output to users of clients 304 through the display, namely the client portion of GUI or application interface 336.

GUI 336 comprises a graphical user interface operable to allow the user of client 304 to interface with at least a portion of environment 300 for any suitable purpose, such as viewing application or other transaction data. Generally, GUI 336 provides the particular user with an efficient and user-friendly presentation of data provided by or communicated within environment 300. For example, GUI 336 may present the user with the components and information that is relevant to their task, increase reuse of such components, and facilitate a sizable developer community around those components. GUI 336 may comprise a plurality of customizable frames or views having interactive fields, pull-down lists, and buttons operated by the user. For example, GUI 336 is operable to display data involving business objects and interfaces in a user-friendly form based on the user context and the displayed data. In another example, GUI 336 is operable to display different levels and types of information involving business objects and interfaces based on the identified or supplied user role. GUI 336 may also present a plurality of portals or dashboards. For example, GUI 336 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by business objects and interfaces. It should be understood that the term graphical user interface may be used in the singular or in the plural to describe one or more graphical user interfaces and each of the displays of a particular graphical user interface. Indeed, reference to GUI 336 may indicate a reference to the front-end or a component of business application 330, as well as the particular interface accessible via client 304, as appropriate, without departing from the scope of this disclosure. Therefore, GUI 336 contemplates any graphical user interface, such as a generic web browser or touchscreen, that processes information in environment 300 and efficiently presents the results to the user. Server 302 can accept data from client 304 via the web browser (e.g., Microsoft Internet Explorer or Netscape Navigator) and return the appropriate HTML or XML responses to the browser using network 312.

Figure 3B:
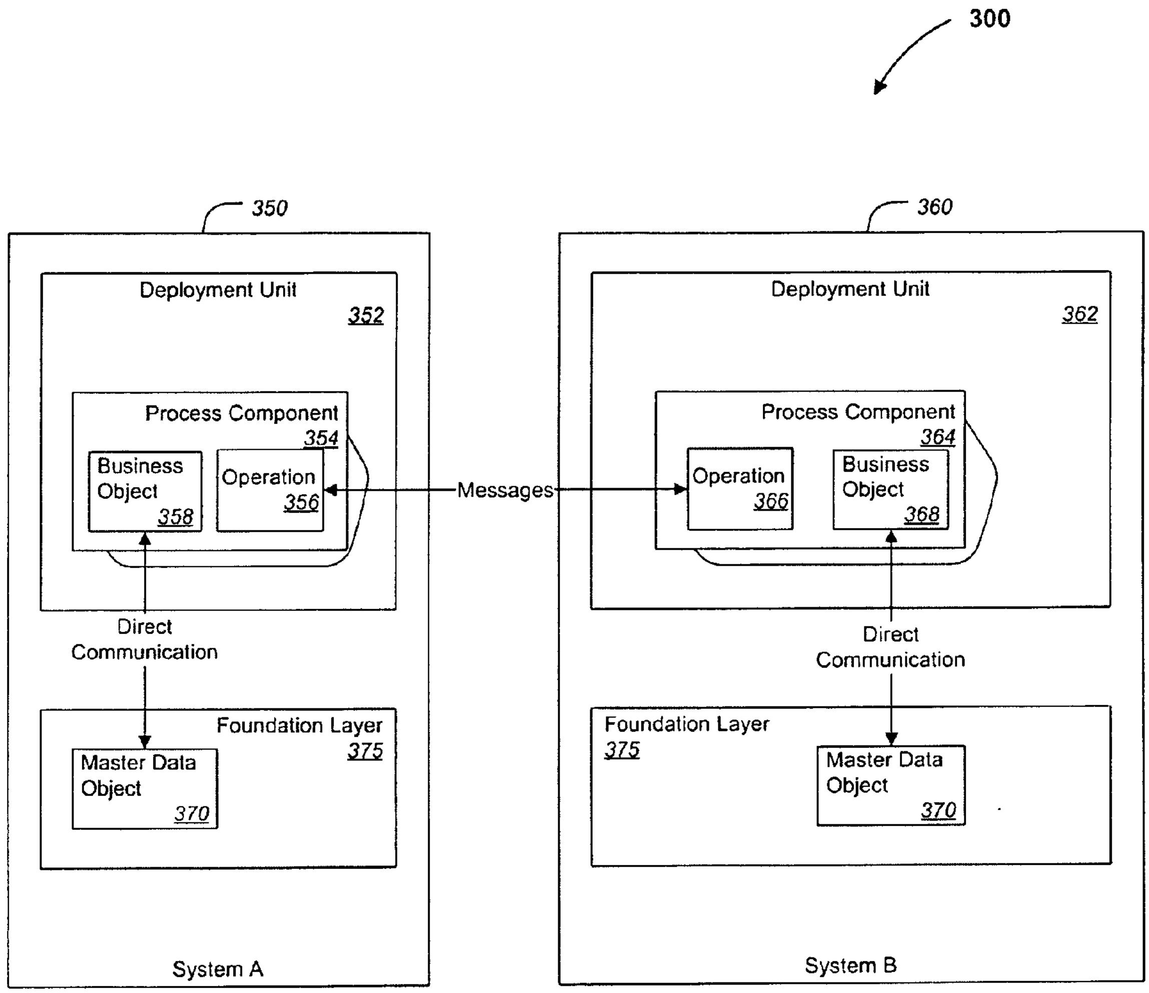

More generally in environment 300 as depicted in FIG. 3B, a Foundation Layer 375 can be deployed on multiple separate and distinct hardware platforms, e.g., System A 350 and System B 360, to support application software deployed as two or more deployment units distributed on the platforms, including deployment unit 352 deployed on System A and deployment unit 362 deployed on System B. In this example, the foundation layer can be used to support application software deployed in an application layer. In particular, the foundation layer can be used in connection with application software implemented in accordance with a software architecture that provides a suite of enterprise service operations having various application functionality. In some implementations, the application software is implemented to be deployed on an application platform that includes a foundation layer that contains all fundamental entities that can used from multiple deployment units. These entities can be process components, business objects, and reuse service components. A reuse service component is a piece of software that is reused in different transactions. A reuse service component is used by its defined interfaces, which can be, e.g., local APIs or service interfaces. As explained above, process components in separate deployment units interact through service operations, as illustrated by messages passing between service operations 356 and 366, which are implemented in process components 354 and 364, respectively, which are included in deployment units 352 and 362, respectively. As also explained above, some form of direct communication is generally the form of interaction used between a business object, e.g., business object 358 and 368, of an application deployment unit and a business object, such as master data object 370, of the Foundation Layer 375.

Various components of the present disclosure may be modeled using a model-driven environment. For example, the model-driven framework or environment may allow the developer to use simple drag-and-drop techniques to develop pattern-based or freestyle user interfaces and define the flow of data between them. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding.

Figure 5A:
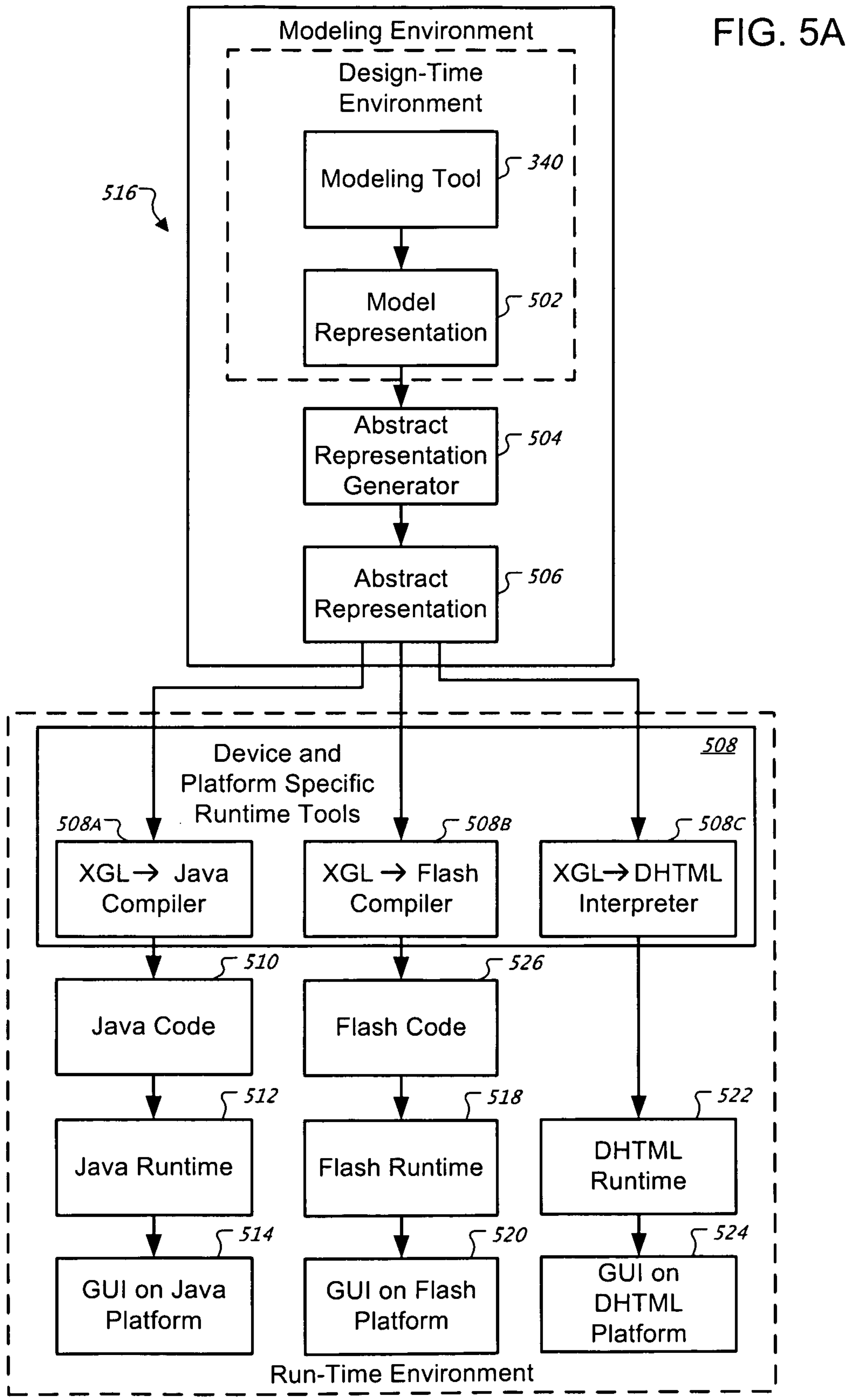
FIG. 5A depicts an example development environment in accordance with one embodiment of FIG. 1.

FIG. 5A depicts an example modeling environment 516, namely a modeling environment, in accordance with one embodiment of the present disclosure. Thus, as illustrated in FIG. 5A, such a modeling environment 516 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

According to some embodiments, a modeler (or other analyst) may use the model-driven modeling environment 516 to create pattern-based or freestyle user interfaces using simple drag-and-drop services. Because this development may be model-driven, the modeler can typically compose an application using models of business objects without having to write much, if any, code. In some cases, this example modeling environment 516 may provide a personalized, secure interface that helps unify enterprise applications, information, and processes into a coherent, role-based portal experience. Further, the modeling environment 516 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 516 may provide a shared set of services for finding, organizing, and accessing unstructured content stored in third-party repositories and content management systems across various networks 312. Classification tools may automate the organization of information, while subject-matter experts and content managers can publish information to distinct user audiences. Regardless of the particular implementation or architecture, this modeling environment 516 may allow the developer to easily model hosted business objects 140 using this model-driven approach.

In certain embodiments, the modeling environment 516 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 5A, modeling tool 340 may be used by a GUI designer or business analyst during the application design phase to create a model representation 502 for a GUI application. It will be understood that modeling environment 516 may include or be compatible with various different modeling tools 340 used to generate model representation 502. This model representation 502 may be a machine-readable representation of an application or a domain specific model. Model representation 502 generally encapsulates various design parameters related to the GUI such as GUI components, dependencies between the GUI components, inputs and outputs, and the like. Put another way, model representation 502 provides a form in which the one or more models can be persisted and transported, and possibly handled by various tools such as code generators, runtime interpreters, analysis and validation tools, merge tools, and the like. In one embodiment, model representation 502 maybe a collection of XML documents with a well-formed syntax.

Illustrated modeling environment 516 also includes an abstract representation generator (or XGL generator) 504 operable to generate an abstract representation (for example, XGL representation or XGL-compliant representation) 506 based upon model representation 502. Abstract representation generator 504 takes model representation 502 as input and outputs abstract representation 506 for the model representation. Model representation 502 may include multiple instances of various forms or types depending on the tool/language used for the modeling. In certain cases, these various different model representations may each be mapped to one or more abstract representations 506. Different types of model representations may be transformed or mapped to XGL representations. For each type of model representation, mapping rules may be provided for mapping the model representation to the XGL representation 506. Different mapping rules may be provided for mapping a model representation to an XGL representation.

This XGL representation 506 that is created from a model representation may then be used for processing in the runtime environment. For example, the XGL representation 506 may be used to generate a machine-executable runtime GUI (or some other runtime representation) that may be executed by a target device. As part of the runtime processing, the XGL representation 506 may be transformed into one or more runtime representations, which may indicate source code in a particular programming language, machine-executable code for a specific runtime environment, executable GUI, and so forth, which may be generated for specific runtime environments and devices. Since the XGL representation 506, rather than the design-time model representation, is used by the runtime environment, the design-time model representation is decoupled from the runtime environment. The XGL representation 506 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 506 generated for a model representation 502 is generally declarative and executable in that it provides a representation of the GUI of model representation 502 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 506 is also not GUI runtime-platform specific. The abstract representation 506 provides a self-contained, closed, and deterministic definition of all aspects of a graphical user interface that is device independent and language independent.

Abstract representation 506 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract representation generator 504 may be configured to generate abstract representation 506 for models of different types, which may be created using different modeling tools 340. It will be understood that modeling environment 516 may include some, none, or other sub-modules or components as those shown in this example illustration. In other words, modeling environment 516 encompasses the design-time environment (with or without the abstract generator or the various representations), a modeling toolkit (such as 340) linked with a developer's space, or any other appropriate software operable to decouple models created during design-time from the runtime environment. Abstract representation 506 provides an interface between the design time environment and the runtime environment. As shown, this abstract representation 506 may then be used by runtime processing.

As part of runtime processing, modeling environment 516 may include various runtime tools 508 and may generate different types of runtime representations based upon the abstract representation 506. Examples of runtime representations include device or language-dependent (or specific) source code, runtime platform-specific machine-readable code, GUIs for a particular target device, and the like. The runtime tools 508 may include compilers, interpreters, source code generators, and other such tools that are configured to generate runtime platform-specific or target device-specific runtime representations of abstract representation 506. The runtime tool 508 may generate the runtime representation from abstract representation 506 using specific rules that map abstract representation 506 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 506 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 5A, an XGL-to-Java compiler 508A may take abstract representation 506 as input and generate Java code 510 for execution by a target device comprising a Java runtime 512. Java runtime 512 may execute Java code 510 to generate or display a GUI 514 on a Java-platform target device. As another example, an XGL-to-Flash compiler 508B may take abstract representation 506 as input and generate Flash code 526 for execution by a target device comprising a Flash runtime 518. Flash runtime 518 may execute Flash code 516 to generate or display a GUI 520 on a target device comprising a Flash platform. As another example, an XGL-to-DHTML (dynamic HTML) interpreter 508C may take abstract representation 506 as input and generate DHTML statements (instructions) on the fly which are then interpreted by a DHTML runtime 522 to generate or display a GUI 524 on a target device comprising a DHTML platform.

It should be apparent that abstract representation 506 may be used to generate GUIs for Extensible Application Markup Language (XAML) or various other runtime platforms and devices. The same abstract representation 506 may be mapped to various runtime representations and device-specific and runtime platform-specific GUIs. In general, in the runtime environment, machine executable instructions specific to a runtime environment may be generated based upon the abstract representation 506 and executed to generate a GUI in the runtime environment. The same XGL representation may be used to generate machine executable instructions specific to different runtime environments and target devices.

According to certain embodiments, the process of mapping a model representation 502 to an abstract representation 506 and mapping an abstract representation 506 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 506 rather than model representation 502 for runtime processing, the model representation 502 that is created during design-time is decoupled from the runtime environment. Abstract representation 506 thus provides an interface between the modeling environment and the runtime environment. As a result, changes may be made to the design time environment, including changes to model representation 502 or changes that affect model representation 502, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 5B:
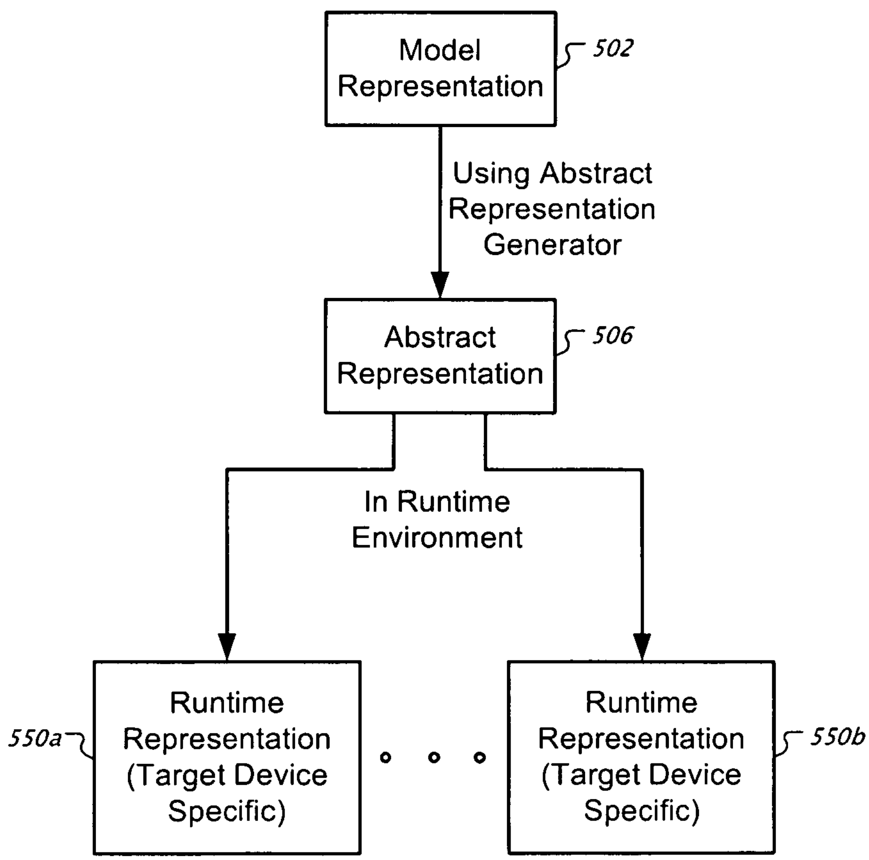
FIG. 5B depicts a simplified process for mapping a model representation to a runtime representation using the example development environment of FIG. 5A or some other development environment.

FIG. 5B depicts an example process for mapping a model representation 502 to a runtime representation using the example modeling environment 516 of FIG. 5A or some other modeling environment. Model representation 502 may comprise one or more model components and associated properties that describe a data object, such as hosted business objects and interfaces. As described above, at least one of these model components is based on or otherwise associated with these hosted business objects and interfaces. The abstract representation 506 is generated based upon model representation 502. Abstract representation 506 may be generated by the abstract representation generator 504. Abstract representation 506 comprises one or more abstract GUI components and properties associated with the abstract GUI components. As part of generation of abstract representation 506, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 550a, including GUIs for specific runtime environment platforms, may be generated from abstract representation 506. A device-dependent runtime representation may be generated for a particular type of target device platform to be used for executing and displaying the GUI encapsulated by the abstract representation. The GUIs generated from abstract representation 506 may comprise various types of GUI elements such as buttons, windows, scrollbars, input boxes, etc. Rules may be provided for mapping an abstract representation to a particular runtime representation. Various mapping rules may be provided for different runtime environment platforms.

Methods and systems consistent with the subject matter described herein provide and use interfaces 320 derived from the business object model 318 suitable for use with more than one business area, for example different departments within a company such as finance, or marketing. Also, they are suitable across industries and across businesses. Interfaces 320 are used during an end-to-end business transaction to transfer business process information in an application-independent manner. For example the interfaces can be used for fulfilling a sales order.

1. Message Overview

To perform an end-to-end business transaction, consistent interfaces are used to create business documents that are sent within messages between heterogeneous programs or modules.

(a) Message Categories

Figure 6:
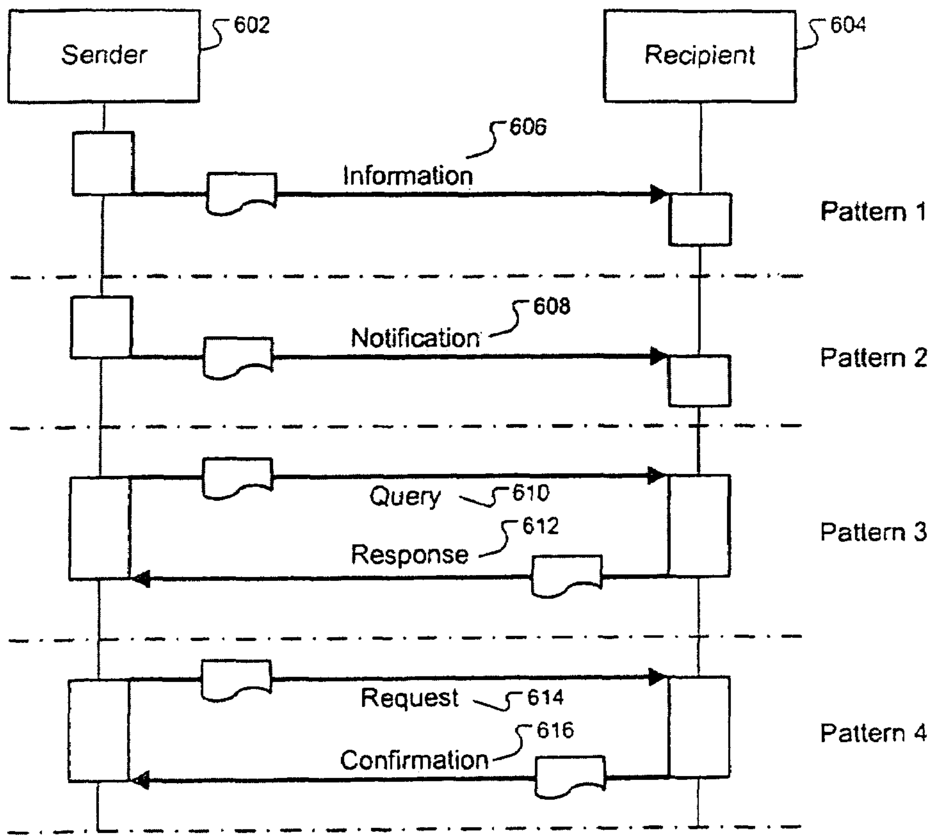
FIG. 6 depicts message categories in accordance with methods and systems consistent with the subject matter described herein.

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

(i) Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of "information" are an announcement, advertising, a report, planning information, and a message to the business warehouse.

(ii) Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

(iii) Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

(iv) Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

(v) Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

(vi) Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

(b) Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

2. Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is generally a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

(a) Data Types

Data types are used to type object entities and interfaces with a structure. This typing can include business semantic. Such data types may include those generally described at pages 96 through 1642 (which are incorporated by reference herein) of U.S. patent application Ser. No. 11/803,178, filed on May 11, 2007 and entitled "Consistent Set Of Interfaces Derived From A Business Object Model". For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

(b) Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

(c) Packages

Packages group the entities in the business object model and the resulting interfaces into groups of semantically associated information. Packages also may include "sub"-packages, i.e., the packages may be nested.

Figure 7:
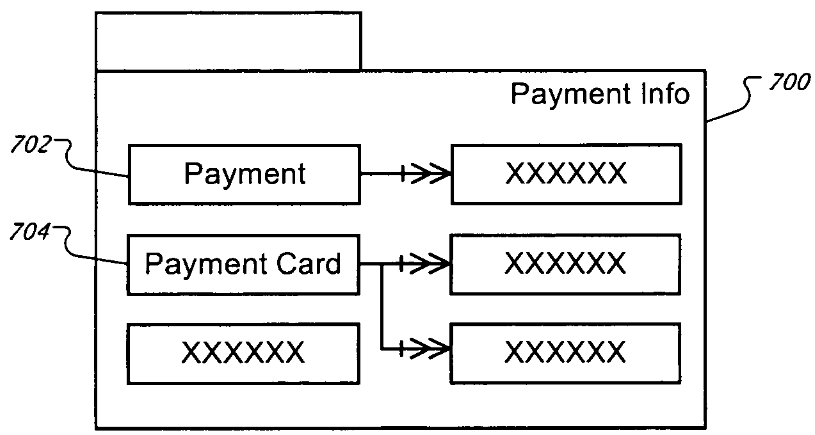
FIG. 7 depicts an example of a package in accordance with methods and systems consistent with the subject matter described herein.

Packages may group elements together based on different factors, such as elements that occur together as a rule with regard to a business-related aspect. For example, as depicted in FIG. 7, in a Purchase Order, different information regarding the purchase order, such as the type of payment 702, and payment card 704, are grouped together via the PaymentInformation package 700.

Figure 8:
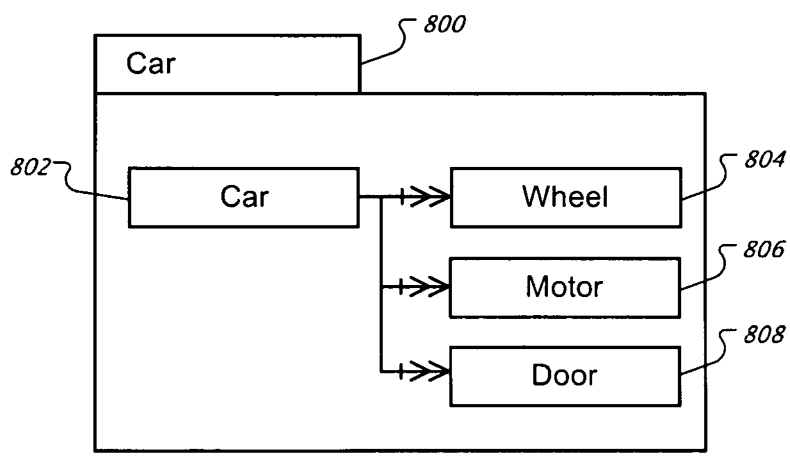
FIG. 8 depicts another example of a package in accordance with methods and systems consistent with the subject matter described herein.

Packages also may combine different components that result in a new object. For example, as depicted in FIG. 8, the components wheels 804, motor 806, and doors 808 are combined to form a composition "Car" 802. The "Car" package 800 includes the wheels, motor and doors as well as the composition "Car."

Figure 9:
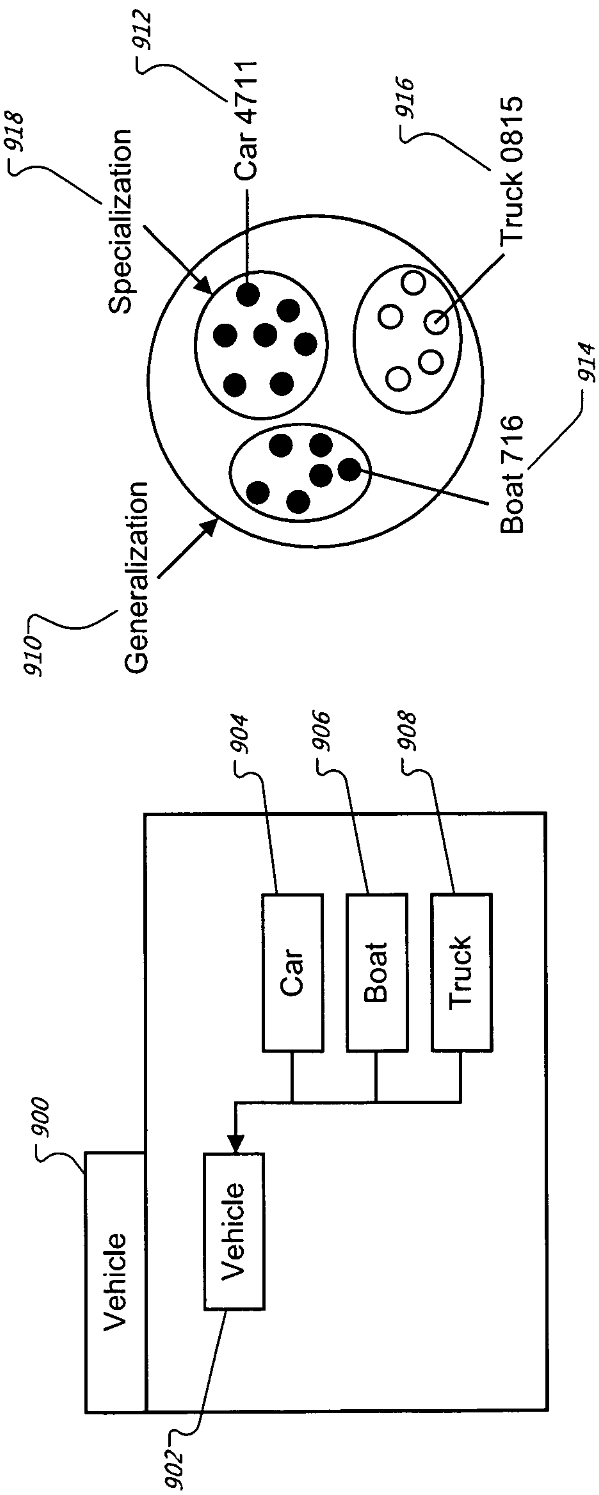
FIG. 9 depicts a third example of a package in accordance with methods and systems consistent with the subject matter described herein.

Another grouping within a package may be subtypes within a type. In these packages, the components are specialized forms of a generic package. For example, as depicted in FIG. 9, the components Car 904, Boat 906, and Truck 908 can be generalized by the generic term Vehicle 902 in Vehicle package 900. Vehicle in this case is the generic package 910, while Car 912, Boat 914, and Truck 916 are the specializations 918 of the generalized vehicle 910.

Figure 10:
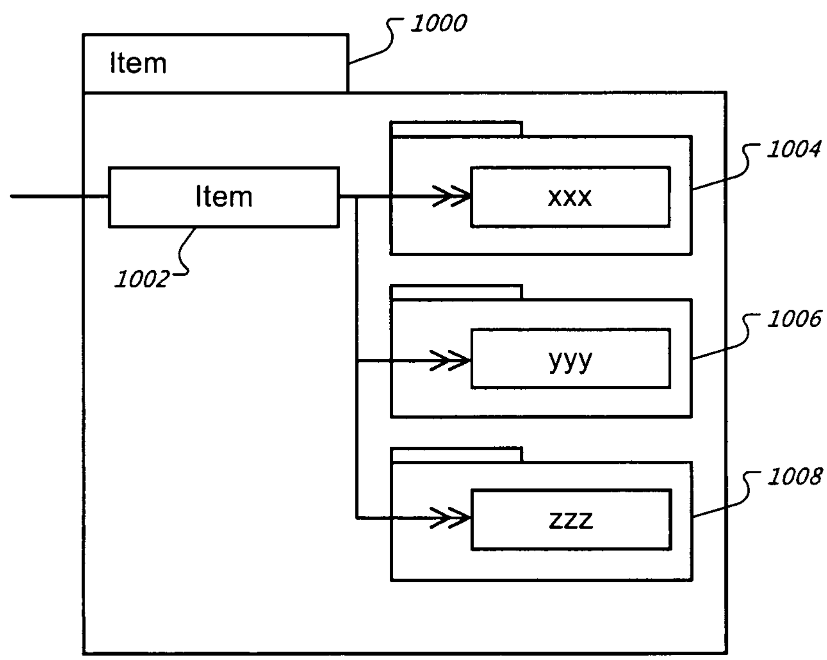
FIG. 10 depicts a fourth example of a package in accordance with methods and systems consistent with the subject matter described herein.

Packages also may be used to represent hierarchy levels. For example, as depicted in FIG. 10, the Item Package 1000 includes Item 1002 with subitem xxx 1004, subitem yyy 1006, and subitem zzz 1008.

Figure 11:
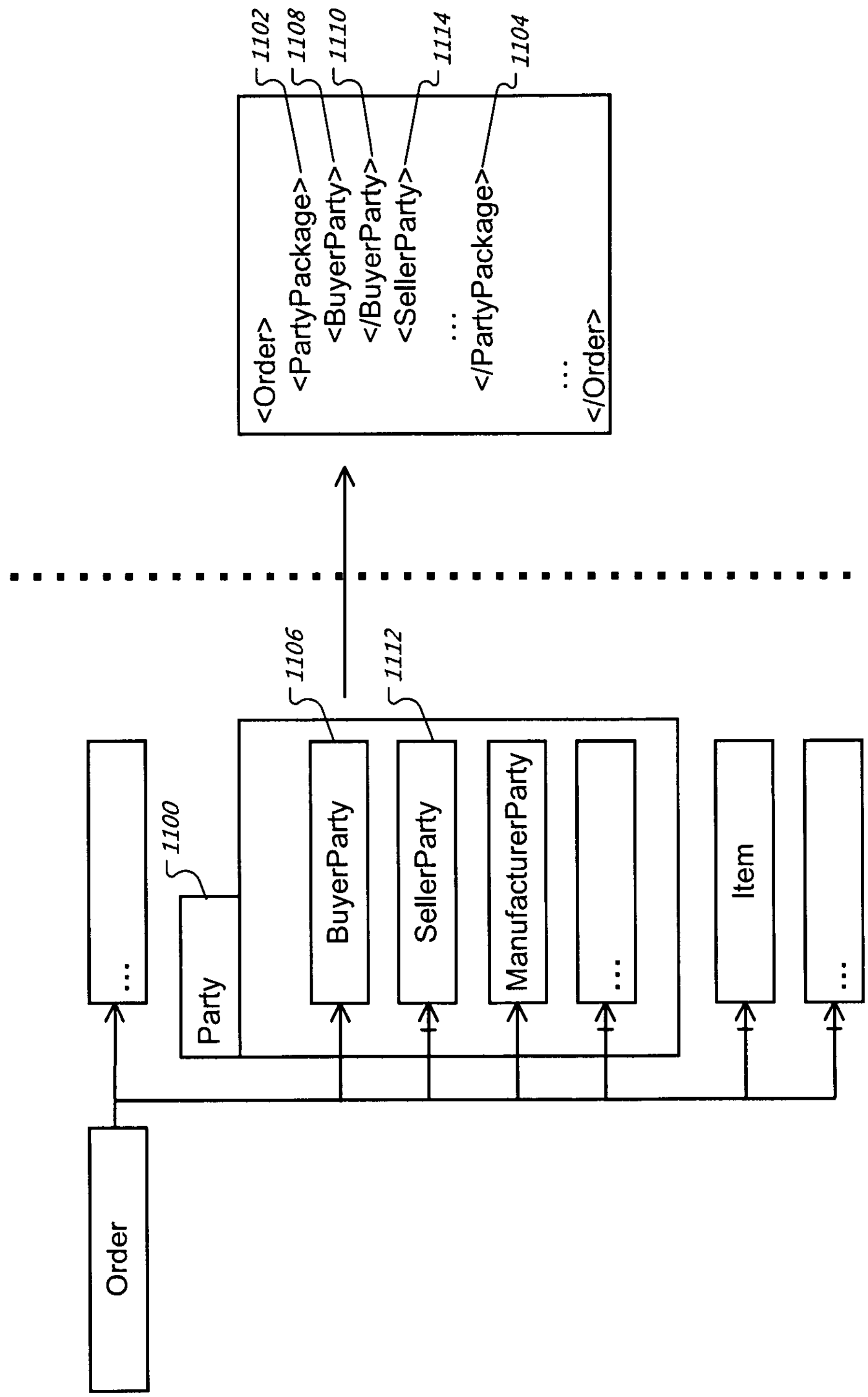
FIG. 11 depicts the representation of a package in the XML schema in accordance with methods and systems consistent with the subject matter described herein.

Packages can be represented in the XML schema as a comment. One advantage of this grouping is that the document structure is easier to read and is more understandable. The names of these packages are assigned by including the object name in brackets with the suffix "Package." For example, as depicted in FIG. 11, Party package 1100 is enclosed by <PartyPackage> 1102 and </PartyPackage> 1104. Party package 1100 illustratively includes a Buyer Party 1106, identified by <BuyerParty> 1108 and </BuyerParty> 1110, and a Seller Party 1112, identified by <SellerParty> 1114 and </SellerParty>, etc.

(d) Relationships

Relationships describe the interdependencies of the entities in the business object model, and are thus an integral part of the business object model.

(i) Cardinality of Relationships

Figure 12:
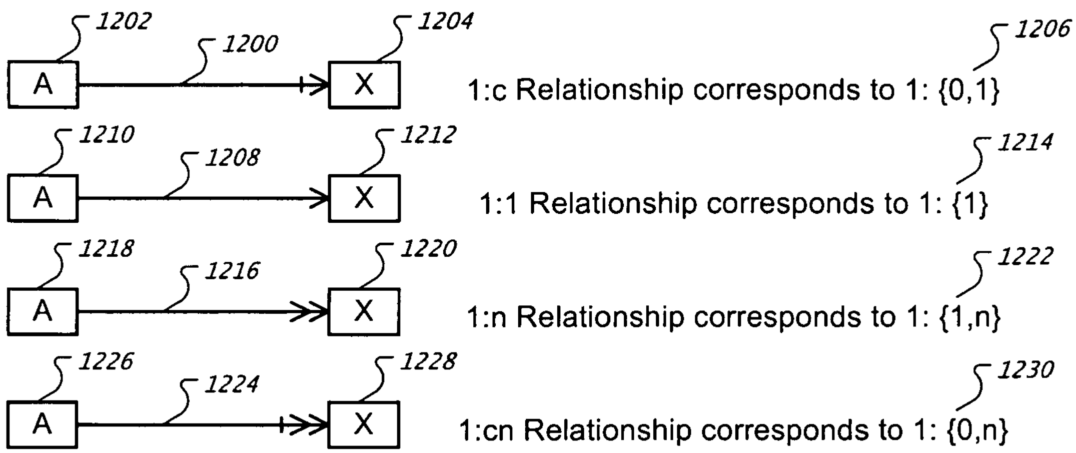
FIG. 12 depicts a graphical representation of cardinalities between two entities in accordance with methods and systems consistent with the subject matter described herein.

FIG. 12 depicts a graphical representation of the cardinalities between two entities. The cardinality between a first entity and a second entity identifies the number of second entities that could possibly exist for each first entity. Thus, a 1:c cardinality 1200 between entities A 1202 and X 1204 indicates that for each entity A 1202, there is either one or zero 1206 entity X 1204. A 1:1 cardinality 1208 between entities A 1210 and X 1212 indicates that for each entity A 1210, there is exactly one 1214 entity X 1212. A 1:n cardinality 1216 between entities A 1218 and X 1220 indicates that for each entity A 1218, there are one or more 1222 entity Xs 1220. A 1:cn cardinality 1224 between entities A 1226 and X 1228 indicates that for each entity A 1226, there are any number 1230 of entity Xs 1228 (i.e., 0 through n Xs for each A).

(ii) Types of Relationships a. Composition

Figure 13:
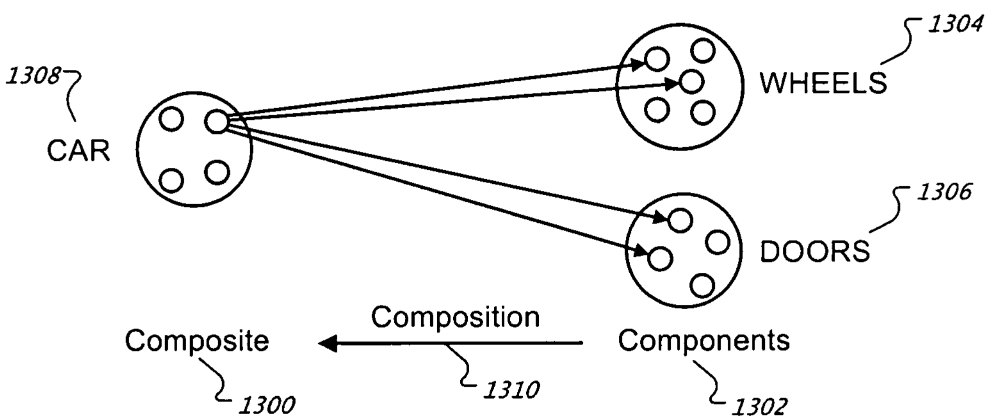
FIG. 13 depicts an example of a composition in accordance with methods and systems consistent with the subject matter described herein.
Figure 14:
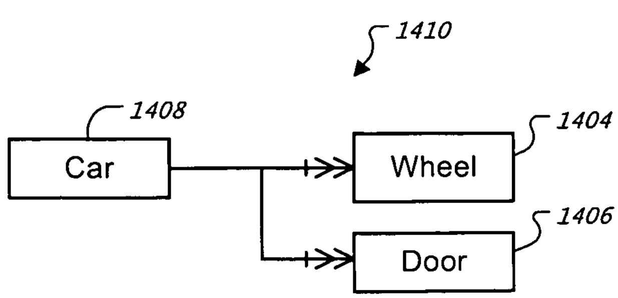
FIG. 14 depicts an example of a hierarchical relationship in accordance with methods and systems consistent with the subject matter described herein.

A composition or hierarchical relationship type is a strong whole-part relationship which is used to describe the structure within an object. The parts, or dependent entities, represent a semantic refinement or partition of the whole, or less dependent entity. For example, as depicted in FIG. 13, the components 1302, wheels 1304, and doors 1306 may be combined to form the composite 1300 "Car" 1308 using the composition 1310. FIG. 14 depicts a graphical representation of the composition 1410 between composite Car 1408 and components wheel 1404 and door 1406.

b. Aggregation

Figure 15:
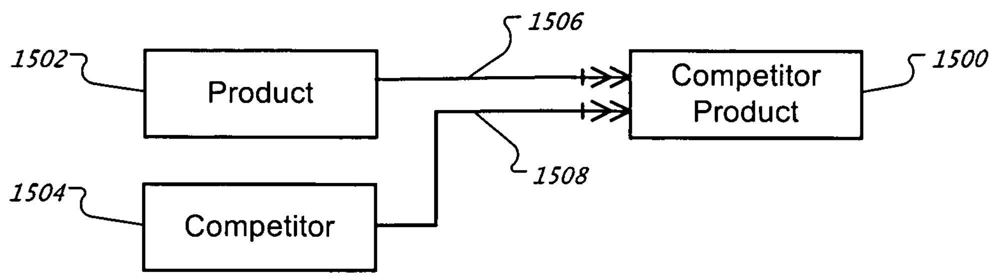
FIG. 15 depicts an example of an aggregating relationship in accordance with methods and systems consistent with the subject matter described herein.

An aggregation or an aggregating relationship type is a weak whole-part relationship between two objects. The dependent object is created by the combination of one or several less dependent objects. For example, as depicted in FIG. 15, the properties of a competitor product 1500 are determined by a product 1502 and a competitor 1504. A hierarchical relationship 1506 exists between the product 1502 and the competitor product 1500 because the competitor product 1500 is a component of the product 1502. Therefore, the values of the attributes of the competitor product 1500 are determined by the product 1502. An aggregating relationship 1508 exists between the competitor 1504 and the competitor product 1500 because the competitor product 1500 is differentiated by the competitor 1504. Therefore the values of the attributes of the competitor product 1500 are determined by the competitor 1504.

c. Association

Figure 16:
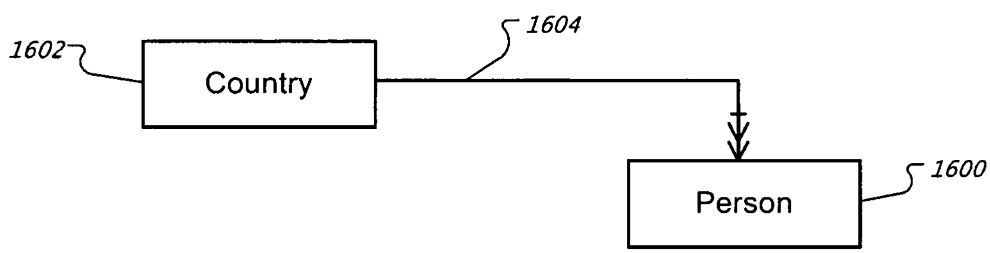
FIG. 16 depicts an example of an association in accordance with methods and systems consistent with the subject matter described herein.

An association or a referential relationship type describes a relationship between two objects in which the dependent object refers to the less dependent object. For example, as depicted in FIG. 16, a person 1600 has a nationality, and thus, has a reference to its country 1602 of origin. There is an association 1604 between the country 1602 and the person 1600. The values of the attributes of the person 1600 are not determined by the country 1602.

(iii) Specialization

Figure 17:
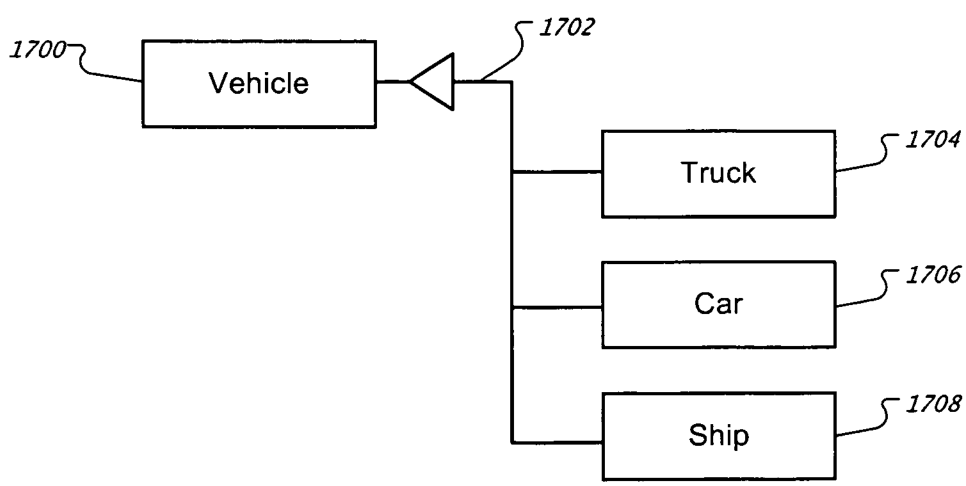
FIG. 17 depicts an example of a specialization in accordance with methods and systems consistent with the subject matter described herein.

Entity types may be divided into subtypes based on characteristics of the entity types. For example, FIG. 17 depicts an entity type "vehicle" 1700 specialized 1702 into subtypes "truck" 1704, "car" 1706, and "ship" 1708. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

Figure 18:
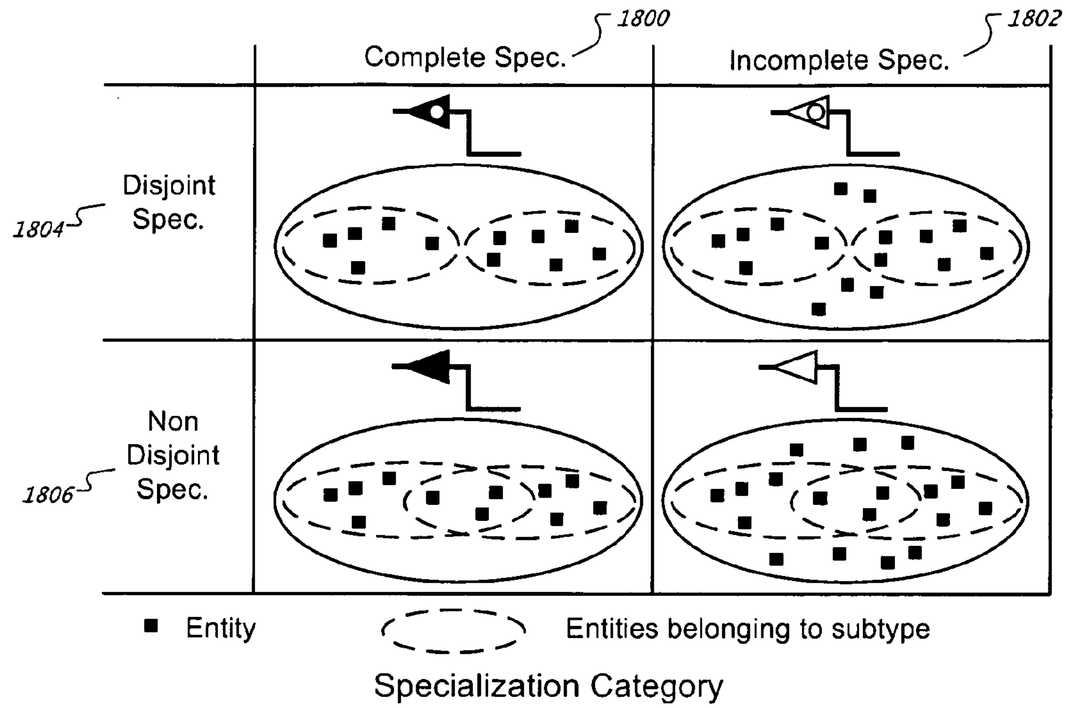
FIG. 18 depicts the categories of specializations in accordance with methods and systems consistent with the subject matter described herein.

As depicted in FIG. 18, specializations may further be characterized as complete specializations 1800 or incomplete specializations 1802. There is a complete specialization 1800 where each entity of the generalized type belongs to at least one subtype. With an incomplete specialization 1802, there is at least one entity that does not belong to a subtype. Specializations also may be disjoint 1804 or nondisjoint 1806. In a disjoint specialization 1804, each entity of the generalized type belongs to a maximum of one subtype. With a nondisjoint specialization 1806, one entity may belong to more than one subtype. As depicted in FIG. 18, four specialization categories result from the combination of the specialization characteristics.

(e) Structural Patterns (i) Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is often either 1:n or 1:cn. For example, in the case of the entity type chart of accounts, there is a hierarchical relationship of the cardinality 1:n with the entity type chart of accounts item since a chart of accounts has at least one item in all cases.

(ii) Hierarchy

Figure 19:
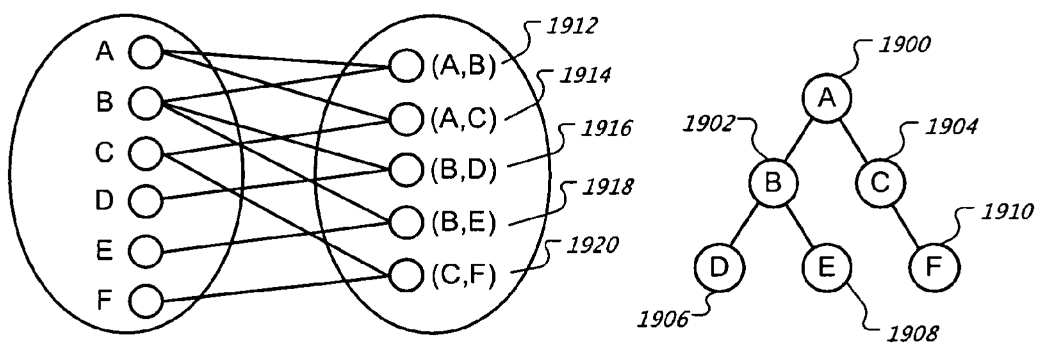
FIG. 19 depicts an example of a hierarchy in accordance with methods and systems consistent with the subject matter described herein.

A hierarchy describes the assignment of subordinate entities to superordinate entities and vice versa, where several entities of the same type are subordinate entities that have, at most, one directly superordinate entity. For example, in the hierarchy depicted in FIG. 19, entity B 1902 is subordinate to entity A 1900, resulting in the relationship (A,B) 1912. Similarly, entity C 1904 is subordinate to entity A 1900, resulting in the relationship (A,C) 1914. Entity D 1906 and entity E 1908 are subordinate to entity B 1902, resulting in the relationships (B,D) 1916 and (B,E) 1918, respectively. Entity F 1910 is subordinate to entity C 1904, resulting in the relationship (C,F) 1920.

Figure 20:
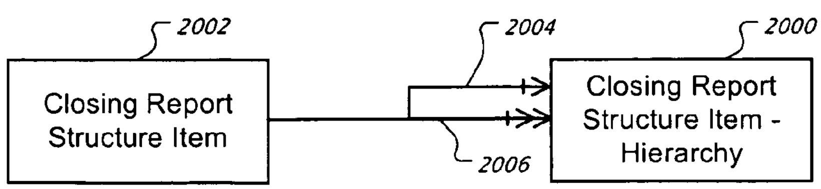
FIG. 20 depicts a graphical representation of a hierarchy in accordance with methods and systems consistent with the subject matter described herein.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 20 depicts a graphical representation of a Closing Report Structure Item hierarchy 2000 for a Closing Report Structure Item 2002. The hierarchy illustrates the 1:c cardinality 2004 between a subordinate entity and its superordinate entity, and the 1:cn cardinality 2006 between a superordinate entity and its subordinate entity.

3. Creation of the Business Object Model

Figure 21A:
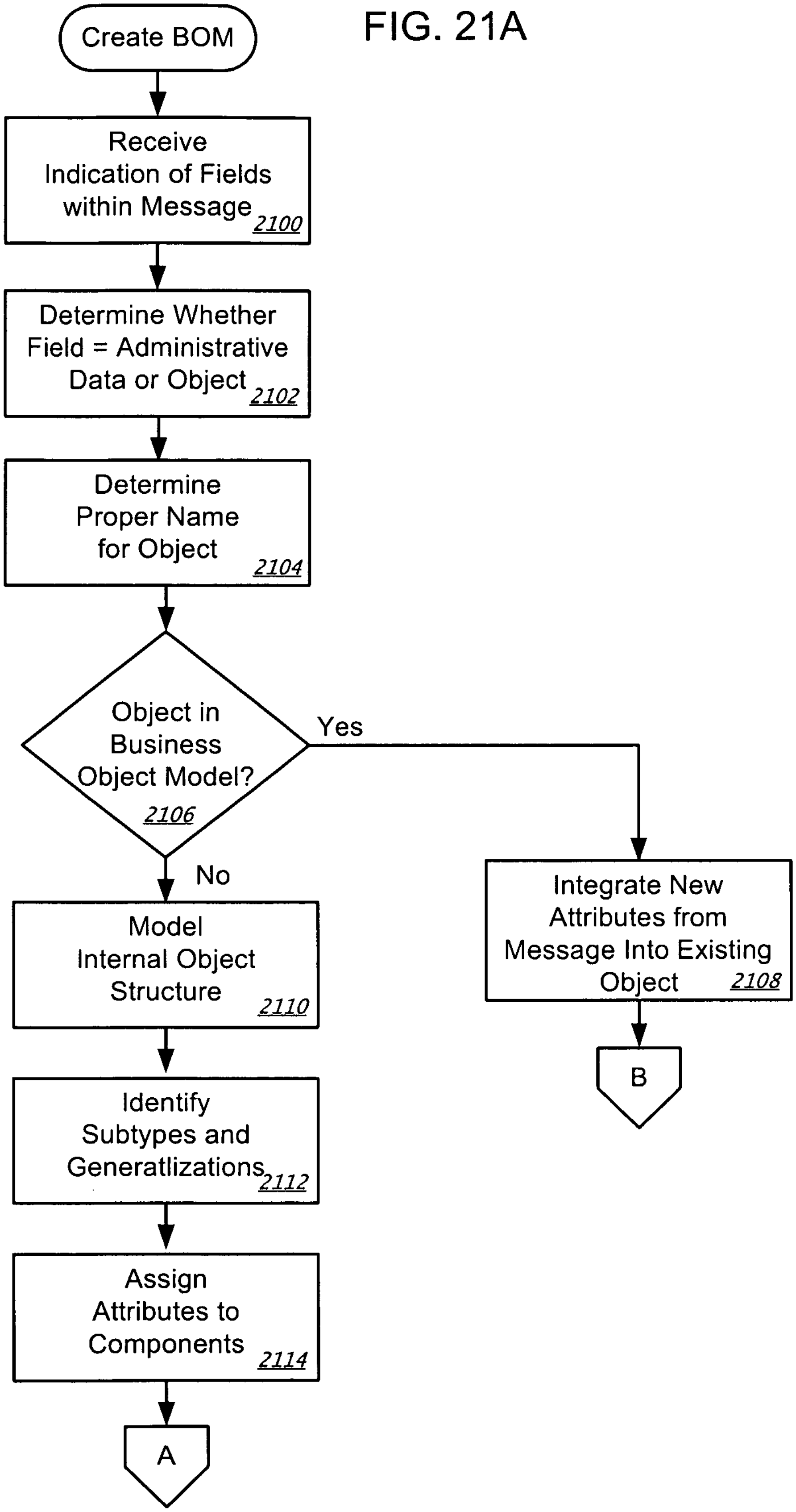
FIGS. 21A-B depict a flow diagram of the steps performed to create a business object model in accordance with methods and systems consistent with the subject matter described herein.
Figure 21B:
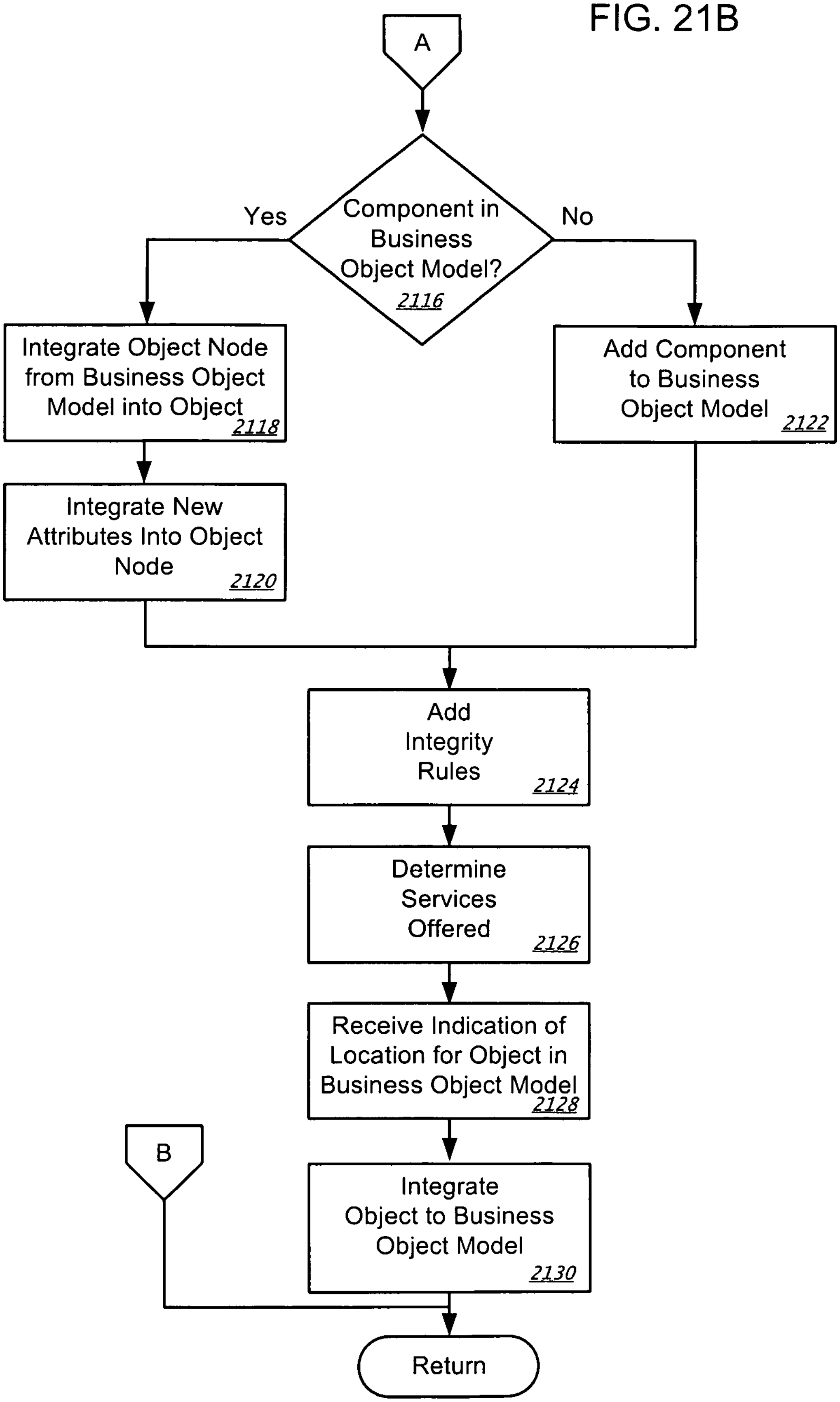

FIGS. 21A-B depict the steps performed using methods and systems consistent with the subject matter described herein to create a business object model. Although some steps are described as being performed by a computer, these steps may alternatively be performed manually, or computer-assisted, or any combination thereof. Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 2100, FIG. 21A). The designers then determine whether each field relates to administrative data or is part of the object (step 2102). Thus, the first eleven fields identified below in the left column are related to administrative data, while the remaining fields are part of the object.

| | |
|---|---|
| MessageID | Admin |
| ReferenceID | |
| CreationDate | |
| SenderID | |
| AdditionalSenderID | |
| ContactPersonID | |
| SenderAddress | |
| RecipientID | |
| AdditionalRecipientID | |
| ContactPersonID | |
| RecipientAddress | |
| ID | Main Object |
| AdditionalID | |
| PostingDate | |
| LastChangeDate | |
| AcceptanceStatus | |
| Note | |
| CompleteTransmission Indicator | |
| Buyer | |
| BuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |

-continued

| |
|---|
| Room ID |
| Care Of Name |
| AddressDescription |
| Telefonnumber |
| MobileNumber |
| Facsimile |
| Email |
| Seller |
| SellerAddress |
| Location |
| LocationType |
| DeliveryItemGroupID |
| DeliveryPriority |
| DeliveryCondition |
| TransferLocation |
| NumberofPartialDelivery |
| QuantityTolerance |
| MaximumLeadTime |
| TransportServiceLevel |
| TranportCondition |
| TransportDescription |
| CashDiscountTerms |
| PaymentForm |
| PaymentCardID |
| PaymentCardReferenceID |
| SequenceID |
| Holder |
| ExpirationDate |
| AttachmentID |
| AttachmentFilename |
| DescriptionofMessage |
| ConfirmationDescriptionof Message |
| FollowUpActivity |
| ItemID |
| ParentItemID |
| HierarchyType |
| ProductID |
| ProductType |
| ProductNote |
| ProductCategoryID |
| Amount |
| BaseQuantity |
| ConfirmedAmount |
| ConfirmedBaseQuantity |
| ItemBuyer |
| ItemBuyerOrganisationName |
| Person Name |
| FunctionalTitle |
| DepartmentName |
| CountryCode |
| StreetPostalCode |
| POBox Postal Code |
| Company Postal Code |
| City Name |
| DistrictName |
| PO Box ID |
| PO Box Indicator |
| PO Box Country Code |
| PO Box Region Code |
| PO Box City Name |
| Street Name |
| House ID |
| Building ID |
| Floor ID |
| Room ID |
| Care Of Name |
| AddressDescription |
| Telefonnumber |
| MobilNumber |
| Facsimile |
| Email |
| ItemSeller |
| ItemSellerAddress |
| ItemLocation |
| ItemLocationType |
| ItemDeliveryItemGroupID |
| ItemDeliveryPriority |
| ItemDeliveryCondition |
| ItemTransferLocation |

-continued

| |
|---|
| ItemNumberofPartialDelivery |
| ItemQuantityTolerance |
| ItemMaximumLeadTime |
| ItemTransportServiceLevel |
| ItemTranportCondition |
| ItemTransportDescription |
| ContractReference |
| QuoteReference |
| CatalogueReference |
| ItemAttachmentID |
| ItemAttachmentFilename |
| ItemDescription |
| ScheduleLineID |
| DeliveryPeriod |
| Quantity |
| ConfirmedScheduleLineID |
| ConfirmedDeliveryPeriod |
| ConfirmedQuantity |

Next, the designers determine the proper name for the object according to the ISO 11179 naming standards (step 2104). In the example above, the proper name for the "Main Object" is "Purchase Order." After naming the object, the system that is creating the business object model determines whether the object already exists in the business object model (step 2106). If the object already exists, the system integrates new attributes from the message into the existing object (step 2108), and the process is complete.

If at step 2106 the system determines that the object does not exist in the business object model, the designers model the internal object structure (step 2110). To model the internal structure, the designers define the components. For the above example, the designers may define the components identified below.

| | | |
|---|---|---|
| ID | Purchase Order | |
| AdditionalID | | |
| PostingDate | | |
| LastChangeDate | | |
| AcceptanceStatus | | |
| Note | | |
| CompleteTransmission Indicator | | |
| Buyer | | Buyer |
| BuyerOrganisationName | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |
| Telefonnumber | | |
| MobileNumber | | |
| Facsimile | | |
| Email | | |
| Seller | | Seller |
| SellerAddress | | |

-continued

| | | |
|---|---|---|
| Location | Location | |
| LocationType | | |
| DeliveryItemGroupID | DeliveryTerms | |
| DeliveryPriority | | |
| DeliveryCondition | | |
| TransferLocation | | |
| NumberofPartialDelivery | | |
| QuantityTolerance | | |
| MaximumLeadTime | | |
| TransportServiceLevel | | |
| TranportCondition | | |
| TransportDescription | | |
| CashDiscountTerms | | |
| PaymentForm | Payment | |
| PaymentCardID | | |
| PaymentCardReferenceID | | |
| SequenceID | | |
| Holder | | |
| ExpirationDate | | |
| AttachmentID | | |
| AttachmentFilename | | |
| DescriptionofMessage | | |
| ConfirmationDescriptionof Message | | |
| FollowUpActivity | | |
| ItemID | Purchase Order Item | |
| ParentItemID | | |
| HierarchyType | | |
| ProductID | | Product |
| ProductType | | |
| ProductNote | | |
| ProductCategoryID | | Product-Category |
| Amount | | |
| BaseQuantity | | |
| ConfirmedAmount | | |
| ConfirmedBaseQuantity | | |
| ItemBuyer | | Buyer |
| ItemBuyerOrganisation Name | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |

-continued

| | |
|---|---|
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobilNumber | |
| Facsimile | |
| Email | |
| ItemSeller | Seller |
| ItemSellerAddress | |
| ItemLocation | Location |
| ItemLocationType | |
| ItemDeliveryItemGroupID | |
| ItemDeliveryPriority | |
| ItemDeliveryCondition | |
| ItemTransferLocation | |
| ItemNumberofPartial Delivery | |
| ItemQuantityTolerance | |
| ItemMaximumLeadTime | |
| ItemTransportServiceLevel | |
| ItemTranportCondition | |
| ItemTransportDescription | |
| ContractReference | Contract |
| QuoteReference | Quote |
| CatalogueReference | Catalogue |
| ItemAttachmentID | |
| ItemAttachmentFilename | |
| ItemDescription | |
| ScheduleLineID | |
| DeliveryPeriod | |
| Quantity | |
| ConfirmedScheduleLineID | |
| ConfirmedDeliveryPeriod | |
| ConfirmedQuantity | |

During the step of modeling the internal structure, the designers also model the complete internal structure by identifying the compositions of the components and the corresponding cardinalities, as shown below.

| | | | | |
|---|---|---|---|---|
| PurchaseOrder | | | | 1 |
| | Buyer | | | 0 . . . 1 |
| | | Address | | 0 . . . 1 |
| | | ContactPerson | | 0 . . . 1 |
| | | | Address | 0 . . . 1 |
| | Seller | | | 0 . . . 1 |
| | Location | | | 0 . . . 1 |
| | | Address | | 0 . . . 1 |
| | DeliveryTerms | | | 0 . . . 1 |
| | | Incoterms | | 0 . . . 1 |
| | | PartialDelivery | | 0 . . . 1 |
| | | QuantityTolerance | | 0 . . . 1 |
| | | Transport | | 0 . . . 1 |
| | CashDiscount Terms | | | 0 . . . 1 |
| | | MaximumCashDiscount | | 0 . . . 1 |
| | | NormalCashDiscount | | 0 . . . 1 |
| | PaymentForm | | | 0 . . . 1 |
| | | PaymentCard | | 0 . . . 1 |
| | Attachment | | | 0 . . . n |
| | Description | | | 0 . . . 1 |
| | Confirmation Description | | | 0 . . . 1 |
| | Item | | | 0 . . . n |
| | | HierarchyRelationship | | 0 . . . 1 |
| | | Product | | 0 . . . 1 |
| | | ProductCategory | | 0 . . . 1 |

-continued

| | | |
|---|---|---|
| Price | | 0 . . . 1 |
| | NetunitPrice | 0 . . . 1 |
| ConfirmedPrice | | 0 . . . 1 |
| | NetunitPrice | 0 . . . 1 |
| Buyer | | 0 . . . 1 |
| Seller | | 0 . . . 1 |
| Location | | 0 . . . 1 |
| DeliveryTerms | | 0 . . . 1 |
| Attachment | | 0 . . . n |
| Description | | 0 . . . 1 |
| ConfirmationDescription | | 0 . . . 1 |
| ScheduleLine | | 0 . . . n |
| | DeliveryPeriod | 1 |
| ConfirmedScheduleLine | | 0 . . . n |

After modeling the internal object structure, the developers identify the subtypes and generalizations for all objects and components (step 2112). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | | |
|---|---|---|---|---|---|
| Purchase Order | | | | | 1 |
| | PurchaseOrder Update | | | | |
| | | PurchaseOrder Request | | | |
| | | PurchaseOrder Change | | | |
| | | PurchaseOrder Confirmation | | | |
| | PurchaseOrder Cancellation | | | | |
| | PurchaseOrder Information | | | | |
| | Party | | | | |
| | | BuyerParty | | | 0 . . . 1 |
| | | | Address | | 0 . . . 1 |
| | | | ContactPerson | | 0 . . . 1 |
| | | | | Address | 0 . . . 1 |
| | | SellerParty | | | 0 . . . 1 |
| | Location | | | | |
| | | ShipToLocation | | | 0 . . . 1 |
| | | | Address | | 0 . . . 1 |
| | | ShipFromLocation | | | 0 . . . 1 |
| | | | Address | | 0 . . . 1 |
| | DeliveryTerms | | | | 0 . . . 1 |
| | | Incoterms | | | 0 . . . 1 |
| | | PartialDelivery | | | 0 . . . 1 |
| | | QuantityTolerance | | | 0 . . . 1 |
| | | Transport | | | 0 . . . 1 |
| | CashDiscount Terms | | | | 0 . . . 1 |
| | | MaximumCash Discount | | | 0 . . . 1 |
| | | NormalCashDiscount | | | 0 . . . 1 |
| | PaymentForm | | | | 0 . . . 1 |
| | | PaymentCard | | | 0 . . . 1 |
| | Attachment | | | | 0 . . . n |
| | Description | | | | 0 . . . 1 |
| | Confirmation Description | | | | 0 . . . 1 |
| | Item | | | | 0 . . . n |
| | | HierarchyRelationship | | | 0 . . . 1 |
| | | Product | | | 0 . . . 1 |
| | | ProductCategory | | | 0 . . . 1 |
| | | Price | | | 0 . . . 1 |
| | | | NetunitPrice | | 0 . . . 1 |
| | | ConfirmedPrice | | | 0 . . . 1 |
| | | | NetunitPrice | | 0 . . . 1 |
| | | Party | | | |
| | | | BuyerParty | | 0 . . . 1 |
| | | | SellerParty | | 0 . . . 1 |
| | | Location | | | |
| | | | ShipTo Location | | 0 . . . 1 |
| | | | ShipFrom Location | | 0 . . . 1 |

-continued

| | | |
|---|---|---|
| DeliveryTerms | | 0 . . . 1 |
| Attachment | | 0 . . . n |
| Description | | 0 . . . 1 |
| Confirmation Description | | 0 . . . 1 |
| ScheduleLine | | 0 . . . n |
| | Delivery Period | 1 |
| ConfirmedScheduleLine | | 0 . . . n |

After identifying the subtypes and generalizations, the developers assign the attributes to these components (step 2114). The attributes for a portion of the components are shown below.

| | | | | |
|---|---|---|---|---|
| Purchase Order | | | | 1 |
| | ID | | | 1 |
| | SellerID | | | 0 . . . 1 |
| | BuyerPosting DateTime | | | 0 . . . 1 |
| | BuyerLast ChangeDate Time | | | 0 . . . 1 |
| | SellerPosting DateTime | | | 0 . . . 1 |
| | SellerLast ChangeDate Time | | | 0 . . . 1 |
| | Acceptance StatusCode | | | 0 . . . 1 |
| | Note | | | 0 . . . 1 |
| | ItemList Complete Transmission Indicator | | | 0 . . . 1 |
| | BuyerParty | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | | ContactPerson | | 0 . . . 1 |
| | | | BuyerID | 0 . . . 1 |
| | | | SellerID | 0 . . . 1 |
| | | | Address | 0 . . . 1 |
| | SellerParty | | | 0 . . . 1 |
| | Product RecipientParty | | | 0 . . . 1 |
| | VendorParty | | | 0 . . . 1 |
| | Manufacturer Party | | | 0 . . . 1 |
| | BillToParty | | | 0 . . . 1 |
| | PayerParty | | | 0 . . . 1 |
| | CarrierParty | | | 0 . . . 1 |
| | ShipTo Location | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | ShipFrom Location | | | 0 . . . 1 |

The system then determines whether the component is one of the object nodes in the business object model (step 2116, FIG. 21B). If the system determines that the component is one of the object nodes in the business object model, the system integrates a reference to the corresponding object node from the business object model into the object (step 2118). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from the PurchaseOrder object.

| | | |
|---|---|---|
| PurchaseOrder | | |
| | ID | |
| | SellerID | |
| | BuyerPostingDateTime | |
| | BuyerLastChangeDateTime | |
| | SellerPostingDateTime | |
| | SellerLastChangeDateTime | |
| | AcceptanceStatusCode | |
| | Note | |
| | ItemListComplete | |
| | TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |
| | CarrierParty | |
| | ShipToLocation | |
| | | ID |
| | ShipFromLocation | |

During the integration step, the designers classify the relationship (i.e., aggregation or association) between the object node and the object being integrated into the business object model. The system also integrates the new attributes into the object node (step 2120). If at step 2116, the system determines that the component is not in the business object model, the system adds the component to the business object model (step 2122).

Regardless of whether the component was in the business object model at step 2116, the next step in creating the business object model is to add the integrity rules (step 2124). There are several levels of integrity rules and constraints which should be described. These levels include consistency rules between attributes, consistency rules between components, and consistency rules to other objects. Next, the designers determine the services offered, which can be accessed via interfaces (step 2126). The services offered in the example above include PurchaseOrderCreateRequest, PurchaseOrderCancellationRequest, and PurchaseOrderReleaseRequest. The system then receives an indication of the location for the object in the business object model (step 2128). After receiving the indication of the location, the system integrates the object into the business object model (step 2130).

4. Structure of the Business Object Model

The business object model, which serves as the basis for the process of generating consistent interfaces, includes the elements contained within the interfaces. These elements are arranged in a hierarchical structure within the business object model.

5. Interfaces Derived from Business Object Model

Figure 27A:
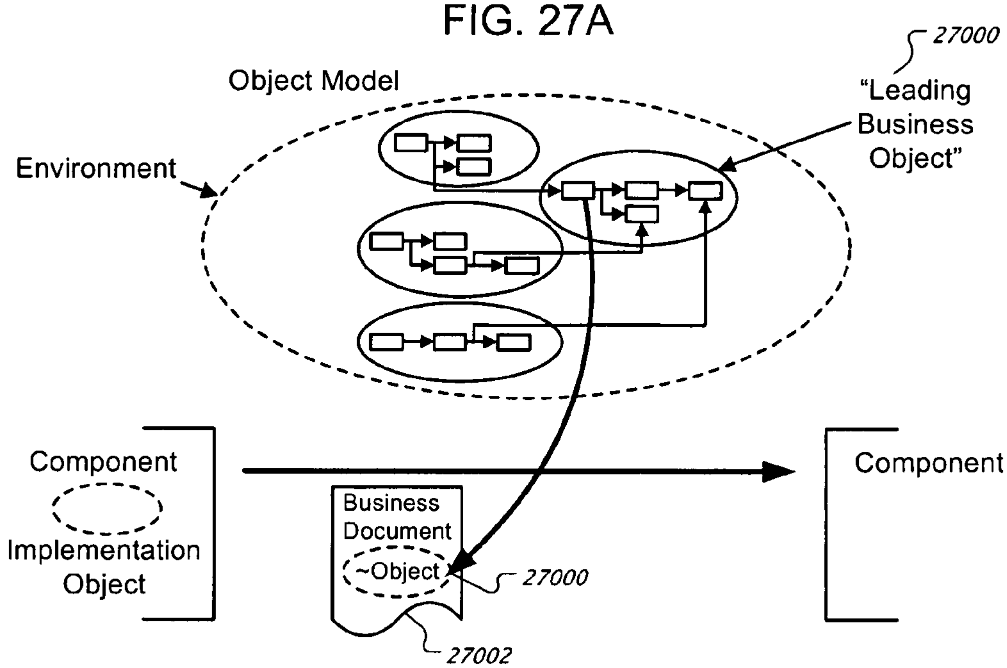

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface. As illustrated in FIG. 27A, communication between components takes place via messages that contain business documents (e.g., business document 27002). The business document 27002 ensures a holistic business-related understanding for the recipient of the message. The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object 27000. The interface represents a usage-specific, hierarchical view of the underlying usage-neutral object model.

Figure 27B:
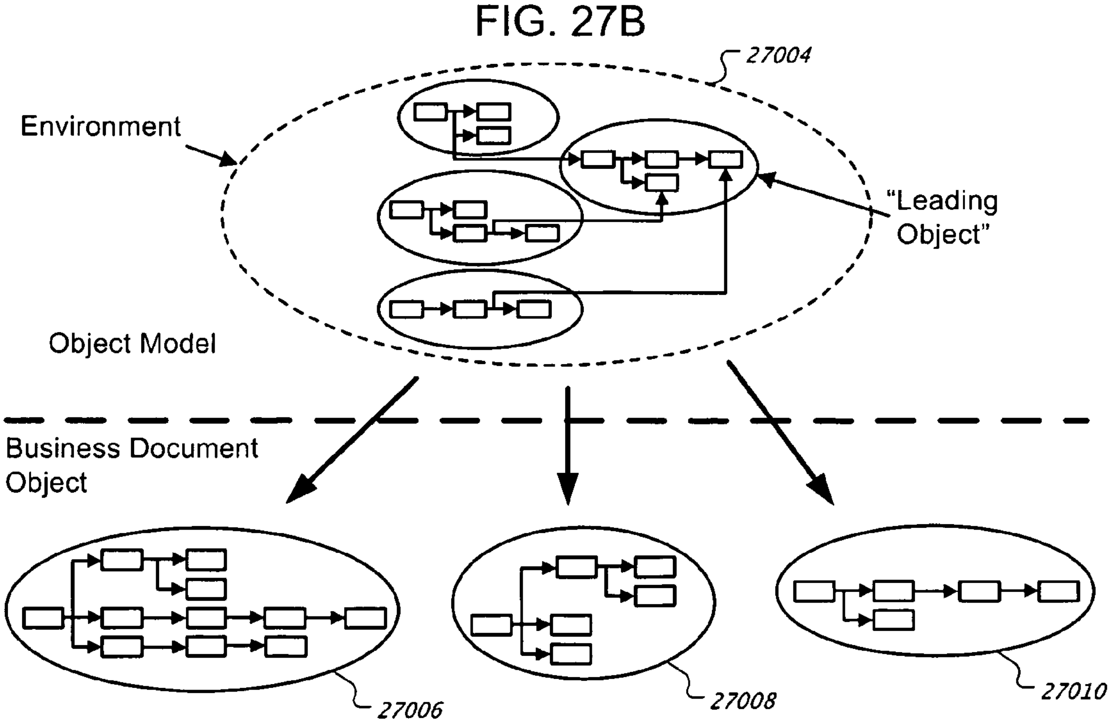

As illustrated in FIG. 27B, several business document objects 27006, 27008, and 27010 as overlapping views may be derived for a given leading object 27004. Each business document object results from the object model by hierarchization.

Figure 27C:
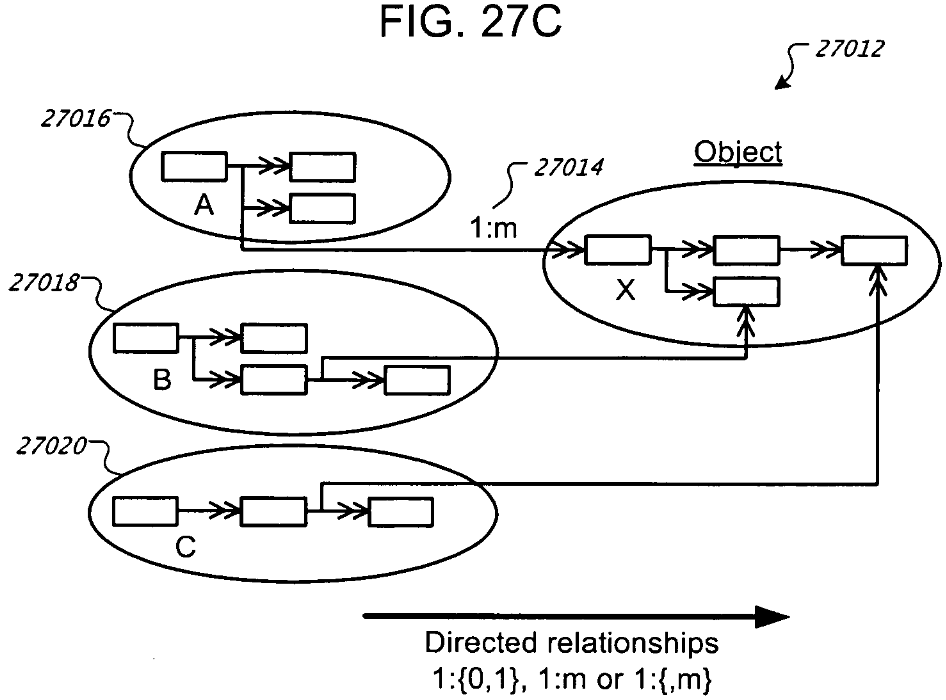

To illustrate the hierarchization process, FIG. 27C depicts an example of an object model 27012 (i.e., a portion of the business object model) that is used to derive a service operation signature (business document object structure). As depicted, leading object X 27014 in the object model 27012 is integrated in a net of object A 27016, object B 27018, and object C 27020. Initially, the parts of the leading object 27014 that are required for the business object document are adopted. In one variation, all parts required for a business document object are adopted from leading object 27014 (making such an operation a maximal service operation). Based on these parts, the relationships to the superordinate objects (i.e., objects A, B, and C from which object X depends) are inverted. In other words, these objects are adopted as dependent or subordinate objects in the new business document object.

For example, object A 27016, object B 27018, and object C 27020 have information that characterize object X. Because object A 27016, object B 27018, and object C 27020 are superordinate to leading object X 27014, the dependencies of these relationships change so that object A 27016, object B 27018, and object C 27020 become dependent and subordinate to leading object X 27014. This procedure is known as "derivation of the business document object by hierarchization."

Business-related objects generally have an internal structure (parts). This structure can be complex and reflect the individual parts of an object and their mutual dependency. When creating the operation signature, the internal structure of an object is strictly hierarchized. Thus, dependent parts keep their dependency structure, and relationships between the parts within the object that do not represent the hierarchical structure are resolved by prioritizing one of the relationships.

Relationships of object X to external objects that are referenced and whose information characterizes object X are added to the operation signature. Such a structure can be quite complex (see, for example, FIG. 27D). The cardinality to these referenced objects is adopted as 1:1 or 1:C, respectively. By this, the direction of the dependency changes. The required parts of this referenced object are adopted identically, both in their cardinality and in their dependency arrangement.

Figure 27D:
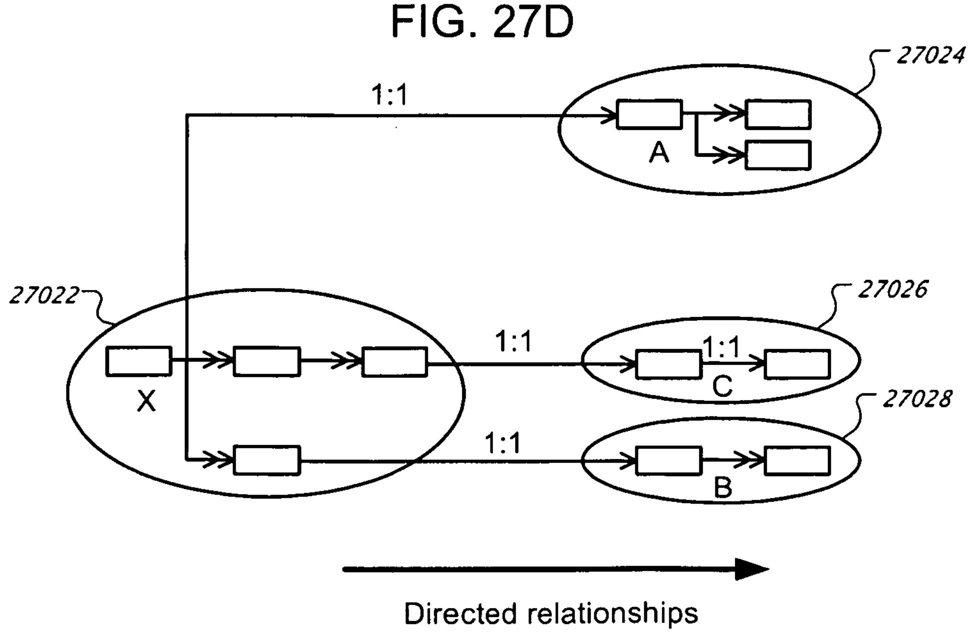

The newly created business document object contains all required information, including the incorporated master data information of the referenced objects. As depicted in FIG. 27D, components Xi in leading object X 27022 are adopted directly. The relationship of object X 27022 to object A 27024, object B 27028, and object C 27026 are inverted, and the parts required by these objects are added as objects that depend from object X 27022. As depicted, all of object A 27024 is adopted. B3 and B4 are adopted from object B 27028, but B1 is not adopted. From object C 27026, C2 and C1 are adopted, but C3 is not adopted.

FIG. 27E depicts the business document object X 27030 created by this hierarchization process. As shown, the arrangement of the elements corresponds to their dependency levels, which directly leads to a corresponding representation as an XML structure 27032.

The following provides certain rules that can be adopted singly or in combination with regard to the hierarchization process:

- A business document object always refers to a leading business document object and is derived from this object.
- The name of the root entity in the business document entity is the name of the business object or the name of a specialization of the business object or the name of a service specific view onto the business object.
- The nodes and elements of the business object that are relevant (according to the semantics of the associated message type) are contained as entities and elements in the business document object.
- The name of a business document entity is predefined by the name of the corresponding business object node. The name of the superordinate entity is not repeated in the name of the business document entity. The "full" semantic name results from the concatenation of the entity names along the hierarchical structure of the business document object.
- The structure of the business document object is, except for deviations due to hierarchization, the same as the structure of the business object.
- The cardinalities of the business document object nodes and elements are adopted identically or more restrictively to the business document object.
- An object from which the leading business object is dependent can be adopted to the business document object. For this arrangement, the relationship is inverted, and the object (or its parts, respectively) are hierarchically subordinated in the business document object.
- Nodes in the business object representing generalized business information can be adopted as explicit entities to the business document object (generally speaking, multiply TypeCodes out). When this adoption occurs, the entities are named according to their more specific semantic (name of TypeCode becomes prefix).
    - Party nodes of the business object are modeled as explicit entities for each party role in the business document object. These nodes are given the name <Prefix><Party Role>Party, for example, BuyerParty, ItemBuyerParty.
    - BTDReference nodes are modeled as separate entities for each reference type in the business document object. These nodes are given the name <Qualifier><BO><Node>Reference, for example SalesOrderReference, OriginSalesOrderReference, SalesOrderItemReference.

A product node in the business object comprises all of the information on the Product, ProductCategory, and Batch. This information is modeled in the business document object as explicit entities for Product, ProductCategory, and Batch.

Entities which are connected by a 1:1 relationship as a result of hierarchization can be combined to a single entity, if they are semantically equivalent. Such a combination can often occurs if a node in the business document object that results from an assignment node is removed because it does not have any elements.

The message type structure is typed with data types.

Elements are typed by GDTs according to their business objects.

Aggregated levels are typed with message type specific data types (Intermediate Data Types), with their names being built according to the corresponding paths in the message type structure.

The whole message type structured is typed by a message data type with its name being built according to the root entity with the suffix "Message".

For the message type, the message category (e.g., information, notification, query, response, request, confirmation, etc.) is specified according to the suited transaction communication pattern.

In one variation, the derivation by hierarchization can be initiated by specifying a leading business object and a desired view relevant for a selected service operation. This view determines the business document object. The leading business object can be the source object, the target object, or a third object. Thereafter, the parts of the business object required for the view are determined. The parts are connected to the root node via a valid path along the hierarchy. Thereafter, one or more independent objects (object parts, respectively) referenced by the leading object which are relevant for the service may be determined (provided that a relationship exists between the leading object and the one or more independent objects).

Once the selection is finalized, relevant nodes of the leading object node that are structurally identical to the message type structure can then be adopted. If nodes are adopted from independent objects or object parts, the relationships to such independent objects or object parts are inverted. Linearization can occur such that a business object node containing certain TypeCodes is represented in the message type structure by explicit entities (an entity for each value of the TypeCode). The structure can be reduced by checking all 1:1 cardinalities in the message type structure. Entities can be combined if they are semantically equivalent, one of the entities carries no elements, or an entity solely results from an n:m assignment in the business object.

After the hierarchization is completed, information regarding transmission of the business document object (e.g., CompleteTransmissionIndicator, ActionCodes, message category, etc.) can be added. A standardized message header can be added to the message type structure and the message structure can be typed. Additionally, the message category for the message type can be designated.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status "pending."

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status "pending." The message type InvoiceConfirmation is based on the message data type InvoiceMessage. An InvoiceConfirmation is not mandatory in a B2B invoicing process, however, it automates collaborative processes and dispute management.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status "pending." The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 22A-F depict a flow diagram of the steps performed by methods and systems consistent with the subject matter described herein to generate an interface from the business object model. Although described as being performed by a computer, these steps may alternatively be performed manually, or using any combination thereof. The process begins when the system receives an indication of a package template from the designer, i.e., the designer provides a package template to the system (step 2200).

Package templates specify the arrangement of packages within a business transaction document. Package templates are used to define the overall structure of the messages sent between business entities. Methods and systems consistent with the subject matter described herein use package templates in conjunction with the business object model to derive the interfaces.

The system also receives an indication of the message type from the designer (step 2202). The system selects a package from the package template (step 2204), and receives an indication from the designer whether the package is required for the interface (step 2206). If the package is not required for the interface, the system removes the package from the package template (step 2208). The system then continues this analysis for the remaining packages within the package template (step 2210).

Figure 22A:
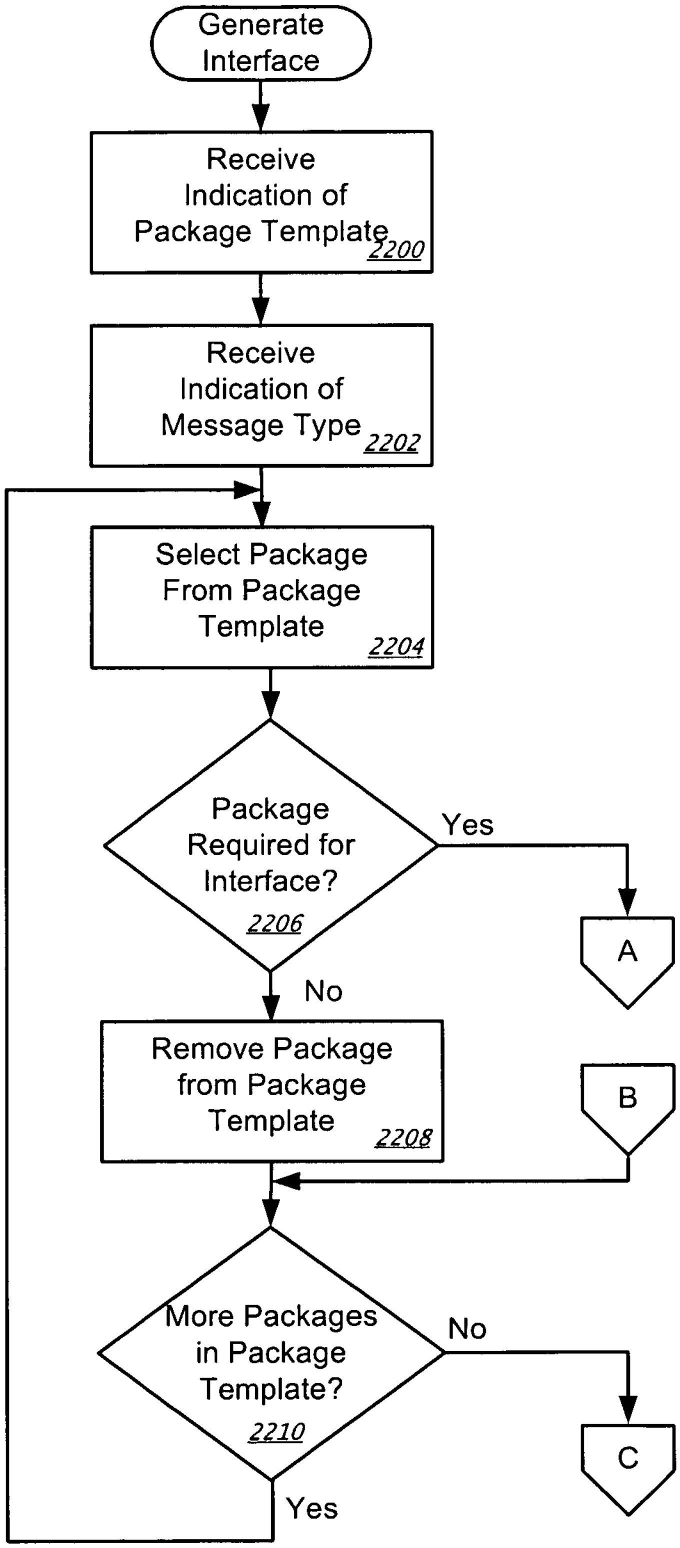
FIGS. 22A-F depict a flow diagram of the steps performed to generate an interface from the business object model in accordance with methods and systems consistent with the subject matter described herein.
Figure 22B:
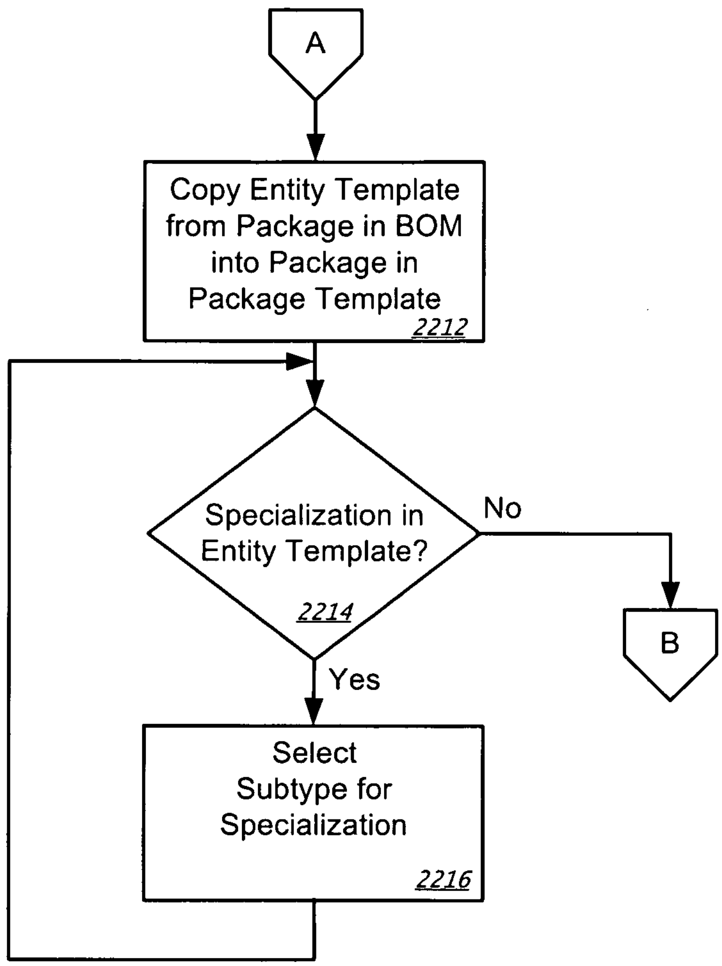
Figure 22C:
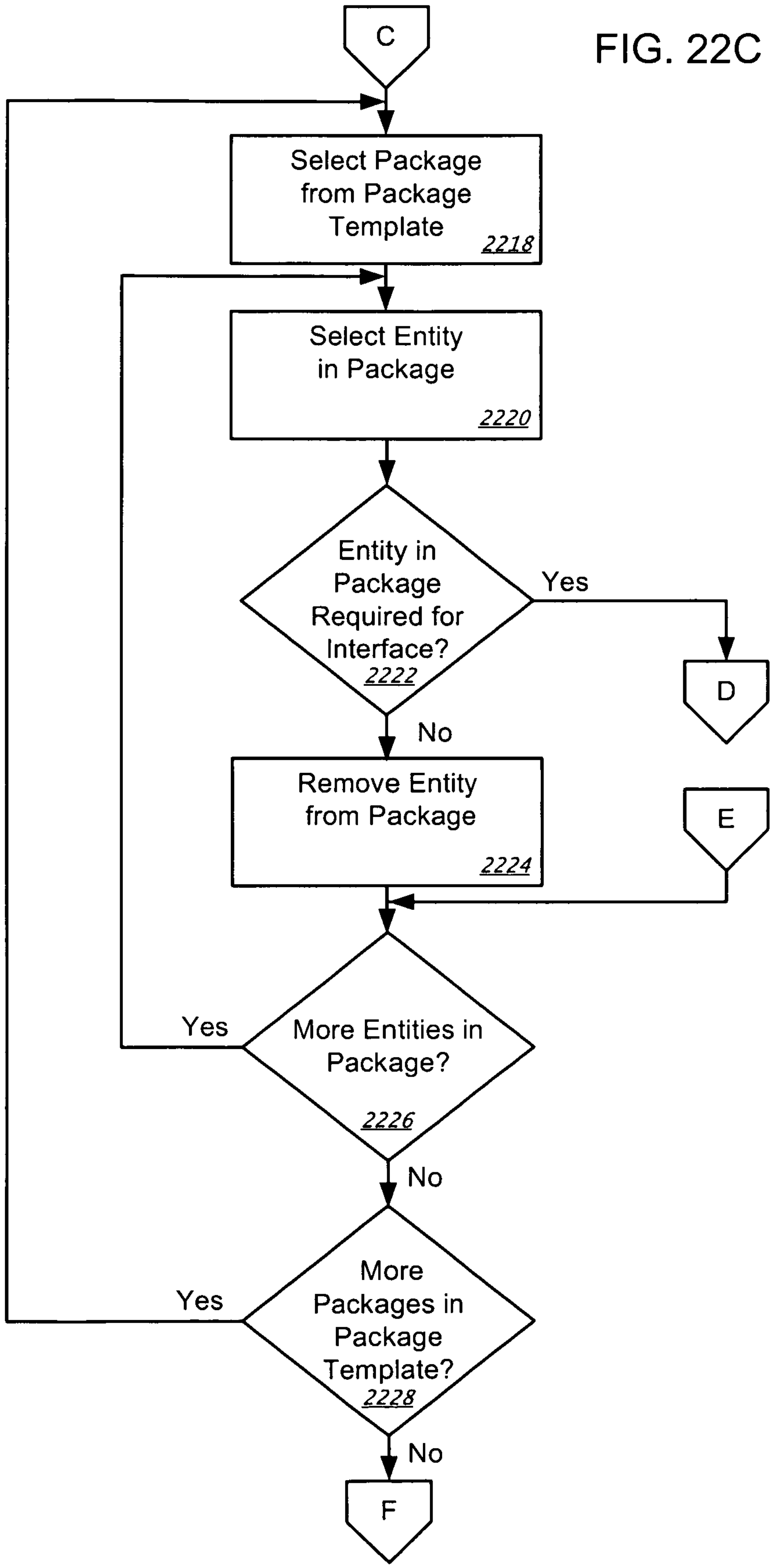

If, at step 2206, the package is required for the interface, the system copies the entity template from the package in the business object model into the package in the package template (step 2212, FIG. 22B). The system determines whether there is a specialization in the entity template (step 2214). If the system determines that there is a specialization in the entity template, the system selects a subtype for the specialization (step 2216). The system may either select the subtype for the specialization based on the message type, or it may receive this information from the designer. The system then determines whether there are any other specializations in the entity template (step 2214). When the system determines that there are no specializations in the entity template, the system continues this analysis for the remaining packages within the package template (step 2210, FIG. 22A).

At step 2210, after the system completes its analysis for the packages within the package template, the system selects one of the packages remaining in the package template (step 2218, FIG. 22C), and selects an entity from the package (step 2220). The system receives an indication from the designer whether the entity is required for the interface (step 2222). If the entity is not required for the interface, the system removes the entity from the package template (step 2224). The system then continues this analysis for the remaining entities within the package (step 2226), and for the remaining packages within the package template (step 2228).

Figure 22D:
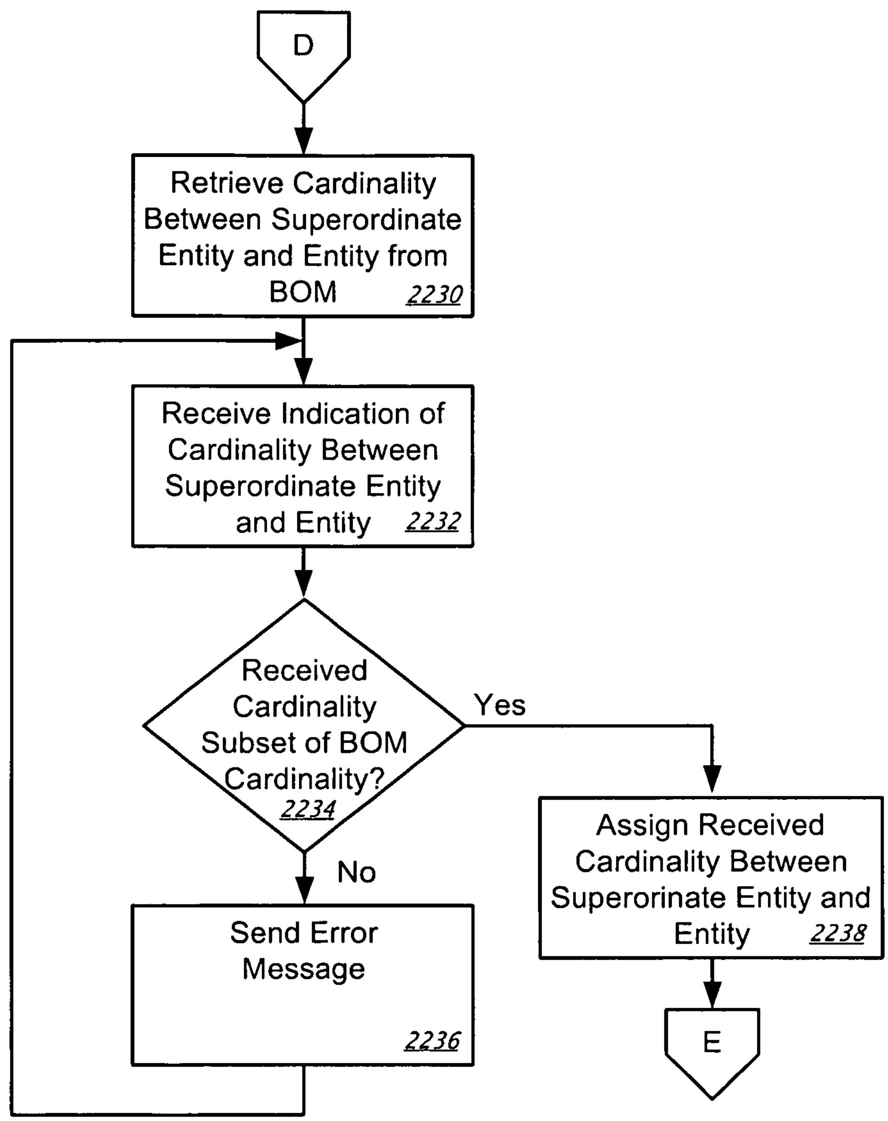

If, at step 2222, the entity is required for the interface, the system retrieves the cardinality between a superordinate entity and the entity from the business object model (step 2230, FIG. 22D). The system also receives an indication of the cardinality between the superordinate entity and the entity from the designer (step 2232). The system then determines whether the received cardinality is a subset of the business object model cardinality (step 2234). If the received cardinality is not a subset of the business object model cardinality, the system sends an error message to the designer (step 2236). If the received cardinality is a subset of the business object model cardinality, the system assigns the received cardinality as the cardinality between the superordinate entity and the entity (step 2238). The system then continues this analysis for the remaining entities within the package (step 2226, FIG. 22C), and for the remaining packages within the package template (step 2228).

Figure 22E:
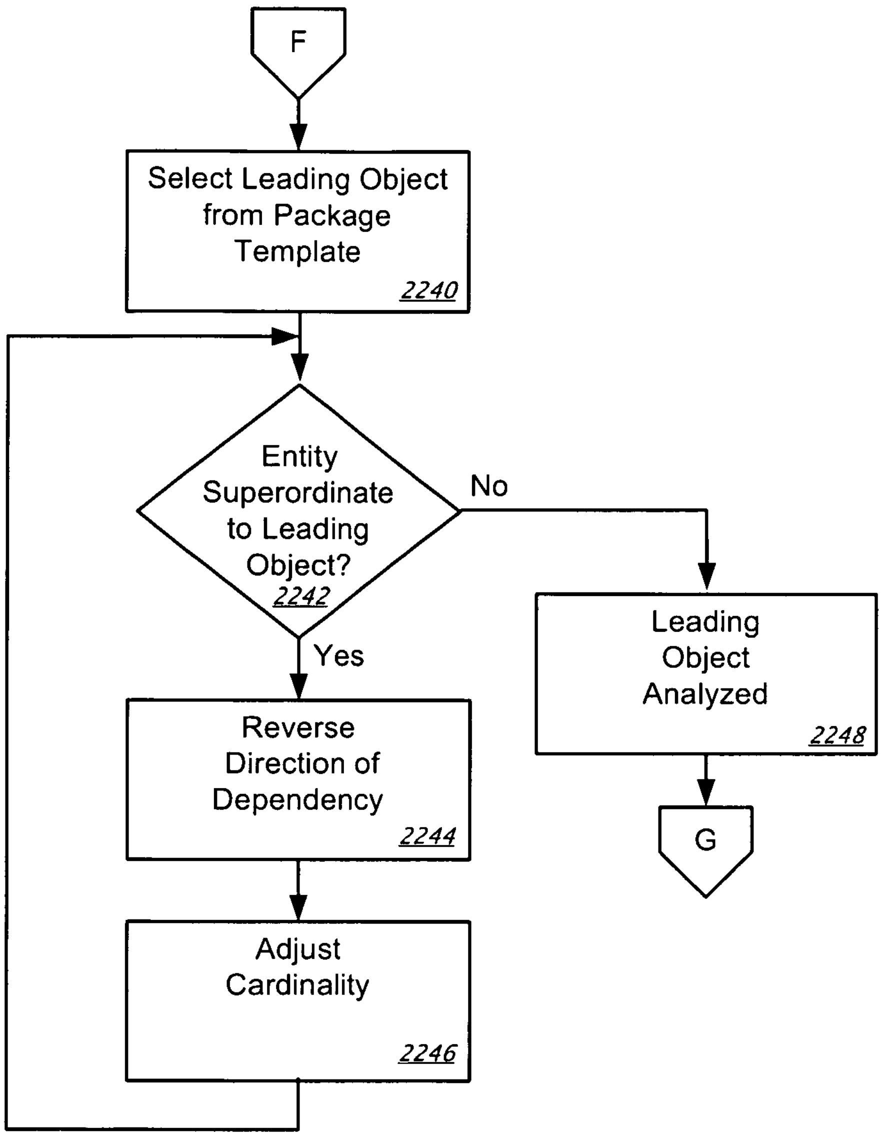

The system then selects a leading object from the package template (step 2240, FIG. 22E). The system determines whether there is an entity superordinate to the leading object (step 2242). If the system determines that there is an entity superordinate to the leading object, the system reverses the direction of the dependency (step 2244) and adjusts the cardinality between the leading object and the entity (step 2246). The system performs this analysis for entities that are superordinate to the leading object (step 2242). If the system determines that there are no entities superordinate to the leading object, the system identifies the leading object as analyzed (step 2248).

Figure 22F:
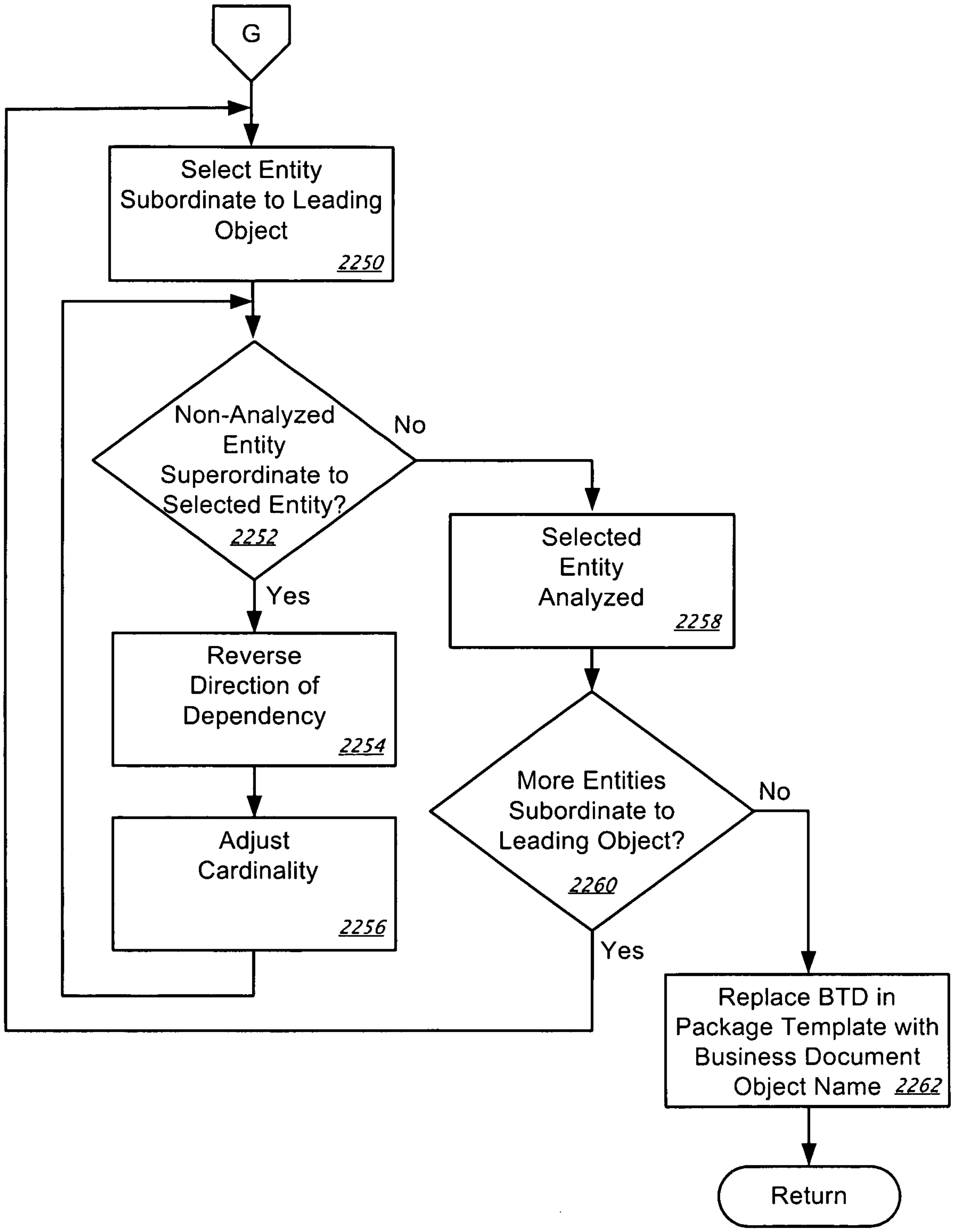

The system then selects an entity that is subordinate to the leading object (step 2250, FIG. 22F). The system determines whether any non-analyzed entities are superordinate to the selected entity (step 2252). If a non-analyzed entity is superordinate to the selected entity, the system reverses the direction of the dependency (step 2254) and adjusts the cardinality between the selected entity and the non-analyzed entity (step 2256). The system performs this analysis for non-analyzed entities that are superordinate to the selected entity (step 2252). If the system determines that there are no non-analyzed entities superordinate to the selected entity, the system identifies the selected entity as analyzed (step 2258), and continues this analysis for entities that are subordinate to the leading object (step 2260). After the packages have been analyzed, the system substitutes the BusinessTransactionDocument ("BTD") in the package template with the name of the interface (step 2262). This includes the "BTD" in the BTDItem package and the "BTD" in the BTDItemScheduleLine package.

6. Use of an Interface

Figure 23:
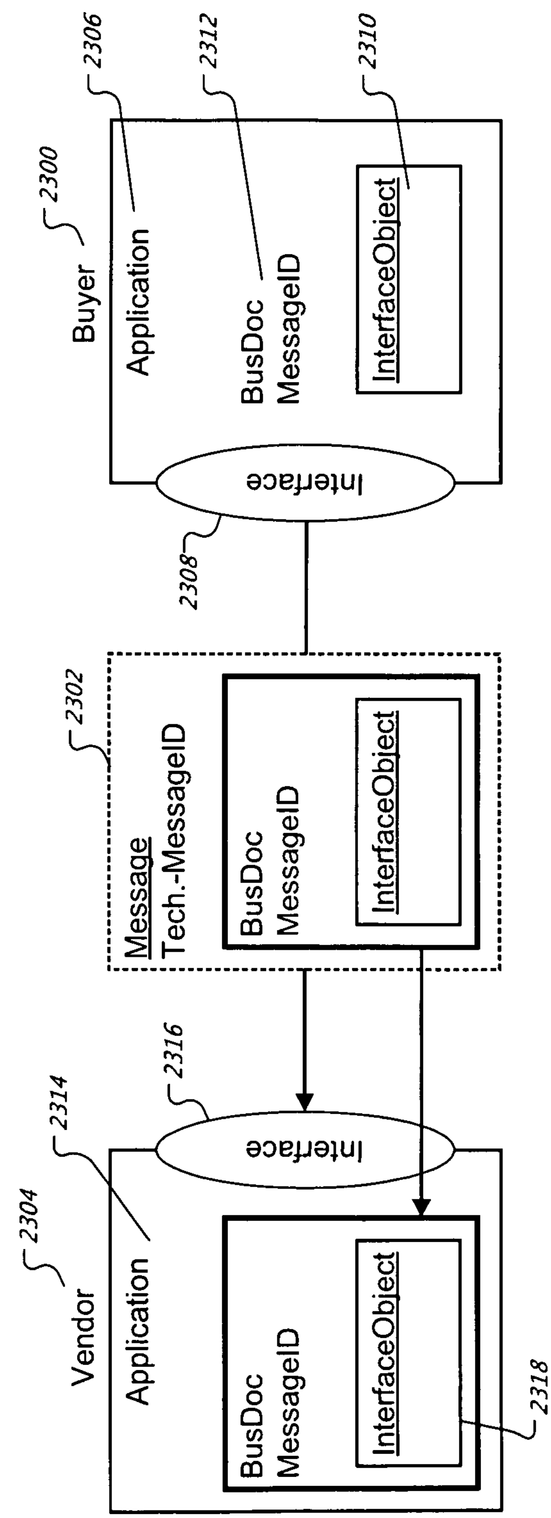
FIG. 23 depicts an example illustrating the transmittal of a business document in accordance with methods and systems consistent with the subject matter described herein.

The XI stores the interfaces (as an interface type). At runtime, the sending party's program instantiates the interface to create a business document, and sends the business document in a message to the recipient. The messages are preferably defined using XML. In the example depicted in FIG. 23, the Buyer 2300 uses an application 2306 in its system to instantiate an interface 2308 and create an interface object or business document object 2310. The Buyer's application 2306 uses data that is in the sender's component-specific structure and fills the business document object 2310 with the data. The Buyer's application 2306 then adds message identification 2312 to the business document and places the business document into a message 2302. The Buyer's application 2306 sends the message 2302 to the Vendor 2304. The Vendor 2304 uses an application 2314 in its system to receive the message 2302 and store the business document into its own memory. The Vendor's application 2314 unpacks the message 2302 using the corresponding interface 2316 stored in its XI to obtain the relevant data from the interface object or business document object 2318.

Figure 24:
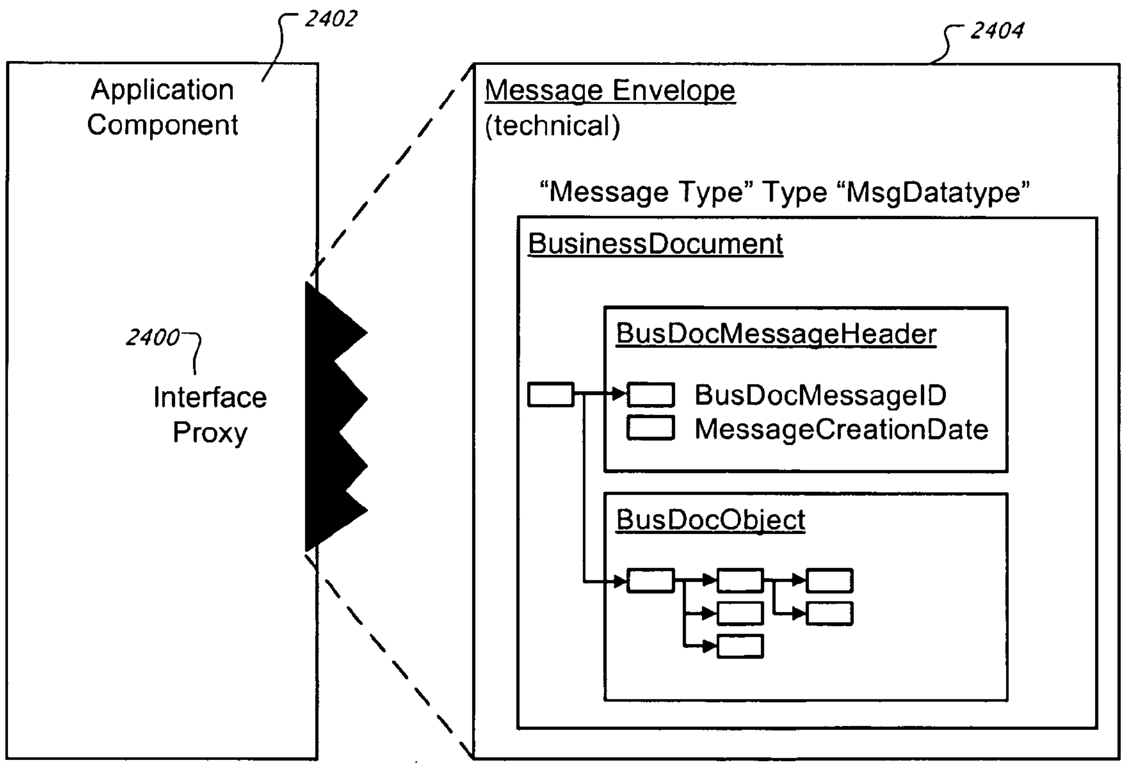
FIG. 24 depicts an interface proxy in accordance with methods and systems consistent with the subject matter described herein.
Figure 25:
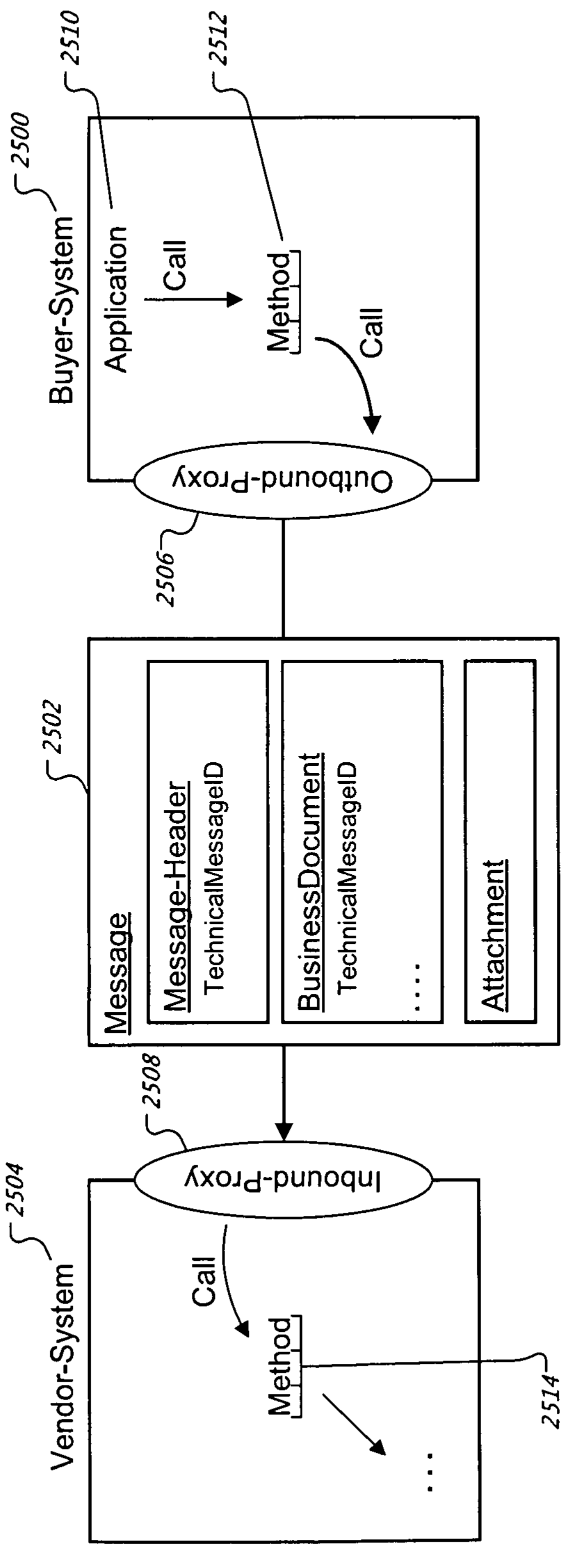
FIG. 25 depicts an example illustrating the transmittal of a message using proxies in accordance with methods and systems consistent with the subject matter described herein.

From the component's perspective, the interface is represented by an interface proxy 2400, as depicted in FIG. 24. The proxies 2400 shield the components 2402 of the sender and recipient from the technical details of sending messages 2404 via XI. In particular, as depicted in FIG. 25, at the sending end, the Buyer 2500 uses an application 2510 in its system to call an implemented method 2512, which generates the outbound proxy 2506. The outbound proxy 2506 parses the internal data structure of the components and converts them to the XML structure in accordance with the business document object. The outbound proxy 2506 packs the document into a message 2502. Transport, routing and mapping the XML message to the recipient 28304 is done by the routing system (XI, modeling environment 516, etc.).

When the message arrives, the recipient's inbound proxy 2508 calls its component-specific method 2514 for creating a document. The proxy 2508 at the receiving end downloads the data and converts the XML structure into the internal data structure of the recipient component 2504 for further processing.

Figure 26A:
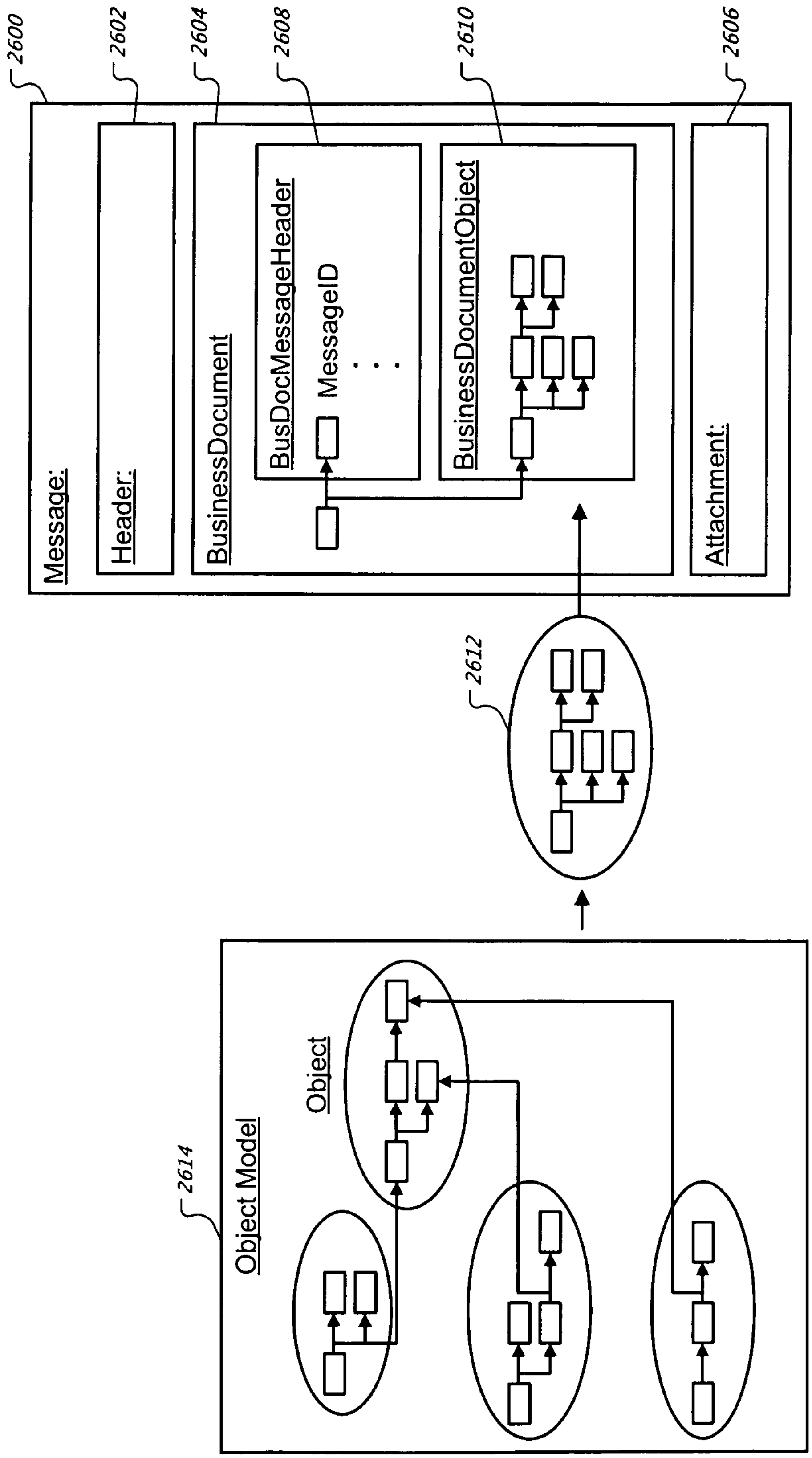
FIG. 26A depicts components of a message in accordance with methods and systems consistent with the subject matter described herein.

As depicted in FIG. 26A, a message 2600 includes a message header 2602 and a business document 2604. The message 2600 also may include an attachment 2606. For example, the sender may attach technical drawings, detailed specifications or pictures of a product to a purchase order for the product. The business document 2604 includes a business document message header 2608 and the business document object 2610. The business document message header 2608 includes administrative data, such as the message ID and a message description. As discussed above, the structure 2612 of the business document object 2610 is derived from the business object model 2614. Thus, there is a strong correlation between the structure of the business document object and the structure of the business object model. The business document object 2610 forms the core of the message 2600.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 26B:
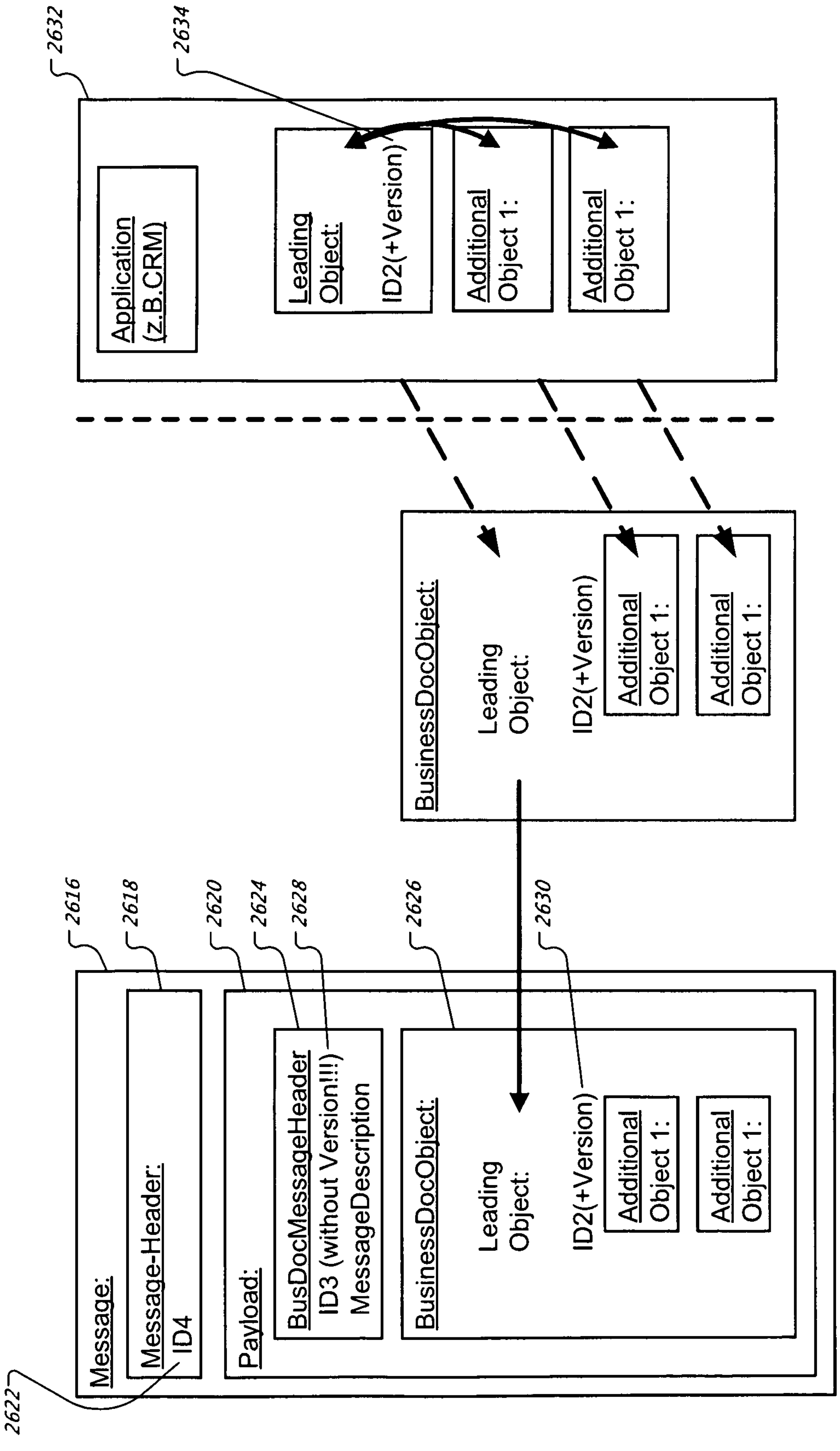
FIG. 26B depicts IDs used in a message in accordance with methods and systems consistent with the subject matter described herein.

As depicted in FIG. 26B, the message header 2618 in message 2616 includes a technical ID ("ID4") 2622 that identifies the address for a computer to route the message. The sender's system manages the technical ID 2622.

The administrative information in the business document message header 2624 of the payload or business document 2620 includes a BusinessDocumentMessageID ("ID3") 2628. The business entity or component 2632 of the business entity manages and sets the BusinessDocumentMessageID 2628. The business entity or component 2632 also can refer to other business documents using the BusinessDocumentMessageID 2628. The receiving component 2632 requires no knowledge regarding the structure of this ID. The BusinessDocumentMessageID 2628 is, as an ID, unique. Creation of a message refers to a point in time. No versioning is typically expressed by the ID. Besides the BusinessDocumentMessageID 2628, there also is a business document object ID 2630, which may include versions.

The component 2632 also adds its own component object ID 2634 when the business document object is stored in the component. The component object ID 2634 identifies the business document object when it is stored within the component. However, not all communication partners may be aware of the internal structure of the component object ID 2634. Some components also may include a versioning in their ID 2634.

7. Use of Interfaces Across Industries

Methods and systems consistent with the subject matter described herein provide interfaces that may be used across different business areas for different industries. Indeed, the interfaces derived using methods and systems consistent with the subject matter described herein may be mapped onto the interfaces of different industry standards. Unlike the interfaces provided by any given standard that do not include the interfaces required by other standards, methods and systems consistent with the subject matter described herein provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the subject matter described herein include most of the fields provided by the interfaces of different industry standards. Missing fields may easily be included into the business object model. Thus, by derivation, the interfaces can be extended consistently by these fields. Thus, methods and systems consistent with the subject matter described herein provide consistent interfaces or services that can be used across different industry standards.

Figure 28:
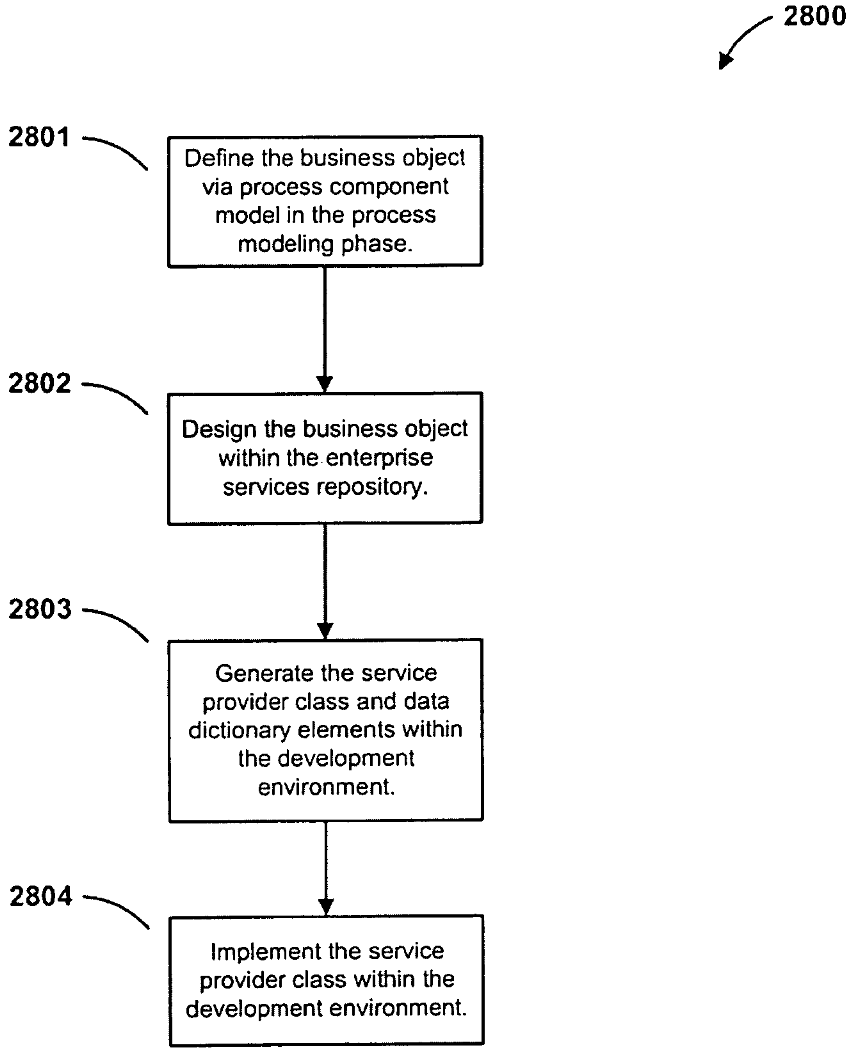
FIG. 28 illustrates an example method for service enabling in accordance with one embodiment of the present disclosure.
Figure 29:
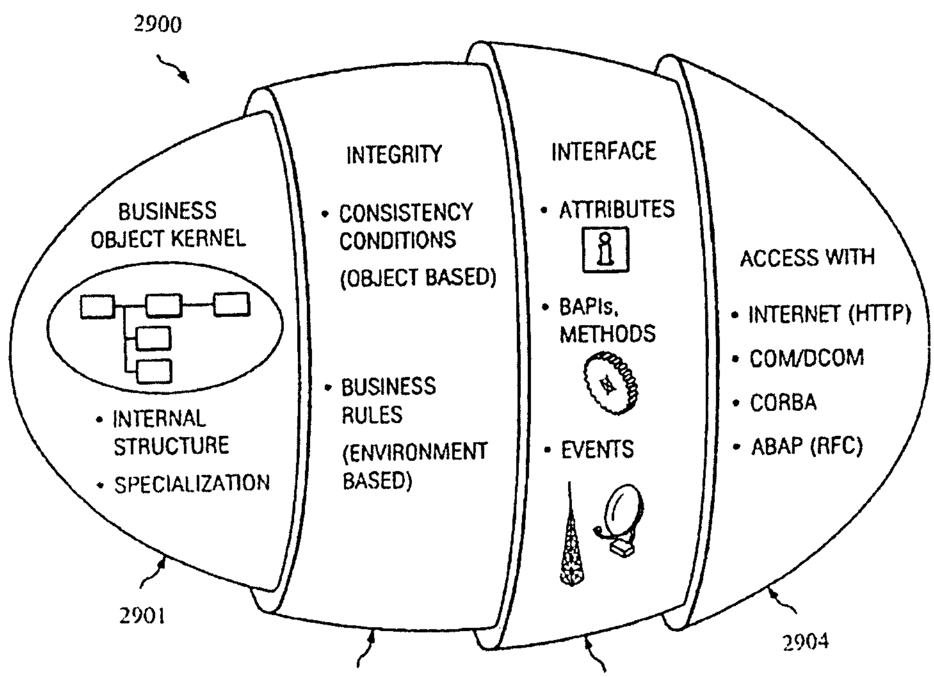
FIG. 29 is a graphical illustration of an example business object and associated components as may be used in the enterprise service infrastructure system of the present disclosure.

For example, FIG. 28 illustrates an example method 2800 for service enabling. In this example, the enterprise services infrastructure may offer one common and standard-based service infrastructure. Further, one central enterprise services repository may support uniform service definition, implementation and usage of services for user interface, and cross-application communication. In step 2801, a business object is defined via a process component model in a process modeling phase. Next, in step 2802, the business object is designed within an enterprise services repository. For example, FIG. 29 provides a graphical representation of one of the business objects 2900. As shown, an innermost layer or kernel 2901 of the business object may represent the business object's inherent data. Inherent data may include, for example, an employee's name, age, status, position, address, etc. A second layer 2902 may be considered the business object's logic. Thus, the layer 2902 includes the rules for consistently embedding the business object in a system environment as well as constraints defining values and domains applicable to the business object. For example, one such constraint may limit sale of an item only to a customer with whom a company has a business relationship. A third layer 2903 includes validation options for accessing the business object. For example, the third layer 2903 defines the business object's interface that may be interfaced by other business objects or applications. A fourth layer 2904 is the access layer that defines technologies that may externally access the business object.

Accordingly, the third layer 2903 separates the inherent data of the first layer 2901 and the technologies used to access the inherent data. As a result of the described structure, the business object reveals only an interface that includes a set of clearly defined methods. Thus, applications access the business object via those defined methods. An application wanting access to the business object and the data associated therewith usually includes the information or data to execute the clearly defined methods of the business object's interface. Such clearly defined methods of the business object's interface represent the business object's behavior. That is, when the methods are executed, the methods may change the business object's data. Therefore, an application may utilize any business object by providing the information or data without having any concern for the details related to the internal operation of the business object. Returning to method 2800, a service provider class and data dictionary elements are generated within a development environment at step 2803. In step 2804, the service provider class is implemented within the development environment.

Figure 30:
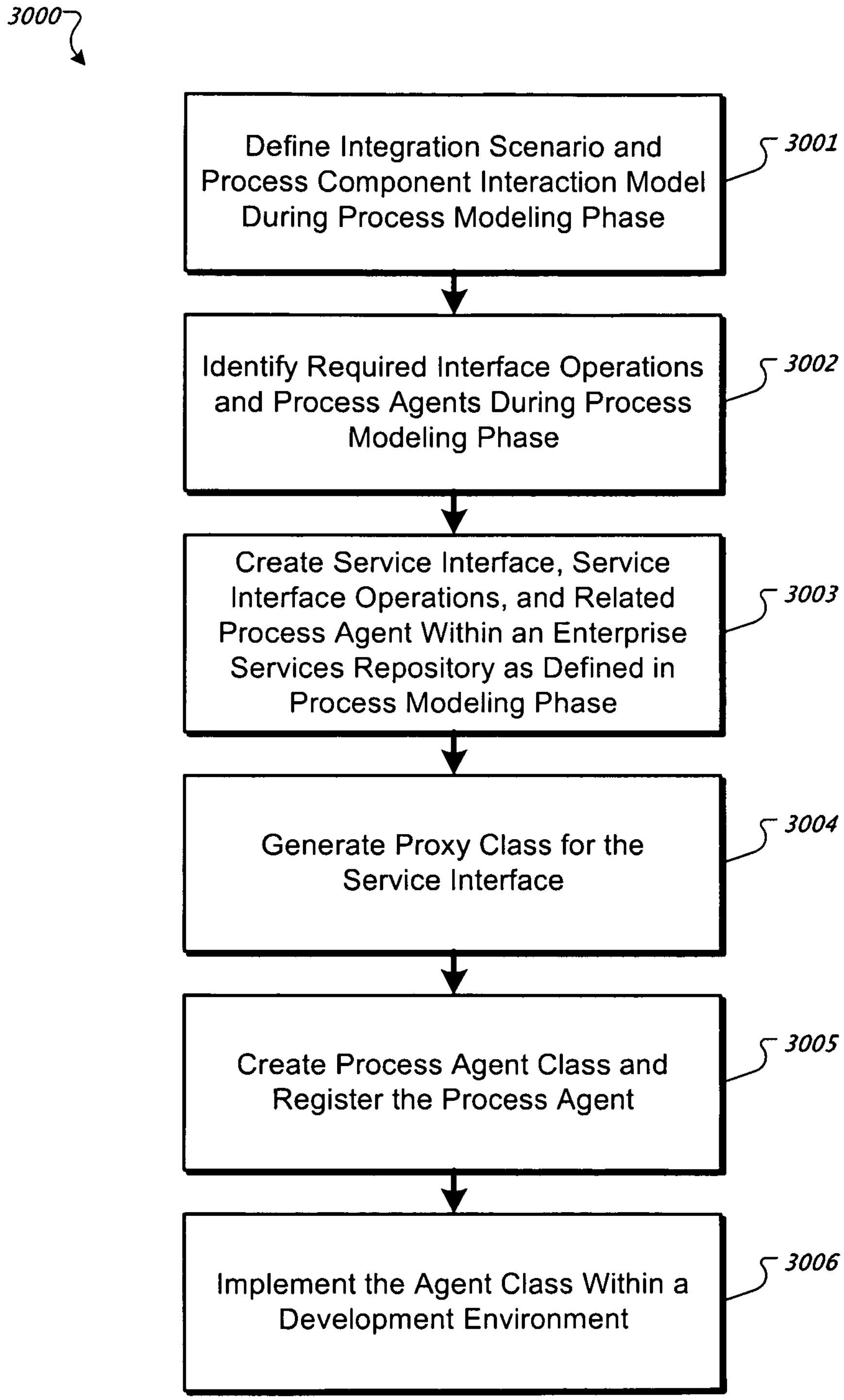
FIG. 30 illustrates an example method for managing a process agent framework in accordance with one embodiment of the present disclosure.

FIG. 30 illustrates an example method 3000 for a process agent framework. For example, the process agent framework may be the basic infrastructure to integrate business processes located in different deployment units. It may support a loose coupling of these processes by message based integration. A process agent may encapsulate the process integration logic and separate it from business logic of business objects. As shown in FIG. 30, an integration scenario and a process component interaction model are defined during a process modeling phase in step 3001. In step 3002, required interface operations and process agents are identified during the process modeling phase also. Next, in step 3003, a service interface, service interface operations, and the related process agent are created within an enterprise services repository as defined in the process modeling phase. In step 3004, a proxy class for the service interface is generated. Next, in step 3005, a process agent class is created and the process agent is registered. In step 3006, the agent class is implemented within a development environment.

Figure 31:
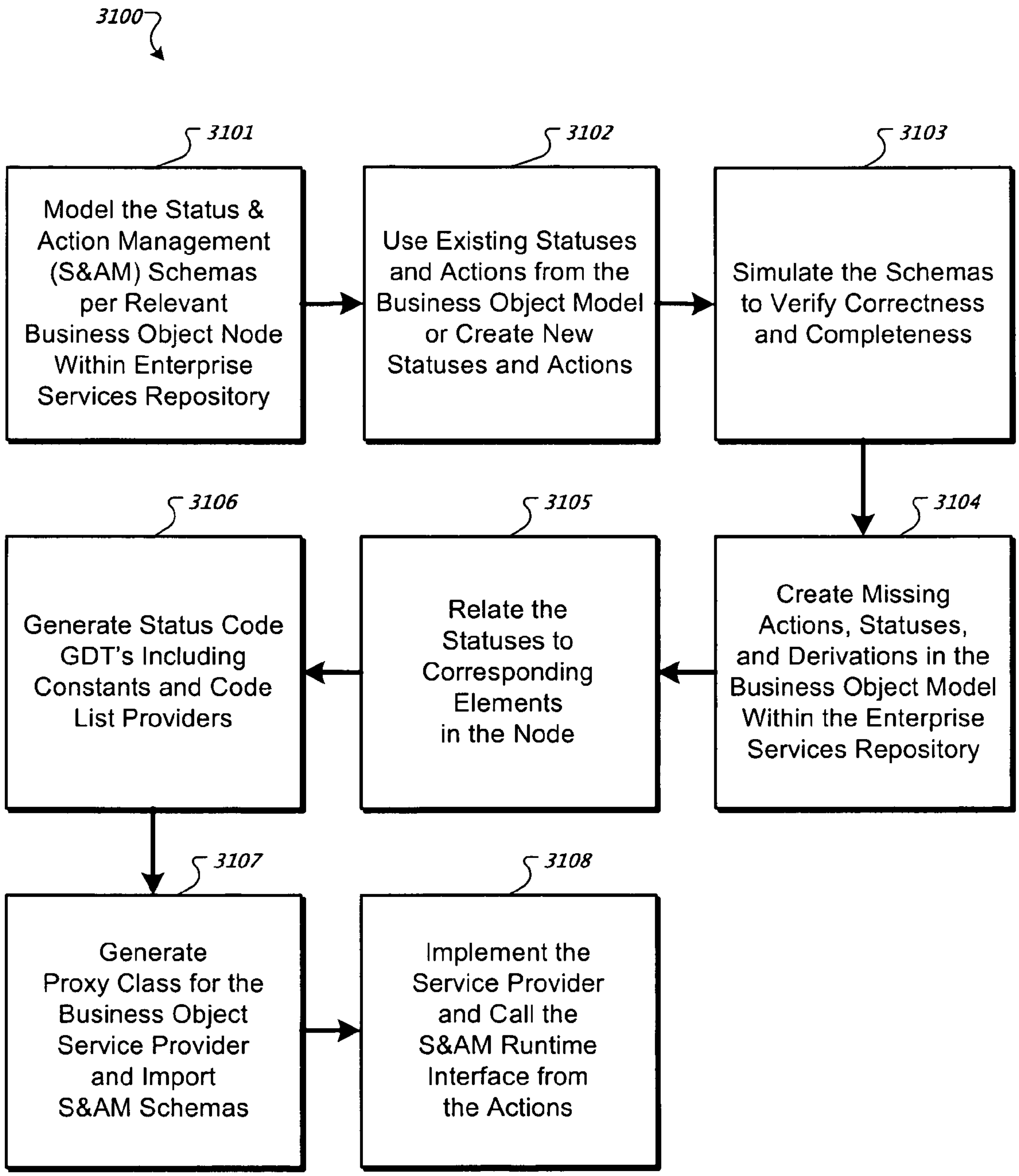
FIG. 31 illustrates an example method for status and action management in accordance with one embodiment of the present disclosure.

FIG. 31 illustrates an example method 3100 for status and action management (S&AM). For example, status and action management may describe the life cycle of a business object (node) by defining actions and statuses (as their result) of the business object (node), as well as, the constraints that the statuses put on the actions. In step 3101, the status and action management schemas are modeled per a relevant business object node within an enterprise services repository. In step 3102, existing statuses and actions from the business object model are used or new statuses and actions are created. Next, in step 3103, the schemas are simulated to verify correctness and completeness. In step 3104, missing actions, statuses, and derivations are created in the business object model with the enterprise services repository. Continuing with method 3100, the statuses are related to corresponding elements in the node in step 3105. In step 3106, status code GDT's are generated, including constants and code list providers. Next, in step 3107, a proxy class for a business object service provider is generated and the proxy class S&AM schemas are imported. In step 3108, the service provider is implemented and the status and action management runtime interface is called from the actions.

Regardless of the particular hardware or software architecture used, the disclosed systems or software are generally capable of implementing business objects and deriving (or otherwise utilizing) consistent interfaces that are suitable for use across industries, across businesses, and across different departments within a business in accordance with some or all of the following description. In short, system 100 contemplates using any appropriate combination and arrangement of logical elements to implement some or all of the described functionality.

Moreover, the preceding flowcharts and accompanying description illustrate example methods. The present services environment contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, the services environment may use methods with additional steps, fewer steps, and/or different steps, so long as the methods remain appropriate.

Supply Network Plan Interfaces

The purpose of Supply Network Planning (SNP) is to create a long or midterm production or distribution plan. A SupplyNetworkPlan is the forecasted supply plan of products or product lines in a network based on future demands. Furthermore, the SupplyNetworkPlan also includes the historical supply of products or product lines in a network. The Supply Network Planning Processor uses the SupplyNetworkPlan to create and change a long or midterm production or distribution plan.

Figure 32:
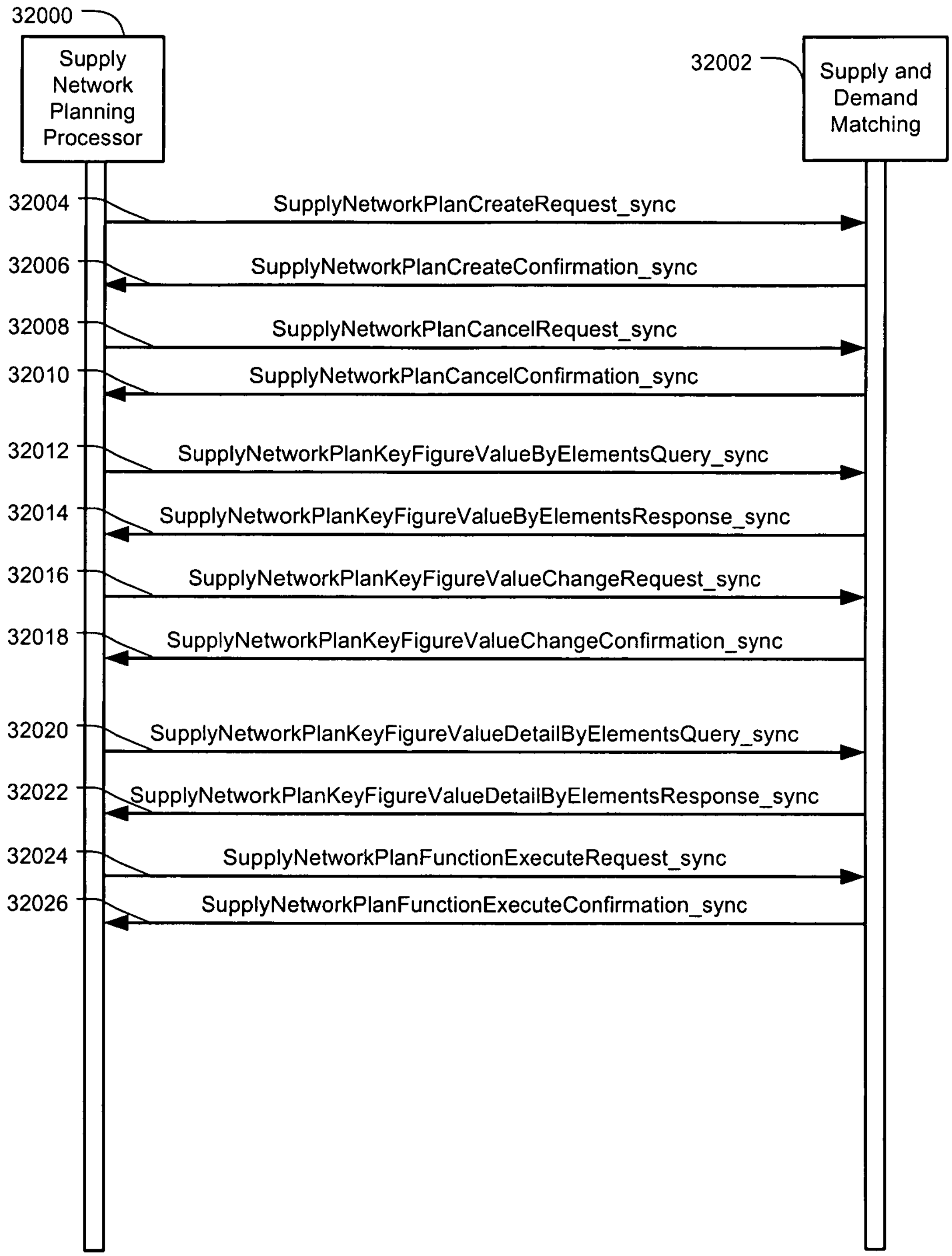
FIG. 32 shows an exemplary SupplyNetworkPlan Message Choreography.

The message choreography of FIG. 32 describes a possible logical sequence of messages that can be used to realize a Supply Network Planning business scenario.

A "Supply Network Planning Processor" system 32000 can request the creation of a supply network plan using a SupplyNetworkPlanCreateRequest sync message 32004 as shown, for example, in FIG. 32. A "Supply and Demand Matching" system 32002 can confirm the request using a SupplyNetworkPlanCreateConfirmation_sync message 32006 as shown, for example, in FIG. 32.

The "Supply Network Planning Processor" system 32000 can request the cancellation of a supply network plan using a SupplyNetworkPlanCancelRequest_sync message 32008 as shown, for example, in FIG. 32. The "Supply and Demand Matching" system 32002 can confirm the cancellation using a SupplyNetworkPlanCancelConfirmation_sync message 32010 as shown, for example, in FIG. 32.

The "Supply Network Planning Processor" system 32000 can query supply network plans by detail using a SupplyNetworkPlanKeyFigureValueByElementsQuery_sync message 32012 as shown, for example, in FIG. 32. The "Supply and Demand Matching" system 32002 can respond to the query using a SupplyNetworkPlanKeyFigureValueByElementsResponse_sync message 32014 as shown, for example, in FIG. 32.

The "Supply Network Planning Processor" system 32000 can request the change of a supply network plan using a SupplyNetworkPlanKeyFigureValueChangeRequest_sync message 32016 as shown, for example, in FIG. 32. The "Supply and Demand Matching" system 32002 can confirm the request using a SupplyNetworkPlanKeyFigureValueChangeConfirmation_sync message 32018 as shown, for example, in FIG. 32.

The "Supply Network Planning Processor" system 32000 can query supply network plans using a SupplyNetworkPlanKeyFigureValueDetailByElementsQuery_sync message 32020 as shown, for example, in FIG. 32. The "Supply and Demand Matching" system 32002 can respond to the query using a SupplyNetworkPlanKeyFigureValueDetailByElementsResponse_sync message 32022 as shown, for example, in FIG. 32.

The "Supply Network Planning Processor" system 32000 can request the execution of a supply network plan function using a SupplyNetworkPlanFunctionExecuteRequest_sync message 32024 as shown, for example, in FIG. 32. The "Supply and Demand Matching" system 32002 can confirm the request using a SupplyNetworkPlanFunctionExecuteConfirmation_sync message 32026 as shown, for example, in FIG. 32.

A SupplyNetworkPlanCreateRequest_sync is a request to create a SupplyNetworkPlan. The structure of the message type SupplyNetworkPlanCreateRequest_sync is specified by the message data type SupplyNetworkPlanCreateRequestMessage_sync.

A SupplyNetworkPlanCreateConfirmation_sync is a confirmation from Supply and Demand Matching to a SupplyNetworkPlanCreateRequest_sync. The structure of the message type SupplyNetworkPlanCreateConfirmation_sync is specified by the message data type SupplyNetworkPlanCreateConfirmationMessage_sync.

A SupplyNetworkPlanCancelRequest_sync is a request to delete a SupplyNetworkPlan. The structure of the message type SupplyNetworkPlanCancelRequest_sync is specified by the message data type SupplyNetworkPlanCancelRequestMessage_sync.

A SupplyNetworkPlanCancelConfirmation_sync is a confirmation from Supply and Demand Matching to a SupplyNetworkPlanCancelRequest_sync. The structure of the message type SupplyNetworkPlanCancelConfirmation_sync is specified by the message data type SupplyNetworkPlanCancelConfirmationMessage_sync.

A SupplyNetworkPlanKeyFigureValueByElementsQuery_sync is an inquiry for key figure values of a SupplyNetworkPlan. The structure of the message type SupplyNetworkPlanKeyFigure- ValueByElementsQuery_sync is specified by the message data type SupplyNetworkPlanKeyFigureValueByElementsQueryMessage_sync.

A SupplyNetworkPlanKeyFigureValueByElementsResponse_sync is a response from Supply and Demand Matching to a SupplyNetworkPlanKeyFigureValueByElementsQuery_sync. The structure of the message type SupplyNetworkPlanKeyFigureValueByElementsResponse_sync is specified by the message data type SupplyNetworkPlanKeyFigureValueByElementsResponse_syncMessage.

A SupplyNetworkPlanKeyfigureValueChangeRequest_sync is a request to change keyfigure values of a SupplyNetworkPlan. The structure of the message type SupplyNetworkPlanKeyfigureValueChangeRequest_sync is specified by the message data type SupplyNetworkPlanKeyfigureValueChangeRequestMessage_sync.

A SupplyNetworkPlanKeyfigureValueChangeConfirmation_sync is a confirmation from Supply and Demand Matching to a SupplyNetworkPlanKeyfigureValueChangeRequest_sync. The structure of the message type SupplyNetworkPlanKeyfigureValueChangeConfirmation_sync is specified by the message data type SupplyNetworkPlanKeyfigureValueChangeConfirmationMessage_sync.

A SupplyNetworkPlanKeyfigureValueDetailByElementsQuery_sync is an inquiry for key figure value details of a SupplyNetworkPlan. The structure of the message type SupplyNetworkPlanKeyfigureValueDetailByElementsQuery_sync is specified by the message data type SupplyNetworkPlanKeyfigureValueDetailByElementsQueryMessage_sync.

A SupplyNetworkPlanKeyfigureValueDetailByElementsResponse_sync is a response from Supply and Demand Matching to a SupplyNetworkPlanKeyfigureValueDetailByElementsQuery_sync. The structure of the message type SupplyNetworkPlanningViewSimpleByIDResponse_sync is specified by the message data type SupplyNetworkPlanningViewSimpleByIDResponseMessage_sync.

A SupplyNetworkPlanFunctionExecuteRequest_sync is a request to execute a function on a SupplyNetworkPlan. The structure of the message type SupplyNetworkPlanFunctionExecuteRequest_sync is specified by the message data type SupplyNetworkPlanFunctionExecuteRequestMessage_sync.

A SupplyNetworkPlanFunctionExecuteConfirmation_sync is a confirmation from Supply and Demand Matching to a SupplyNetworkPlanFunctionExecuteRequest_sync. The structure of the message type SupplyNetworkPlanFunctionExecuteConfirmation_sync is specified by the message data type SupplyNetworkPlanFunctionExecuteConfirmationMessage_sync.

Supply Network Plan may be associated with the following interfaces: SupplyNetworkPlanCreateRequestConfirmation_In, SupplyNetworkPlanCancelRequestConfirmation_In, SupplyNetworkPlanKeyFigureValueByElementsQueryResponse_In, SupplyNetworkPlanKeyfigureValueChangeRequestConfirmation_In, SupplyNetworkPlanKeyfigureValueDetailByElementsQueryResponse_In, and SupplyNetworkPlanFunctionExecuteRequestConfirmation_In.

Figure 33:
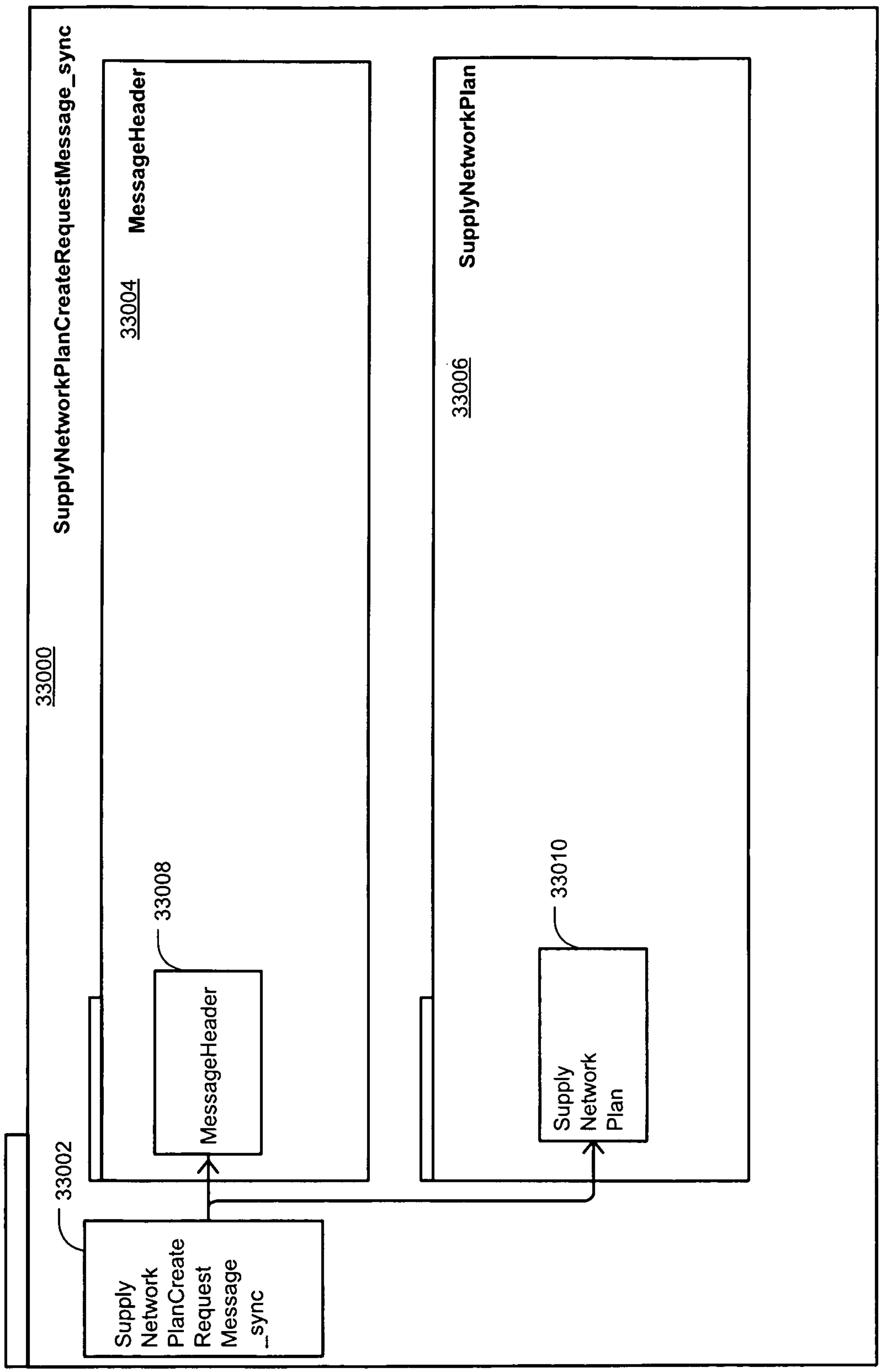
FIG. 33 shows an exemplary SupplyNetworkPlanCreateRequestMessage_sync Message Data Type.

FIG. 33 illustrates one example logical configuration of SupplyNetworkPlanCreateRequestMessage message 33000. Specifically, this figure depicts the arrangement and hierarchy of various components such as one or more levels of packages, entities, and datatypes, shown here as 33000 through 33010. As described above, packages may be used to represent hierarchy levels. Entities are discrete business elements that are used during a business transaction. Data types are used to type object entities and interfaces with a structure. For example, SupplyNetworkPlanCreateRequestMessage message 33000 includes, among other things, SupplyNetworkPlan 33006. Accordingly, heterogeneous applications may communicate using this consistent message configured as such.

Figure 34:
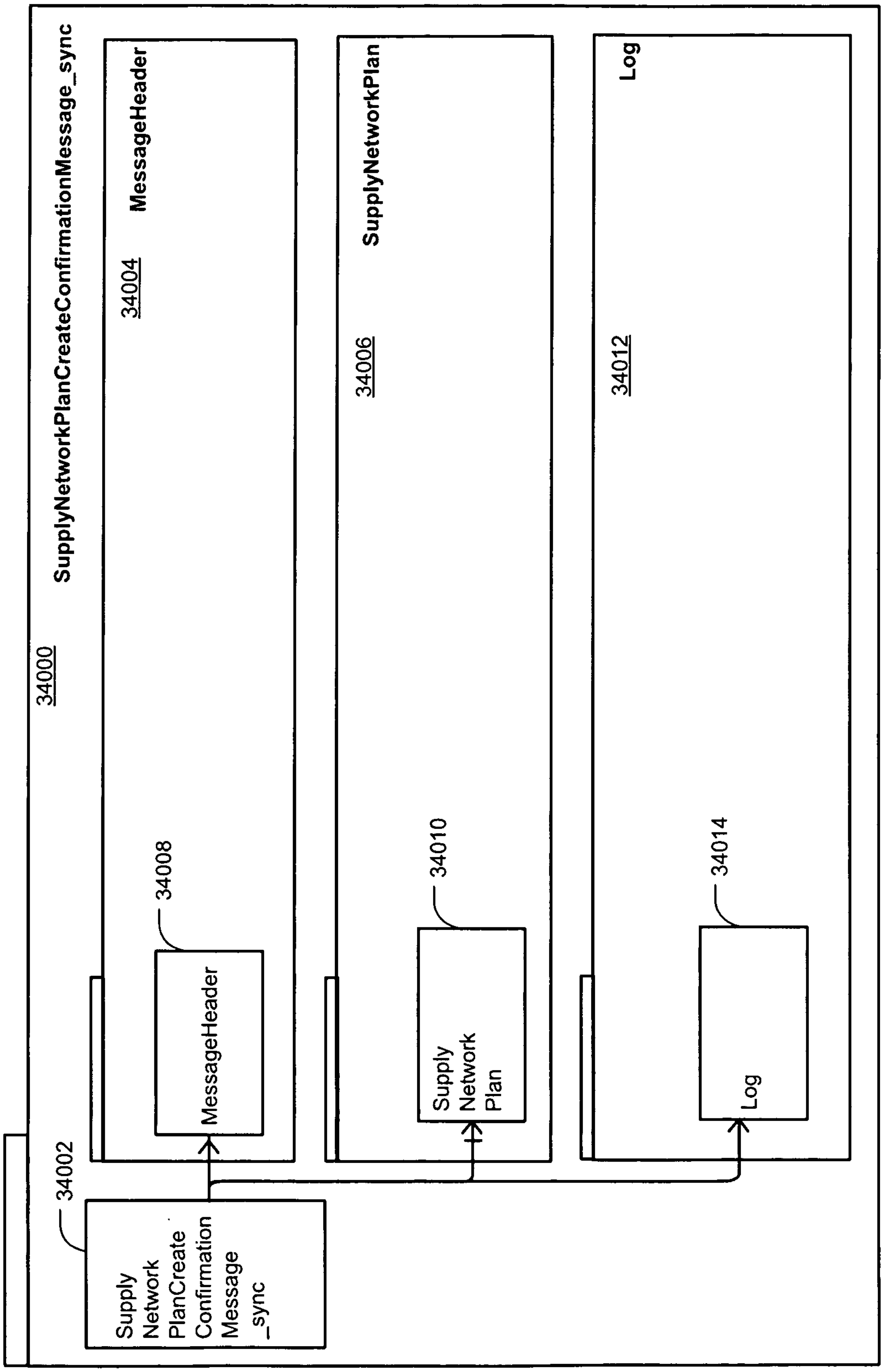
FIG. 34 shows an exemplary SupplyNetworkPlanCreateConfirmationMessage_sync Message Data Type.

Additionally, FIG. 34 illustrates one example logical configuration of SupplyNetworkPlanCreateConfirmationMessage message 34000. Specifically, this figure depicts the arrangement and hierarchy of various components such as one or more levels of packages, entities, and datatypes, shown here as 34000 through 34014. As described above, packages may be used to represent hierarchy levels. Entities are discrete business elements that are used during a business transaction. Data types are used to type object entities and interfaces with a structure. For example, SupplyNetworkPlanCreateConfirmationMessage message 34000 includes, among other things, SupplyNetworkPlan 34006. Accordingly, heterogeneous applications may communicate using this consistent message configured as such.

Figure 35:
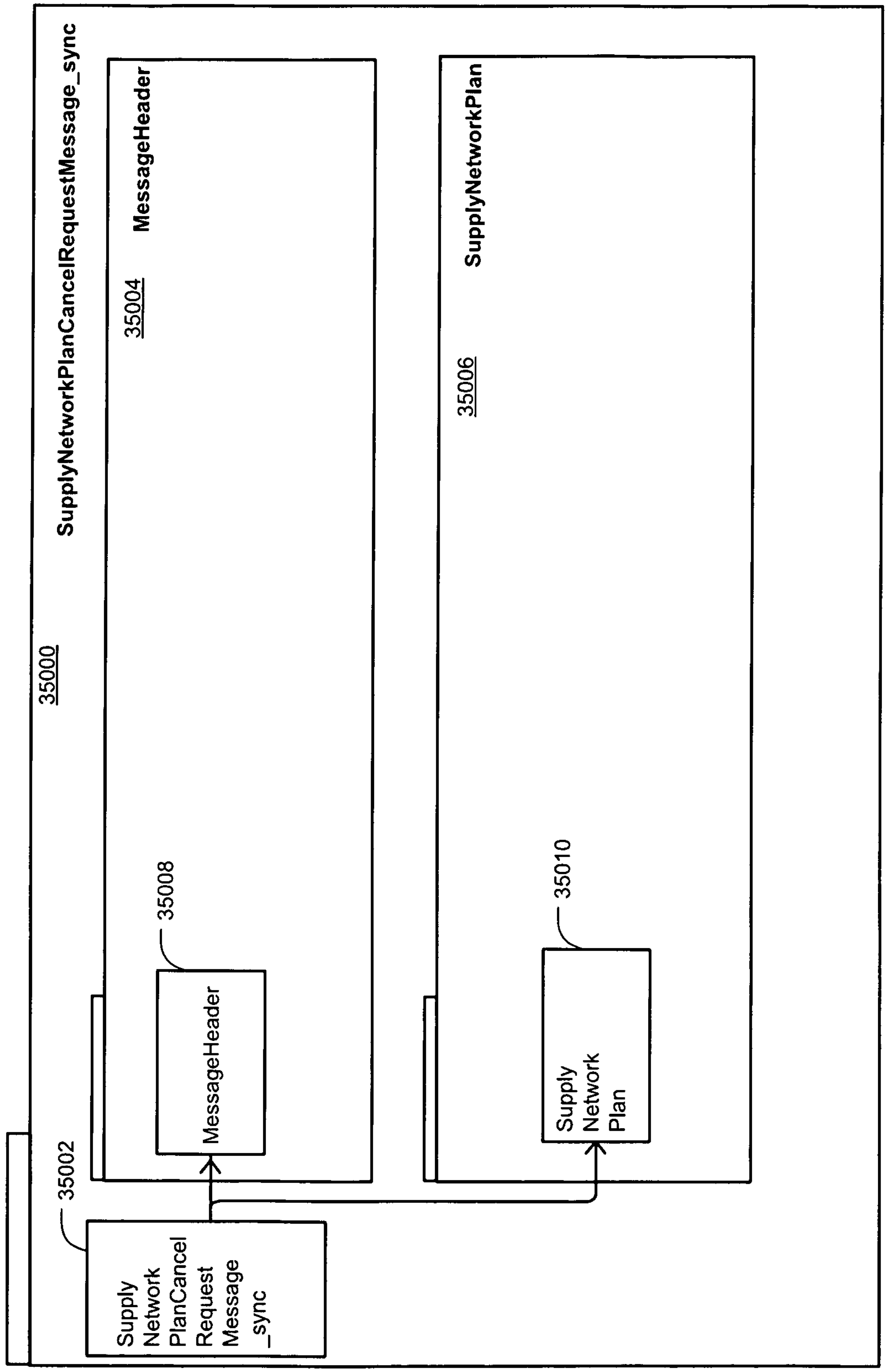
FIG. 35 shows an exemplary SupplyNetworkPlanCancelRequestMessage_sync Message Data Type.

Additionally, FIG. 35 illustrates one example logical configuration of SupplyNetworkPlanCancelRequestMessage message 35000. Specifically, this figure depicts the arrangement and hierarchy of various components such as one or more levels of packages, entities, and datatypes, shown here as 35000 through 35010. As described above, packages may be used to represent hierarchy levels. Entities are discrete business elements that are used during a business transaction. Data types are used to type object entities and interfaces with a structure. For example, SupplyNetworkPlanCancelRequestMessage message 35000 includes, among other things, SupplyNetworkPlan 35006. Accordingly, heterogeneous applications may communicate using this consistent message configured as such.

Figure 36:
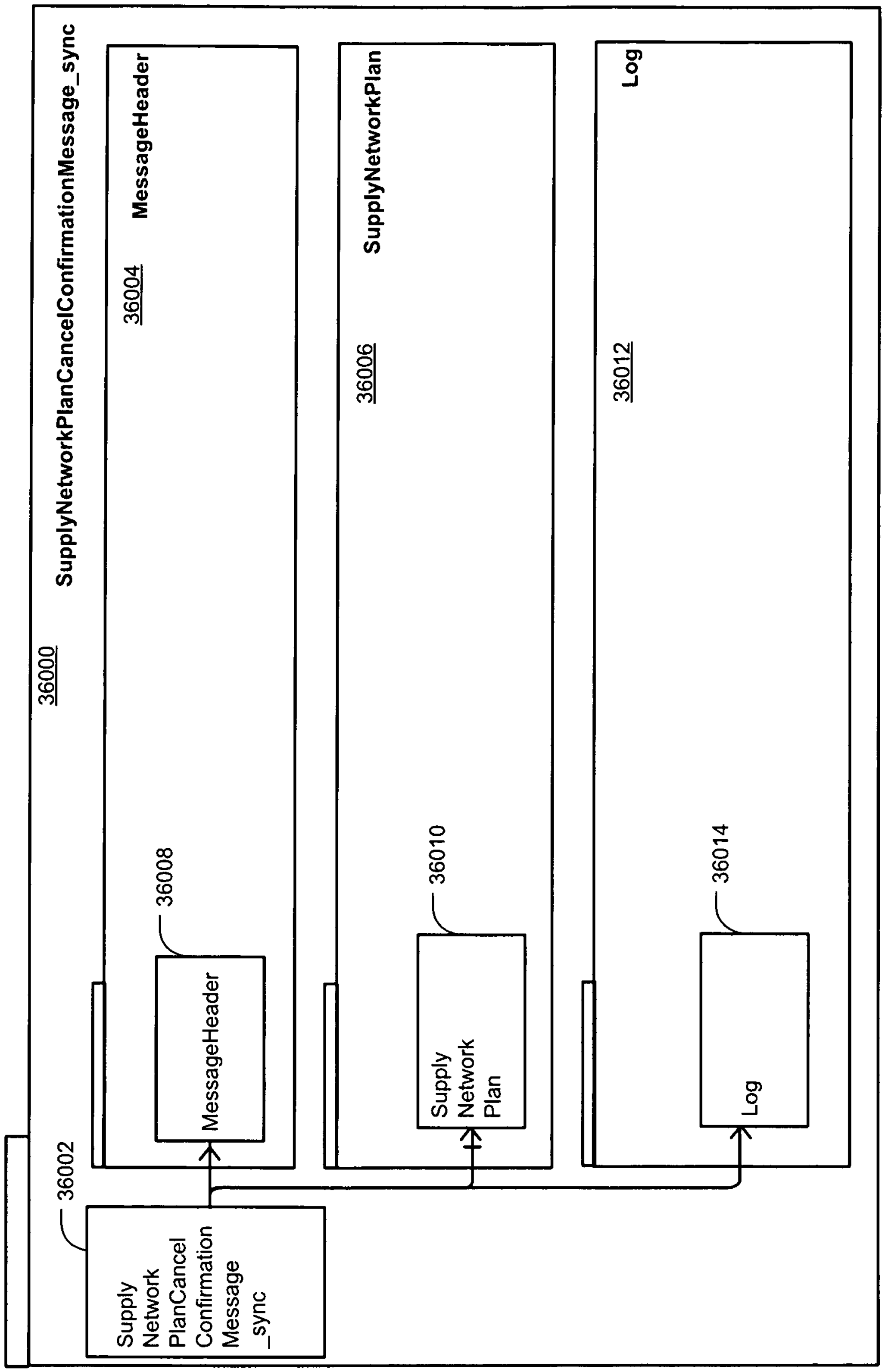
FIG. 36 shows an exemplary SupplyNetworkPlanCancelConfirmationMessage_sync Message Data Type.

Additionally, FIG. 36 illustrates one example logical configuration of SupplyNetworkPlanCancelConfirmationMessage message 36000. Specifically, this figure depicts the arrangement and hierarchy of various components such as one or more levels of packages, entities, and datatypes, shown here as 36000 through 36014. As described above, packages may be used to represent hierarchy levels. Entities are discrete business elements that are used during a business transaction. Data types are used to type object entities and interfaces with a structure. For example, SupplyNetworkPlanCancelConfirmationMessage message 36000 includes, among other things, SupplyNetworkPlan 36006. Accordingly, heterogeneous applications may communicate using this consistent message configured as such.

Figure 37:
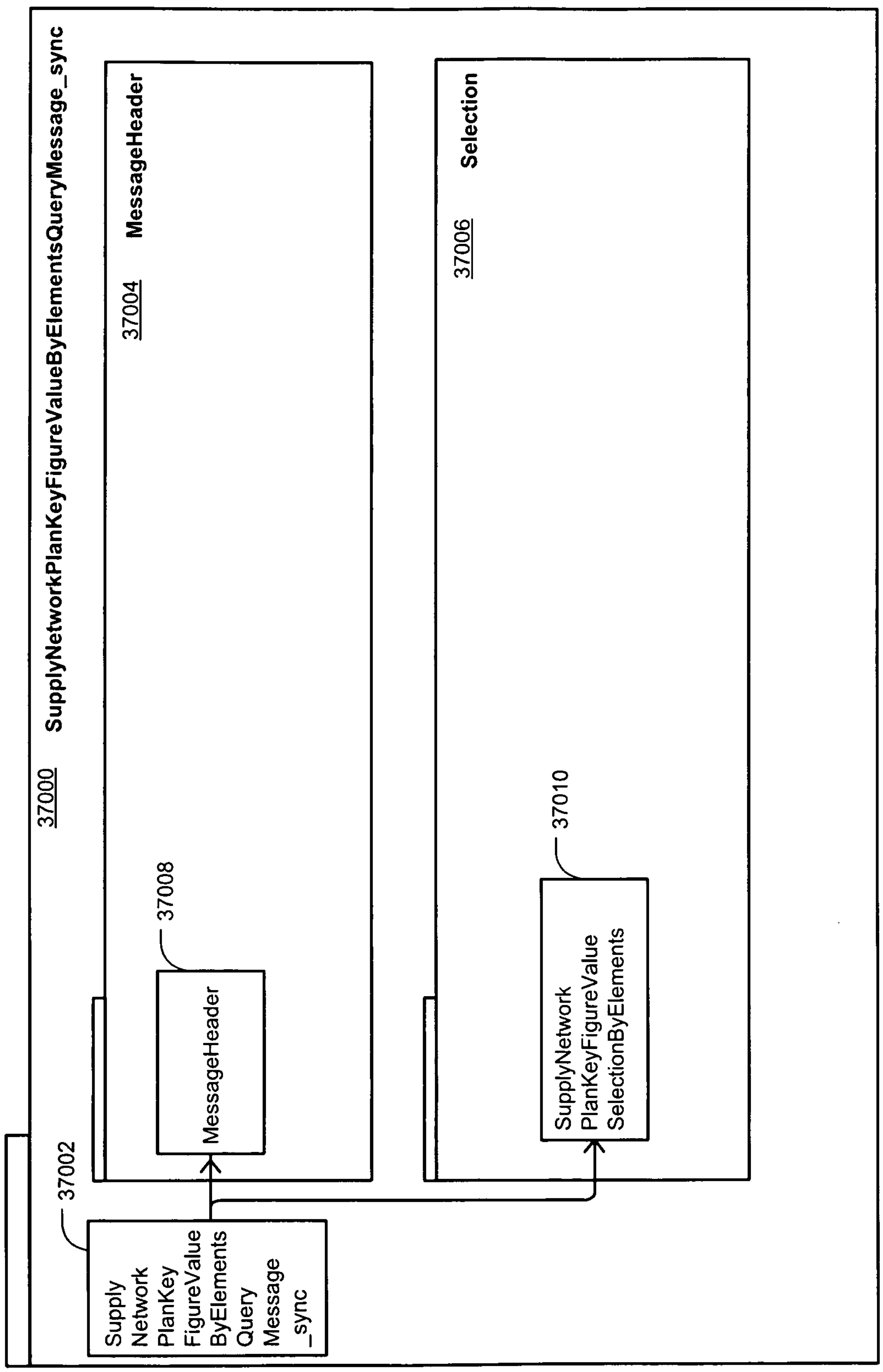
FIG. 37 shows an exemplary SupplyNetworkPlanKeyfigureValueByElementsQueryMessage_sync Message Data Type.

Additionally, FIG. 37 illustrates one example logical configuration of SupplyNetworkPlanKeyFigureValueByElementsQueryMessage message 37000. Specifically, this figure depicts the arrangement and hierarchy of various components such as one or more levels of packages, entities, and datatypes, shown here as 37000 through 37010. As described above, packages may be used to represent hierarchy levels. Entities are discrete business elements that are used during a business transaction. Data types are used to type object entities and interfaces with a structure. For example, SupplyNetworkPlanKeyFigureValueByElementsQueryMessage message 37000 includes, among other things, Selection 37006. Accordingly, heterogeneous applications may communicate using this consistent message configured as such.

Figure 38:
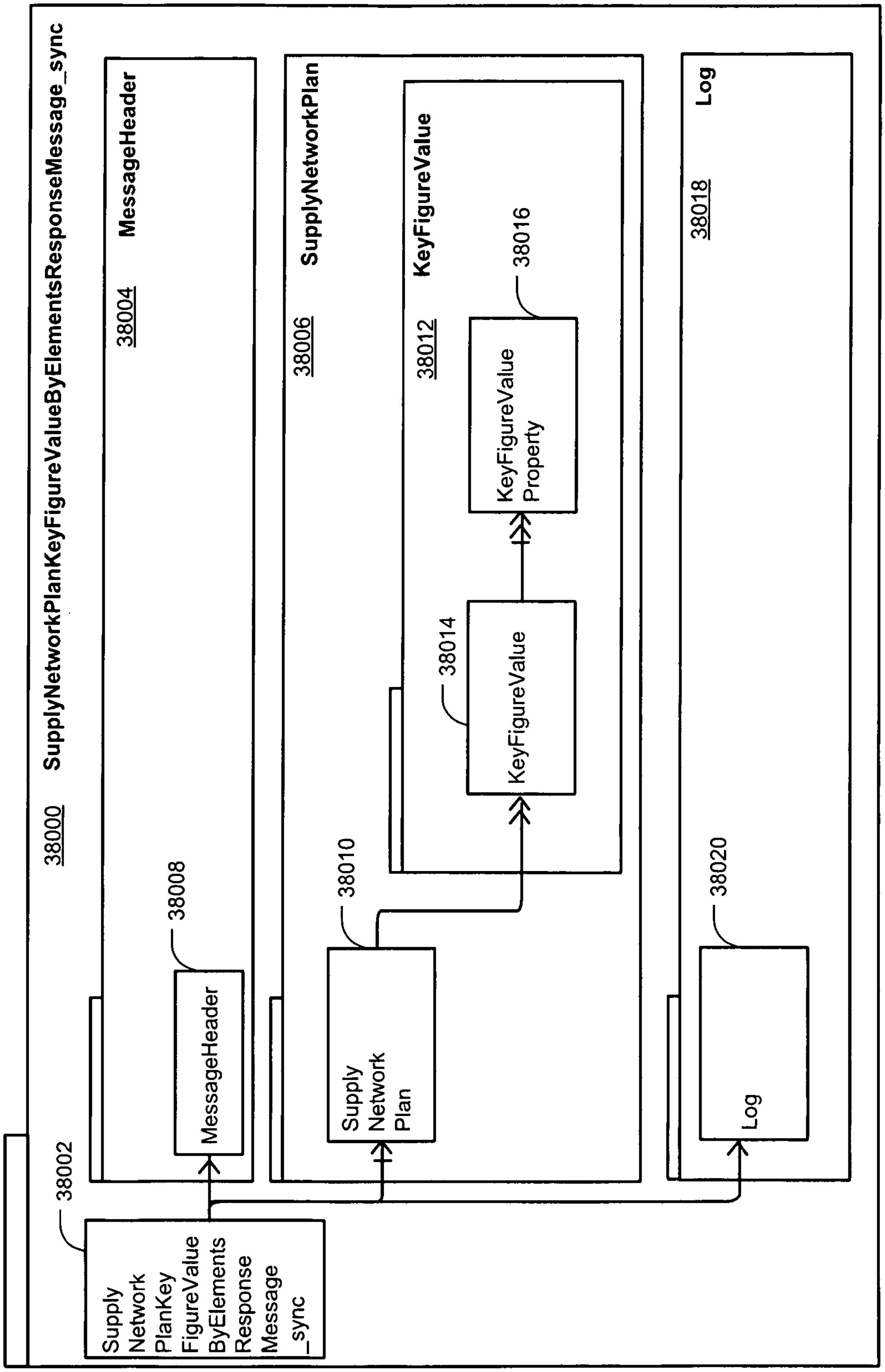
FIG. 38 shows an exemplary SupplyNetworkPlanKeyFigureValueByElementsResponseMessage_sync Message Data Type.

Additionally, FIG. 38 illustrates one example logical configuration of SupplyNetworkPlanKeyFigureValueByElementsResponseMessage message 38000. Specifically, this figure depicts the arrangement and hierarchy of various components such as one or more levels of packages, entities, and datatypes, shown here as 38000 through 38020. As described above, packages may be used to represent hierarchy levels. Entities are discrete business elements that are used during a business transaction. Data types are used to type object entities and interfaces with a structure. For example, SupplyNetworkPlanKeyFigureValueByElementsResponseMessage message 38000 includes, among other things, SupplyNetworkPlan 38006. Accordingly, heterogeneous applications may communicate using this consistent message configured as such.

Figure 39:
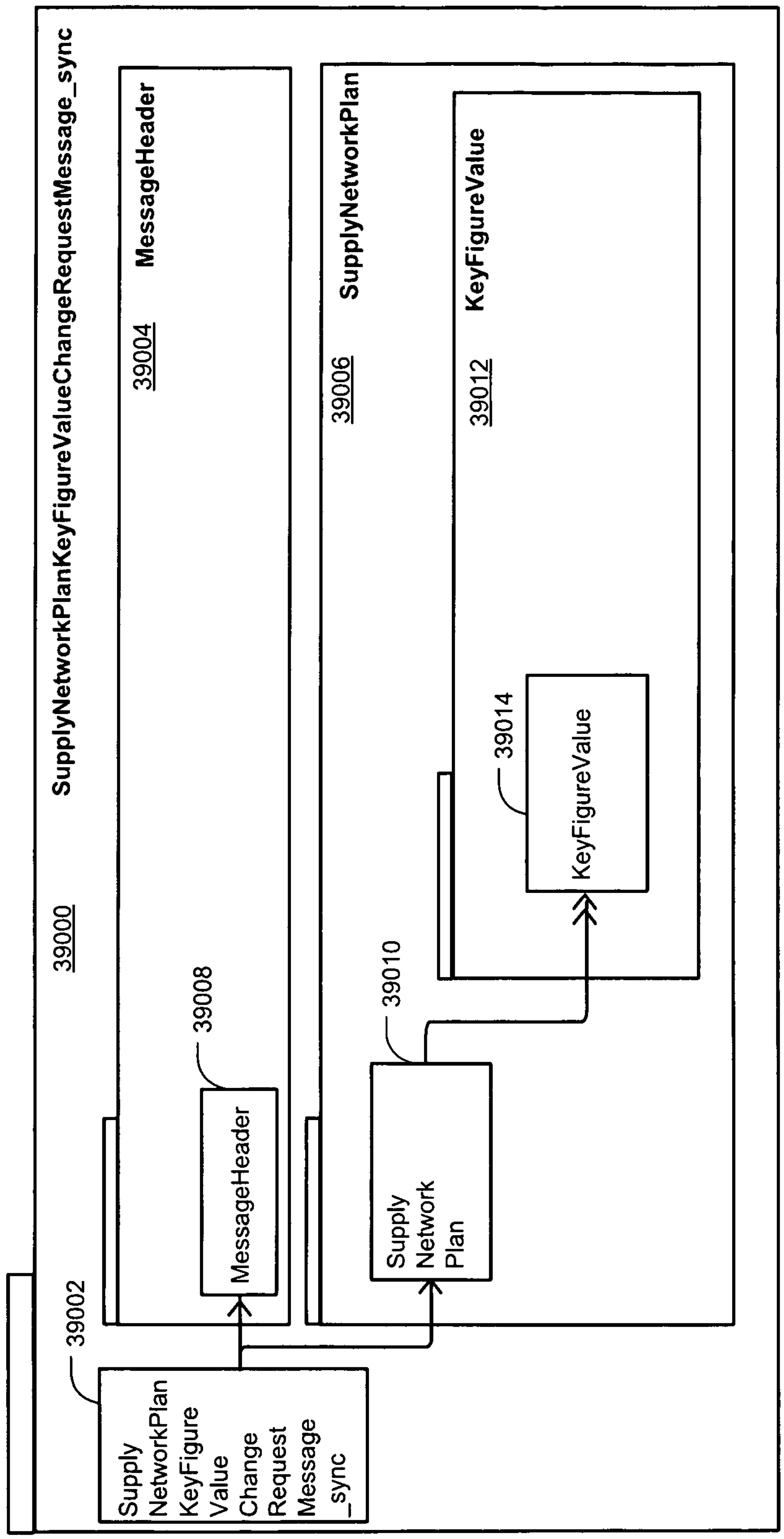
FIG. 39 shows an exemplary SupplyNetworkPlanKeyFigureValueChangeRequestMessage_sync Message Data Type.

Additionally, FIG. 39 illustrates one example logical configuration of SupplyNetworkPlanKeyFigureValueChangeRequestMessage message 39000. Specifically, this figure depicts the arrangement and hierarchy of various components such as one or more levels of packages, entities, and datatypes, shown here as 39000 through 39014. As described above, packages may be used to represent hierarchy levels. Entities are discrete business elements that are used during a business transaction. Data types are used to type object entities and interfaces with a structure. For example, SupplyNetworkPlanKeyFigureValueByElementsResponseMessage message 39000 includes, among other things, SupplyNetworkPlan 39006. Accordingly, heterogeneous applications may communicate using this consistent message configured as such.

Figure 40:
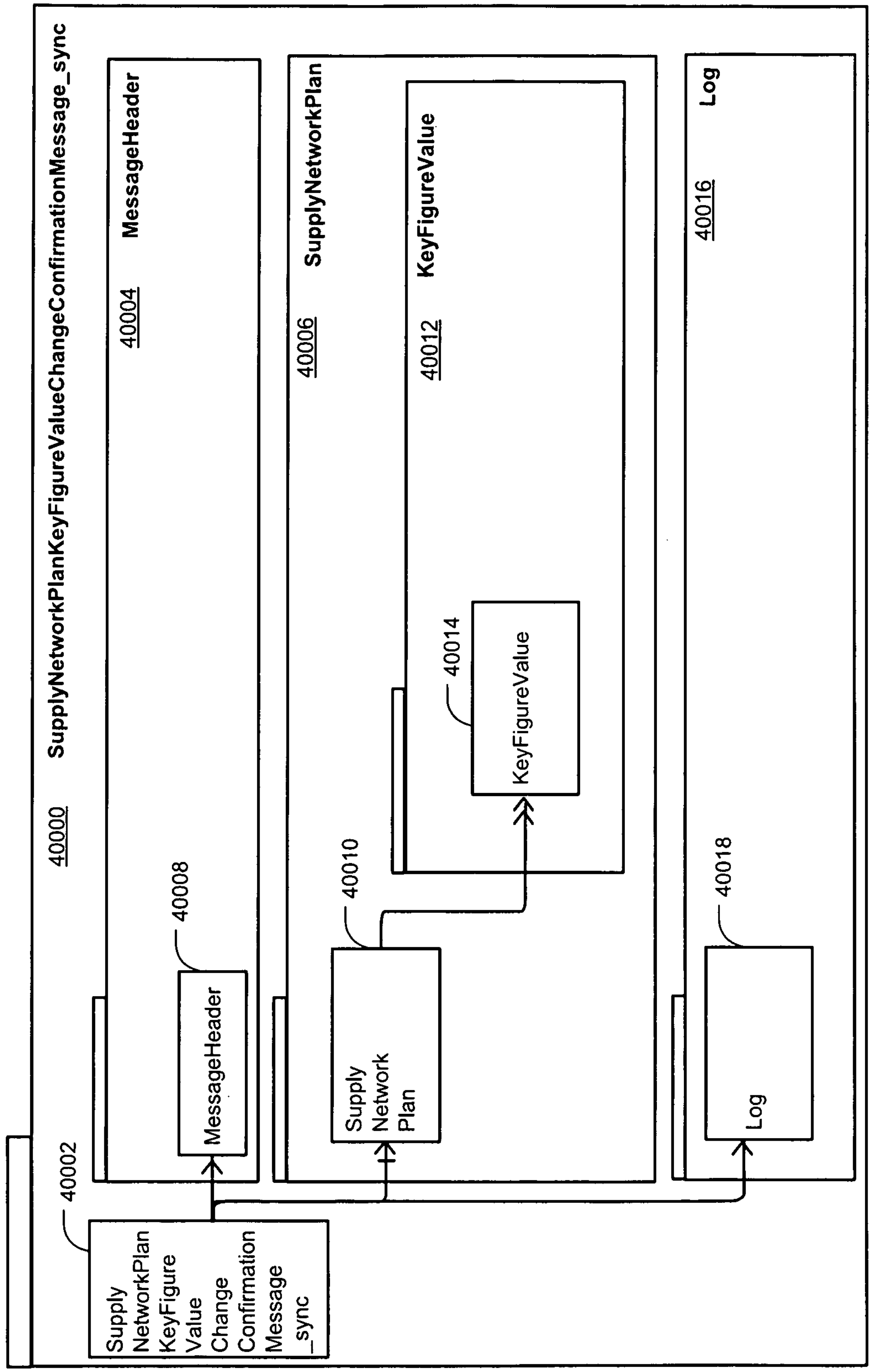
FIG. 40 shows an exemplary SupplyNetworkPlanKeyFigureValueChangeConfirmationMessage_sync Message Data Type.

Additionally, FIG. 40 illustrates one example logical configuration of SupplyNetworkPlanKeyFigureValueChangeConfirmationMessage message 40000. Specifically, this figure depicts the arrangement and hierarchy of various components such as one or more levels of packages, entities, and datatypes, shown here as 40000 through 40018. As described above, packages may be used to represent hierarchy levels. Entities are discrete business elements that are used during a business transaction. Data types are used to type object entities and interfaces with a structure. For example, SupplyNetworkPlanKeyFigureValueChangeConfirmationMessage message 40000 includes, among other things, SupplyNetworkPlan 40006. Accordingly, heterogeneous applications may communicate using this consistent message configured as such.

Figure 41:
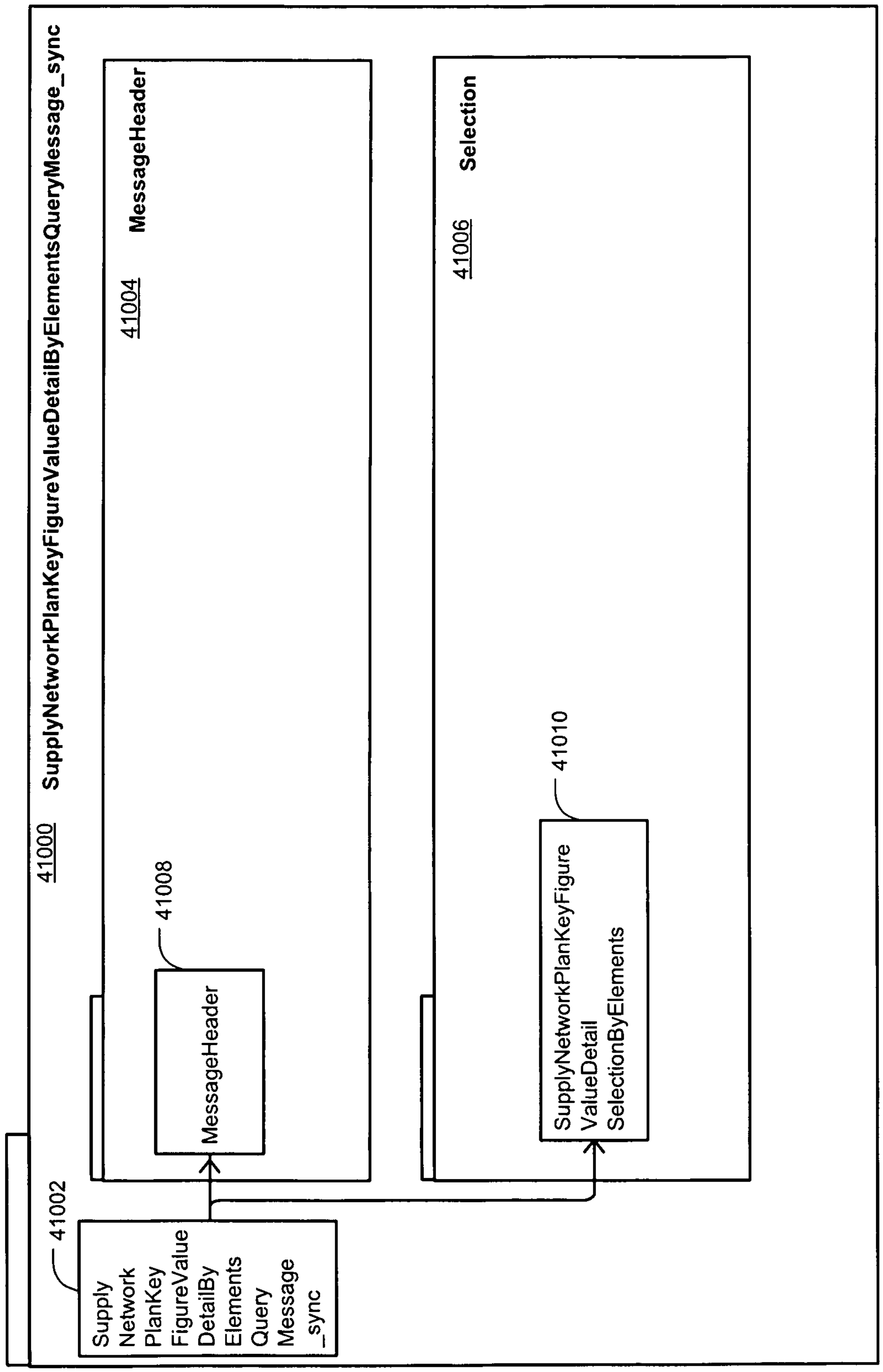
FIG. 41 shows an exemplary SupplyNetworkPlanKeyFigureValueDetailByElementsQueryMessage_sync Message Data Type.

Additionally, FIG. 41 illustrates one example logical configuration of SupplyNetworkPlanKeyFigureValueDetailByElementsQueryMessage message 41000. Specifically, this figure depicts the arrangement and hierarchy of various components such as one or more levels of packages, entities, and datatypes, shown here as 41000 through 41010. As described above, packages may be used to represent hierarchy levels. Entities are discrete business elements that are used during a business transaction. Data types are used to type object entities and interfaces with a structure. For example, SupplyNetworkPlanKeyFigureValueDetailByElementsQueryMessage message 41000 includes, among other things, Selection 41006. Accordingly, heterogeneous applications may communicate using this consistent message configured as such.

Figure 42:
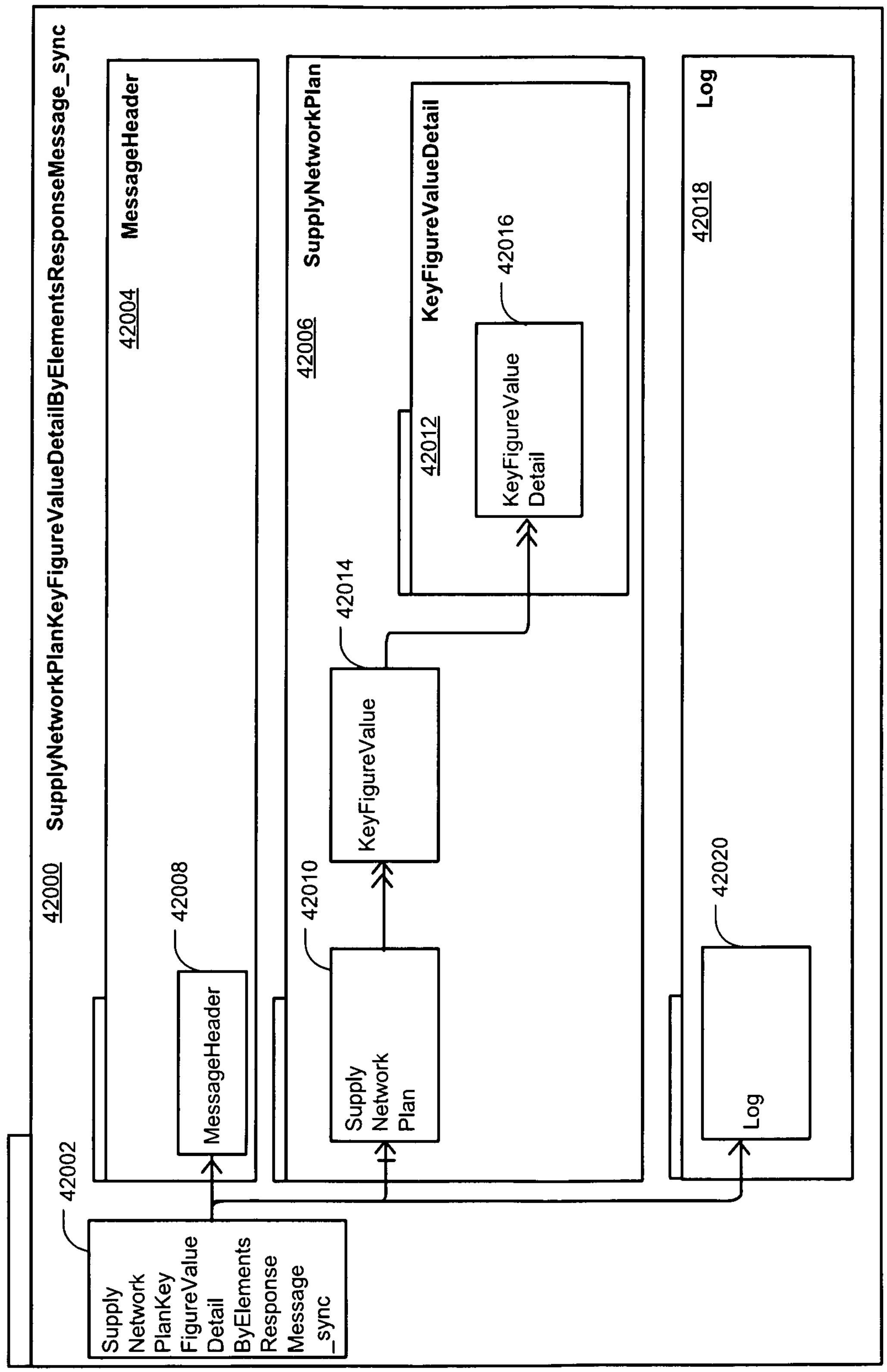
FIG. 42 shows an exemplary SupplyNetworkPlanKeyFigureValueDetailByElementsResponseMessage_sync Message Data Type.

Additionally, FIG. 42 illustrates one example logical configuration of SupplyNetworkPlanKeyFigureValueDetailByElementsResponseMessage message 42000. Specifically, this figure depicts the arrangement and hierarchy of various components such as one or more levels of packages, entities, and datatypes, shown here as 42000 through 42020. As described above, packages may be used to represent hierarchy levels. Entities are discrete business elements that are used during a business transaction. Data types are used to type object entities and interfaces with a structure. For example, SupplyNetworkPlanKeyFigureValueDetailByElementsResponseMessage message 42000 includes, among other things, SupplyNetworkPlan 42006. Accordingly, heterogeneous applications may communicate using this consistent message configured as such.

Figure 43:
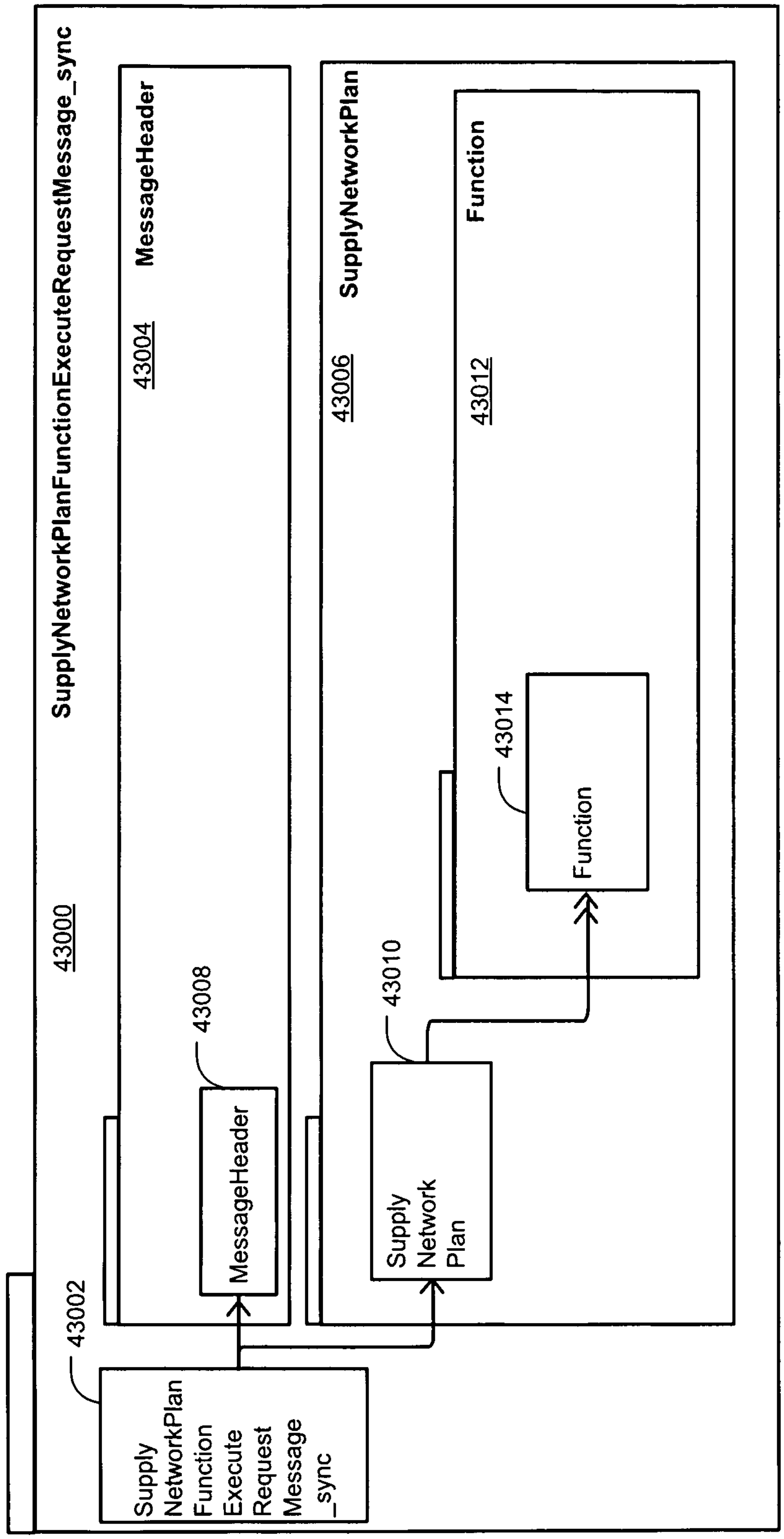
FIG. 43 shows an exemplary SupplyNetworkPlanFunctionExecuteRequestMessage_sync Message Data Type.

Additionally, FIG. 43 illustrates one example logical configuration of SupplyNetworkPlanFunctionExecuteRequestMessage message 43000. Specifically, this figure depicts the arrangement and hierarchy of various components such as one or more levels of packages, entities, and datatypes, shown here as 43000 through 43014. As described above, packages may be used to represent hierarchy levels. Entities are discrete business elements that are used during a business transaction. Data types are used to type object entities and interfaces with a structure. For example, SupplyNetworkPlanFunctionExecuteRequestMessage message 43000 includes, among other things, SupplyNetworkPlan 43006. Accordingly, heterogeneous applications may communicate using this consistent message configured as such.

Figure 44:
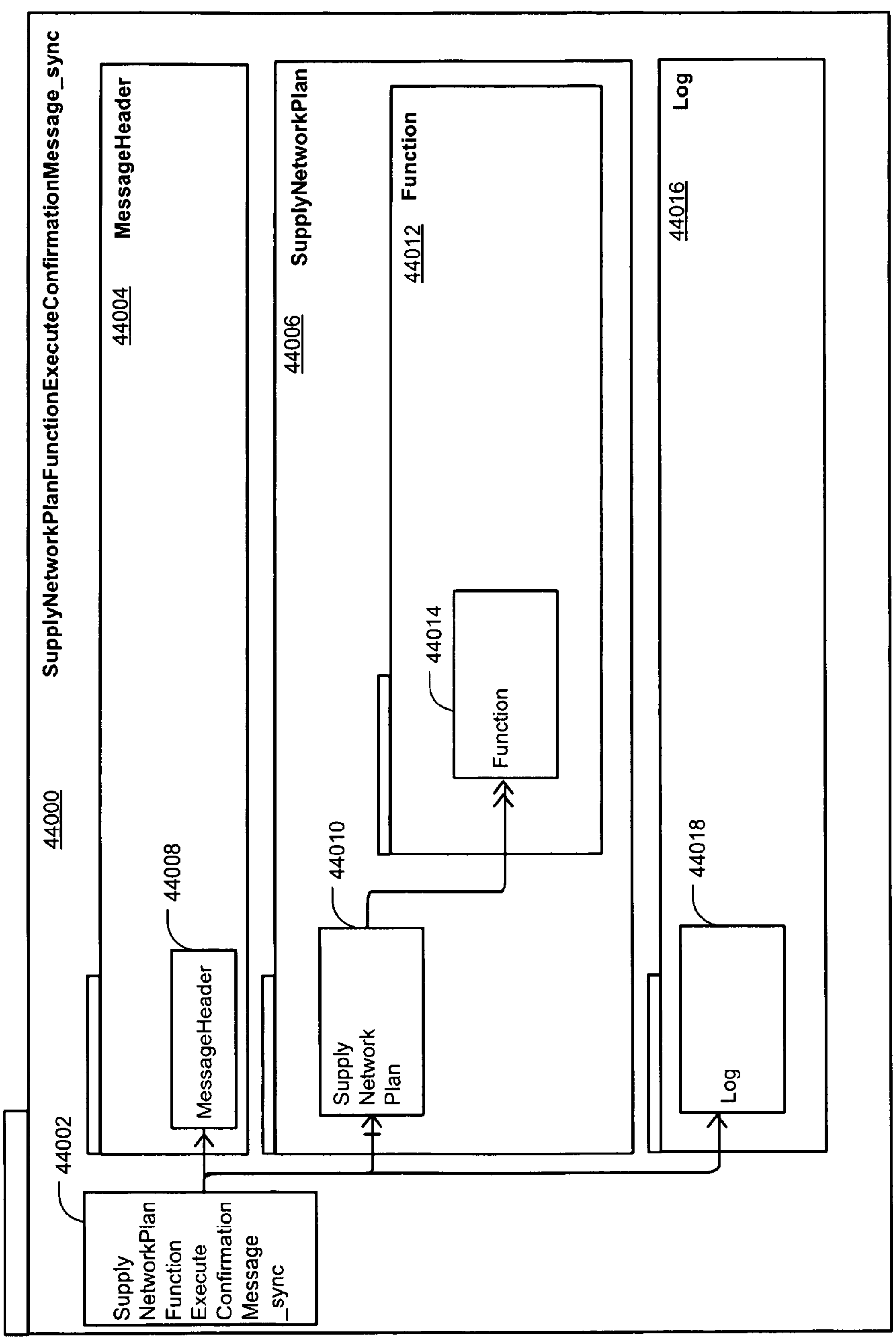
FIG. 44 shows an exemplary SupplyNetworkPlanFunctionExecuteConfirmationMessage_sync Message Data Type.

Additionally, FIG. 44 illustrates one example logical configuration of SupplyNetworkPlanFunctionExecuteConfirmationMessage message 44000. Specifically, this figure depicts the arrangement and hierarchy of various components such as one or more levels of packages, entities, and datatypes, shown here as 44000 through 44018. As described above, packages may be used to represent hierarchy levels. Entities are discrete business elements that are used during a business transaction. Data types are used to type object entities and interfaces with a structure. For example, SupplyNetworkPlanFunctionExecuteConfirmationMessage message 44000 includes, among other things, SupplyNetworkPlan 44006. Accordingly, heterogeneous applications may communicate using this consistent message configured as such.

FIGS. 45-1 through 45-6 illustrate one example logical configuration of a SupplyNetworkPlanCancelConfirmationMessage 45000 element structure. Specifically, these figures depict the arrangement and hierarchy of various components such as one or more levels of packages, entities, and datatypes, shown here as 45000 through 45152. As described above, packages may be used to represent hierarchy levels. Entities are discrete business elements that are used during a business transaction. Data types are used to type object entities and interfaces with a structure. For example, the SupplyNetworkPlanCancelConfirmationMessage 45000 includes, among other things, a SupplyNetworkPlanCancelConfirmationMessage 45002. Accordingly, heterogeneous applications may communicate using this consistent message configured as such.

FIGS. 46-1 through 46-5 illustrate one example logical configuration of a SupplyNetworkPlanCancelRequestMessage 46000 element structure. Specifically, these figures depict the arrangement and hierarchy of various components such as one or more levels of packages, entities, and datatypes, shown here as 46000 through 46126. As described above, packages may be used to represent hierarchy levels. Entities are discrete business elements that are used during a business transaction. Data types are used to type object entities and interfaces with a structure. For example, the SupplyNetworkPlanCancelRequestMessage 46000 includes, among other things, a SupplyNetworkPlanCancelRequestMessage 46002. Accordingly, heterogeneous applications may communicate using this consistent message configured as such.

FIGS. 47-1 through 47-6 illustrate one example logical configuration of a SupplyNetworkPlanCreateConfirmationMessage 47000 element structure. Specifically, these figures depict the arrangement and hierarchy of various components such as one or more levels of packages, entities, and datatypes, shown here as 47000 through 47152. As described above, packages may be used to represent hierarchy levels. Entities are discrete business elements that are used during a business transaction. Data types are used to type object entities and interfaces with a structure. For example, the SupplyNetworkPlanCreateConfirmationMessage 47000 includes, among other things, a SupplyNetworkPlanCreateConfirmationMessage 47002. Accordingly, heterogeneous applications may communicate using this consistent message configured as such.

FIGS. 48-1 through 48-5 illustrate one example logical configuration of a SupplyNetworkPlanCreateRequestMessage 48000 element structure. Specifically, these figures depict the arrangement and hierarchy of various components such as one or more levels of packages, entities, and datatypes, shown here as 48000 through 48126. As described above, packages may be used to represent hierarchy levels. Entities are discrete business elements that are used during a business transaction. Data types are used to type object entities and interfaces with a structure. For example, the SupplyNetworkPlanCreateRequestMessage 48000 includes, among other things, a SupplyNetworkPlanCreateRequestMessage 48002. Accordingly, heterogeneous applications may communicate using this consistent message configured as such.

FIGS. 49-1 through 49-7 illustrate one example logical configuration of a SupplyNetworkPlanFunctionExecuteConfirmationMessage 49000 element structure. Specifically, these figures depict the arrangement and hierarchy of various components such as one or more levels of packages, entities, and datatypes, shown here as 49000 through 49176. As described above, packages may be used to represent hierarchy levels. Entities are discrete business elements that are used during a business transaction. Data types are used to type object entities and interfaces with a structure. For example, the SupplyNetworkPlanFunctionExecuteConfirmationMessage 49000 includes, among other things, a SupplyNetworkPlanFunctionExecuteConfirmationMessage 49002. Accordingly, heterogeneous applications may communicate using this consistent message configured as such.

FIGS. 50-1 through 50-6 illustrate one example logical configuration of a SupplyNetworkPlanFunctionExecuteRequestMessage 50000 element structure. Specifically, these figures depict the arrangement and hierarchy of various components such as one or more levels of packages, entities, and datatypes, shown here as 50000 through 50150. As described above, packages may be used to represent hierarchy levels. Entities are discrete business elements that are used during a business transaction. Data types are used to type object entities and interfaces with a structure. For example, the SupplyNetworkPlanFunctionExecuteRequestMessage 50000 includes, among other things, a SupplyNetworkPlanFunctionExecuteRequestMessage 50002. Accordingly, heterogeneous applications may communicate using this consistent message configured as such.

FIGS. 51-1 through 51-7 illustrate one example logical configuration of a SupplyNetworkPlanKeyFigureValueByElementsQueryMessage 51000 element structure. Specifically, these figures depict the arrangement and hierarchy of various components such as one or more levels of packages, entities, and datatypes, shown here as 51000 through 51188. As described above, packages may be used to represent hierarchy levels. Entities are discrete business elements that are used during a business transaction. Data types are used to type object entities and interfaces with a structure. For example, the SupplyNetworkPlanKeyFigureValueByElementsQueryMessage 51000 includes, among other things, a SupplyNetworkPlanKeyFigureValueByElementsQueryMessage 51002. Accordingly, heterogeneous applications may communicate using this consistent message configured as such.

FIGS. 52-1 through 52-8 illustrate one example logical configuration of a SupplyNetworkPlanKeyFigureValueByElementsResponseMessage 52000 element structure. Specifically, these figures depict the arrangement and hierarchy of various components such as one or more levels of packages, entities, and datatypes, shown here as 52000 through 52210. As described above, packages may be used to represent hierarchy levels. Entities are discrete business elements that are used during a business transaction. Data types are used to type object entities and interfaces with a structure. For example, the SupplyNetworkPlanKeyFigureValueByElementsResponseMessage 52000 includes, among other things, a SupplyNetworkPlanKeyFigureValueByElementsResponseMessage 52002. Accordingly, heterogeneous applications may communicate using this consistent message configured as such.

FIGS. 53-1 through 53-8 illustrate one example logical configuration of a SupplyNetworkPlanKeyFigureValueChangeConfirmationMessage 53000 element structure. Specifically, these figures depict the arrangement and hierarchy of various components such as one or more levels of packages, entities, and datatypes, shown here as 53000 through 53212. As described above, packages may be used to represent hierarchy levels. Entities are discrete business elements that are used during a business transaction. Data types are used to type object entities and interfaces with a structure. For example, the SupplyNetworkPlanKeyFigureValueChangeConfirmationMessage 53000 includes, among other things, a SupplyNetworkPlanKeyFigureValueChangeConfirmationMessage 53002. Accordingly, heterogeneous applications may communicate using this consistent message configured as such.

FIGS. 54-1 through 54-7 illustrate one example logical configuration of a SupplyNetworkPlanKeyFigureValueChangeRequestMessage 54000 element structure. Specifically, these figures depict the arrangement and hierarchy of various components such as one or more levels of packages, entities, and datatypes, shown here as 54000 through 54180. As described above, packages may be used to represent hierarchy levels. Entities are discrete business elements that are used during a business transaction. Data types are used to type object entities and interfaces with a structure. For example, the SupplyNetworkPlanKeyFigureValueChangeRequestMessage 54000 includes, among other things, a SupplyNetworkPlanKeyFigureValueChangeRequestMessage 54002. Accordingly, heterogeneous applications may communicate using this consistent message configured as such.

FIGS. 55-1 through 55-8 illustrate one example logical configuration of a SupplyNetworkPlanKeyFigureValueDetailByElementsQueryMessage 55000 element structure. Specifically, these figures depict the arrangement and hierarchy of various components such as one or more levels of packages, entities, and datatypes, shown here as 55000 through 55210. As described above, packages may be used to represent hierarchy levels. Entities are discrete business elements that are used during a business transaction. Data types are used to type object entities and interfaces with a structure. For example, the SupplyNetworkPlanKeyFigureValueDetailByElementsQueryMessage 55000 includes, among other things, a SupplyNetworkPlanKeyFigureValueDetailByElementsQueryMessage 55002. Accordingly, heterogeneous applications may communicate using this consistent message configured as such.

FIGS. 56-1 through 56-13 illustrate one example logical configuration of a SupplyNetworkPlanKeyFigureValueDetailByElementsResponseMessage 56000 element structure. Specifically, these figures depict the arrangement and hierarchy of various components such as one or more levels of packages, entities, and datatypes, shown here as 56000 through 56318. As described above, packages may be used to represent hierarchy levels. Entities are discrete business elements that are used during a business transaction. Data types are used to type object entities and interfaces with a structure. For example, the SupplyNetworkPlanKeyFigureValueDetailByElementsResponseMessage 56000 includes, among other things, a SupplyNetworkPlanKeyFigureValueDetailByElementsResponseMessage 56002. Accordingly, heterogeneous applications may communicate using this consistent message configured as such.

Message Data Type SupplyNetworkPlanCreateRequestMessage_sync

The message data type SupplyNetworkPlanCreateRequestMessage_sync includes the SupplyNetworkPlan included in the business document. It includes the following packages: MessageHeader and SupplyNetworkPlan. A MessageHeader package groups the business information that is relevant for sending a business document in a message. It includes the MessageHeader entity. A MessageHeader groups business information from the perspective of the sending application, such as information to identify the business document in a message, information about the sender, and (possibly) information about the recipient. The MessageHeader includes SenderParty and RecipientParty. It is of type GDT:BusinessDocumentMessageHeader, whereby the following elements of the GDT are used: ID, which may be based on GDT (Global Data Type): BusinessDocumentMessageID; ReferenceID, which may be based on GDT: BusinessDocumentMessageID; CreationDateTime, which may be based on GDT: CreationDateTime; TestDataIndicator, which may be based on GDT: TestDataIndicator; ReconciliationIndicator, which may be based on GDT: ReconciliationIndicator; SenderParty, which may be based on GDT: BusinessDocumentMessageHeaderParty; RecipientParty, which may be based on GDT: BusinessDocumentMessageHeaderParty; and BusinessScopeBusinessProcess, which may be based on GDT: BusinessScopeBusinessProcess. BusinessScopeBusinessProcess is used to transfer a Supply Planning Simulation Version. A SenderParty is the party responsible for sending a business document at a business application level. The SenderParty is of type GDT:BusinessDocumentMessageHeaderParty. A RecipientParty is the party responsible for receiving a business document at a business application level. The RecipientParty is of type GDT: BusinessDocumentMessageHeaderParty.

The SupplyNetworkPlan package groups the information which refers to a SupplyNetworkPlanI. It includes the entity SupplyNetworkPlan. A SupplyNetworkPlan is a forecasted supply plan of products or product lines in a network based on future demands. Furthermore the SupplyNetworkPlan also includes the historical supply of products or product lines in a network. The SupplyNetworkPlan entity includes the ConfigurationID element. A SupplyNetworkPlanConfigurationID is a unique identifier for a SupplyNetworkPlanConfiguration. In this context a SupplyNetworkPlanConfiguration is the configuration required to access a SupplyNetworkPlan, and may be based on GDT: SupplyNetworkPlanConfigurationID. The message data type SupplyNetworkPlanCreateConfirmationMessage_sync includes the SupplyNetworkPlan included in the business document. It includes the following packages: MessageHeader, SupplyNetworkPlan, and Log.

The SupplyNetworkPlan package includes the SupplyNetworkPlan entity. The SupplyNetworkPlan entity includes the ID element. A SupplyNetworkPlanID is a unique identifier for a Supply Network Plan. A SupplyNetworkPlan is the forecasted supply plan of products or product lines in a network based on future demands. Furthermore, the SupplyNetworkPlan also includes the historical supply of products or product lines in a network. SupplyNetworkPlanID may be based on GDT: SupplyNetworkPlanID.

The Log package includes log information sent by Supply and Demand Matching. A Log includes information about the execution of an action. The log is of type GDT: Log. The Log is a table of elements of type Log. In some implementations, the elements TypeID, SeverityCode, and Note are used in the item.

Message Data Type SupplyNetworkPlanCancelRequestMessage_sync

The message data type SupplyNetworkPlanCancelRequestMessage_sync includes the SupplyNetworkPlan in the business document. It includes the MessageHeader and SupplyNetworkPlan packages. The SupplyNetworkPlan package includes the entity SupplyNetworkPlan. The SupplyNetworkPlan entity includes the ID element. A SupplyNetworkPlanID is a unique identifier for a Supply Network Plan. A SupplyNetworkPlan is the forecasted supply plan of products or product lines in a network based on future demands. Furthermore, the SupplyNetworkPlan also includes the historical supply of products or product lines in a network. SupplyNetworkPlanID may be based onGDT: SupplyNetworkPlanID.

Message Data Type SupplyNetworkPlanCancelConfirmationMessage_sync

The message data type SupplyNetworkPlanCancelConfirmationMessage_sync includes the SupplyNetworkPlan in the business document and the log information with detailed textual messages about the changes that were made to the SupplyNetworkPlan or that were rejected. It includes the MessageHeader, SupplyNetworkPlan, and Log entities. The SupplyNetworkPlan package includes the entity SupplyNetworkPlan. The SupplyNetworkPlan entity includes the ID element. A SupplyNetworkPlanID is a unique identifier for a SupplyNetworkPlan. A SupplyNetworkPlan is the forecasted supply plan of products or product lines in a network based on future demands. Furthermore, the SupplyNetworkPlan also includes the historical supply of products or product lines in a network. SupplyNetworkPlanID may be based on GDT: SupplyNetworkPlanID.

Message Data Type SupplyNetworkPlanKeyfigureValueByElementsQueryMessage_sync

The message data type SupplyNetworkPlanKeyfigureValueByElementsQueryMessage_sync includes the SupplyNetworkPlanKeyFigureValueSelectionByElements included in the business document. It includes the MessageHeader and Selection packages. The Selection package collects all the selection criteria for the SupplyNetworkPlanKeyfigureValue. It includes the entity SupplyNetworkPlanKeyfigureValueSelectionByElements.

The SupplyNetworkPlanKeyFigureValueSelectionByElements includes the query elements to read a KeyfigureValue by common data. In some implementations, the elements at the SupplyNetworkPlanKeyfigureValueSelectionByElements entity can include SelectionByID, SelectionBySupplyNetworkPlanningAggregateHierarchyID, SelectionByKeyFigureID, and SelectionByTimeSeriesPeriodID. The SupplyNetworkPlanID is a unique identifier for a SupplyNetworkPlan.

A SupplyNetworkPlan is the forecasted supply plan of products or product lines in a network based on future demands. Furthermore, the SupplyNetworkPlan also includes the historical supply of products or product lines in a network. SupplyNetworkPlanID may be based on GDT: SupplyNetworkPlanID. The SupplyNetworkPlanningAggregateHierarchyID is a unique identifier for a SupplyNetworkPlanningAggregateHierarchy. In this context a SupplyNetworkPlanningAggregateHierarchy is a hierarchy which includes the different planning levels (e. g. location) from which the SupplyNetworkPlanKeyFigureValues should be read. SupplyNetworkPlanningAggregateHierarchy may be based on GDT: SupplyNetworkPlanningAggregateHierarchy.

A SelectionByKeyFigureID is an interval for SupplyNetworkPlanKeyFigureIDs. A SupplyNetworkPlanKeyFigure represents a planning parameter which holds a numerical planning data value assigned to a planning object for a time period (e.g., week, month). SelectionByKeyFigureID may be based on IDT: SelectionByKeyFigureID. SelectionByKeyFigureID can include InclusionExclusionCode, IntervalBoundaryTypeCode, LowerBoundaryKeyFigureID, and UpperBoundaryKeyFigureID. The InclusionExclusionCode defines if the interval defined by IntervalBoundaryTypeCode, LowerBoundaryKeyFigureID, and UpperBoundaryKeyFigureID is included in the result set or excluded. InclusionExclusionCode may be based on GDT: InclusionExclusionCode. The IntervalBoundaryTypeCode is a coded representation of an interval boundary type, and may be based on GDT: IntervalBoundaryTypeCode. The LowerBoundaryKeyFigureID is the lower boundary of the KeyFigureID interval, and it may be based on GDT: SupplyNetworkPlanKeyFigureID. The UpperBoundaryKeyFigureID is the upper boundary of the KeyFigureID interval, and it may be based on GDT: SupplyNetworkPlanKeyFigureID.

A SelectionByTimeSeriesPeriodID is an interval for TimeSeriesPeriodIDs. A TimeSeriesPeriod defines the time range of a KeyFigureValue of a SupplyNetworkPlan as well as the periodicity. SelectionByTimeSeriesPeriodID may be based on IDT: SelectionByTimeSeriesPeriodID. SelectionByTimeSeriesPeriodID can include the InclusionExclusionCode, IntervalBoundaryTypeCode, LowerBoundaryTimeSeriesPeriodID, and UpperBoundaryTimeSeriesPeriodID elements. The InclusionExclusionCode defines if the interval defined by IntervalBoundaryTypeCode, LowerBoundaryTimeSeriesPeriodID, and UpperBoundaryTimeSeriesPeriodID is included in the result set or excluded. InclusionExclusionCode may be based on GDT: InclusionExclusionCode. The IntervalBoundaryTypeCode is a coded representation of an interval boundary type, and it may be based on GDT: IntervalBoundaryTypeCode. The LowerBoundaryTimeSeriesPeriodID is the lower boundary of the TimeSeriesPeriodID interval, and may be based on GDT: TimeSeriesPeriodID. The UpperBoundaryTimeSeriesPeriodID is the upper boundary of the TimeSeriesPeriodID interval, and may be based on GDT: TimeSeriesPeriodID. In some implementations, the intervals SelectionByKeyFigureID and SelectionByTimeSeriesPeriodID support an InclusionExclusionCode of 'I' (indicating Inclusion) and an IntervalBoundaryTypeCode of '1' (indicating Single Value).

Message Data Type SupplyNetworkPlanKeyFigureValueByElementsResponseMessage_sync

The message data type SupplyNetworkPlanKeyFigureValueByElementsResponseMessage_sync includes the SupplyNetworkPlan included in the business document. It includes the following packages: MessageHeader, SupplyNetworkPlan, and Log. The SupplyNetworkPlan package groups the SupplyNetworkPlan with the KeyfigureValue package. The SupplyNetworkPlan package includes the entity SupplyNetworkPlan. In some implementations, the SupplyNetworkPlan includes the ID element, which is a unique identifier for a SupplyNetworkPlan. A SupplyNetworkPlan is the forecasted supply plan of products or product lines in a network based on future demands. Furthermore, the SupplyNetworkPlan also includes the historical supply of products or product lines in a network. ID may be based on GDT: SupplyNetworkPlanID.

The KeyFigureValue package includes the KeyFigureValue and KeyFigureValueProperty entities. A KeyFigureValue is a single planning value for a key figure assigned to a certain time period. The entity KeyFigureValue includes the following elements: SupplyNetworkPlanKeyFigureID, TimeSeriesPeriodID, SupplyNetworkPlanningAggregateHierarchyAggregateInstanceID, FloatValue, MeasureUnitCode, and MeasureUnitName. SupplyNetworkPlanKeyFigureID is a unique identifier of a SupplyNetworkPlanKeyFigure. In this context a SupplyNetworkPlanKeyFigure represents a planning parameter which holds a numerical planning data value assigned to a planning object for a time period (e.g., a week or month). SupplyNetworkPlanKeyFigureID may be based on GDT: SupplyNetworkPlanKeyFigureID. TimeSeriesPeriodID is a unique identifier of a TimeSeriesPeriod. In this context a TimeSeriesPeriod defines the time range of a KeyFigureValue of a SupplyNetworkPlan as well as the periodicity. TimeSeriesPeriodID may be based on GDT: TimeSeriesPeriodID. SupplyNetworkPlanningAggregateHierarchyAggregateInstanceID is a unique identifier of a SupplyNetworkPlanningAggregateHierarchyAggregateInstance. In this context a SupplyNetworkPlanningAggregateHierarchyAggregateInstanceID defines the planning level (e. g. location) to which a SupplyNetworkPlanKeyFigureValue refers. SupplyNetworkPlanningAggregateHierarchyAggregateInstanceID may be based on GDT: SupplyNetworkPlanningAggregateHierarchyAggregateInstanceID. A FloatValue is a single planning value for a KeyFigure assigned to a certain TimeSeriesPeriod, and may be based on GDT: FloatValue. The MeasureUnitCode is the coded representation of a non-monetary unit of measurement. The MeasureUnitCode describes the unit of measure of the KeyFigureFloatValue, and may be based on GDT: MeasureUnitCode. The MeasureUnitName names the MeasureUnitCode, and may be based on GDT:MEDIUM_Name.

A KeyFigureValueProperty defines a property of a KeyFigureValue. In some implementations, the entity KeyFigureValueProperty can include the ID and Value element. The ID is a unique identifier for a property, and may be based on GDT: PropertyID. The Value describes a value that can be assigned to a property, and may be based on GDT: PropertyValue.

Message Data Type SupplyNetworkPlanKeyFigureValueChangeRequestMessage_sync

The message data type SupplyNetworkPlanKeyfigureValueChangeRequestMessage_sync includes the SupplyNetworkPlan included in the business document. It includes the following packages: MessageHeader and SupplyNetworkPlan. The SupplyNetworkPlan package groups the SupplyNetworkPlan with the KeyFigureValue package. In some implementations, the SupplyNetworkPlan includes the ID element, which is a unique identifier for a SupplyNetworkPlan. A SupplyNetworkPlan is the forecasted supply plan of products or product lines in a network based on future demands. Furthermore, the SupplyNetworkPlan also includes the historical supply of products or product lines in a network, and it may be based on GDT: SupplyNetworkPlanID.

The KeyfigureValue package includes the KeyFigureValue entity. A KeyFigureValue is a single planning value for a KeyFigure assigned to a certain time period. In some implementations, the KeyFigureValue includes the following elements: KeyFigureID, SupplyNetworkPlanningAggregateHierarchyAggregateInstanceID, TimeSeriesPeriodID, FloatValue, MeasureUnitCode, and SourceOfSupplyReference. KeyFigureID is a unique identifier of a KeyFigure.

In this context a KeyFigure represents a planning parameter which holds a numerical planning data value assigned to a planning object for a time period (e. g., week, month). KeyFigureID may be based on GDT: SupplyNetworkPlanKeyFigureID. SupplyNetworkPlanningAggregateHierarchyAggregateInstanceID is a unique identifier of a SupplyNetworkPlanningAggregateHierarchyAggregateInstance. In this context the SupplyNetworkPlanningAggregateHierarchyAggregateInstanceID defines the planning level (e.g., location) of a KeyFigureValue to be changed. SupplyNetworkPlanningAggregateHierarchyAggregateInstanceID may be based on GDT: SupplyNetworkPlanningAggregateHierarchyAggregateInstanceID. TimeSeriesPeriodID is a unique identifier of a TimeSeriesPeriod. In this context, a TimeSeriesPeriod defines the time range of a KeyFigureValue of a SupplyNetworkPlan as well as the periodicity. TimeSeriesPeriod may be based on GDT: TimeSeriesPeriodID. FloatValue is a single planning value for a KeyFigure assigned to a certain TimeSeriesPeriod, and may be based on GDT: FloatValue. MeasureUnitCode is the coded representation of a non-monetary unit of measurement. The MeasureUnitCode describes the unit of measure of the KeyFigureFloatValue, and may be based on GDT: MeasureUnitCode. SourceOfSupplyReference is a unique reference to a source of supply or to a LogisticRelationship within a source of supply. In this context a SourceOfSupplyReference defines the source of supply from which the quantity specified in FloatValue is procured. SourceOfSupplyReference may be based on GDT: SourceOfSupplyReference.

Message Data Type SupplyNetworkPlanKeyFigureValueChangeConfirmationMessage_sync

The message data type SupplyNetworkPlanKeyfigureValueChangeConfirmationMessage_sync includes the SupplyNetworkPlan included in the business document. It includes the following packages: MessageHeader, SupplyNetworkPlan, and Log. The SupplyNetworkPlan package groups the SupplyNetworkPlan with its KeyFigureValue package. In some implementations, the SupplyNetworkPlan includes the ID element, which is a unique identifier for a SupplyNetworkPlan, and which may be based on GDT: SupplyNetworkPlanID.

The KeyfigureValue package includes the KeyFigureValue entity. A KeyFigureValue is a single planning value for a KeyFigure assigned to a certain time period. The KeyFigureValue includes the following elements: KeyFigureID, TimeSeriesPeriodID, SupplyNetworkPlanningAggregateHierarchyAggregateInstanceID, FloatValue, MeasureUnitCode, MeasureUnitName, and SourceOfSupplyReference.

KeyFigureID is a unique identifier of a SupplyNetworkPlanKeyFigure. A SupplyNetworkPlanKeyFigure represents a planning parameter which holds a numerical planning data value assigned to a planning object for a time period (e.g., week, month). KeyFigureID may be based on GDT: SupplyNetworkPlanKeyFigureID. TimeSeriesPeriodID is a unique identifier of a TimeSeriesPeriod. In this context a TimeSeriesPeriod defines the time range of a KeyFigureValue of a SupplyNetworkPlan as well as the periodicity. TimeSeriesPeriodID may be based on GDT: TimeSeriesPeriodID. SupplyNetworkPlanningAggregateHierarchyAggregateInstanceID is a unique identifier of a SupplyNetworkPlanningAggregateHierarchyAggregateInstance. In this context the SupplyNetworkPlanningAggregateHierarchyAggregateInstanceID defines the planning level (e.g., location) on which a SupplyNetworkPlanKeyFigureValue was changed. SupplyNetworkPlanningAggregateHierarchyAggregateInstanceID may be based on GDT: SupplyNetworkPlanningAggregateHierarchyAggregateInstanceID. FloatValue is a single planning value for a KeyFigure assigned to a certain TimeSeriesPeriod, and may be based on GDT: FloatValue. MeasureUnitCode is the coded representation of a non-monetary unit of measurement. The MeasureUnitCode describes the unit of measure of the FloatValue, and may be based on GDT: MeasureUnitCode. MeasureUnitName names the MeasureUnitCode, and may be based on GDT: MEDIUM_Name. SourceOfSupplyReference is a unique reference to a source of supply or to a LogisticRelationship within a source of supply. In this context a SourceOfSupplyReference defines the source of supply from which the quantity specified in FloatValue is procured. SourceOfSupplyReference may be based on GDT: SourceOfSupplyReference.

Message Data Type SupplyNetworkPlanKeyFigureValueDetailByElementsQueryMessage_sync The message data type SupplyNetworkPlanKeyFigureValueDetailByElementsQueryMessage_sync includes the SupplyNetworkPlanKeyFigureValueDetailSelectionByElements included in the business document. It includes the packages: MessageHeader and Selection. The Selection package collects all the selection criteria for the SupplyNetworkPlanKeyfigureValueDetail. It includes the SupplyNetworkPlanKeyfigureValueDetailSelectionByElements entity. The SupplyNetworkPlanKeyFigureValueDetailSelectionByElements includes the query elements to read a KeyfigureValueDetail by common data.

In some implementations, the SupplyNetworkPlanKeyfigureValueDetailSelectionByElements entity includes the following elements: SupplyNetworkPlanID, SelectionByKeyFigureID, SelectionByTimeSeriesPeriodID, and SelectionBySupplyNetworkPlanningAggregateHierarchyAggregateInstanceID. The SupplyNetworkPlanID is a unique identifier for a SupplyNetworkPlan. A SupplyNetworkPlan is the forecasted supply plan of products or product lines in a network based on future demands. Furthermore, the SupplyNetworkPlan also includes the historical supply of products or product lines in a network. SupplyNetworkPlanID may be based on GDT: SupplyNetworkPlanID. A SelectionByKeyFigureID is an interval for SupplyNetworkPlanKeyFigureIDs. A SupplyNetworkPlanKeyFigure represents a planning parameter which holds a numerical planning data value assigned to a planning object for a time period (e.g., week, month). SelectionByKeyFigureID may be based on IDT: SelectionByKeyFigureID. In some implementations, the SelectionByKeyFigureID can include the InclusionExclusionCode, IntervalBoundaryTypeCode, LowerBoundaryKeyFigureID, and UpperBoundarySupplyNetworkPlanKeyFigureID. The InclusionExclusionCode defines if the interval defined by IntervalBoundaryTypeCode, LowerBoundaryKeyFigureID, and UpperBoundaryKeyFigureID is included in the result set or excluded, and may be based on GDT: InclusionExclusionCode. The IntervalBoundaryTypeCode is a coded representation of an interval boundary type, and may be based on GDT: IntervalBoundaryTypeCode. The LowerBoundaryKeyFigureID is the lower boundary of the SupplyNetworkPlanKeyFigureID interval, and may be based on GDT: SupplyNetworkPlanKeyFigureID. The UpperBoundarySupplyNetworkPlanKeyFigureID is the upper boundary of the SupplyNetworkPlanKeyFigureID interval, and may be based on GDT: SupplyNetworkPlanKeyFigureID.

A SelectionByTimeSeriesPeriodID is an interval for TimeSeriesPeriodIDs. A TimeSeriesPeriod defines the time range of a KeyFigureValue of a SupplyNetworkPlan as well as the periodicity, and may be based on IDT: SelectionByTimeSeriesPeriodID. In some implementations, TimeSeriesPeriod can include the InclusionExclusionCode, IntervalBoundaryTypeCode, LowerBoundaryTimeSeriesPeriodID, and UpperBoundaryTimeSeriesPeriodID elements. The InclusionExclusionCode defines if the interval defined by IntervalBoundaryTypeCode, LowerBoundaryTimeSeriesPeriodID, and UpperBoundaryTimeSeriesPeriodID is included in the result set or excluded, and may be based on GDT: InclusionExclusionCode. The IntervalBoundaryTypeCode is a coded representation of an interval boundary type, and may be based on GDT: IntervalBoundaryTypeCode. The LowerBoundaryTimeSeriesPeriodID is the lower boundary of the TimeSeriesPeriodID interval, and may be based on GDT: TimeSeriesPeriodID. The UpperBoundaryTimeSeriesPeriodID is the upper boundary of the TimeSeriesPeriodID interval, and may be based on GDT: TimeSeriesPeriodID.

A SelectionBySupplyNetworkPlanningAggregateHierarchyAggregateInstanceID is an interval for SupplyNetworkPlanningAggregateHierarchyAggregateInstanceIDs. In this context a SupplyNetworkPlanningAggregateHierarchyAggregateInstance defines the planning level (e.g., location) for which the KeyFigureValueDetail should be read. SelectionBySupplyNetworkPlanningAggregateHierarchyAggregateInstanceID may be based on IDT: SelectionBySupplyNetworkPlanningAggregateHierarchyAggregateInstanceID. In some implementations, SelectionBySupplyNetworkPlanningAggregateHierarchyAggregateInstanceID can include the InclusionExclusionCode, IntervalBoundaryTypeCode, LowerBoundarySupplyNetworkPlanningAggregateHierarchyAggregateInstanceID, and UpperBoundarySupplyNetworkPlanningAggregateHierarchyAggregateInstanceID elements. The InclusionExclusionCode defines if the interval defined by IntervalBoundaryTypeCode, LowerBoundarySupplyNetworkPlanningAggregateHierarchyAggregateInstanceID, and UpperBoundarySupplyNetworkPlanningAggregateHierarchyAggregateInstanceID is included in the result set or excluded. InclusionExclusionCode may be based on GDT: InclusionExclusionCode. The IntervalBoundaryTypeCode is a coded representation of an interval boundary type, and may be based on GDT: IntervalBoundaryTypeCode. The LowerBoundarySupplyNetworkPlanningAggregateHierarchyAggregateInstanceID is the lower boundary of the SupplyNetworkPlanningAggregateHierarchyAggregateInstanceID interval, and may be based on GDT: SupplyNetworkPlanningAggregateHierarchyAggregateInstanceID. The UpperBoundarySupplyNetworkPlanningAggregateHierarchyAggregateInstanceID is the upper boundary of the SupplyNetworkPlanningAggregateHierarchyAggregateInstanceID interval, and may be based on GDT: SupplyNetworkPlanningAggregateHierarchyAggregateInstanceID. In some implementations, the intervals SelectionByKeyFigureID, SelectionByTimeSeriesPeriodID and SelectionBySupplyNetworkPlanningAggregateHierarchyAggregateInstanceID support an InclusionExclusionCode of ‘I’ (indicating Inclusion) and an IntervalBoundaryTypeCode ‘1’ (indicating Single Value).

Message Data Type SupplyNetworkPlanKeyFigureValueDetailByElementsResponseMessage_sync The message data type SupplyNetworkPlanKeyFigureValueDetailByElementsResponseMessage_sync includes the SupplyNetworkPlan and KeyFigureValue included in the business document. It includes the following packages: MessageHeader, SupplyNetworkPlan, and Log. The SupplyNetworkPlan package groups the SupplyNetworkPlan and the KeyFigureValue with the KeyfigureValueDetail entity. The SupplyNetworkPlanKeyfigureValue package includes the entities SupplyNetworkPlan and KeyFigureValue. In some implementations, the SupplyNetworkPlan includes the ID element, which is a unique identifier for a SupplyNetworkPlan. A SupplyNetworkPlan is the forecasted supply plan of products or product lines in a network based on future demands. Furthermore, the SupplyNetworkPlan also includes the historical supply of products or product lines in a network. ID may be based on GDT: SupplyNetworkPlanID.

A KeyFigureValue is a single planning value for a key figure assigned to a certain time period. In some implementations, the KeyFigureValue includes the KeyFigureID, TimeSeriesPeriodID, and SupplyNetworkPlanningAggregateHierarchyAggregateInstanceID elements. KeyFigureID is a unique identifier of a SupplyNetworkPlanKeyFigure. In this context, a SupplyNetworkPlanKeyFigure represents a planning parameter which holds a numerical planning data value assigned to a planning object for a time period (e.g., week, month). KeyFigureID may be based on GDT: SupplyNetworkPlanKeyFigureID. TimeSeriesPeriodID is a unique identifier of a TimeSeriesPeriod. In this context, a TimeSeriesPeriod defines the time range of a KeyFigureValue of a SupplyNetworkPlan as well as the periodicity. TimeSeriesPeriod may be based on GDT: TimeSeriesPeriodID. SupplyNetworkPlanningAggregateHierarchyAggregateInstanceID is a unique identifier of a SupplyNetworkPlanningAggregateHierarchyAggregateInstance. In this context, a SupplyNetworkPlanningAggregateHierarchyAggregateInstanceID defines the planning level (e.g., location) for which the KeyFigureValueDetail was read. SupplyNetworkPlanningAggregateHierarchyAggregateInstanceID may be based on GDT:

SupplyNetworkPlanningAggregateHierarchyAggregateInstanceID.

The KeyFigureValue package includes the KeyFigureValueDetail entity. A KeyFigureValueDetail defines the details of a KeyFigureValue. In some implementations, the entity KeyFigureValueDetail includes the following elements: ID, Description, GroupID, ProductInternalID, PredecessorProductInternalID, SuccessorProductInternalID, SourceSupplyPlanningAreaID, DestinationSupplyPlanningAreaID, FixedIndicator, RequirementQuantity, OriginalQuantity, ConfirmedQuantity, RequestedQuantity, VariableQuantity, SourceOfSupplyReference, SourceOfSupplyDescription, TransportMeansDescriptionCode, TransportMeansDescriptionCodeName, TransportationPriorityValue, AvailabilityDateTime, and ProcessingDateTimePeriod. ID is a unique identifier for a SupplyNetworkPlanKeyFigureValueDetail, and may be based on GDT: SupplyNetworkPlanKeyFigureValueDetailID. SupplyNetworkPlanKeyFigureValueDetailDescription is a description for a SupplyNetworkPlanKeyFigureValueDetail. In this context the SupplyNetworkPlanKeyFigureValueDetailDescription describes the business meaning of a KeyFigureValueDetail. Description may be based on GDT: SHORT_Description. A SupplyNetworkPlanKeyFigureValueDetailGroupID is a unique Identifier for a group in a SupplyNetworkPlanKeyFigureValueDetail. In this context a KeyFigureValueDetailGroupID identifies KeyFigureValueDetails which belong to the same group of KeyFigureValueDetails. SupplyNetworkPlanKeyFigureValueDetailGroupID may be based on GDT: SupplyNetworkPlanKeyFigureValueDetailGroupID.

A ProductInternalID is a proprietary identifier for a product. In this context the ProductInternalID identifies the product of a KeyFigureValueDetail, and may be based on GDT: ProductInternalID. In this context, the PredecessorProductInternalID identifies the predecessor product for a ProductInternalID of a KeyFigureValueDetail. ProductInternalID may be based on GDT: ProductInternalID. SuccessorProductInternalID is a proprietary identifier for a product. In this context the SuccessorProductInternalID identifies the successor product for a ProductInternalID of a KeyFigureValueDetail. ProductInternalI may be based on GDT: ProductInternalID. A SupplyPlanningAreaID is a unique identifier of a SupplyPlanningArea. In this context, the SupplyPlanningAreaID identifies the source SupplyPlanningArea of a KeyFigureValueDetail. SupplyPlanningAreaID may be based on GDT: SupplyPlanningAreaID. DestinationSupplyPlanningAreaID is a unique identifier of a SupplyPlanningArea. In this context, the DestinationSupplyPlanningAreaID identifies the destination SupplyPlanningAreaID of a KeyFigureValueDetail. DestinationSupplyPlanningAreaID may be based on GDT: SupplyPlanningAreaID. A FixedIndicator indicates whether a value/object is fixed or not. In this context, the FixedIndicator defines whether the KeyFigureValueDetail can be overwritten by a planning logic. FixedIndicator may be based on CDT: Indicator and Qualifier: Fixed. RequirementQuantity is a quantity of a material that is requested by a requirement. RequirementQuantity may be based on GDT: Quantity and Qualifier: Requirement. OriginalQuantity is an Original Quantity (with Definition of Qualifier as Original). In this context, the OriginalQuantity of a KeyFigureValueDetail is its quantity when creating the KeyFigureValueDetail. OriginalQuantity may be based on GDT: Quantity and Qualifier: Original. ConfirmedQuantity is a Quantity which is confirmed, and may be based on GDT: Quantity and Qualifier: Confirmed. RequestedQuantity is a Quantity that is requested, and may be based on GDT: Quantity and Qualifier: Requested. VariableQuantity is a Quantity that is defined dependent on a reference value. In this context, the VariableQuantity of a KeyFigureValueDetail references to either one of the following quantities: RequirementQuantity, OriginalQuantity, ConfirmedQuantity, or RequestedQuantity. The quantity referenced by the VariableQuantity is specified in Supply and Demand Matching. VariableQuantity may be based on GDT: Quantity and Qualifier: Variable.

SourceOfSupplyReference is a unique reference to a source of supply or to a LogisticRelationship within a source of supply. In this context, a SourceOfSupplyReference defines the source of supply from which the quantities of a KeyFigureValueDetail are procured. SourceOfSupplyReference may be based on GDT: SourceOfSupplyReference. SourceOfSupplyDescription is a description for the SourceOfSupplyReference. SourceOfSupplyDescription may be based on GDT: MEDIUM Description. The TransportMeansDescriptionCode is a coded representation of the transport means type with which goods or persons are to be transported (e.g., road tanker, barge, airplane, refrigerated road tanker, etc.). It identifies the means of transport used for the KeyFigureValueDetail, and may be based on GDT: TransportMeansDescriptionCode. The TransportMeansDescriptionCodeName names the TransportMeansDescriptionCode, and may be based on GDT: MEDIUM_Name. TransportationPriorityValue is the value-based specification of a priority. In this context the TransportationPriorityValue describes the transportation priority of the KeyFigureValueDetail. TransportationPriorityValue may be based on GDT: PriorityValue. AvailabilityDateTime is a time point at which something is available. In this context, the AvailabilityDateTime defines the time-point when the quantity of the KeyFigureValueDetail will be available. AvailabilityDateTime may be based on GDT: GLOBAL_DateTime. ProcessingDateTimePeriod is a period that is defined by two points in time. It includes the start time-point, but excludes the end time-point. In this context, the ProcessingDateTimePeriod defines the processing period of a KeyFigureValueDetail, and may be based on GDT: UPPEROPEN_GLOBAL_DateTimePeriod.

Message Data Type SupplyNetworkPlanFunctionExecuteRequestMessage_sync

The message data type SupplyNetworkPlanFunctionExecuteRequestMessage_sync includes the SupplyNetworkPlan included in the business document. It includes the following packages: MessageHeader and SupplyNetworkPlan. The SupplyNetworkPlan package groups the SupplyNetworkPlan with the Function package. The SupplyNetworkPlan package includes the entity SupplyNetworkPlan. In some implementations, the SupplyNetworkPlan includes the ID element, which is a unique identifier for a SupplyNetworkPlan. A SupplyNetworkPlan is the forecasted supply plan of products or product lines in a network based on future demands. Furthermore, the SupplyNetworkPlan also includes the historical supply of products or product lines in a network. ID may be based on GDT: SupplyNetworkPlanID. ID can include SupplyNetworkPlanningAggregateHierarchyID, which is a unique identifier for a SupplyNetworkPlanningAggregateHierarchy. A SupplyNetworkPlanningAggregateHierarchy is a hierarchy of different aggregates which are the planning levels in supply network planning. In this context the SupplyNetworkPlanningAggregateHierarchy defines the planning levels (e. g. location) on which the SupplyNetworkPlanConfigurationFunctions are executed. SupplyNetworkPlanningAggregateHierarchyID may be based on GDT: SupplyNetworkPlanningAggregateHierarchyID.

The Function package includes the Function entity. A Function is an algorithm which can be executed on a SupplyNetworkPlan. In some implementations, the entity Function includes the following elements: SupplyNetworkPlanConfigurationFunctionID and RowOrdinalNumberValue. A SupplyNetworkPlanConfigurationFunctionID is a unique identifier for a Function in a SupplyNetworkPlanConfiguration. A SupplyNetworkPlanConfigurationFunction is an algorithm which can be executed on a SupplyNetworkPlan for example, to calculate the stock balance. SupplyNetworkPlanConfigurationFunctionID may be based on GDT: SupplyNetworkPlanConfigurationFunctionID. RowOrdinalNumberValue is a number indicating the position of a row in a table. In this context the RowOrdinalNumberValue indicates the sequence in which the SupplyNetworkPlanConfigurationFunctions are executed. RowOrdinalNumberValue may be based on CDT: OrdinalNumberValue and Qualifier: Row.

Message Data Type SupplyNetworkPlanFunctionExecuteConfirmationMessage_sync

The message data type SupplyNetworkPlanFunctionExecuteConfirmationMessage_sync includes the SupplyNetworkPlan included in the business document. It includes the following packages: MessageHeader, SupplyNetworkPlan, and Log. The SupplyNetworkPlan package groups the SupplyNetworkPlan with the Function package. The SupplyNetworkPlan package includes the entity SupplyNetworkPlan. In some implementations, the SupplyNetworkPlan includes the ID element, which is a unique identifier for a SupplyNetworkPlan. A SupplyNetworkPlan is the forecasted supply plan of products or product lines in a network based on future demands. Furthermore, the SupplyNetworkPlan also includes the historical supply of products or product lines in a network. ID may be based on GDT: SupplyNetworkPlanID. In some implementations, ID can include SupplyNetworkPlanningAggregateHierarchyID, which is a unique identifier for a SupplyNetworkPlanningAggregateHierarchy. A SupplyNetworkPlanningAggregateHierarchy is a hierarchy of different aggregates which are the planning levels in supply network planning. In this context the SupplyNetworkPlanningAggregateHierarchy defines the planning levels (e.g., locations) on which the SupplyNetworkPlanConfigurationFunctions are executed. SupplyNetworkPlanningAggregateHierarchyID may be based on GDT: SupplyNetworkPlanningAggregateHierarchyID.

The Function package includes the Function entity. A Function is an algorithm which can be executed on a SupplyNetworkPlan. In some implementations, the entity Function includes the following elements: RowOrdinalNumberValue and SupplyNetworkPlanConfigurationFunctionID. RowOrdinalNumberValue is a number indicating the position of a row in a table. In this context the RowOrdinalNumberValue indicates the sequence in which the SupplyNetworkPlanFunctions were executed. RowOrdinalNumberValue may be based on CDT: OrdinalNumberValue and Qualifier: Row. SupplyNetworkPlanConfigurationFunctionID is a unique identifier for a Function in a SupplyNetworkPlanConfiguration. A SupplyNetworkPlanConfigurationFunction is an algorithm which was executed on a SupplyNetworkPlan, for example, to calculate a stock balance. SupplyNetworkPlanConfigurationFunctionID may be based on GDT: SupplyNetworkPlanConfigurationFunctionID.

Supply Network Plan Configuration Interfaces

The purpose of Supply Network Planning (SNP) is to create a long or midterm production or distribution plan which is called SupplyNetworkPlan. A SupplyNetworkPlanConfiguration is the configuration required to access a SupplyNetworkPlan. The Supply Network Planning Processor uses the SupplyNetworkPlanConfiguration interfaces which are provided by Supply and Demand Matching to create a user interface which is used by a person who is responsible to create and change the SupplyNetworkPlan.

Figure 57:
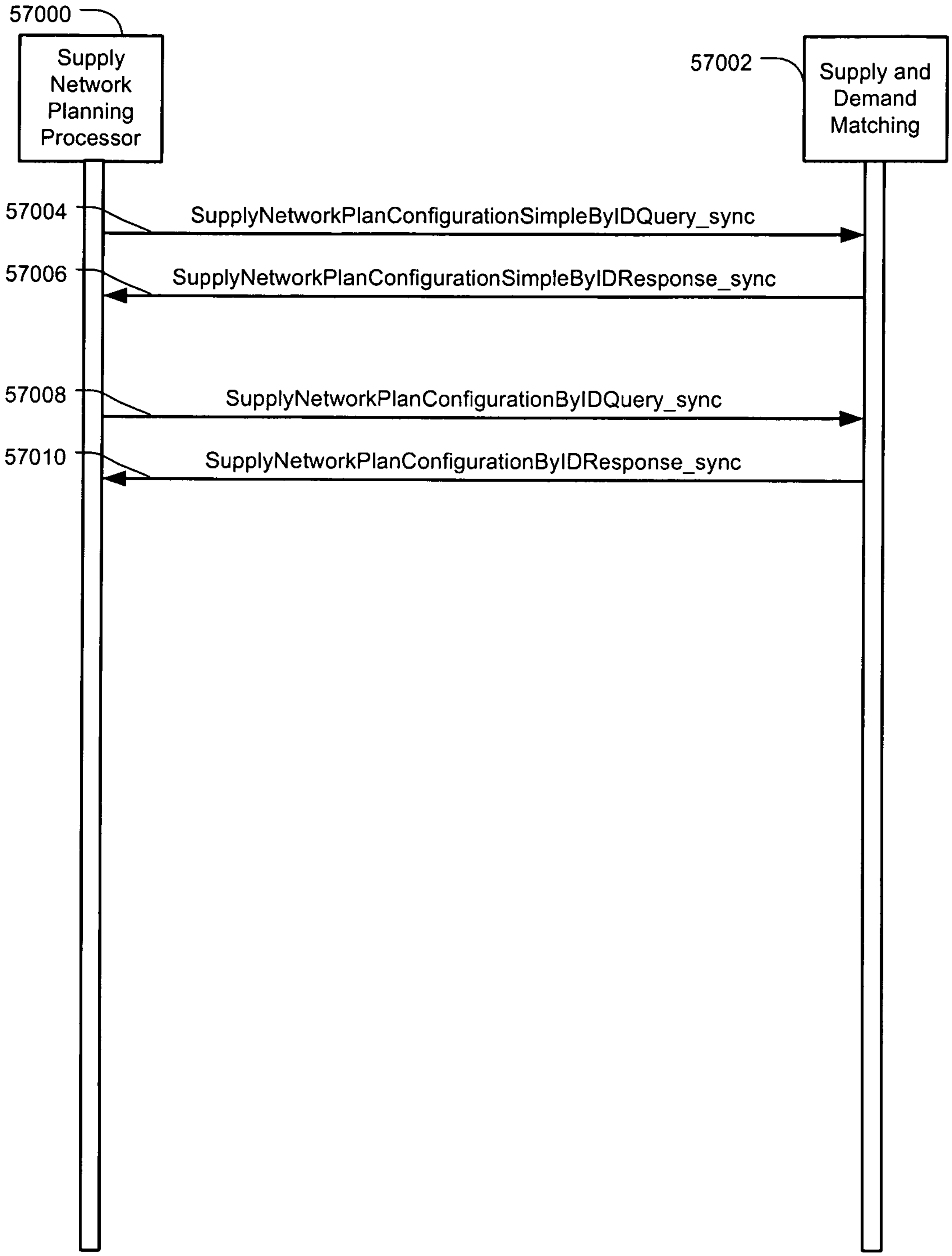
FIG. 57 shows an exemplary SupplyNetworkPlanConfiguration Message Choreography.

The message choreography of FIG. 57 describes a possible logical sequence of messages that can be used to realize a Supply Network Plan Configuration business scenario.

A "Supply Network Planning Processor" system 57000 can query supply network plan configurations using a SupplyNetworkPlanConfigurationSimpleByIDQuery_sync message 57004 as shown, for example, in FIG. 57. A "Supply and Demand Matching" system 57002 can respond to the query using a SupplyNetworkPlanConfigurationSimpleByIDResponse_sync message 57006 as shown, for example, in FIG. 57.

The "Supply Network Planning Processor" system 57000 can further query supply network plan configurations using a SupplyNetworkPlanConfigurationByIDQuery_sync message 57008 as shown, for example, in FIG. 57. The "Supply and Demand Matching" system 57002 can respond to the query using a SupplyNetworkPlanConfigurationByIDResponse_sync message 57010 as shown, for example, in FIG. 57.

Figure 58:
FIG. 58 shows an exemplary SupplyNetworkPlanConfiguration Message Choreography.

The message choreography of FIG. 58 describes another possible logical sequence of messages that can be used to realize a Supply Network Plan Configuration business scenario.

A "Supply Network Planning Processor" system 58000 can request the creation of a supply network plan configuration selection using a SupplyNetworkPlanConfigurationSelectionCreateRequest_sync message 58004 as shown, for example, in FIG. 58. A "Supply and Demand Matching" system 58002 can confirm the request using a SupplyNetworkPlanConfigurationSelectionCreateConfirmation_sync message 58006 as shown, for example, in FIG. 58.

The "Supply Network Planning Processor" system 58000 can request the change of a supply network plan configuration selection using a SupplyNetworkPlanConfigurationSelectionChangeRequest_sync message 58008 as shown, for example, in FIG. 58. The "Supply and Demand Matching" system 58002 can confirm the request using a SupplyNetworkPlanConfigurationSelectionChangeConfirmation_sync message 58010 as shown, for example, in FIG. 58.

The "Supply Network Planning Processor" system 58000 can request the cancellation of a supply network plan configuration selection using a SupplyNetworkPlanConfigurationSelectionCancelRequest_sync message 58012 as shown, for example, in FIG. 58. The "Supply and Demand Matching" system 58002 can confirm the request using a SupplyNetworkPlanConfigurationSelectionCancelConfirmation_sync message 58014 as shown, for example, in FIG. 58.

The "Supply Network Planning Processor" system 58000 can query supply network plan configuration selections using a SupplyNetworkPlanConfigurationSelectionByIDQuery_sync message 58016 as shown, for example, in FIG. 58. The "Supply and Demand Matching" system 58002 can respond to the query using a SupplyNetworkPlanConfigurationSelectionByIDResponse_sync message 58018 as shown, for example, in FIG. 58.

A SupplyNetworkPlanConfigurationByIDQuery_sync is an inquiry for a SupplyNetworkPlanConfiguration. The structure of the message type SupplyNetworkPlanConfigurationByIDQuery_sync is specified by the message data type SupplyNetworkPlanConfigurationByIDQueryMessage_sync.

A SupplyNetworkPlanConfigurationByIDResponse_sync is a response from Supply and Demand Matching to a SupplyNetworkPlanConfigurationByIDQuery_sync. The structure of the message type SupplyNetworkPlanConfigurationByIDResponse_sync is specified by the message data type SupplyNetworkPlanConfigurationByIDResponseMessage_sync.

A SupplyNetworkPlanConfigurationSimpleByIDQuery_sync is an inquiry for SupplyNetworkPlanConfigurations which correspond to a SupplyNetworkPlanConfigurationID-pattern. The structure of the message type SupplyNetworkPlanConfigurationSimpleByIDQuery_sync is specified by the message data type SupplyNetworkPlanConfigurationSimpleByIDQueryMessage_sync.

A SupplyNetworkPlanConfigurationSimpleByIDResponse_sync is a response from Supply and Demand Matching to a SupplyNetworkPlanConfigurationSimpleByIDQuery_sync. The structure of the message type SupplyNetworkPlanConfigurationSimpleByIDResponse_sync is specified by the message data type SupplyNetworkPlanConfigurationSimpleByIDResponseMessage_sync.

A SupplyNetworkPlanConfigurationSelectionCreateRequest_sync is a request to create a SupplyNetworkPlanConfigurationSelection. The structure of the message type SupplyNetworkPlanConfigurationSelectionCreateRequest_sync is specified by the message data type SupplyNetworkPlanConfigurationSelectionCreateRequestMessage_sync.

A SupplyNetworkPlanConfigurationSelectionCreateConfirmation_sync is a confirmation from Supply and Demand Matching to a SupplyNetworkPlanConfigurationSelectionCreateRequest_sync. The structure of the message type SupplyNetworkPlanConfigurationSelectionCreateConfirmation_sync is specified by the message data type SupplyNetworkPlanConfigurationSelectionCreateConfirmationMessage_sync.

A SupplyNetworkPlanConfigurationSelectionChangeRequest_sync is a request to change a SupplyNetworkPlanConfigurationSelection. The structure of the message type SupplyNetworkPlanConfigurationSelectionChangeRequest_sync is specified by the message data type SupplyNetworkPlanConfigurationSelectionChangeRequestMessage_sync.

A SupplyNetworkPlanConfigurationSelectionChangeConfirmation_sync is a confirmation from Supply and Demand Matching to a SupplyNetworkPlanConfigurationSelectionChangeRequest_sync. The structure of the message type SupplyNetworkPlanConfigurationSelectionChangeConfirmation_sync is specified by the message data type SupplyNetworkPlanConfigurationSelectionChangeConfirmationMessage_sync.

A SupplyNetworkPlanConfigurationSelectionCancelRequest_sync is a request to delete a SupplyNetworkPlanConfigurationSelection. The structure of the message type SupplyNetworkPlanConfigurationSelectionCancelRequest_sync is specified by the message data type SupplyNetworkPlanConfigurationSelectionCancelRequestMessage_sync.

A SupplyNetworkPlanConfigurationSelectionCancelConfirmation_sync is a confirmation from Supply and Demand Matching to a SupplyNetworkPlanConfigurationSelectionCancelRequest_sync. The structure of the message type SupplyNetworkPlanConfigurationSelectionCancelConfirmation_sync is specified by the message data type SupplyNetworkPlanConfigurationSelectionCancelConfirmationMessage_sync.

A SupplyNetworkPlanConfigurationSelectionByIDQuery_sync is an inquiry for a SupplyNetworkPlanConfigurationSelection. The structure of the message type SupplyNetworkPlanConfigurationSelectionByIDQuery_sync is specified by the message data type SupplyNetworkPlanConfigurationSelectionByIDQueryMessage_sync.

A SupplyNetworkPlanConfigurationSelectionByIDResponse_sync is a response from Supply and Demand Matching to a SupplyNetworkPlanConfigurationSelectionByIDQuery_sync. The structure of the message type SupplyNetworkPlanConfigurationSelectionByIDResponse_sync is specified by the message data type SupplyNetworkPlanConfigurationSelectionByIDResponseMessage_sync.

A number of interfaces can exist, such as SupplyNetworkPlanConfigurationByIDQueryResponse_In, SupplyNetworkPlanConfigurationSimpleByIDQueryResponse_In, SupplyNetworkPlanConfigurationSelectionCreateRequestConfirmation_In, SupplyNetworkPlanConfigurationSelectionChangeRequestConfirmation_In, SupplyNetworkPlanConfigurationSelectionCancelRequestConfirmation_In, and SupplyNetworkPlanConfigurationSelectionByIDQueryResponse_In.

Figure 59:
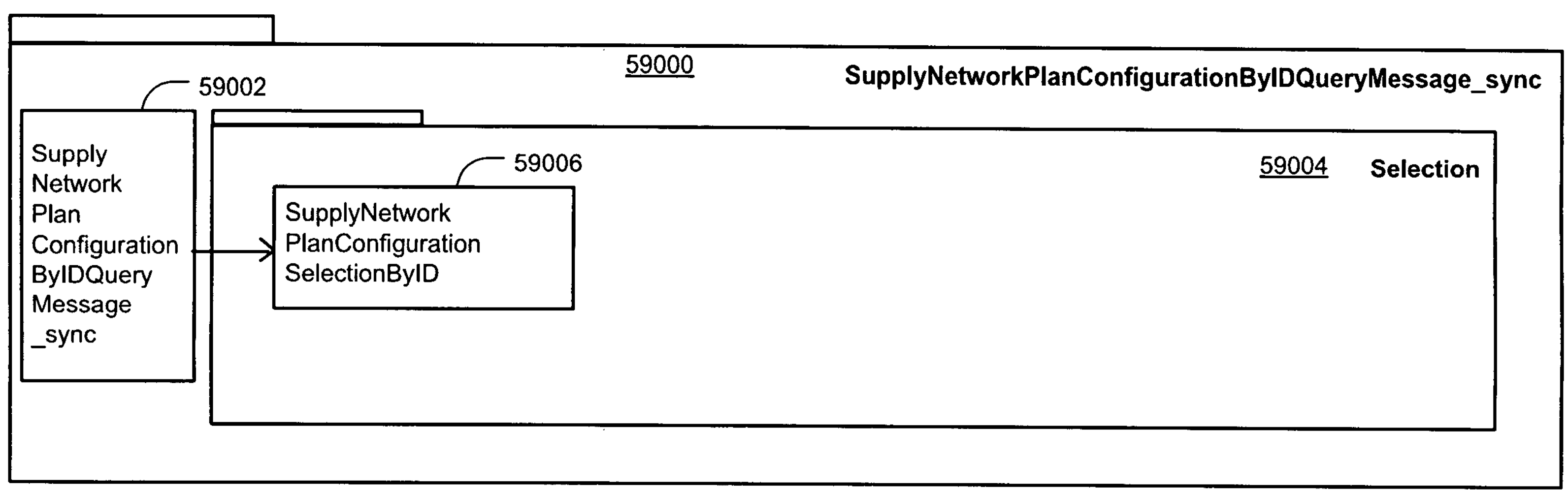
FIG. 59 shows an exemplary SupplyNetworkPlanConfigurationByIDQueryMessage_sync Message Data Type.

FIG. 59 illustrates one example logical configuration of SupplyNetworkPlanConfigurationByIDQueryMessage message 59000. Specifically, this figure depicts the arrangement and hierarchy of various components such as one or more levels of packages, entities, and datatypes, shown here as 59000 through 59006. As described above, packages may be used to represent hierarchy levels. Entities are discrete business elements that are used during a business transaction. Data types are used to type object entities and interfaces with a structure. For example, SupplyNetworkPlanConfigurationByIDQueryMessage message 59000 includes, among other things, Selection 59004. Accordingly, heterogeneous applications may communicate using this consistent message configured as such.

Figure 60:
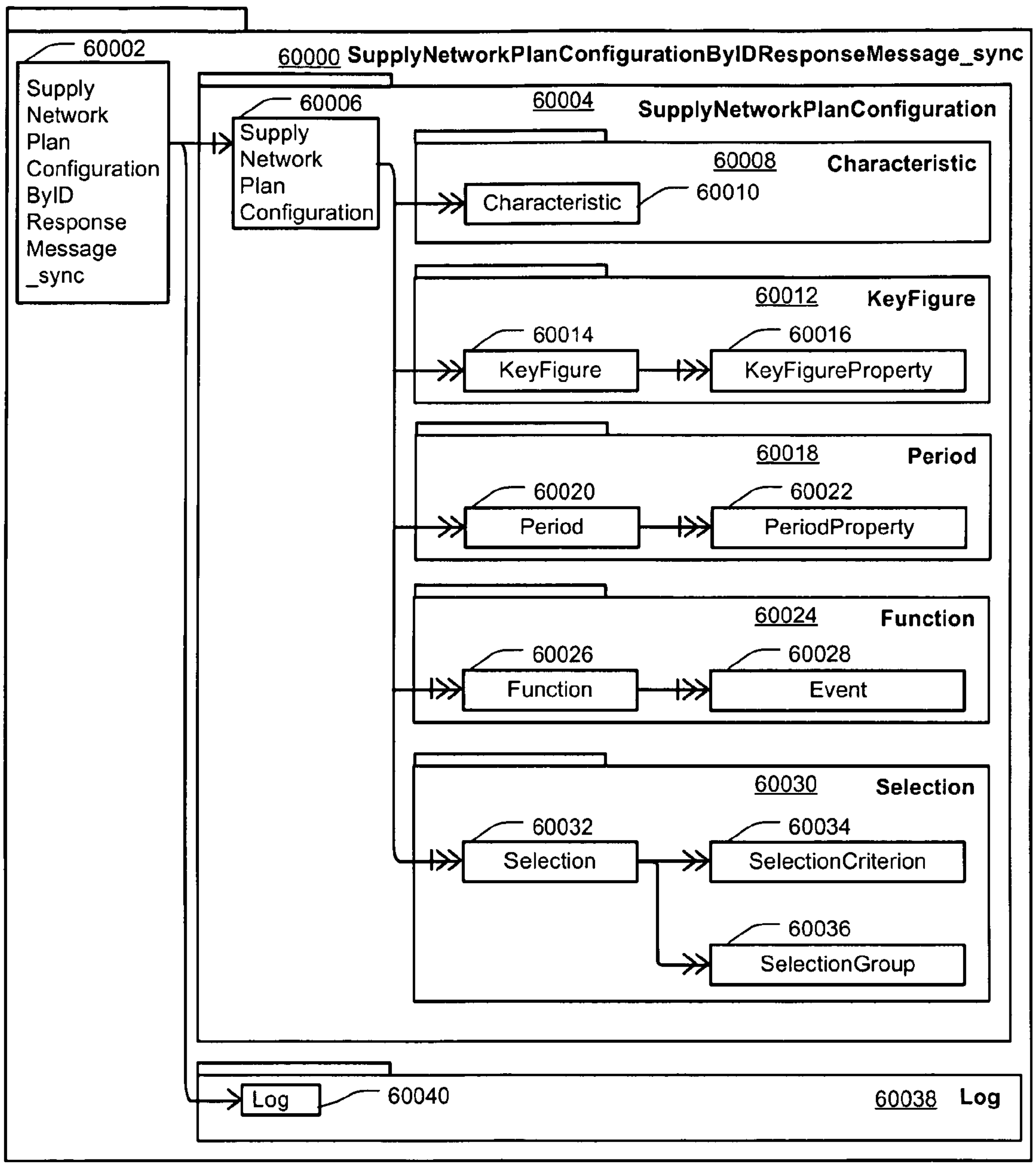
FIG. 60 shows an exemplary SupplyNetworkPlanConfigurationByIDResponseMessage_sync Message Data Type.

Additionally, FIG. 60 illustrates one example logical configuration of SupplyNetworkPlanConfigurationByIDResponseMessage message 60000. Specifically, this figure depicts the arrangement and hierarchy of various components such as one or more levels of packages, entities, and datatypes, shown here as 60000 through 60040. As described above, packages may be used to represent hierarchy levels. Entities are discrete business elements that are used during a business transaction. Data types are used to type object entities and interfaces with a structure. For example, SupplyNetworkPlanConfigurationByIDResponseMessage message 60000 includes, among other things, SupplyNetworkPlanConfiguration 60004. Accordingly, heterogeneous applications may communicate using this consistent message configured as such.

Figure 61:
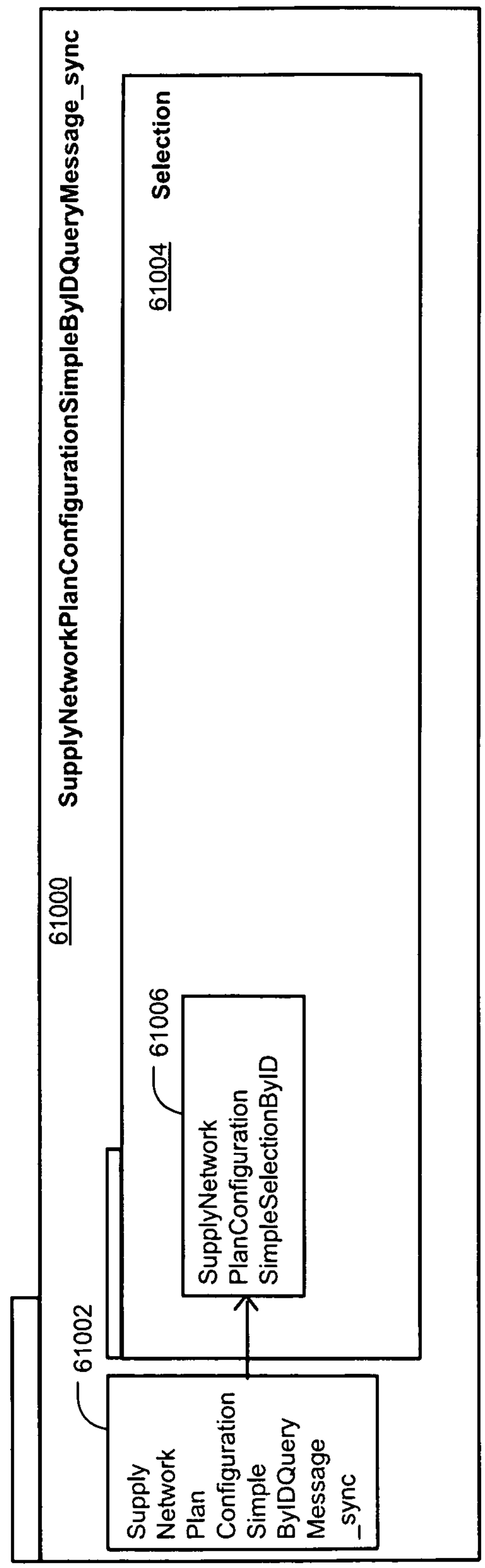
FIG. 61 shows an exemplary SupplyNetworkPlanConfigurationSimpleByIDQueryMessage_sync Message Data Type.

Additionally, FIG. 61 illustrates one example logical configuration of SupplyNetworkPlanConfigurationSimpleByIDQueryMessage message 61000. Specifically, this figure depicts the arrangement and hierarchy of various components such as one or more levels of packages, entities, and datatypes, shown here as 61000 through 61006. As described above, packages may be used to represent hierarchy levels. Entities are discrete business elements that are used during a business transaction. Data types are used to type object entities and interfaces with a structure. For example, SupplyNetworkPlanConfigurationSimpleByIDQueryMessage message 61000 includes, among other things, Selection 61004. Accordingly, heterogeneous applications may communicate using this consistent message configured as such.

Figure 62:
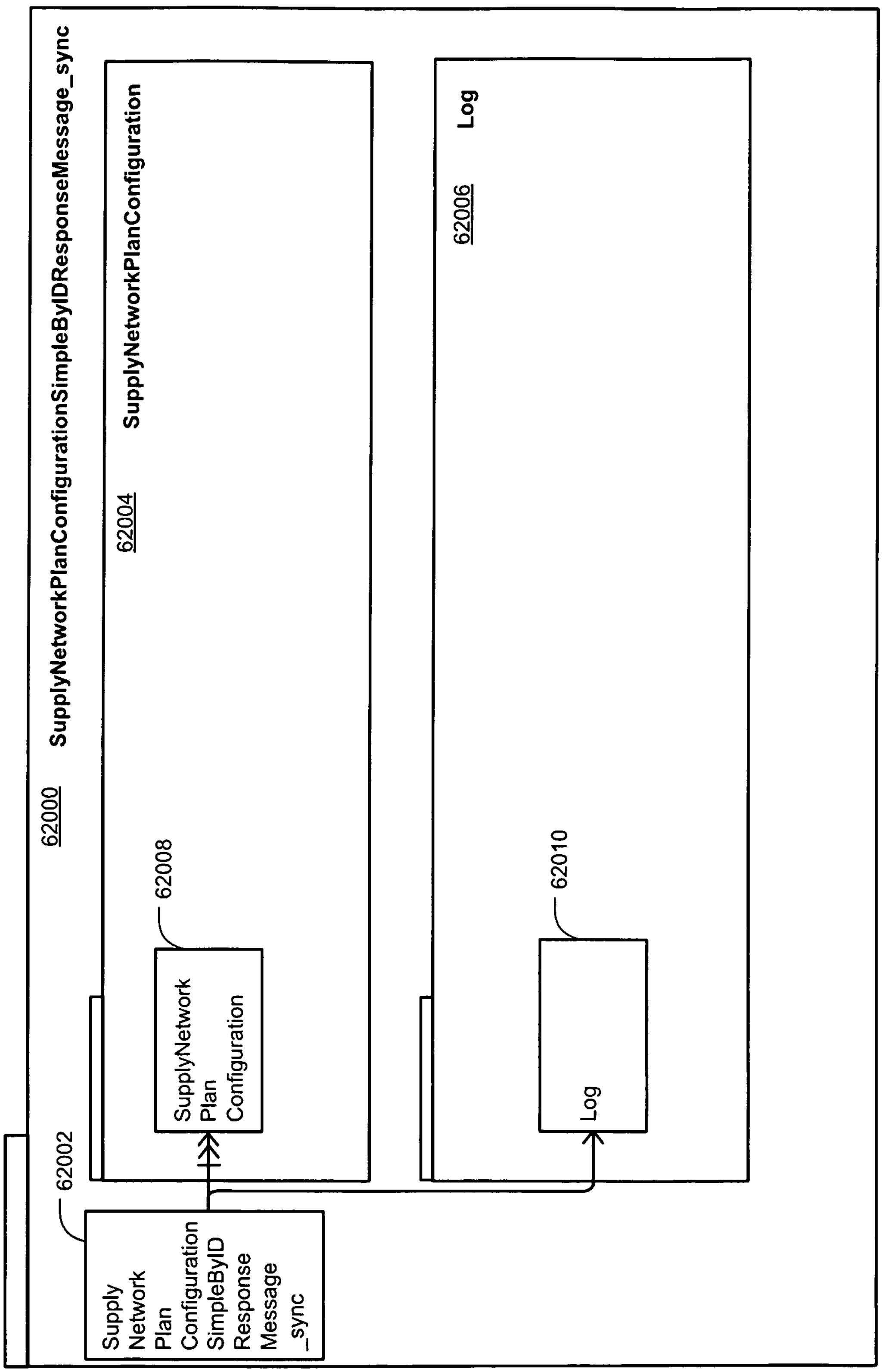
FIG. 62 shows an exemplary SupplyNetworkPlanConfigurationSimpleByIDResponseMessage_sync Message Data Type.

Additionally, FIG. 62 illustrates one example logical configuration of SupplyNetworkPlanConfigurationSimpleByIDResponseMessage message 62000. Specifically, this figure depicts the arrangement and hierarchy of various components such as one or more levels of packages, entities, and datatypes, shown here as 62000 through 62010. As described above, packages may be used to represent hierarchy levels. Entities are discrete business elements that are used during a business transaction. Data types are used to type object entities and interfaces with a structure. For example, SupplyNetworkPlanConfigurationSimpleByIDResponseMessage message 62000 includes, among other things, SupplyNetworkPlanConfiguration 62004. Accordingly, heterogeneous applications may communicate using this consistent message configured as such.

Figure 63:
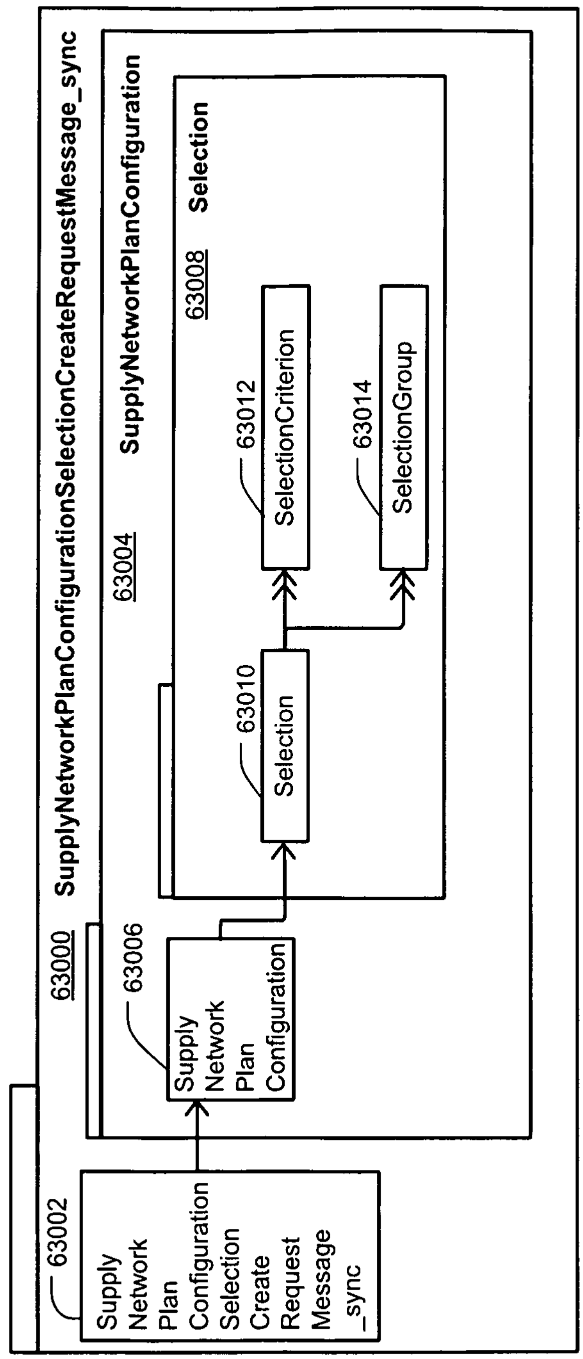
FIG. 63 shows an exemplary SupplyNetworkPlanConfigurationSelectionCreateRequestMessage_sync Message Data Type.

Additionally, FIG. 63 illustrates one example logical configuration of SupplyNetworkPlanConfigurationSelectionCreateRequestMessage message 63000. Specifically, this figure depicts the arrangement and hierarchy of various components such as one or more levels of packages, entities, and datatypes, shown here as 63000 through 63014. As described above, packages may be used to represent hierarchy levels. Entities are discrete business elements that are used during a business transaction. Data types are used to type object entities and interfaces with a structure. For example, SupplyNetworkPlanConfigurationSelectionCreateRequestMessage message 63000 includes, among other things, SupplyNetworkPlanConfiguration 63004. Accordingly, heterogeneous applications may communicate using this consistent message configured as such.

Figure 64:
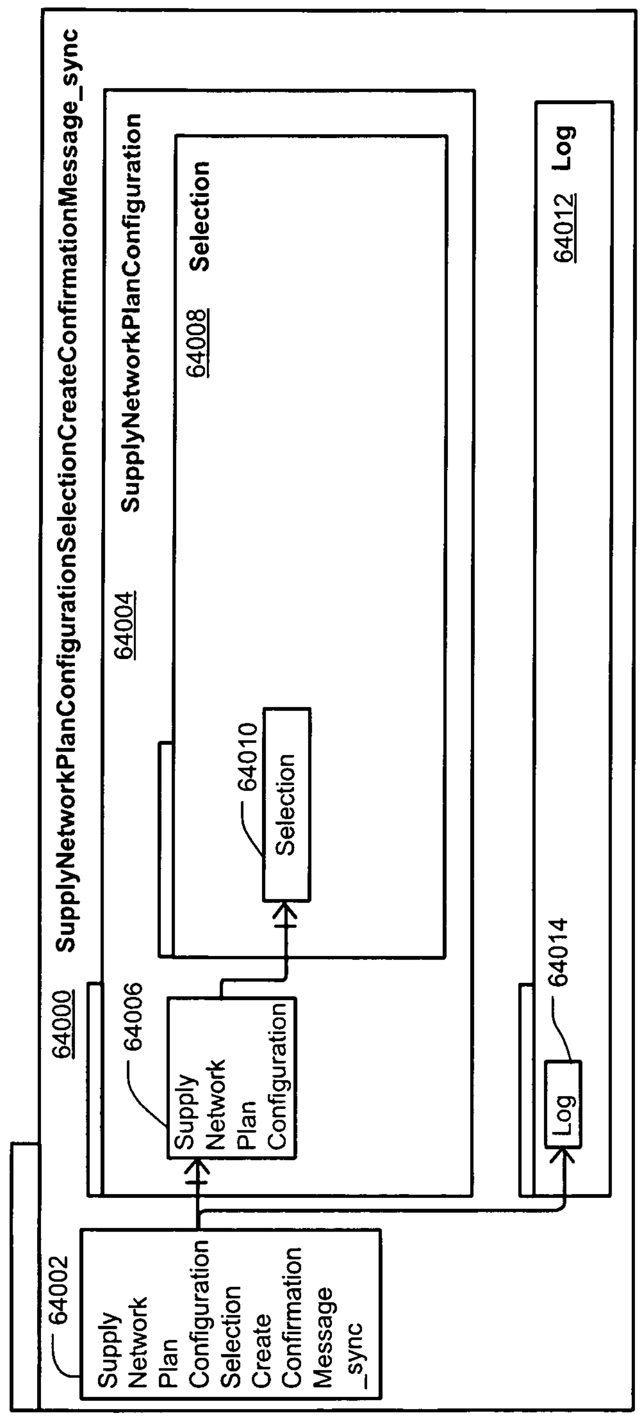
FIG. 64 shows an exemplary SupplyNetworkPlanConfigurationSelectionCreateConfirmationMessage_sync Message Data Type.

Additionally, FIG. 64 illustrates one example logical configuration of SupplyNetworkPlanConfigurationSelectionCreateConfirmationMessage message 64000. Specifically, this figure depicts the arrangement and hierarchy of various components such as one or more levels of packages, entities, and datatypes, shown here as 64000 through 64014. As described above, packages may be used to represent hierarchy levels. Entities are discrete business elements that are used during a business transaction. Data types are used to type object entities and interfaces with a structure. For example, SupplyNetworkPlanConfigurationSelectionCreateConfirmationMessage message 64000 includes, among other things, SupplyNetworkPlanConfirmation 64004. Accordingly, heterogeneous applications may communicate using this consistent message configured as such.

Figure 65:
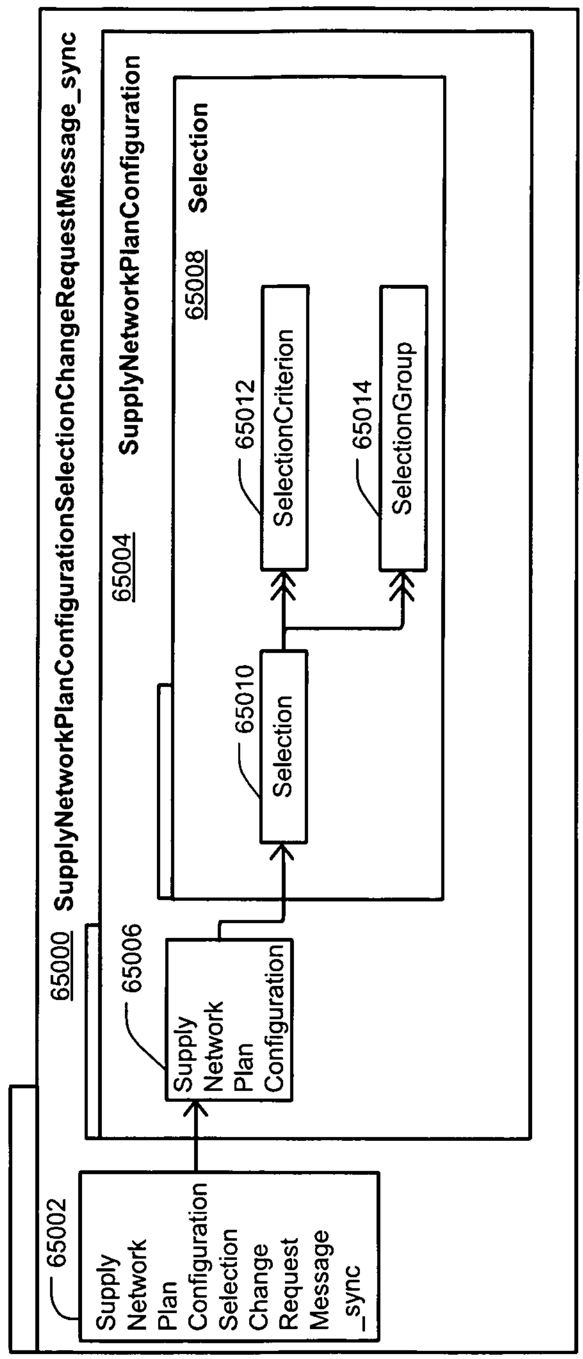
FIG. 65 shows an exemplary SupplyNetworkPlanConfigurationSelectionChangeRequestMessage_sync Message Data Type.

Additionally, FIG. 65 illustrates one example logical configuration of SupplyNetworkPlanConfigurationSelectionChangeRequestMessage message 65000. Specifically, this figure depicts the arrangement and hierarchy of various components such as one or more levels of packages, entities, and datatypes, shown here as 65000 through 65014. As described above, packages may be used to represent hierarchy levels. Entities are discrete business elements that are used during a business transaction. Data types are used to type object entities and interfaces with a structure. For example, SupplyNetworkPlanConfigurationSelectionChangeRequestMessage message 65000 includes, among other things, SupplyNetworkPlanConfiguration 65008. Accordingly, heterogeneous applications may communicate using this consistent message configured as such.

Figure 66:
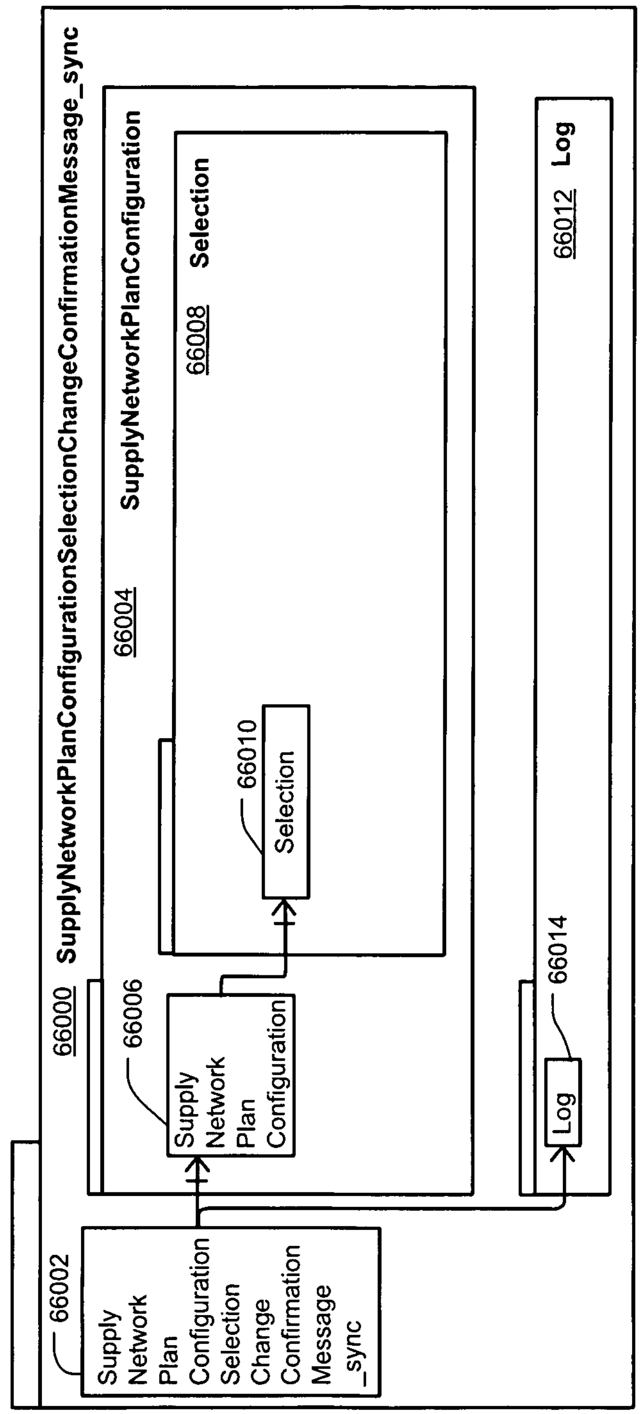
FIG. 66 shows an exemplary SupplyNetworkPlanConfigurationSelectionChangeConfirmationMessage_sync Message Data Type.

Additionally, FIG. 66 illustrates one example logical configuration of SupplyNetworkPlanConfigurationSelectionChangeConfirmationMessage message 66000. Specifically, this figure depicts the arrangement and hierarchy of various components such as one or more levels of packages, entities, and datatypes, shown here as 66000 through 66014. As described above, packages may be used to represent hierarchy levels. Entities are discrete business elements that are used during a business transaction. Data types are used to type object entities and interfaces with a structure. For example, SupplyNetworkPlanConfigurationSelectionChangeConfirmationMessage message 66000 includes, among other things, SupplyNetworkPlanConfiguration 66004. Accordingly, heterogeneous applications may communicate using this consistent message configured as such.

Figure 67:
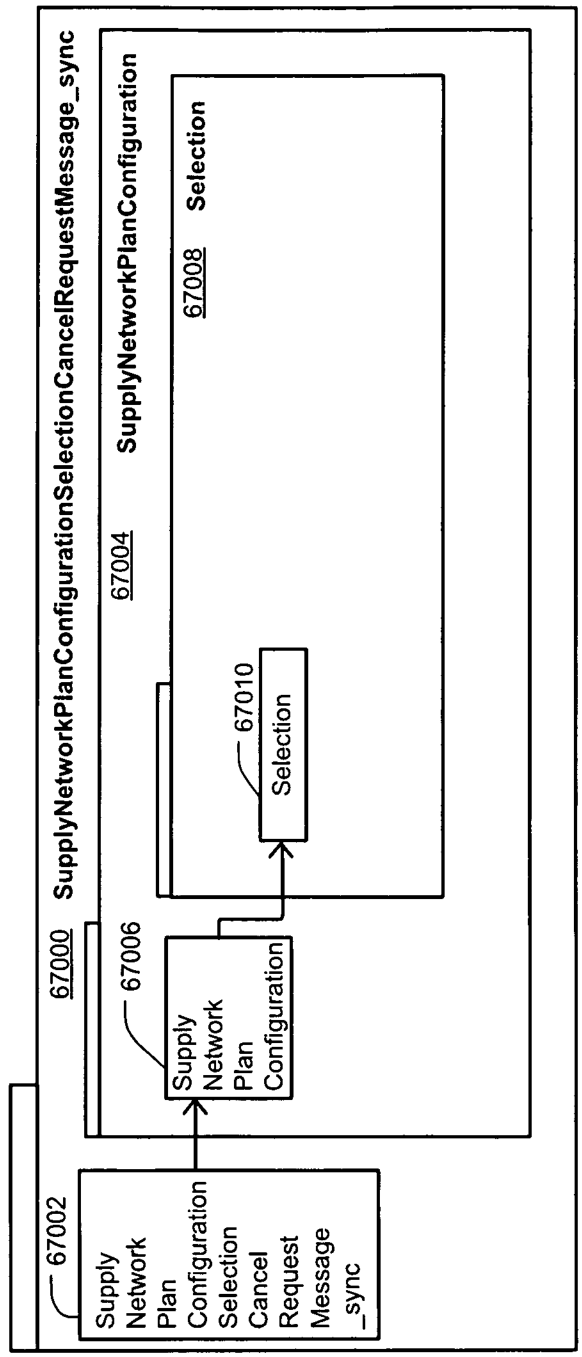
FIG. 67 shows an exemplary SupplyNetworkPlanConfigurationSelectionCancelRequestMessage_sync Message Data Type.

Additionally, FIG. 67 illustrates one example logical configuration of SupplyNetworkPlanConfigurationSelectionCancelRequestMessage message 67000. Specifically, this figure depicts the arrangement and hierarchy of various components such as one or more levels of packages, entities, and datatypes, shown here as 67000 through 67010. As described above, packages may be used to represent hierarchy levels. Entities are discrete business elements that are used during a business transaction. Data types are used to type object entities and interfaces with a structure. For example, SupplyNetworkPlanConfigurationSelectionCancelRequestMessage message 67000 includes, among other things, SupplyNetworkPlanConfiguration 67004. Accordingly, heterogeneous applications may communicate using this consistent message configured as such.

Figure 68:
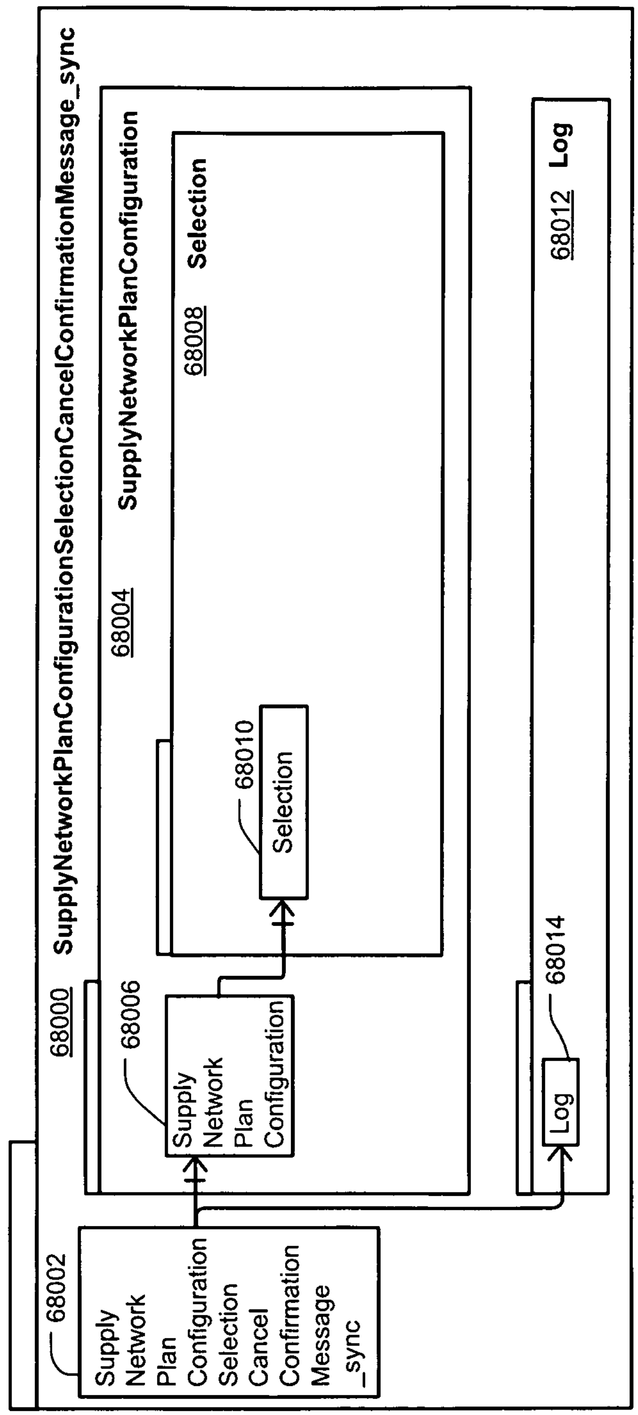
FIG. 68 shows an exemplary SupplyNetworkPlanConfigurationSelectionCancelConfirmationMessage_sync Message Data Type.

Additionally, FIG. 68 illustrates one example logical configuration of SupplyNetworkPlanConfigurationSelectionCancelConfirmationMessage message 68000. Specifically, this figure depicts the arrangement and hierarchy of various components such as one or more levels of packages, entities, and datatypes, shown here as 68000 through 68014. As described above, packages may be used to represent hierarchy levels. Entities are discrete business elements that are used during a business transaction. Data types are used to type object entities and interfaces with a structure. For example, SupplyNetworkPlanConfigurationSelectionCancelConfirmationMessage message 68000 includes, among other things, SupplyNetworkPlanConfirmation 68004. Accordingly, heterogeneous applications may communicate using this consistent message configured as such.

Figure 69:
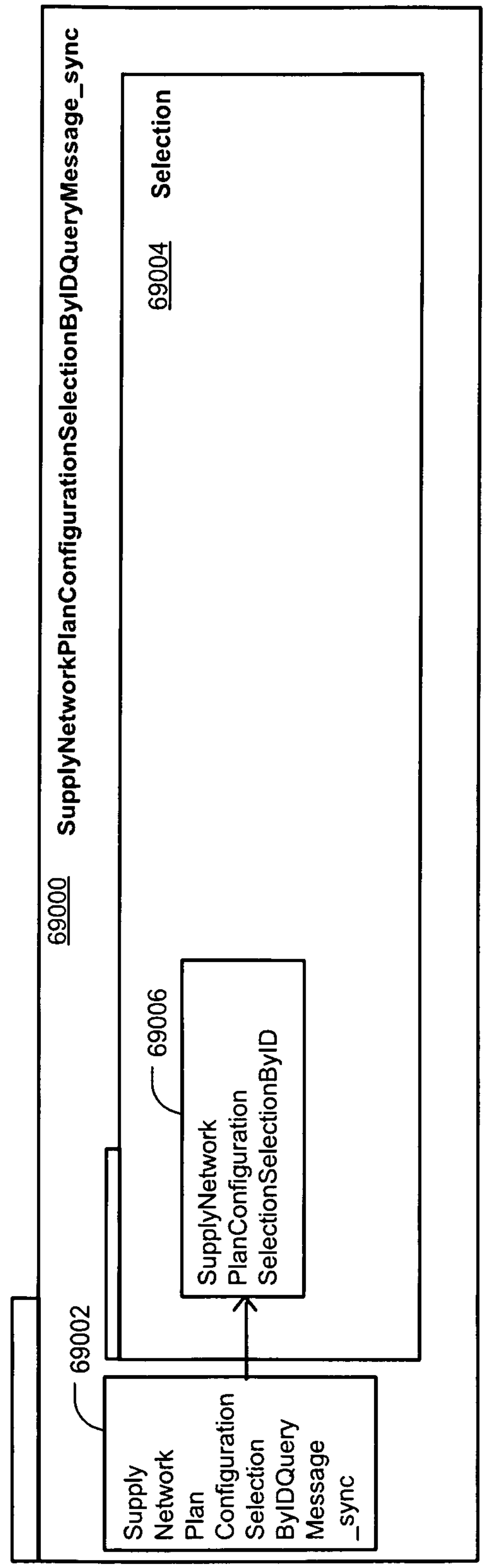
FIG. 69 shows an exemplary SupplyNetworkPlanConfigurationSelectionByIDQueryMessage_sync Message Data Type.

Additionally, FIG. 69 illustrates one example logical configuration of SupplyNetworkPlanConfigurationSelectionByIDQueryMessage message 69000. Specifically, this figure depicts the arrangement and hierarchy of various components such as one or more levels of packages, entities, and datatypes, shown here as 69000 through 69006. As described above, packages may be used to represent hierarchy levels. Entities are discrete business elements that are used during a business transaction. Data types are used to type object entities and interfaces with a structure. For example, SupplyNetworkPlanConfigurationSelectionByIDQueryMessage message 69000 includes, among other things, Selection 69004. Accordingly, heterogeneous applications may communicate using this consistent message configured as such.

Figure 70:
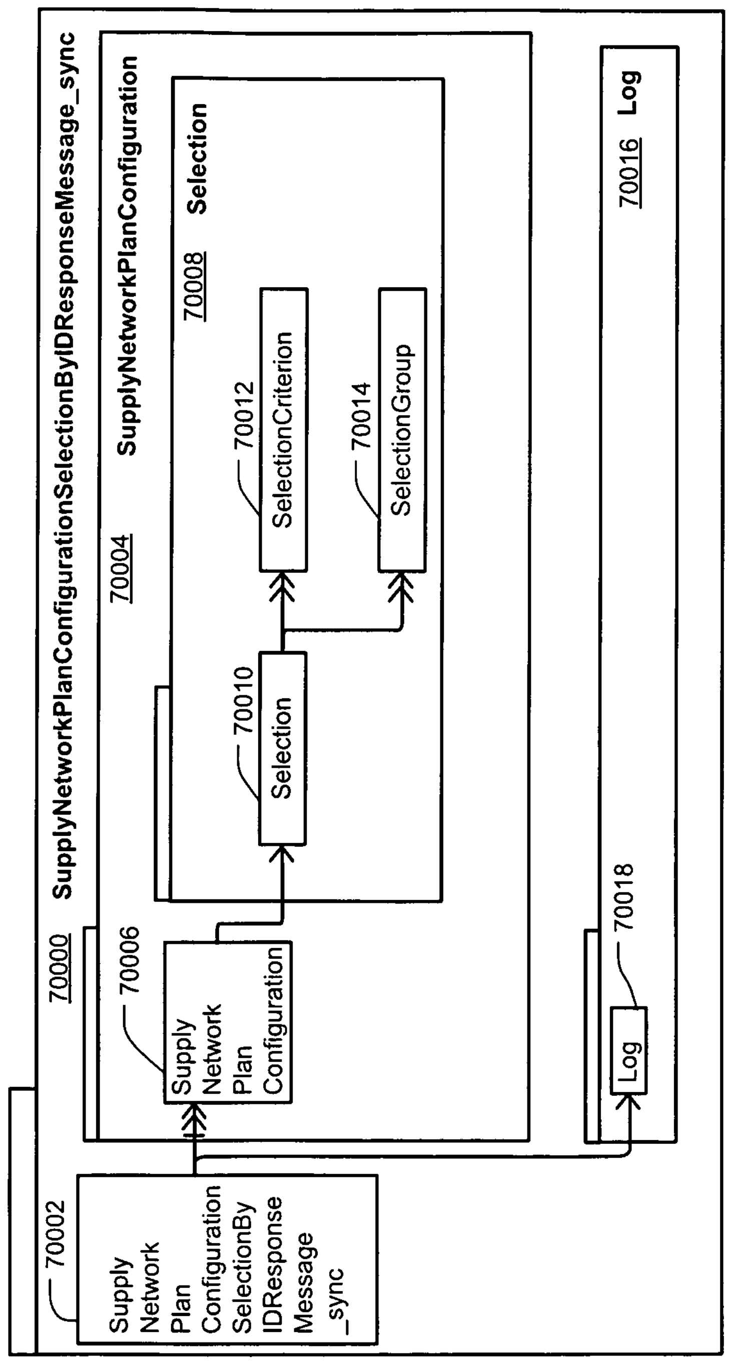
FIG. 70 shows an exemplary SupplyNetworkPlanConfigurationSelectionByIDResponseMessage_sync Message Data Type.

Additionally, FIG. 70 illustrates one example logical configuration of SupplyNetworkPlanConfigurationSelectionByIDResponseMessage message 70000. Specifically, this figure depicts the arrangement and hierarchy of various components such as one or more levels of packages, entities, and datatypes, shown here as 70000 through 70018. As described above, packages may be used to represent hierarchy levels. Entities are discrete business elements that are used during a business transaction. Data types are used to type object entities and interfaces with a structure. For example, SupplyNetworkPlanConfigurationSelectionByIDResponseMessage message 70000 includes, among other things, SupplyNetworkPlanConfiguration 70004. Accordingly, heterogeneous applications may communicate using this consistent message configured as such.

FIG. 71 illustrates one example logical configuration of a SupplyNetworkPlanConfigurationByIDQueryMessage_sync 71000 element structure. Specifically, this figure depicts the arrangement and hierarchy of various components such as one or more levels of packages, entities, and datatypes, shown here as 71000 through 71016. As described above, packages may be used to represent hierarchy levels. Entities are discrete business elements that are used during a business transaction. Data types are used to type object entities and interfaces with a structure. For example, the SupplyNetworkPlanConfigurationByIDQueryMessage_sync 71000 includes, among other things, a SupplyNetworkPlanConfigurationByIDQueryMessage_sync 71002. Accordingly, heterogeneous applications may communicate using this consistent message configured as such.

FIGS. 72-1 through 72-12 illustrate one example logical configuration of a SupplyNetworkPlanConfigurationByIDResponseMessage_sync 72000 element structure. Specifically, these figures depict the arrangement and hierarchy of various components such as one or more levels of packages, entities, and datatypes, shown here as 72000 through 72332. As described above, packages may be used to represent hierarchy levels. Entities are discrete business elements that are used during a business transaction. Data types are used to type object entities and interfaces with a structure. For example, the SupplyNetworkPlanConfigurationByIDResponseMessage_sync 72000 includes, among other things, a SupplyNetworkPlanConfigurationByIDResponseMessage_sync 72002. Accordingly, heterogeneous applications may communicate using this consistent message configured as such.

FIG. 73 illustrates one example logical configuration of a SupplyNetworkPlanConfigurationSelectionByIDQueryMessage_sync 73000 element structure. Specifically, this figure depicts the arrangement and hierarchy of various components such as one or more levels of packages, entities, and datatypes, shown here as 73000 through 73022. As described above, packages may be used to represent hierarchy levels. Entities are discrete business elements that are used during a business transaction. Data types are used to type object entities and interfaces with a structure. For example, the SupplyNetworkPlanConfigurationSelectionByIDQueryMessage_sync 73000 includes, among other things, a SupplyNetworkPlanConfigurationSelectionByIDQueryMessage_sync 73002. Accordingly, heterogeneous applications may communicate using this consistent message configured as such.

FIGS. 74-1 through 74-5 illustrate one example logical configuration of a SupplyNetworkPlanConfigurationSelectionByIDResponseMessage_sync 74000 element structure. Specifically, these figures depict the arrangement and hierarchy of various components such as one or more levels of packages, entities, and datatypes, shown here as 74000 through 74122. As described above, packages may be used to represent hierarchy levels. Entities are discrete business elements that are used during a business transaction. Data types are used to type object entities and interfaces with a structure. For example, the SupplyNetworkPlanConfigurationSelectionByIDResponseMessage_sync 74000 includes, among other things, a SupplyNetworkPlanConfigurationSelectionByIDResponseMessage_sync 74002. Accordingly, heterogeneous applications may communicate using this consistent message configured as such.

FIGS. 75-1 through 75-2 illustrate one example logical configuration of a SupplyNetworkPlanConfigurationSelectionCancelConfirmationMessage_sync 75000 element structure. Specifically, these figures depict the arrangement and hierarchy of various components such as one or more levels of packages, entities, and datatypes, shown here as 75000 through 75054. As described above, packages may be used to represent hierarchy levels. Entities are discrete business elements that are used during a business transaction. Data types are used to type object entities and interfaces with a structure. For example, the SupplyNetworkPlanConfigurationSelectionCancelConfirmationMessage_sync 75000 includes, among other things, a SupplyNetworkPlanConfigurationSelectionCancelConfirmationMessage_sync 75002. Accordingly, heterogeneous applications may communicate using this consistent message configured as such.

FIGS. 76-1 through 76-2 illustrate one example logical configuration of a SupplyNetworkPlanConfigurationSelectionCancelRequestMessage_sync 76000 element structure. Specifically, these figures depict the arrangement and hierarchy of various components such as one or more levels of packages, entities, and datatypes, shown here as 76000 through 76028. As described above, packages may be used to represent hierarchy levels. Entities are discrete business elements that are used during a business transaction. Data types are used to type object entities and interfaces with a structure. For example, the SupplyNetworkPlanConfigurationSelectionCancelRequestMessage_sync 76000 includes, among other things, a SupplyNetworkPlanConfigurationSelectionCancelRequestMessage_sync 76002. Accordingly, heterogeneous applications may communicate using this consistent message configured as such.

FIGS. 77-1 through 77-2 illustrate one example logical configuration of a SupplyNetworkPlanConfigurationSelectionChangeConfirmationMessage_sync 77000 element structure. Specifically, these figures depict the arrangement and hierarchy of various components such as one or more levels of packages, entities, and datatypes, shown here as 77000 through 77054. As described above, packages may be used to represent hierarchy levels. Entities are discrete business elements that are used during a business transaction. Data types are used to type object entities and interfaces with a structure. For example, the SupplyNetworkPlanConfigurationSelectionChangeConfirmationMessage_sync 77000 includes, among other things, a SupplyNetworkPlanConfigurationSelectionChangeConfirmationMessage_sync 77002. Accordingly, heterogeneous applications may communicate using this consistent message configured as such.

FIGS. 78-1 through 78-4 illustrate one example logical configuration of a SupplyNetworkPlanConfigurationSelectionChangeRequestMessage_sync 78000 element structure. Specifically, these figures depict the arrangement and hierarchy of various components such as one or more levels of packages, entities, and datatypes, shown here as 78000 through 78096. As described above, packages may be used to represent hierarchy levels. Entities are discrete business elements that are used during a business transaction. Data types are used to type object entities and interfaces with a structure. For example, the SupplyNetworkPlanConfigurationSelectionChangeRequestMessage_sync 78000 includes, among other things, a SupplyNetworkPlanConfigurationSelectionChangeRequestMessage_sync 78002. Accordingly, heterogeneous applications may communicate using this consistent message configured as such.

FIGS. 79-1 through 79-2 illustrate one example logical configuration of a SupplyNetworkPlanConfigurationSelectionCreateConfirmationMessage_sync 79000 element structure. Specifically, these figures depict the arrangement and hierarchy of various components such as one or more levels of packages, entities, and datatypes, shown here as 79000 through 79054. As described above, packages may be used to represent hierarchy levels. Entities are discrete business elements that are used during a business transaction. Data types are used to type object entities and interfaces with a structure. For example, the SupplyNetworkPlanConfigurationSelectionCreateConfirmationMessage_sync 79000 includes, among other things, a SupplyNetworkPlanConfigurationSelectionCreateConfirmationMessage_sync 79002. Accordingly, heterogeneous applications may communicate using this consistent message configured as such.

FIGS. 80-1 through 80-4 illustrate one example logical configuration of a SupplyNetworkPlanConfigurationSelectionCreateRequestMessage_sync 80000 element structure. Specifically, these figures depict the arrangement and hierarchy of various components such as one or more levels of packages, entities, and datatypes, shown here as 80000 through 80096. As described above, packages may be used to represent hierarchy levels. Entities are discrete business elements that are used during a business transaction. Data types are used to type object entities and interfaces with a structure. For example, the SupplyNetworkPlanConfigurationSelectionCreateRequestMessage_sync 80000 includes, among other things, a SupplyNetworkPlanConfigurationSelectionCreateRequestMessage_sync 80002. Accordingly, heterogeneous applications may communicate using this consistent message configured as such.

FIG. 81 illustrates one example logical configuration of a SupplyNetworkPlanConfigurationSimpleByIDQueryMessage_sync 81000 element structure. Specifically, this figure depicts the arrangement and hierarchy of various components such as one or more levels of packages, entities, and datatypes, shown here as 81000 through 81016. As described above, packages may be used to represent hierarchy levels. Entities are discrete business elements that are used during a business transaction. Data types are used to type object entities and interfaces with a structure. For example, the SupplyNetworkPlanConfigurationSimpleByIDQueryMessage_sync 81000 includes, among other things, a SupplyNetworkPlanConfigurationSimpleByIDQueryMessage_sync 81002. Accordingly, heterogeneous applications may communicate using this consistent message configured as such.

FIGS. 82-1 through 82-2 illustrate one example logical configuration of a SupplyNetworkPlanConfigurationSimpleByIDResponseMessage_sync 82000 element structure. Specifically, these figures depict the arrangement and hierarchy of various components such as one or more levels of packages, entities, and datatypes, shown here as 82000 through 82048. As described above, packages may be used to represent hierarchy levels. Entities are discrete business elements that are used during a business transaction. Data types are used to type object entities and interfaces with a structure. For example, the SupplyNetworkPlanConfigurationSimpleByIDResponseMessage_sync 82000 includes, among other things, a SupplyNetworkPlanConfigurationSimpleByIDResponseMessage_sync 82002. Accordingly, heterogeneous applications may communicate using this consistent message configured as such.

Message Data Type SupplyNetworkPlanConfigurationByIDQueryMessage_sync

The message data type SupplyNetworkPlanConfigurationByIDQueryMessage_sync includes the SupplyNetworkPlanConfigurationSelectionByID entity. It includes the Selection package. The Selection package collects all the selection criteria for the SupplyNetworkPlanConfiguration. It includes the SupplyNetworkPlanConfigurationSelectionByID entity. The SupplyNetworkPlanConfigurationSelectionByID includes the query elements to read SupplyNetworkPlanConfiguration by its ID. In some implementations, the SupplyNetworkPlanConfigurationSelectionByID includes the SupplyNetworkPlanConfigurationID element. A SupplyNetworkPlanConfigurationID is a unique identifier for a SupplyNetworkPlanConfiguration, and may be based on GDT: SupplyNetworkPlanConfigurationID.

Message Data Type SupplyNetworkPlanConfigurationByIDResponseMessage_sync

The message data type SupplyNetworkPlanConfigurationByIDResponseMessage_sync includes the SupplyNetworkPlanConfiguration included in the business document. It includes the following packages: SupplyNetworkPlanConfiguration and Log. The SupplyNetworkPlanConfiguration package groups the SupplyNetworkPlanConfiguration and the Description with the following packages: Characteristic, KeyFigure, TimeSeriesPeriod, Function, and Selection. The SupplyNetworkPlanConfiguration package includes the SupplyNetworkPlanConfiguration entity. A SupplyNetworkPlanConfiguration is the configuration required to access a Supply Network Plan. The SupplyNetworkPlanConfiguration includes the following elements: SupplyNetworkPlanConfigurationID, MeasureUnitCode, CurrencyCode, and Description. A SupplyNetworkPlanConfigurationID is a unique identifier for a SupplyNetworkPlanConfiguration, and may be based on GDT: SupplyNetworkPlanConfigurationID. The MeasureUnitCode is the coded representation of a non-monetary unit of measurement, and may be based on GDT: MeasureUnitCode. The CurrencyCode is a coded representation of the currency, and may be based on GDT: CurrencyCode. A description is a representation of the properties of an object in natural language, and may be based on GDT: LONG_Description.

The Characteristic Package groups the characteristics used in the given SupplyNetworkPlanConfiguration. The Characteristic package includes the Characteristic entity. A Characteristic is a property for describing and distinguishing between planning objects. Characteristics are, for example, location, product and resource. In some implementations, the Characteristic includes the ID and Description elements. A SupplyNetworkPlanCharacteristicID is a unique identifier for a Characteristic in a SupplyNetworkPlanConfiguration, and may be based on GDT: SupplyNetworkPlanCharacteristicID. A description is a representation of the properties of an object in natural language, and may be based on GDT: MEDIUM_Description.

The Keyfigure package groups the Keyfigures used in the given SupplyNetworkPlanConfiguration. The Keyfigure package includes the KeyFigure and Property entities. A KeyFigure represents a planning parameter which holds a numerical planning data value assigned to a planning object for a time period, e. g. a week or month. In some implementations, the KeyFigure includes the following elements: SupplyNetworkPlanKeyFigureID, SemanticsCode, Description, GridNumberValue, DetailedIndicator, OrdinalNumberValue, and PlanningVersionID. A SupplyNetworkPlanKeyFigureSemanticsCode indicates the business meaning of a KeyFigure in a SupplyNetworkPlanConfiguration, and may be based on GDT: SupplyNetworkPlanKeyFigureSemanticsCode. A description is a representation of the properties of an object in natural language, and may be based on GDT: MEDIUM_Description. GridNumberValue is a number, and may be based on GDT: MEDIUM_Description. DetailedIndicator is the representation of a situation that has exactly two mutually exclusive Boolean values, and may be based on CDT: Indicator and a qualifier of Detailed. OrdinalNumberValue is a number that indicates the position of an element in a linearly ordered set that is ordered according to particular factors, and may be based on GDT: OrdinalNumberValue. PlanningVersionID is a unique identifier for a Planning Version, and may be based on GDT: PlanningVersionID.

A KeyFigureProperty defines a property of a KeyFigure. The Property includes the following elements: ID and Value. A PropertyID is a unique identifier for a property, and may be based on GDT: PropertyID. Value describes a value that can be assigned to a property, and may be based on GDT: PropertyValue. The Period package groups the Periods used in the given SupplyNetworkPlanConfiguration. The Period package includes the following entities: TimeSeriesPeriod and Property.

A TimeSeriesPeriod defines the time range of a KeyFigureValue of a Supply Network Plan as well as the periodicity. In some implementations, the TimeSeriesPeriod includes the following elements: ID, Description and CalendarUnitCode. A TimeSeriesID is a unique identifier for a Time Series Period, and may be based on GDT: TimeSeriesPeriodID. A description is a representation of the properties of an object in natural language, and may be based on GDT: MEDIUM_Description. A CalendarUnitCode is the coded representation of a calendar-related unit, and may be based on GDT: CalendarUnitCode. A Property defines a property of a TimeSeriesPeriod. The Property includes the following elements: ID and Value. A PropertyID is a unique identifier for a property, and may be based on GDT: PropertyID. PropertyValue describes a value that can be assigned to a property, and may be based on GDT: PropertyValue.

The Function package groups the Functions and Events used in the given SupplyNetworkPlanConfiguration. The Function package includes the following entities: Function and Event. A function is a reference to an algorithm which can be executed on a SupplyNetworkPlan. In some implementations, the Function includes the following elements: ID, Description, and ManualExecutionAllowedIndicator. A SupplyNetworkPlanConfigurationFunctionID is a unique identifier for a Function in a SupplyNetworkPlanConfiguration, and may be based on GDT: SupplyNetworkPlanConfigurationFunctionID. A description is a representation of the properties of an object in natural language, and may be based on GDT: MEDIUM_Description. ManualExecutionAllowedIndicator is the representation of a situation that has exactly two mutually exclusive Boolean values, and may be based on CDT: Indicator and qualifier: ManualExecutionAllowed.

An Event is a defined step within the planning process to change a KeyFigureValue of a SupplyNetworkPlan. An Event groups one or more Functions and determines their processing sequence in a SupplyNetworkPlan. In some implementations, the Event includes the following elements: SupplyNetworkPlanConfigurationFunctionEventTypeCode, TypeName, TypeDescription, and ManualExecutionAllowedIndicator. A SupplyNetworkPlanConfigurationFunctionEventTypeCode is a coded representation of the type of a function event in a SupplyNetworkPlanConfiguration, and may be based on GDT: SupplyNetworkPlanConfigurationFunctionEventTypeCode. TypeName is a word or combination of words used to name or define an object, and may be based on GDT: MEDIUM_Name. A description is a representation of the properties of an object in natural language, and may be based on GDT: LONG_Description. ManualExecutionAllowedIndicator is the representation of a situation that has two mutually exclusive Boolean values, and may be based on CDT: Indicator and qualifier: ManualExecutionAllowed.

The Selection package groups the Selections used in the given SupplyNetworkPlanConfiguration. The Selection package includes the following entities: Selection, SelectionCriterion, and SelectionGroup. A Selection is a filter to select objects to be planned by a planner. The objects to be planned are AggregateInstances of a SupplyNetworkPlanningAggregateHierarchy. In some implementations, the Selection includes the ID element. A SupplyNetworkPlanConfigurationSelectionID is an identifier for a Selection of a SupplyNetworkPlanConfiguration, and may be based on GDT: SupplyNetworkPlanConfigurationSelectionID. A SelectionCriterion is a criterion to select objects to be planned for a certain characteristic. The SelectionCriterion includes the following elements: OrdinalNumberValue, SupplyNetworkPlanCharacteristicID, InclusionExclusionCode, InclusionExclusionName, IntervalBoundaryTypeCode, IntervalBoundaryTypeName, LowerBoundarySupplyNetworkPlanCharacteristicValue, and UpperBoundarySupplyNetworkPlanCharacteristicValue.

An OrdinalNumberValue is a number that indicates the position of an element in a linearly ordered set that is ordered according to particular factors, and may be based on GDT: OrdinalNumberValue. A SupplyNetworkPlanCharacteristicID is a unique identifier for a Characteristic in a SupplyNetworkPlanConfiguration, and may be based on GDT: SupplyNetworkPlanCharacteristicID. InclusionExclusionCode, which may be based on GDT: InclusionExclusionCode, is a coded representation of the inclusion of a set into a result set or the exclusion of it. InclusionExclusionName is a word or combination of words used to name or define an object, and may be based on GDT: MEDIUM_Name. An IntervalBoundaryTypeCode is a coded representation of an interval boundary type, and may be based on GDT: IntervalBoundaryTypeCode. IntervalBoundaryTypeName is a word or combination of words used to name or define an object, and may be based on GDT: MEDIUM_Name. LowerBoundarySupplyNetworkPlanCharacteristicValue is an arbitrary value that a Characteristic of a SupplyNetworkPlanConfiguration can have, and may be based on GDT: SupplyNetworkPlanCharacteristicValue. UpperBoundarySupplyNetworkPlanCharacteristicValue is an arbitrary value that a Characteristic of a SupplyNetworkPlanConfiguration can have, and may be based on GDT: SupplyNetworkPlanCharacteristicValue.

A SelectionGroup groups one or several characteristics to aggregate the selected objects to be planned. The SelectionGroup includes the following elements: OrdinalNumberValue and SupplyNetworkPlanCharacteristicID. An OrdinalNumberValue is a number that indicates the position of an element in a linearly ordered set that is ordered according to particular factors, and may be based on GDT: OrdinalNumberValue. A SupplyNetworkPlanCharacteristicID is a unique identifier for a Characteristic in a SupplyNetworkPlanConfiguration, and may be based on GDT: SupplyNetworkPlanCharacteristicID.

A log is a sequence of messages that result when an application executes a task. The entity Log is of type GDT:Log.

Message Data Type SupplyNetworkPlanConfigurationSimpleByIDQueryMessage_sync

The message data type SupplyNetworkPlanConfigurationSimpleByIDQueryMessage_sync includes the SupplyNetworkPlanConfigurationSimpleSelectionByID entity. It includes the Selection package. The Selection package includes the entity SupplyNetworkPlanConfigurationSimpleSelectionByID. The SupplyNetworkPlanConfigurationSimpleSelectionByID includes the query elements to search for a SupplyNetworkPlanConfiguration by an ID pattern. In some implementations, the SupplyNetworkPlanConfigurationSimpleSelectionByID includes the ID element. A SupplyNetworkPlanConfigurationID is a unique identifier for a SupplyNetworkPlanConfiguration, and it may be based on GDT: SupplyNetworkPlanConfigurationID. In some implementations, the query supports the use of wildcards to retrieve the IDs of SupplyNetworkPlanConfigurations which contain that pattern. For example the query retrieves for the given wildcard pattern '9ASNP*' the IDs of SupplyNetworkPlanConfigurations which begin with the pattern '9ASNP'.

Message Data Type SupplyNetworkPlanConfigurationSimpleByIDResponseMessage_sync

The message data type SupplyNetworkPlanConfigurationSimpleByIDResponseMessage_sync includes the SupplyNetworkPlanConfiguration and the Description included in the business document. It includes the following packages: SupplyNetworkPlanConfiguration and Log. The SupplyNetworkPlanConfiguration package includes the SupplyNetworkPlanConfiguration entity. In some implementations, the SupplyNetworkPlanConfiguration includes the following elements: ID and Description. A SupplyNetworkPlanConfigurationID is a unique identifier for a SupplyNetworkPlanConfiguration, and may be based on GDT: SupplyNetworkPlanConfigurationID. A description is a representation of the properties of an object in natural language, and may be based on GDT: LONG_Description.

Message Data Type SupplyNetworkPlanConfigurationSelectionCreateRequestMessage_sync The message data type SupplyNetworkPlanConfigurationSelectionCreateRequestMessage_sync includes the SupplyNetworkPlanConfiguration included in the business document. It includes the SupplyNetworkPlanConfiguration package. A message header might not be used because the ID of a SupplyNetworkPlanConfigurationSelection is passed to the create service operation.

Because the ID of a SupplyNetworkPlanConfigurationSelection is unique the SupplyNetworkPlanConfigurationSelection is created only once even if the message is transferred several times due to network problems. The SupplyNetworkPlanConfiguration package groups the SupplyNetworkPlanConfiguration with the Selection package. The SupplyNetworkPlanConfiguration package includes the entity SupplyNetworkPlanConfiguration. A SupplyNetworkPlanConfiguration is the configuration required to access a Supply Network Plan. In some implementations, the SupplyNetworkPlanConfiguration includes the ID element. A SupplyNetworkPlanConfigurationID is a unique identifier for a SupplyNetworkPlanConfiguration, and may be based on GDT: SupplyNetworkPlanConfigurationID.

The Selection package includes the following entities: Selection, SelectionCriterion, and SelectionGroup. In some implementations, the Selection includes the ID element. A SupplyNetworkPlanConfigurationSelectionID is an identifier for a Selection of a SupplyNetworkPlanConfiguration, and may be based on GDT: SupplyNetworkPlanConfigurationSelectionID. The SelectionCriterion includes the following elements: OrdinalNumberValue, SupplyNetworkPlanCharacteristicID, InclusionExclusionCode, InclusionExclusionName, IntervalBoundaryTypeCode, IntervalBoundaryTypeName, LowerBoundarySupplyNetworkPlanCharacteristicValue, and UpperBoundarySupplyNetworkPlanCharacteristicValue. An OrdinalNumberValue is a number that indicates the position of an element in a linearly ordered set that is ordered according to particular factors. OrdinalNumberValue may be based on GDT: OrdinalNumberValue.

A SupplyNetworkPlanCharacteristicID is a unique identifier for a Characteristic in a SupplyNetworkPlanConfiguration, and may be based on GDT: SupplyNetworkPlanCharacteristicID. InclusionExclusionCode, which may be based on GDT: InclusionExclusionCode, is a coded representation of the inclusion of a set into a result set or the exclusion of it. InclusionExclusionName is a word or combination of words used to name or define an object, and may be based on GDT: MEDIUM_Name. IntervalBoundaryTypeCode may be based on GDT: IntervalBoundaryTypeCode. IntervalBoundaryTypeName is a word or combination of words used to name or define an object, and may be based on GDT: MEDIUM_Name. LowerBoundarySupplyNetworkPlanCharacteristicValue is an arbitrary value that a Characteristic of a SupplyNetworkPlanConfiguration can have, and may be based on GDT: SupplyNetworkPlanCharacteristicValue. UpperBoundarySupplyNetworkPlanCharacteristicValue is an arbitrary value that a Characteristic of a SupplyNetworkPlanConfiguration can have. UpperBoundarySupplyNetworkPlanCharacteristicValue may be based on GDT: SupplyNetworkPlanCharacteristicValue.

In some implementations, the SelectionGroup includes the following elements: OrdinalNumberValue and SupplyNetworkPlanCharacteristicID. An OrdinalNumberValue is a number that indicates the position of an element in a linearly ordered set that is ordered according to particular factors. OrdinalNumberValue may be based on GDT: OrdinalNumberValue. A SupplyNetworkPlanCharacteristicID is a unique identifier for a Characteristic in a SupplyNetworkPlanConfiguration, and it may be based on GDT: SupplyNetworkPlanCharacteristicID.

Message Data Type SupplyNetworkPlanConfigurationSelectionCreateConfirmationMessage_sync The message data type SupplyNetworkPlanConfigurationSelectionCreateConfirmationMessage_sync includes the SupplyNetworkPlanConfiguration included in the business document. It includes the following packages: SupplyNetworkPlanConfiguration and Log. If any error occurs when creating the SupplyNetworkPlanConfigurationSelection, the creation of the whole SupplyNetworkPlanConfigurationSelection may be aborted resulting in no SupplyNetworkPlanConfigurationSelection entity being returned in the confirmation message. The SupplyNetworkPlanConfiguration package groups the SupplyNetworkPlanConfiguration with the Selection package. The SupplyNetworkPlanConfiguration package includes the entity SupplyNetworkPlanConfiguration. A SupplyNetworkPlanConfiguration is the configuration required to access a Supply Network Plan. In some implementations, the SupplyNetworkPlanConfiguration includes the ID element. A SupplyNetworkPlanConfigurationID is a unique identifier for a SupplyNetworkPlanConfiguration, and may be based on GDT: SupplyNetworkPlanConfigurationID.

The Selection package includes the Selection entity. In some implementations, the Selection includes the ID element. A SupplyNetworkPlanConfigurationSelectionID is an identifier for a Selection of a SupplyNetworkPlanConfiguration, and it may be based on GDT: SupplyNetworkPlanConfigurationSelectionID.

Message Data Type SupplyNetworkPlanConfigurationSelectionChangeRequestMessage_sync The message data type SupplyNetworkPlanConfigurationSelectionChangeRequestMessage_sync includes the SupplyNetworkPlanConfiguration included in the business document. It includes the SupplyNetworkPlanConfiguration package. In some implementations, a message header might not be used because a SupplyNetworkPlanConfigurationSelection is changed correctly even if the message is transferred several times due to network problems. The SupplyNetworkPlanConfiguration package groups the SupplyNetworkPlanConfiguration with the Selection package. The SupplyNetworkPlanConfiguration package includes the entity SupplyNetworkPlanConfiguration. A SupplyNetworkPlanConfiguration is the configuration required to access a Supply Network Plan. In some implementations, the SupplyNetworkPlanConfiguration includes the ID element. A SupplyNetworkPlanConfigurationID is a unique identifier for a SupplyNetworkPlanConfiguration, and may be based on GDT: SupplyNetworkPlanConfigurationID. The Selection package includes the following entities: Selection, SelectionCriterion, and SelectionGroup. In some implementations, the Selection includes the ID element. A SupplyNetworkPlanConfigurationSelectionID is an identifier for a Selection of a SupplyNetworkPlanConfiguration, and may be based on GDT: SupplyNetworkPlanConfigurationSelectionID.

In some implementations, the SelectionCriterion includes the following elements: OrdinalNumberValue, SupplyNetworkPlanCharacteristicID, InclusionExclusionCode, InclusionExclusionName, IntervalBoundaryTypeCode, IntervalBoundaryTypeName, LowerBoundarySupplyNetworkPlanCharacteristicValue, and UpperBoundarySupplyNetworkPlanCharacteristicValue. An OrdinalNumberValue is a number that indicates the position of an element in a linearly ordered set that is ordered according to particular factors. OrdinalNumberValue may be based on GDT: OrdinalNumberValue. A SupplyNetworkPlanCharacteristicID is a unique identifier for a Characteristic in a SupplyNetworkPlanConfiguration, and may be based on GDT: SupplyNetworkPlanCharacteristicID. InclusionExclusionCode, which may be based on GDT: InclusionExclusionCode, is a coded representation of the inclusion of a set into a result set or the exclusion of it. InclusionExclusionName is a word or combination of words used to name or define an object. InclusionExclusionName may be based on GDT: MEDIUM_Name. IntervalBoundaryTypeCode may be based on GDT: IntervalBoundaryTypeCode. IntervalBoundaryTypeName is a word or combination of words used to name or define an object, and it may be based on GDT: MEDIUM_Name. LowerBoundarySupplyNetworkPlanCharacteristicValue is an arbitrary value that a Characteristic of a SupplyNetworkPlanConfiguration can have, and may be based on GDT: SupplyNetworkPlanCharacteristicValue. UpperBoundarySupplyNetworkPlanCharacteristicValue is an arbitrary value that a Characteristic of a SupplyNetworkPlanConfiguration can have. UpperBoundarySupplyNetworkPlanCharacteristicValue may be based on GDT: SupplyNetworkPlanCharacteristicValue. The SelectionGroup includes the following elements: OrdinalNumberValue and SupplyNetworkPlanCharacteristicID. An OrdinalNumberValue is a number that indicates the position of an element in a linearly ordered set that is ordered according to particular factors. OrdinalNumberValue may be based on GDT: OrdinalNumberValue. A SupplyNetworkPlanCharacteristicID is a unique identifier for a Characteristic in a SupplyNetworkPlanConfiguration, and may be based on GDT: SupplyNetworkPlanCharacteristicID.

Message Data Type SupplyNetworkPlanConfigurationSelectionChangeConfirmationMessage_sync The message data type SupplyNetworkPlanConfigurationSelectionChangeConfirmationMessage_sync includes the SupplyNetworkPlanConfiguration included in the business document. It includes the following packages: SupplyNetworkPlanConfiguration and Log. If any error occurs when changing the SupplyNetworkPlanConfigurationSelection, the change of the whole SupplyNetworkPlanConfigurationSelection is aborted and no SupplyNetworkPlanConfigurationSelection entity is returned in the confirmation message. The SupplyNetworkPlanConfiguration package groups the SupplyNetworkPlanConfiguration with the Selection package. The SupplyNetworkPlanConfiguration package includes the entity SupplyNetworkPlanConfiguration. A SupplyNetworkPlanConfiguration is the configuration required to access a Supply Network Plan. In some implementations, the SupplyNetworkPlanConfiguration includes the ID element. A SupplyNetworkPlanConfigurationID is a unique identifier for a SupplyNetworkPlanConfiguration, and may be based on GDT: SupplyNetworkPlanConfigurationID. The Selection package includes the Selection entity. In some implementations, the Selection includes the ID element. A SupplyNetworkPlanConfigurationSelectionID is an identifier for a Selection of a SupplyNetworkPlanConfiguration, and may be based on GDT: SupplyNetworkPlanConfigurationSelectionID.

Message Data Type SupplyNetworkPlanConfigurationSelectionCancelRequestMessage_sync The message data type SupplyNetworkPlanConfigurationSelectionCancelRequestMessage_sync includes the SupplyNetworkPlanConfiguration included in the business document. It includes the SupplyNetworkPlanConfiguration package. In some implementations, a message header is not required for this message because a SupplyNetworkPlanConfigurationSelection is deleted only once even if the message is transferred several times due to network problems. The SupplyNetworkPlanConfiguration package groups the SupplyNetworkPlanConfiguration with the Selection package. The SupplyNetworkPlanConfiguration package includes the entity SupplyNetworkPlanConfiguration. A SupplyNetworkPlanConfiguration is the configuration required to access a Supply Network Plan.

In some implementations, the SupplyNetworkPlanConfiguration includes the ID element. A SupplyNetworkPlanConfigurationID is a unique identifier for a SupplyNetworkPlanConfiguration, and may be based on GDT: SupplyNetworkPlanConfigurationID. The Selection package includes the Selection entity. In some implementations, the Selection includes the ID element. A SupplyNetworkPlanConfigurationSelectionID is an identifier for a Selection of a SupplyNetworkPlanConfiguration, and may be based on GDT: SupplyNetworkPlanConfigurationSelectionID.

Message Data Type SupplyNetworkPlanConfigurationSelectionCancelConfirmationMessage_sync The message data type SupplyNetworkPlanConfigurationSelectionCancelConfirmationMessage_sync includes the SupplyNetworkPlanConfiguration included in the business document. It includes the following packages: SupplyNetworkPlanConfiguration and Log. If any error occurs when deleting the SupplyNetworkPlanConfigurationSelection, the deletion of the entire SupplyNetworkPlanConfigurationSelection may be aborted resulting in no SupplyNetworkPlanConfigurationSelection entity being returned in the confirmation message.

The SupplyNetworkPlanConfiguration package groups the SupplyNetworkPlanConfiguration with the Selection package. The SupplyNetworkPlanConfiguration package includes the entity SupplyNetworkPlanConfiguration. A SupplyNetworkPlanConfiguration is the configuration required to access a Supply Network Plan. In some implementations, the SupplyNetworkPlanConfiguration includes the ID element. A SupplyNetworkPlanConfigurationID is a unique identifier for a SupplyNetworkPlanConfiguration, and may be based on GDT: SupplyNetworkPlanConfigurationID. The Selection package includes the Selection entity. In some implementations, the Selection includes the ID element. A SupplyNetworkPlanConfigurationSelectionID is an identifier for a Selection of a SupplyNetworkPlanConfiguration, and may be based on GDT: SupplyNetworkPlanConfigurationSelectionID.

Message Data Type SupplyNetworkPlanConfigurationSelectionByIDQueryMessage_sync

The message data type SupplyNetworkPlanConfigurationSelectionByIDQueryMessage_sync includes all data required to select a SupplyNetworkPlanSelection (i.e., the SupplyNetworkPlanConfigurationID and the SupplyNetworkplanConfigurationSelectionID). It includes the Selection package. The service operation can receive a SupplyNetworkPlanConfigurationID and a SupplyNetworkPlanConfigurationSelectionID. Therefore the following inquiries are possible: 1) retrieve all SupplyNetworkPlanConfigurationSelections of a SupplyNetworkPlanConfiguration; 2) retrieve all SupplyNetworkPlanConfigurationSelections of a SupplyNetworkPlanConfiguration which corresponds to a SupplyNetworkPlanConfigurationSelectionID pattern (e. g. 'A*' which corresponds to all SelectionIDs beginning with 'A'); and 3) retrieve a SupplyNetworkPlanConfigurationSelection specified by SupplyNetworkPlanConfigurationID and SupplyNetworkPlanConfigurationSelectionID. The Selection package includes the SupplyNetworkPlanConfigurationSelectionSelectionByID entity. The SupplyNetworkPlanConfigurationSelectionSelectionByID includes the query element to search for a SupplyNetworkPlanConfigurationSelection. In some implementations, the SupplyNetworkPlanConfigurationSelectionSelectionByID includes the following elements: SupplyNetworkPlanConfigurationID and SupplyNetworkPlanConfigurationSelectionID. A SupplyNetworkPlanConfigurationID is a unique identifier for a SupplyNetworkPlanConfiguration, and may be based on GDT: SupplyNetworkPlanConfigurationID. A SupplyNetworkPlanConfigurationSelectionID is an identifier for a Selection of a SupplyNetworkPlanConfiguration, and may be based on GDT: SupplyNetworkPlanConfigurationSelectionID.

Message Data Type SupplyNetworkPlanConfigurationSelectionByIDResponseMessage_sync The message data type SupplyNetworkPlanConfigurationSelectionByIDResponseMessage_sync includes the SupplyNetworkPlanConfiguration included in the business document. It includes the following packages: SupplyNetworkPlanConfiguration and Log. The SupplyNetworkPlanConfiguration package groups the SupplyNetworkPlanConfiguration with the Selection package. The SupplyNetworkPlanConfiguration package includes the entity SupplyNetworkPlanConfiguration. A SupplyNetworkPlanConfiguration is the configuration required to access a Supply Network Plan. In some implementations, the SupplyNetworkPlanConfiguration includes the ID element. A SupplyNetworkPlanConfigurationID is a unique identifier for a SupplyNetworkPlanConfiguration, and may be based on GDT: SupplyNetworkPlanConfigurationID. The Selection package includes the following entities: Selection, SelectionCriterion, and SelectionGroup. In some implementations, the Selection includes the ID element. A SupplyNetworkPlanConfigurationSelectionID is an identifier for a Selection of a SupplyNetworkPlanConfiguration, and may be based on GDT: SupplyNetworkPlanConfigurationSelectionID.

In some implementations, the SelectionCriterion includes the following elements: OrdinalNumberValue, SupplyNetworkPlanCharacteristicID, InclusionExclusionCode, InclusionExclusionName, IntervalBoundaryTypeCode, IntervalBoundaryTypeName, LowerBoundarySupplyNetworkPlanCharacteristicValue, and UpperBoundarySupplyNetworkPlanCharacteristicValue. An OrdinalNumberValue is a number that indicates the position of an element in a linearly ordered set that is ordered according to particular factors. OrdinalNumberValue may be based on GDT: OrdinalNumberValue. A SupplyNetworkPlanCharacteristicID is a unique identifier for a Characteristic in a SupplyNetworkPlanConfiguration, and it may be based on GDT: SupplyNetworkPlanCharacteristicID. InclusionExclusionCode may be based on GDT: InclusionExclusionCode. An InclusionExclusionCode is a coded representation of the inclusion of a set into a result set or the exclusion of it. InclusionExclusionName is a word or combination of words used to name or define an object, and it may be based on GDT: MEDIUM_Name. IntervalBoundaryTypeCode may be based on GDT: IntervalBoundaryTypeCode. IntervalBoundaryTypeName is a word or combination of words used to name or define an object, and may be based on GDT: MEDIUM_Name. LowerBoundarySupplyNetworkPlanCharacteristicValue is an arbitrary value that a Characteristic of a SupplyNetworkPlanConfiguration can have, and may be based on GDT: SupplyNetworkPlanCharacteristicValue. SupplyNetworkPlanCharacteristicValue is an arbitrary value that a Characteristic of a SupplyNetworkPlanConfiguration can have, and it may be based on GDT: SupplyNetworkPlanCharacteristicValue. In some implementations, the SelectionGroup includes the following elements: OrdinalNumberValue and SupplyNetworkPlanCharacteristicID. An OrdinalNumberValue is a number that indicates the position of an element in a linearly ordered set that is ordered according to particular factors, and may be based on GDT: OrdinalNumberValue. A SupplyNetworkPlanCharacteristicID is a unique identifier for a Characteristic in a SupplyNetworkPlanConfiguration, and may be based on GDT: SupplyNetworkPlanCharacteristicID.

SupplyNetworkPlanningAggregateHierarchy Interfaces

The purpose of supply network planning (SNP) is to create a long or midterm production or distribution plan which is called SupplyNetworkPlan. A SupplyNetworkPlanningAggregateHierarchy is a hierarchy of different planning levels (called aggregates) in supply network planning. The supply network planning processor uses the SupplyNetworkPlanningAggregateHierarchy interfaces which are provided by Supply And Demand Matching to create a user interface. The user interface is used by a person who is responsible to create and change a SupplyNetworkPlan based on the structure of a SupplyNetworkPlanningAggregateHierarchy.

Figure 83:
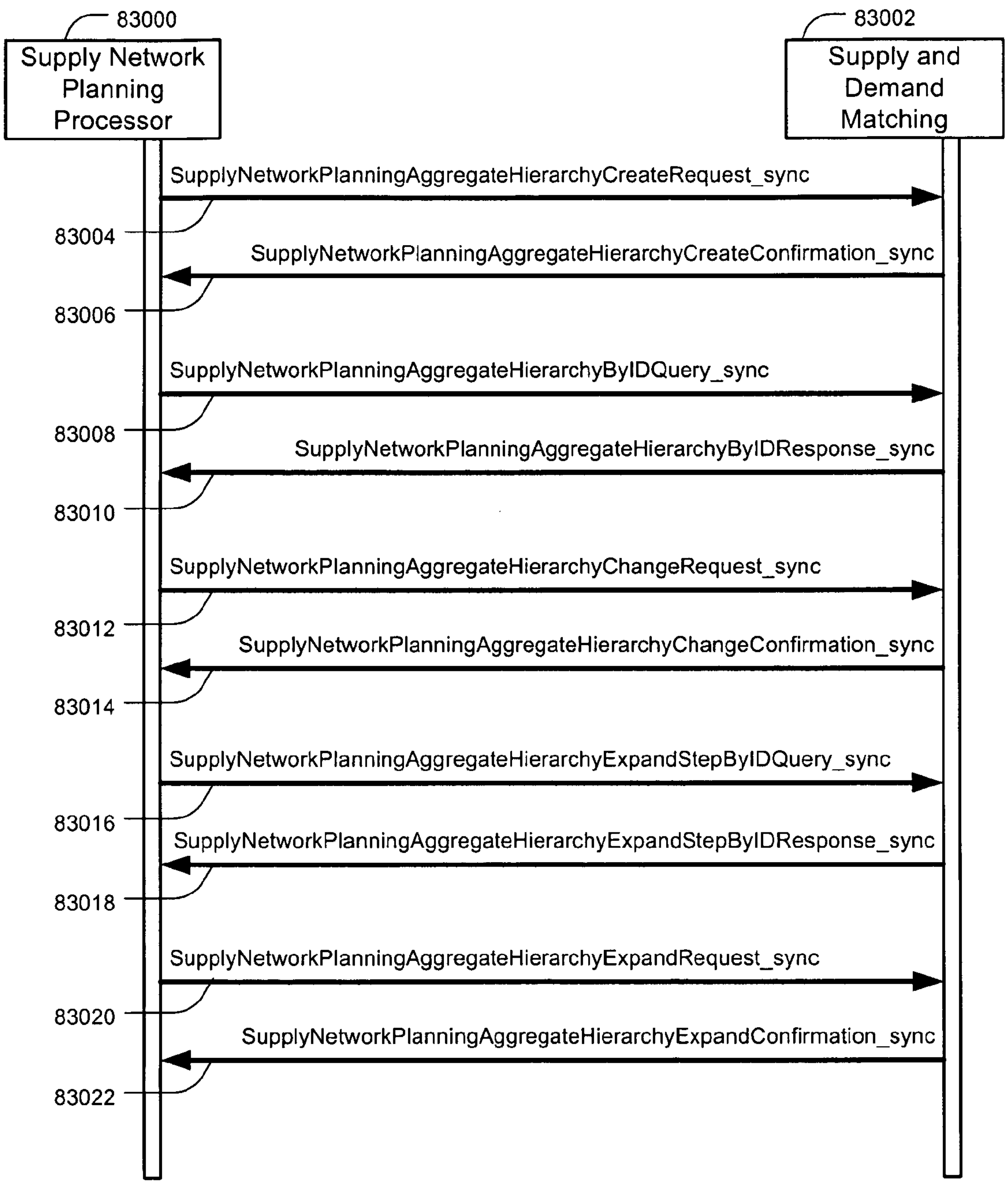
FIG. 83 shows an exemplary SupplyNetworkPlanningAggregateHierarchy Message Choreography.

The message choreography of FIG. 83 describes a possible logical sequence of messages that can be used to realize a Supply Network Planning Aggregate Hierarchy business scenario.

A "Supply Network Planning Processor" system 83000 can request the creation of a supply network planning aggregate hierarchy using a SupplyNetworkPlanningAggregateHierarchyCreateRequest_sync message 83004 as shown, for example, in FIG. 83. A "Supply and Demand Matching" system 83002 can confirm the request using a SupplyNetworkPlanningAggregateHierarchyCreateConfirmation_sync message 83006 as shown, for example, in FIG. 83.

The "Supply Network Planning Processor" system 83000 can query supply network planning aggregate hierarchies using a SupplyNetworkPlanningAggregateHierarchyByIDQuery_sync message 83008 as shown, for example, in FIG. 83. The "Supply and Demand Matching" system 83002 can respond to the query using a SupplyNetworkPlanningAggregateHierarchyByIDResponse_sync message 83010 as shown, for example, in FIG. 83.

The "Supply Network Planning Processor" system 83000 can request the change of a planning aggregate hierarchy using a SupplyNetworkPlanningAggregateHierarchyChangeRequest_sync message 83012 as shown, for example, in FIG. 83. The "Supply and Demand Matching" system 83002 can confirm the request using a SupplyNetworkPlanningAggregateHierarchyChangeConfirmation_sync message 83014 as shown, for example, in FIG. 83.

The "Supply Network Planning Processor" system 83000 can query supply network planning aggregate hierarchy expand steps using a SupplyNetworkPlanningAggregateHierarchyExpandStepByIDQuery_sync message 83016 as shown, for example, in FIG. 83. The "Supply and Demand Matching" system 83002 can respond to the query using a SupplyNetworkPlanningAggregateHierarchyExpandStepByIDResponse_sync message 83018 as shown, for example, in FIG. 83.

The "Supply Network Planning Processor" system 83000 can request supply network planning aggregate hierarchy expansion using a SupplyNetworkPlanningAggregateHierarchyExpandRequest_sync message 83020 as shown, for example, in FIG. 83. The "Supply and Demand Matching" system 83002 can confirm the request using a SupplyNetworkPlanningAggregateHierarchyExpandConfirmation_sync message 83022 as shown, for example, in FIG. 83.

Figure 84:
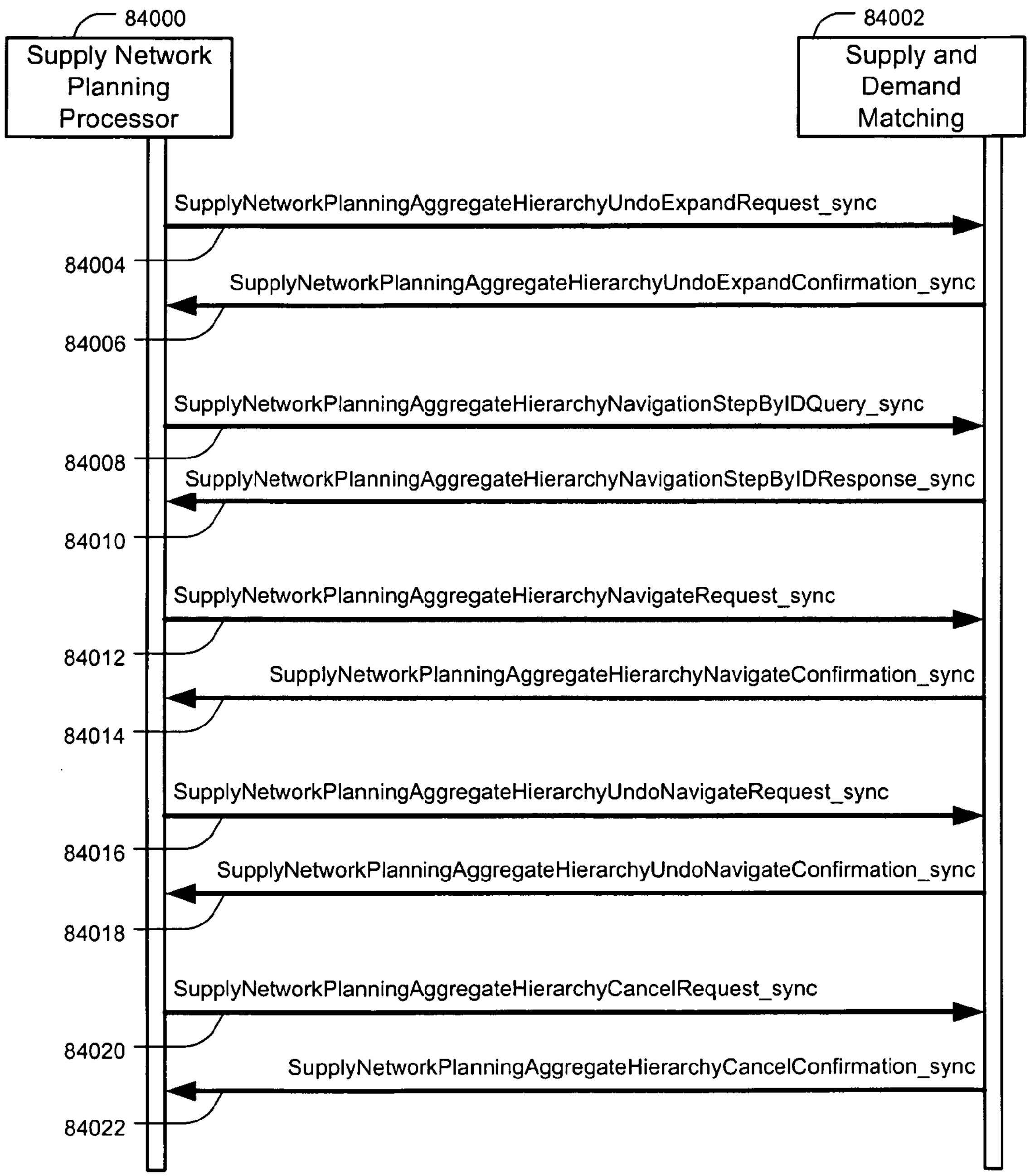
FIG. 84 shows an exemplary SupplyNetworkPlanningAggregateHierarchy Message Choreography.

The message choreography of FIG. 84 describes another possible logical sequence of messages that can be used to realize a Supply Network Planning Aggregate Hierarchy business scenario.

A "Supply Network Planning Processor" system 84000 can request to undo the expansion of a supply network planning aggregate hierarchy using a SupplyNetworkPlanningAggregateHierarchyUndoExpandRequest_sync message 84004 as shown, for example, in FIG. 84. A "Supply and Demand Matching" system 84002 can confirm the request using a SupplyNetworkPlanningAggregateHierarchyUndoExpandConfirmation_sync message 84006 as shown, for example, in FIG. 84.

The "Supply Network Planning Processor" system 84000 can query supply network planning aggregate hierarchy navigation steps by ID using a SupplyNetworkPlanningAggregateHierarchyNavigationStepByIDQuery_sync message 84008 as shown, for example, in FIG. 84. The "Supply and Demand Matching" system 84002 can respond to the query using a SupplyNetworkPlanningAggregateHierarchyNavigationStepByIDResponse_sync message 84010 as shown, for example, in FIG. 84.

The "Supply Network Planning Processor" system 84000 can request navigation of a planning aggregate hierarchy using a SupplyNetworkPlanningAggregateHierarchyNavigateRequest_sync message 84012 as shown, for example, in FIG. 84. The "Supply and Demand Matching" system 84002 can confirm the request using a SupplyNetworkPlanningAggregateHierarchyNavigateConfirmation_sync message 84014 as shown, for example, in FIG. 84.

The "Supply Network Planning Processor" system 84000 can request to undo navigation of a supply network planning aggregate hierarchy using a SupplyNetworkPlanningAggregateHierarchyUndoNavigateRequest_sync message 84016 as shown, for example, in FIG. 84. The "Supply and Demand Matching" system 84002 can respond to the request using a SupplyNetworkPlanningAggregateHierarchyUndoNavigateConfirmation_sync message 84018 as shown, for example, in FIG. 84.

The "Supply Network Planning Processor" system 84000 can request to cancel a supply network planning aggregate hierarchy using a SupplyNetworkPlanningAggregateHierarchyCancelRequest_sync message 84020 as shown, for example, in FIG. 84. The "Supply and Demand Matching" system 84002 can confirm the request using a SupplyNetworkPlanningAggregateHierarchyCancelConfirmation_sync message 84022 as shown, for example, in FIG. 84.

SupplyNetworkPlanningAggregateHierarchyCreateRequest_sync is the request to create a SupplyNetworkPlanningAggregateHierarchy. The structure of SupplyNetworkPlanningAggregateHierarchyCreateRequest_sync is specified by message data type SupplyNetworkPlanningAggregateHierarchyCreateRequestMessage_sync.

SupplyNetworkPlanningAggregateHierarchyCreateConfirmation_sync is the confirmation to SupplyNetworkPlanningAggregateHierarchyCreateRequest_sync. The structure of SupplyNetworkPlanningAggregateHierarchyCreateConfirmation_sync is specified by message data type SupplyNetworkPlanningAggregateHierarchyCreateConfirmationMessage_sync.

SupplyNetworkPlanningAggregateHierarchyCancelRequest_sync is the request to cancel a SupplyNetworkPlanningAggregateHierarchy. The structure of SupplyNetworkPlanningAggregateHierarchyCancelRequest_sync is specified by message data type SupplyNetworkPlanningAggregateHierarchyCancelRequestMessage_sync.

SupplyNetworkPlanningAggregateHierarchyCancelConfirmation_sync is the confirmation to SupplyNetworkPlanningAggregateHierarchyCancelRequest_sync. The structure of SupplyNetworkPlanCancelConfirmation_sync is specified by message data type SupplyNetworkPlanCancelConfirmationMessage_sync.

SupplyNetworkPlanningAggregateHierarchyChangeRequest_sync is the request to change a SupplyNetworkPlanningAggregateHierarchy. The structure of SupplyNetworkPlanningAggregateHierarchyChangeRequest_sync is specified by message data type SupplyNetworkPlanningAggregateHierarchyChangeRequestMessage_sync.

SupplyNetworkPlanningAggregateHierarchyChangeConfirmation_sync is the confirmation to a SupplyNetworkPlanningAggregateHierarchyChangeRequest_sync. The structure of SupplyNetworkPlanningAggregateHierarchyChangeConfirmation_sync is specified by message data type SupplyNetworkPlanningAggregateHierarchyChangeConfirmationMessage_sync.

SupplyNetworkPlanningAggregateHierarchyByIDQuery_sync is the inquiry for a SupplyNetworkPlanningAggregateHierarchy. The structure of the message type SupplyNetworkPlanningAggregateHierarchyByIDQuery_sync is specified by message data type SupplyNetworkPlanningAggregateHierarchyByIDQueryMessage_sync.

SupplyNetworkPlanningAggregateHierarchyByIDResponse_sync is the response to a SupplyNetworkPlanningAggregateHierarchyByIDQuery_sync. The structure of SupplyNetworkPlanningAggregateHierarchyByIDResponse_sync is specified by message data type SupplyNetworkPlanningAggregateHierarchyByIDResponseMessage_sync.

SupplyNetworkPlanningAggregateHierarchyExpandStepByIDQuery_sync is the inquiry for the ExpandSteps of a SupplyNetworkPlanningAggregateHierarchy. The structure of SupplyNetworkPlanningAggregateHierarchyExpandStepByIDQuery_sync is specified by message data type SupplyNetworkPlanningAggregateHierarchyExpandStepByIDQueryMessage_sync.

SupplyNetworkPlanningAggregateHierarchyExpandStepByIDResponse_sync is the response to a SupplyNetworkPlanningAggregateHierarchyExpandStepByIDQuery_sync. The structure of SupplyNetworkPlanningAggregateHierarchyExpandStepByIDResponse_sync is specified by message data type SupplyNetworkPlanningAggregateHierarchyExpandStepByIDResponseMessage_sync.

SupplyNetworkPlanningAggregateHierarchyExpandRequest_sync is the request to execute an expand operation on a SupplyNetworkPlanningAggregateHierarchy. The structure of SupplyNetworkPlanningAggregateHierarchyExpandRequest_sync is specified by message data type SupplyNetworkPlanningAggregateHierarchyExpandRequestMessage_sync. This operation corresponds to an ExpandStep of a SupplyNetworkPlanningAggregateHierarchy. It expands the hierarchy of AggregateInstances by appending one or more related AggregateInstances to the hierarchy. Additionally it updates the ExpandSteps to the new hierarchy and step history.

SupplyNetworkPlanningAggregateHierarchyExpandConfirmation_sync is the confirmation to a SupplyNetworkPlanningAggregateHierarchyExpandRequest_sync. The structure of SupplyNetworkPlanningAggregateHierarchyExpandConfirmation_sync is specified by message data type SupplyNetworkPlanningAggregateHierarchyExpandConfirmationMessage_sync.

SupplyNetworkPlanningAggregateHierarchyUndoExpandRequest_sync is the request to undo the last executed expand operation of a SupplyNetworkPlanningAggregateHierarchy. The structure of SupplyNetworkPlanningAggregateHierarchyUndoExpandRequest_sync is specified by message data type SupplyNetworkPlanningAggregateHierarchyUndoExpandRequestMessage_sync.

SupplyNetworkPlanningAggregateHierarchyUndoExpandConfirmation_sync is the confirmation to a SupplyNetworkPlanningAggregateHierarchyUndoExpandRequest_sync. The structure of SupplyNetworkPlanningAggregateHierarchyUndoExpandConfirmation_sync is specified by message data type SupplyNetworkPlanningAggregateHierarchyUndoExpandConfirmationMessage_sync.

SupplyNetworkPlanningAggregateHierarchyNavigationStepByIDQuery_sync is the inquiry for the NavigationSteps of a SupplyNetworkPlanningAggregateHierarchy. The structure of SupplyNetworkPlanningAggregateHierarchyNavigationStepByIDQuery_sync is specified by message data type SupplyNetworkPlanningAggregateHierarchyNavigationStepByIDQueryMessage_sync.

SupplyNetworkPlanningAggregateHierarchyNavigationStepByIDResponse_sync is the response to a SupplyNetworkPlanningAggregateHierarchyNavigationStepByIDQuery_sync. The structure of SupplyNetworkPlanningAggregateHierarchyNavigationStepByIDResponse_sync is specified by message data type SupplyNetworkPlanningAggregateHierarchyNavigationStepByIDResponseMessage_sync.

SupplyNetworkPlanningAggregateHierarchyNavigateRequest_sync is the request to execute a navigation operation on a SupplyNetworkPlanningAggregateHierarchy. The structure of SupplyNetworkPlanningAggregateHierarchyNavigateRequest_sync is specified by message data type SupplyNetworkPlanningAggregateHierarchyNavigateRequestMessage_sync. This operation corresponds to a NavigationStep of a SupplyNetworkPlanningAggregateHierarchy. It navigates from one or more AggregateInstances to one or more other related AggregateInstances by replacing them in the hierarchy. Additionally it updates the NavigationSteps to the new hierarchy and step history.

SupplyNetworkPlanningAggregateHierarchyNavigateConfirmation_sync is the confirmation to a SupplyNetworkPlanningAggregateHierarchyNavigateRequest_sync. The structure of SupplyNetworkPlanningAggregateHierarchyNavigateConfirmation_sync is specified by message data type SupplyNetworkPlanningAggregateHierarchyNavigateConfirmationMessage_sync.

SupplyNetworkPlanningAggregateHierarchyUndoNavigateRequest_sync is the request to undo the last executed navigation operation of a SupplyNetworkPlanningAggregateHierarchy. The structure of SupplyNetworkPlanningAggregateHierarchyUndoNavigateRequest_sync is specified by message data type SupplyNetworkPlanningAggregateHierarchyUndoNavigateRequestMessage_sync.

SupplyNetworkPlanningAggregateHierarchyUndoNavigateConfirmation_sync is the confirmation to a SupplyNetworkPlanningAggregateHierarchyUndoNavigateRequest_sync. The structure of SupplyNetworkPlanningAggregateHierarchyUndoNavigateConfirmation_sync is specified by message data type SupplyNetworkPlanningAggregateHierarchyUndoNavigateConfirmationMessage_sync.

Figure 85:
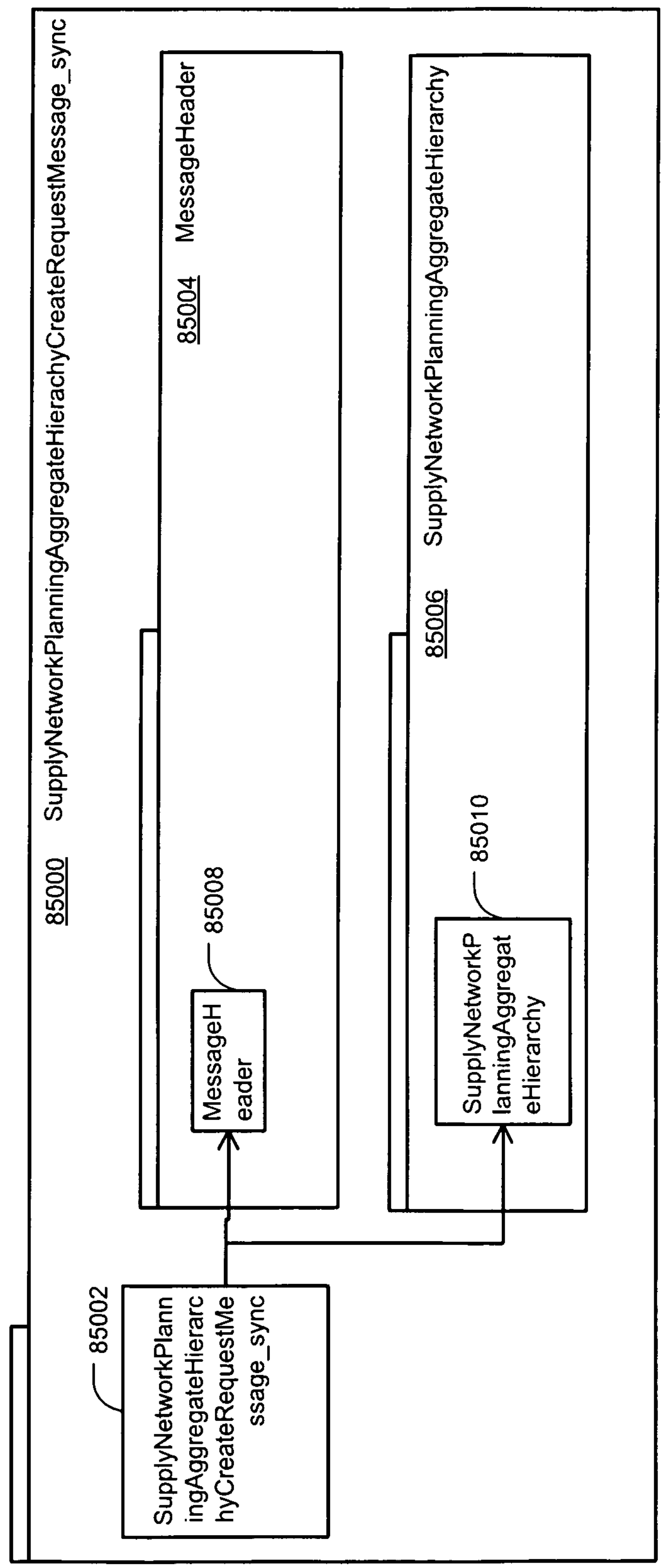
FIG. 85 shows an exemplary SupplyNetworkPlanningAggregateHierarchyCreateRequestMessage_sync Message Data Type.

FIG. 85 illustrates one example logical configuration of SupplyNetworkPlanningAggregateHierarchyCreateRequestMessage message 85000. Specifically, this figure depicts the arrangement and hierarchy of various components such as one or more levels of packages, entities, and datatypes, shown here as 85000 through 85010.

As described above, packages may be used to represent hierarchy levels. Entities are discrete business elements that are used during a business transaction. Data types are used to type object entities and interfaces with a structure. For example, SupplyNetworkPlanningAggregateHierarchyCreateRequestMessage message 85000 includes, among other things, SupplyNetworkPlanningAggregateHierarchy 85006. Accordingly, heterogeneous applications may communicate using this consistent message configured as such.

Figure 86:
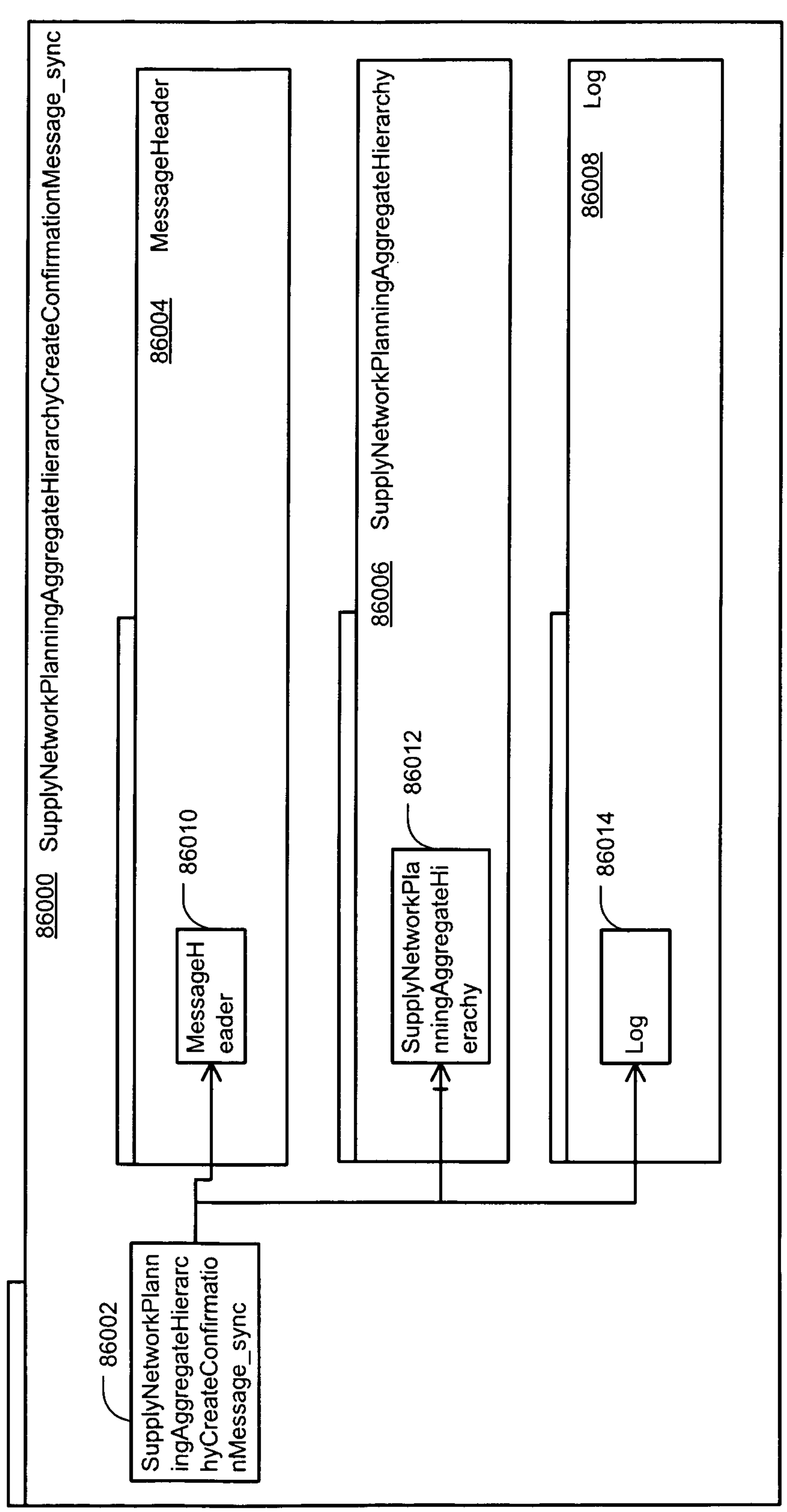
FIG. 86 shows an exemplary SupplyNetworkPlanningAggregateHierarchyCreateConfirmationMessage_sync Message Data Type.

Additionally, FIG. 86 illustrates one example logical configuration of SupplyNetworkPlanningAggregateHierarchyCreateConfirmationMessage message 86000. Specifically, this figure depicts the arrangement and hierarchy of various components such as one or more levels of packages, entities, and datatypes, shown here as 86000 through 86014. As described above, packages may be used to represent hierarchy levels. Entities are discrete business elements that are used during a business transaction. Data types are used to type object entities and interfaces with a structure. For example, SupplyNetworkPlanningAggregateHierarchyCreateConfirmationMessage message 86000 includes, among other things, SupplyNetworkPlanningAggregateHierarchy 86006. Accordingly, heterogeneous applications may communicate using this consistent message configured as such.

Figure 87:
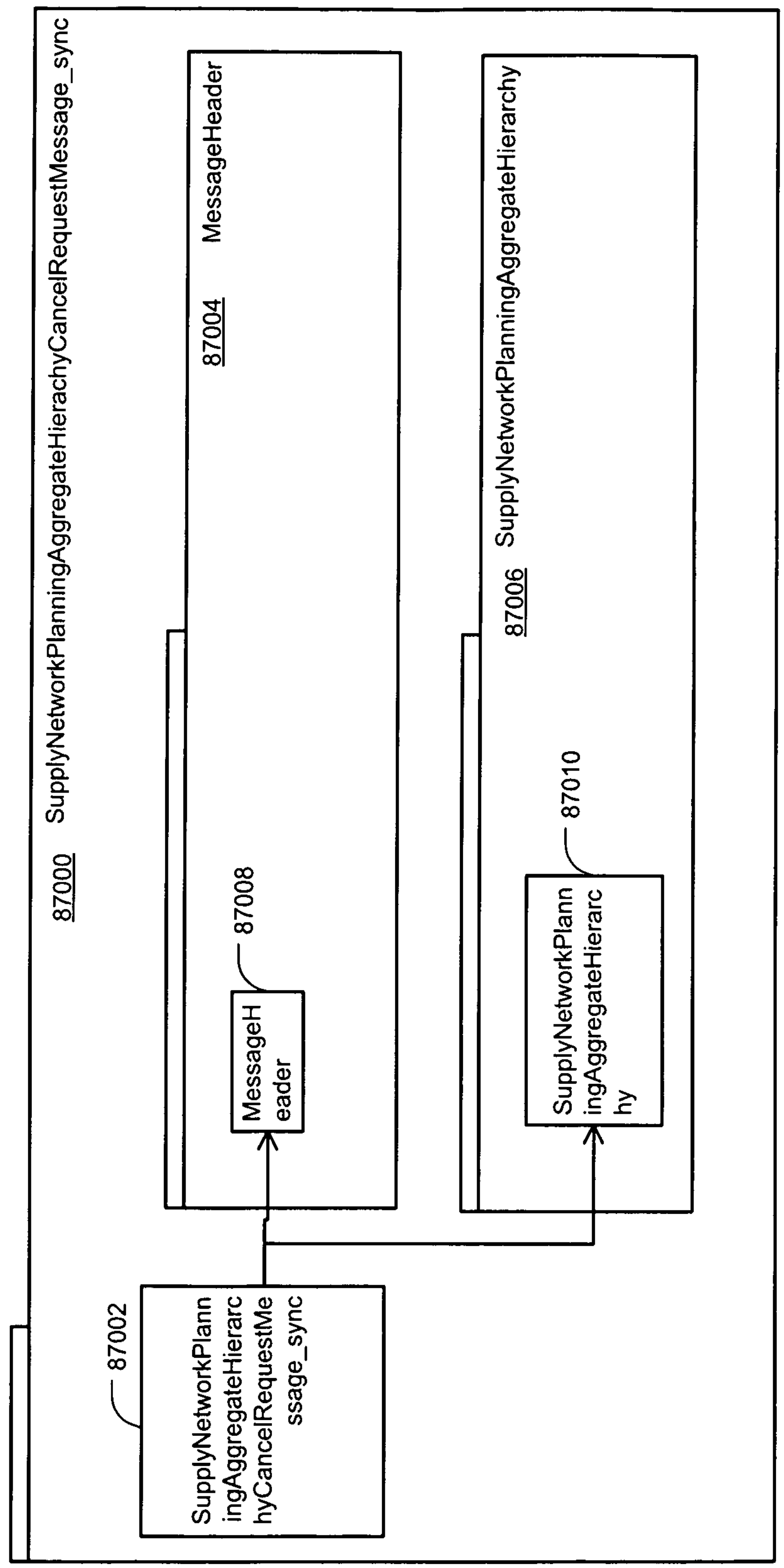
FIG. 87 shows an exemplary SupplyNetworkPlanningAggregateHierarchyCancelRequestMessage_sync Message Data Type.

Additionally, FIG. 87 illustrates one example logical configuration of SupplyNetworkPlanningAggregateHierarchyCancelRequestMessage message 87000. Specifically, this figure depicts the arrangement and hierarchy of various components such as one or more levels of packages, entities, and datatypes, shown here as 87000 through 87010. As described above, packages may be used to represent hierarchy levels. Entities are discrete business elements that are used during a business transaction. Data types are used to type object entities and interfaces with a structure. For example, SupplyNetworkPlanningAggregateHierarchyCancelRequestMessage message 87000 includes, among other things, SupplyNetworkPlanningAggregateHierarchy 87006. Accordingly, heterogeneous applications may communicate using this consistent message configured as such.

Figure 88:
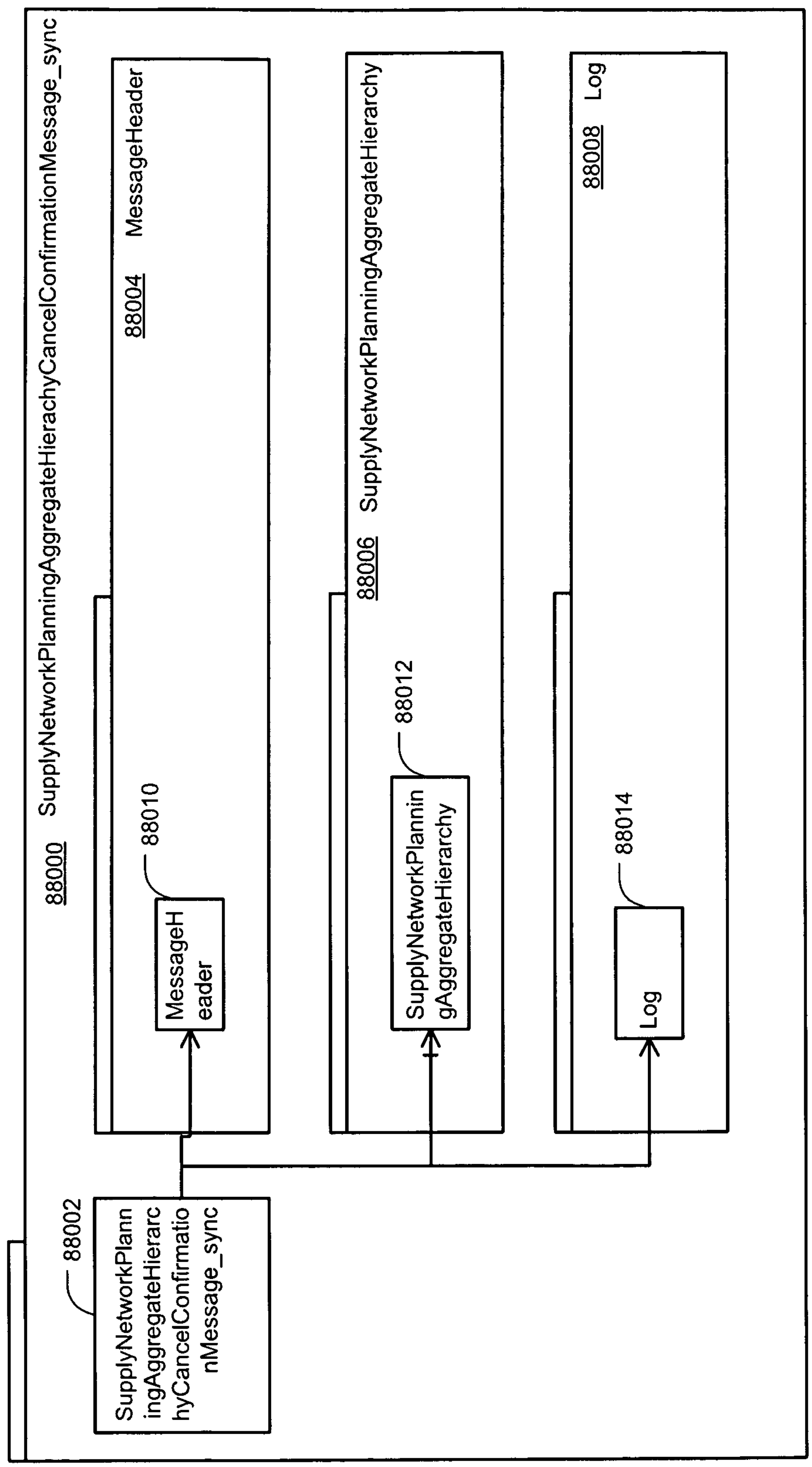
FIG. 88 shows an exemplary SupplyNetworkPlanningAggregateHierarchyCancelConfirmationMessage_sync Message Data Type.

Additionally, FIG. 88 illustrates one example logical configuration of SupplyNetworkPlanningAggregateHierarchyCancelConfirmationMessage message 88000. Specifically, this figure depicts the arrangement and hierarchy of various components such as one or more levels of packages, entities, and datatypes, shown here as 88000 through 88014. As described above, packages may be used to represent hierarchy levels. Entities are discrete business elements that are used during a business transaction. Data types are used to type object entities and interfaces with a structure. For example, SupplyNetworkPlanningAggregateHierarchyCancelConfirmationMessage message 88000 includes, among other things, SupplyNetworkPlanningAggregateHierarchy 88006. Accordingly, heterogeneous applications may communicate using this consistent message configured as such.

Figure 89:
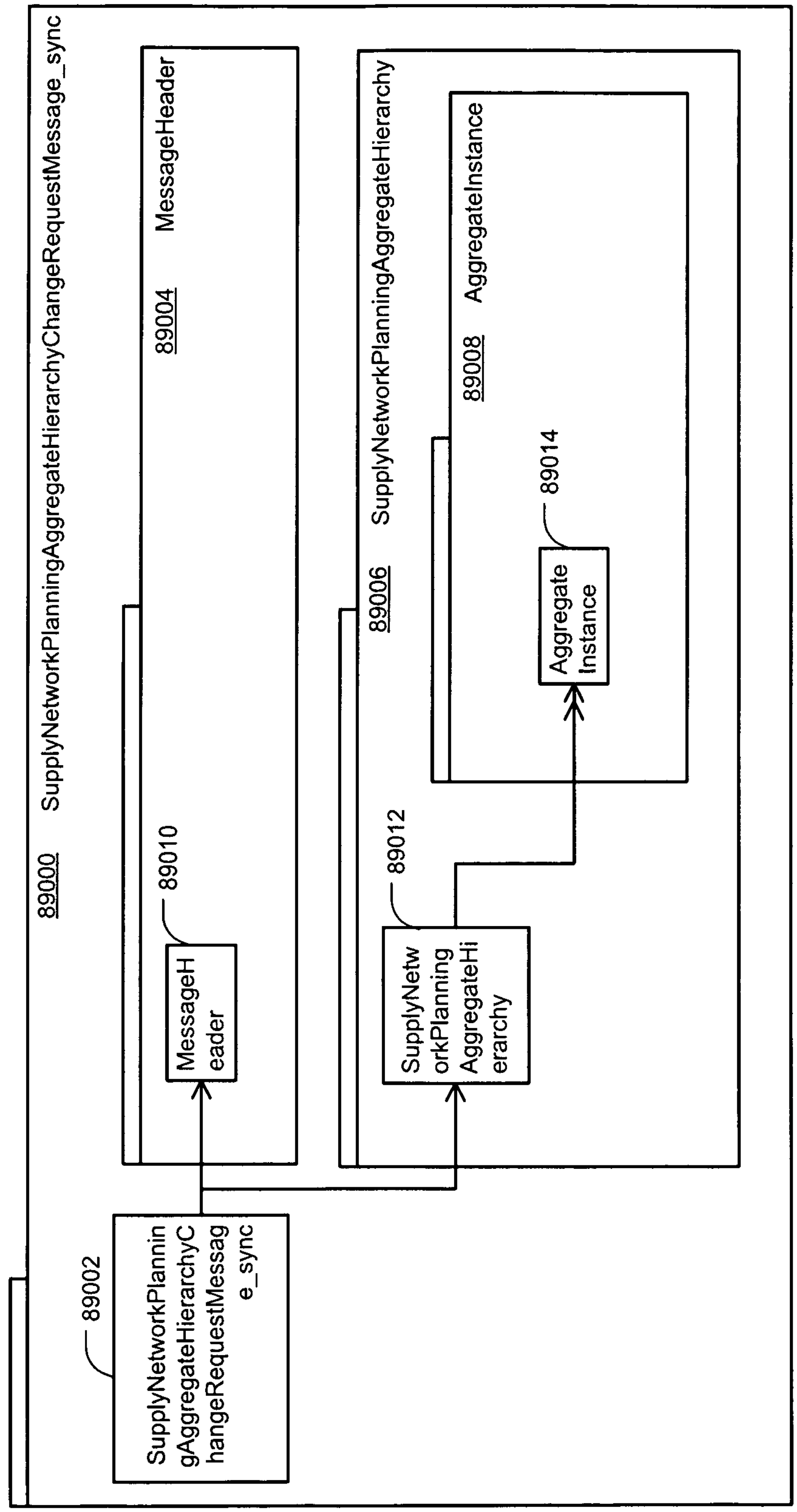
FIG. 89 shows an exemplary SupplyNetworkPlanningAggregateHierarchyChangeRequestMessage_sync Message Data Type.

Additionally, FIG. 89 illustrates one example logical configuration of SupplyNetworkPlanningAggregateHierarchyChangeRequestMessage message 89000. Specifically, this figure depicts the arrangement and hierarchy of various components such as one or more levels of packages, entities, and datatypes, shown here as 89000 through 89014. As described above, packages may be used to represent hierarchy levels. Entities are discrete business elements that are used during a business transaction. Data types are used to type object entities and interfaces with a structure. For example, SupplyNetworkPlanningAggregateHierarchyChangeRequestMessage message 89000 includes, among other things, SupplyNetworkPlanningAggregateHierarchy 89006. Accordingly, heterogeneous applications may communicate using this consistent message configured as such.

Figure 90:
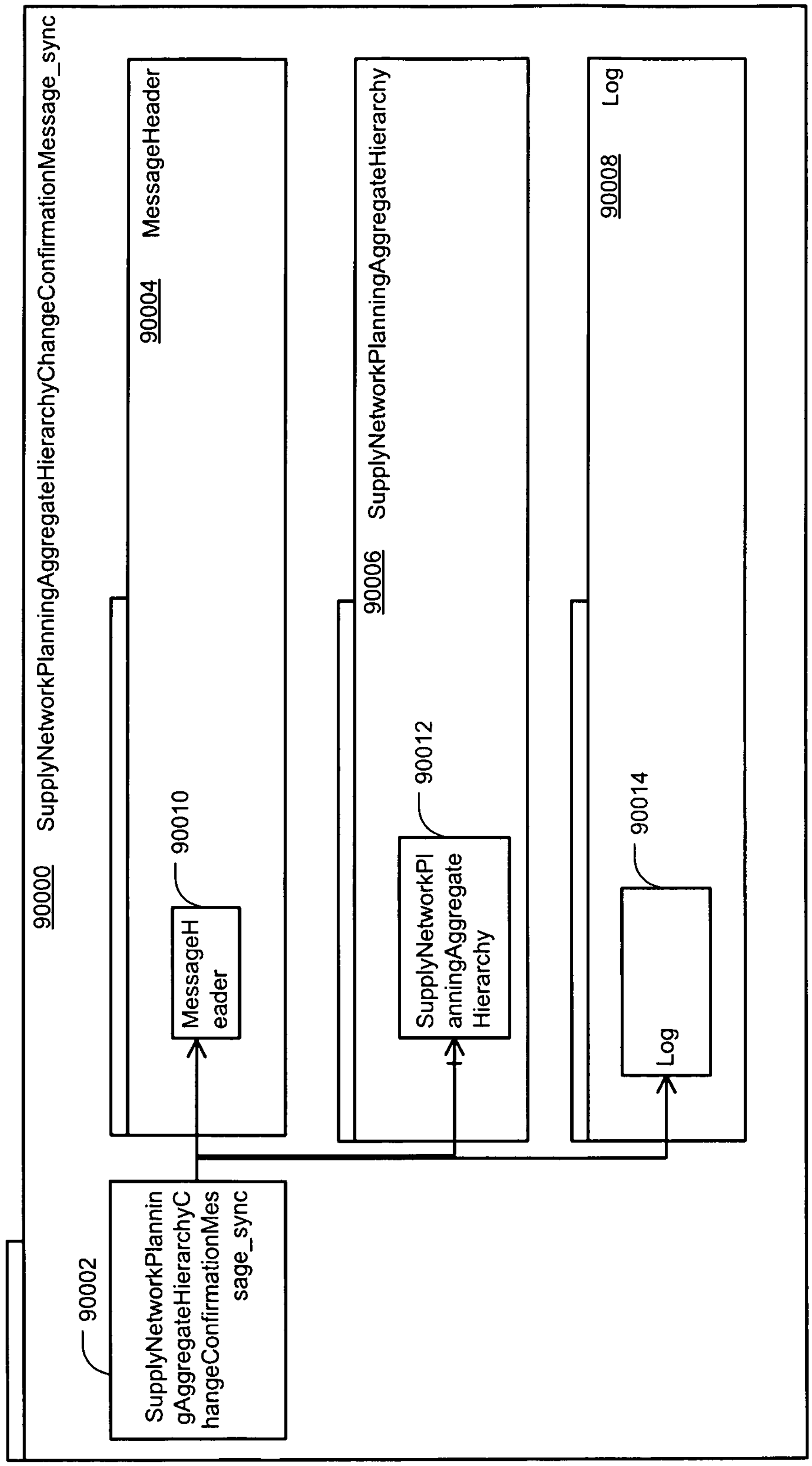
FIG. 90 shows an exemplary SupplyNetworkPlanningAggregateHierarchyChangeConfirmationMessage_sync Message Data Type.

Additionally, FIG. 90 illustrates one example logical configuration of SupplyNetworkPlanningAggregateHierarchyChangeConfirmationMessage message 90000. Specifically, this figure depicts the arrangement and hierarchy of various components such as one or more levels of packages, entities, and datatypes, shown here as 90000 through 90014. As described above, packages may be used to represent hierarchy levels. Entities are discrete business elements that are used during a business transaction. Data types are used to type object entities and interfaces with a structure. For example, SupplyNetworkPlanningAggregateHierarchyChangeConfirmationMessage message 90000 includes, among other things, SupplyNetworkPlanningAggregateHierarchy 90006. Accordingly, heterogeneous applications may communicate using this consistent message configured as such.

Figure 91:
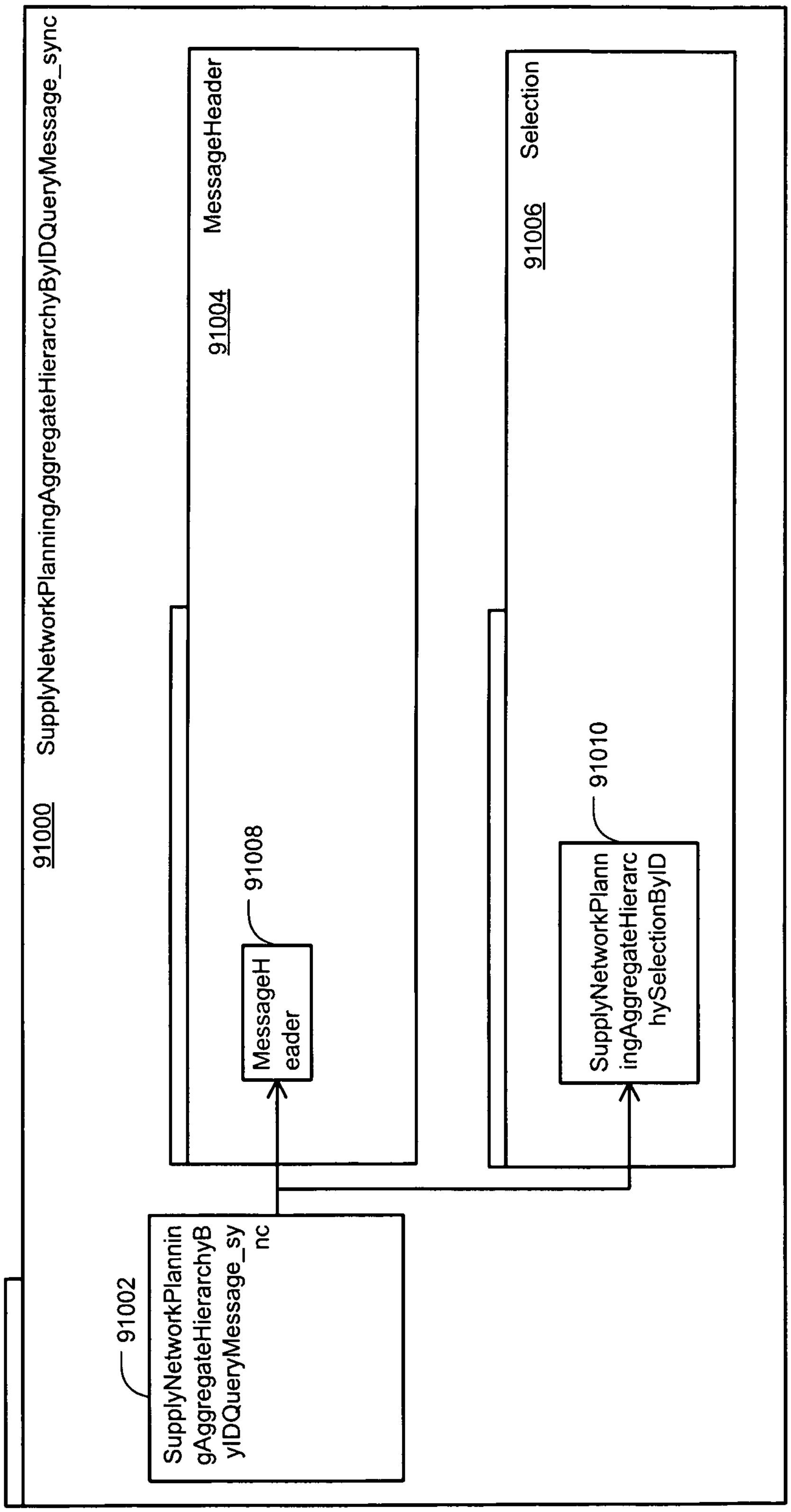
FIG. 91 shows an exemplary SupplyNetworkPlanningAggregateHierarchyByIDQueryMessage_sync Message Data Type.

Additionally, FIG. 91 illustrates one example logical configuration of SupplyNetworkPlanningAggregateHierarchyByIDQueryMessage message 91000. Specifically, this figure depicts the arrangement and hierarchy of various components such as one or more levels of packages, entities, and datatypes, shown here as 91000 through 91010. As described above, packages may be used to represent hierarchy levels. Entities are discrete business elements that are used during a business transaction. Data types are used to type object entities and interfaces with a structure. For example, SupplyNetworkPlanningAggregateHierarchyByIDQueryMessage message 91000 includes, among other things, Selection 91006. Accordingly, heterogeneous applications may communicate using this consistent message configured as such.

Figure 92:
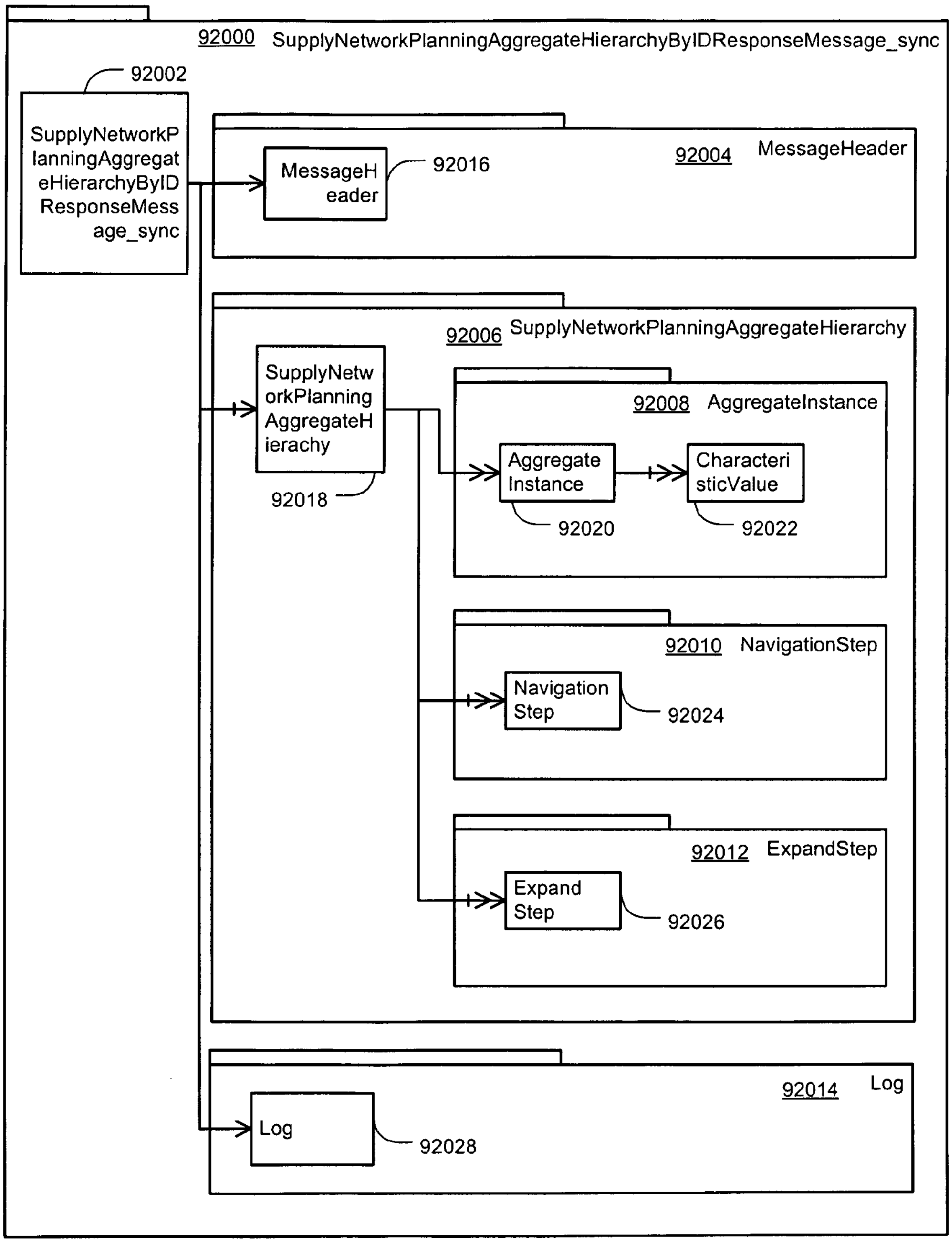
FIG. 92 shows an exemplary SupplyNetworkPlanningAggregateHierarchyByIDResponseMessage_sync Message Data Type.

Additionally, FIG. 92 illustrates one example logical configuration of SupplyNetworkPlanningAggregateHierarchyByIDResponseMessage message 92000. Specifically, this figure depicts the arrangement and hierarchy of various components such as one or more levels of packages, entities, and datatypes, shown here as 92000 through 92028. As described above, packages may be used to represent hierarchy levels. Entities are discrete business elements that are used during a business transaction. Data types are used to type object entities and interfaces with a structure. For example, SupplyNetworkPlanningAggregateHierarchyByIDResponseMessage message 92000 includes, among other things, SupplyNetworkPlanningAggregateHierarchy 92006. Accordingly, heterogeneous applications may communicate using this consistent message configured as such.

Figure 93:
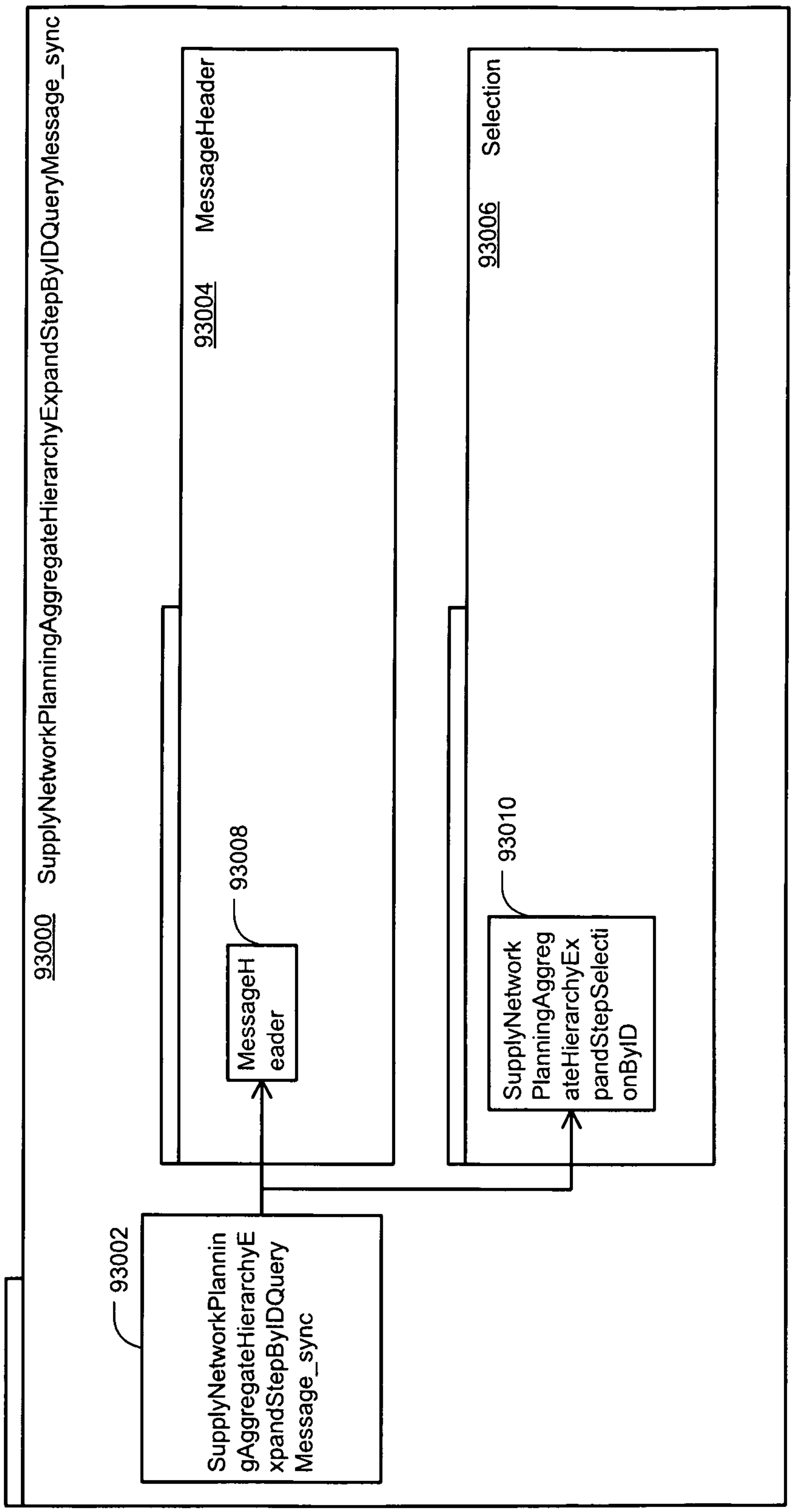
FIG. 93 shows an exemplary SupplyNetworkPlanningAggregateHierarchyExpandStepByIDQueryMessage_sync Message Data Type.

Additionally, FIG. 93 illustrates one example logical configuration of SupplyNetworkPlanningAggregateHierarchyExpandStepByIDQueryMessage message 93000. Specifically, this figure depicts the arrangement and hierarchy of various components such as one or more levels of packages, entities, and datatypes, shown here as 93000 through 93010. As described above, packages may be used to represent hierarchy levels. Entities are discrete business elements that are used during a business transaction. Data types are used to type object entities and interfaces with a structure. For example, SupplyNetworkPlanningAggregateHierarchyExpandStepByIDQueryMessage message 93000 includes, among other things, Selection 93006.

Accordingly, heterogeneous applications may communicate using this consistent message configured as such.

Figure 94:
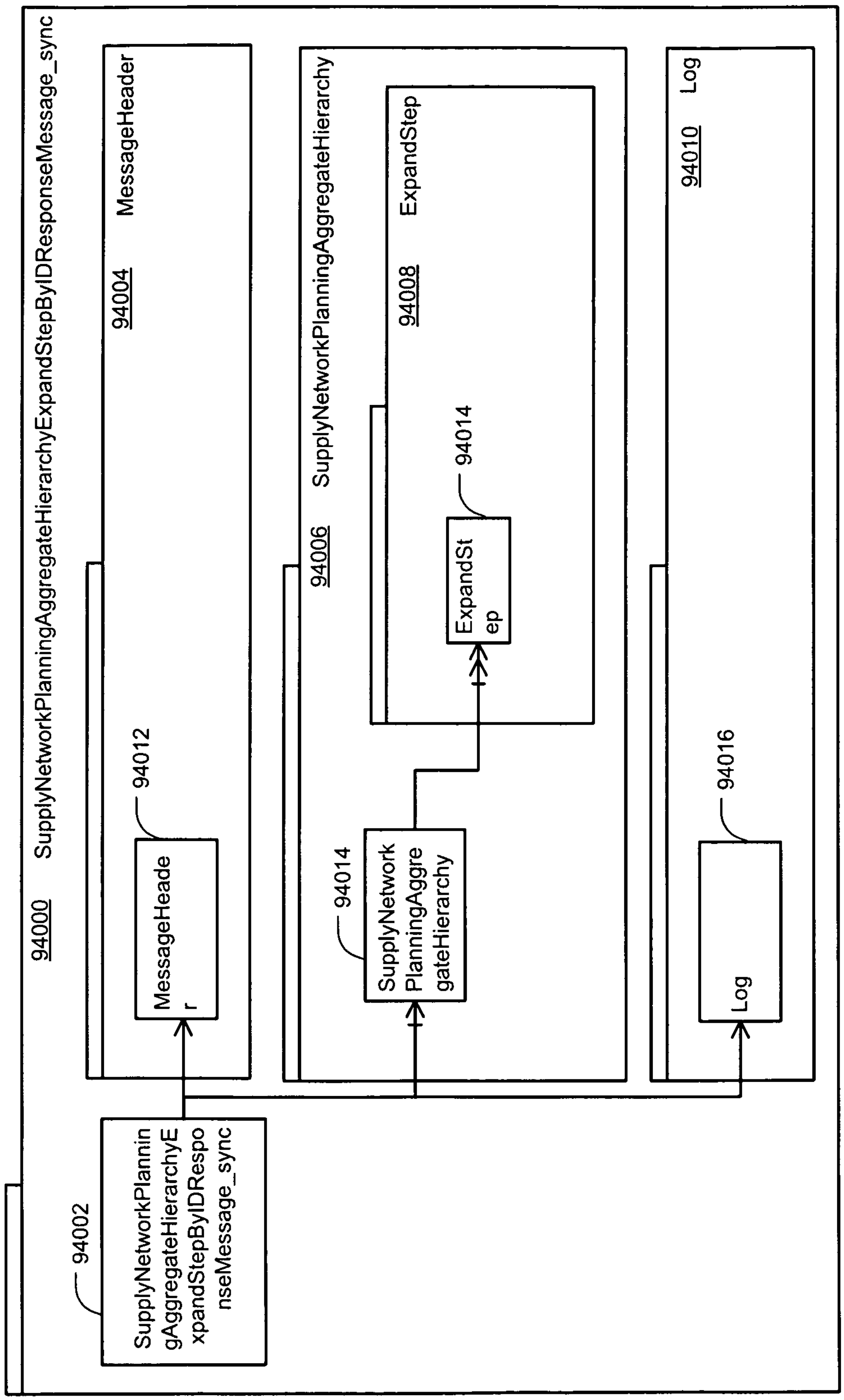
FIG. 94 shows an exemplary SupplyNetworkPlanningAggregateHierarchyExpandStepByIDResponseMessage_sync Message Data Type.

Additionally, FIG. 94 illustrates one example logical configuration of SupplyNetworkPlanningAggregateHierarchyExpandStepByIDResponseMessage message 94000. Specifically, this figure depicts the arrangement and hierarchy of various components such as one or more levels of packages, entities, and datatypes, shown here as 94000 through 94016. As described above, packages may be used to represent hierarchy levels. Entities are discrete business elements that are used during a business transaction. Data types are used to type object entities and interfaces with a structure. For example, SupplyNetworkPlanningAggregateHierarchyExpandStepByIDResponseMessage message 94000 includes, among other things, SupplyNetworkPlanningAggregateHierarchy 94006. Accordingly, heterogeneous applications may communicate using this consistent message configured as such.

Figure 95:
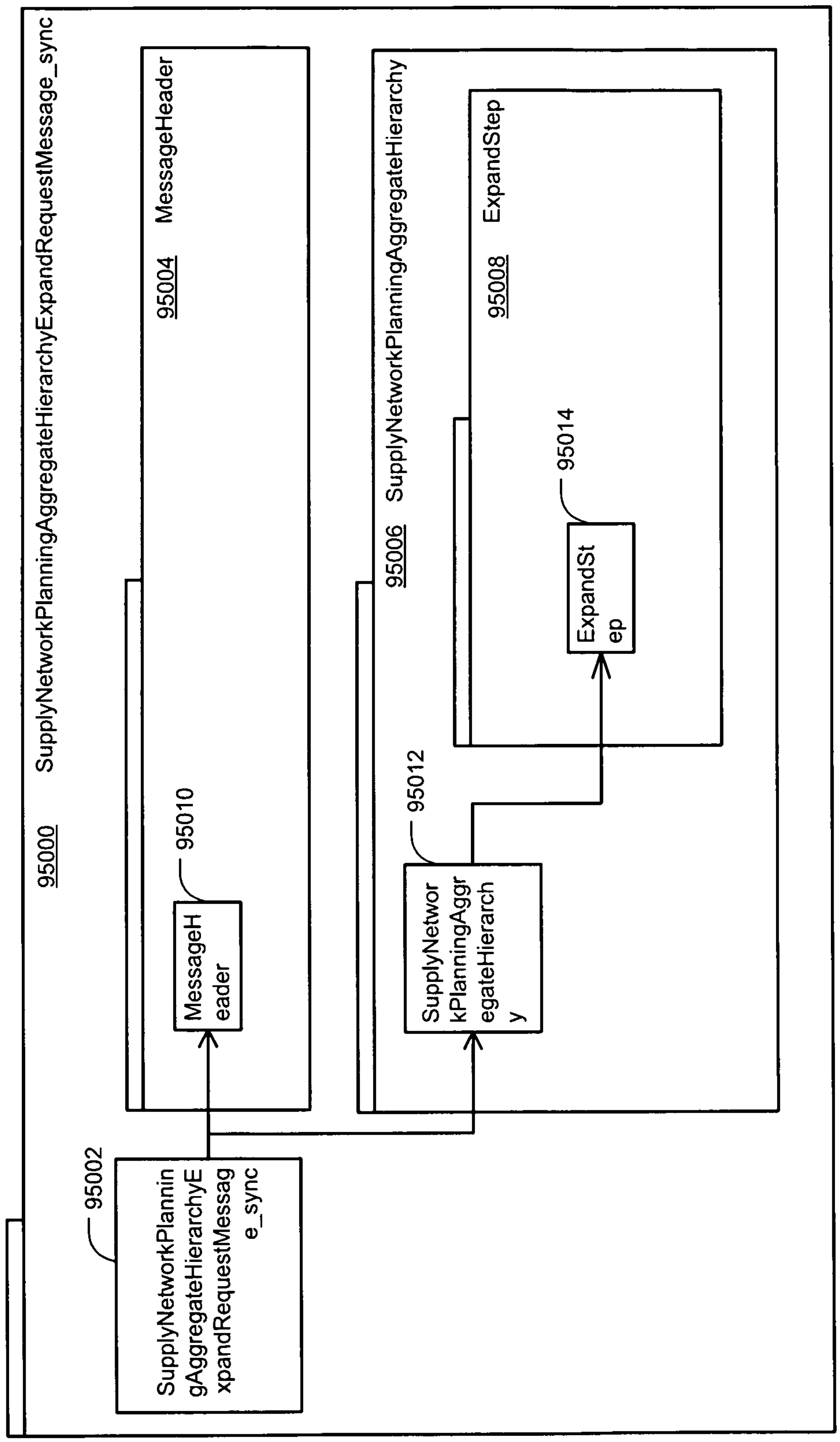
FIG. 95 shows an exemplary SupplyNetworkPlanningAggregateHierarchyExpandRequestMessage_sync Message Data Type.

Additionally, FIG. 95 illustrates one example logical configuration of SupplyNetworkPlanningAggregateHierarchyExpandRequestMessage message 95000. Specifically, this figure depicts the arrangement and hierarchy of various components such as one or more levels of packages, entities, and datatypes, shown here as 95000 through 95014. As described above, packages may be used to represent hierarchy levels. Entities are discrete business elements that are used during a business transaction. Data types are used to type object entities and interfaces with a structure. For example, SupplyNetworkPlanningAggregateHierarchyExpandRequestMessage message 95000 includes, among other things, SupplyNetworkPlanningAggregateHierarchy 95006. Accordingly, heterogeneous applications may communicate using this consistent message configured as such.

Figure 96:
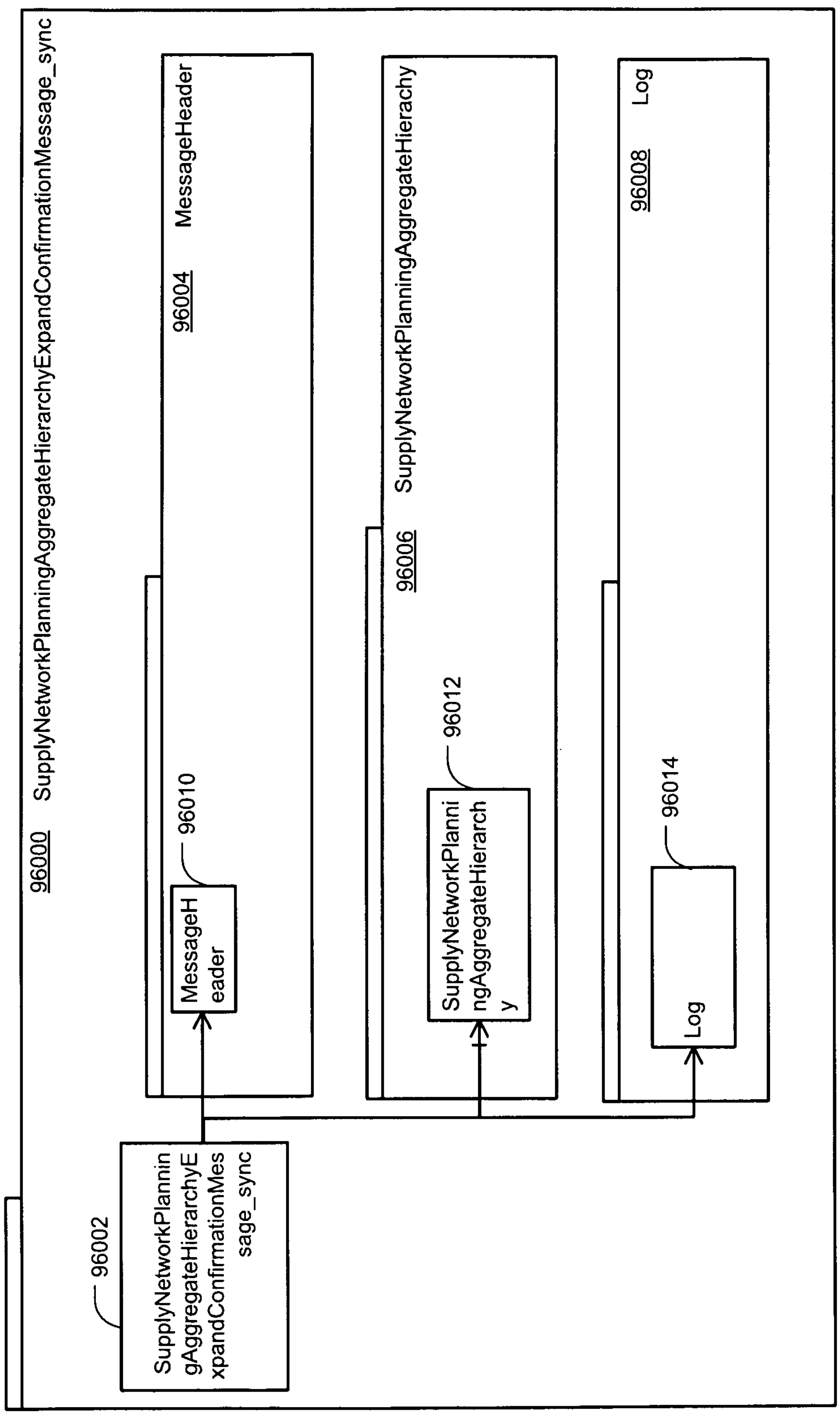
FIG. 96 shows an exemplary SupplyNetworkPlanningAggregateHierarchyExpandConfirmationMessage_sync Message Data Type.

Additionally, FIG. 96 illustrates one example logical configuration of SupplyNetworkPlanningAggregateHierarchyExpandConfirmationMessage message 96000. Specifically, this figure depicts the arrangement and hierarchy of various components such as one or more levels of packages, entities, and datatypes, shown here as 96000 through 96014. As described above, packages may be used to represent hierarchy levels. Entities are discrete business elements that are used during a business transaction. Data types are used to type object entities and interfaces with a structure. For example, SupplyNetworkPlanningAggregateHierarchyExpandConfirmationMessage message 96000 includes, among other things, SupplyNetworkPlanningAggregateHierarchy 96006. Accordingly, heterogeneous applications may communicate using this consistent message configured as such.

Figure 97:
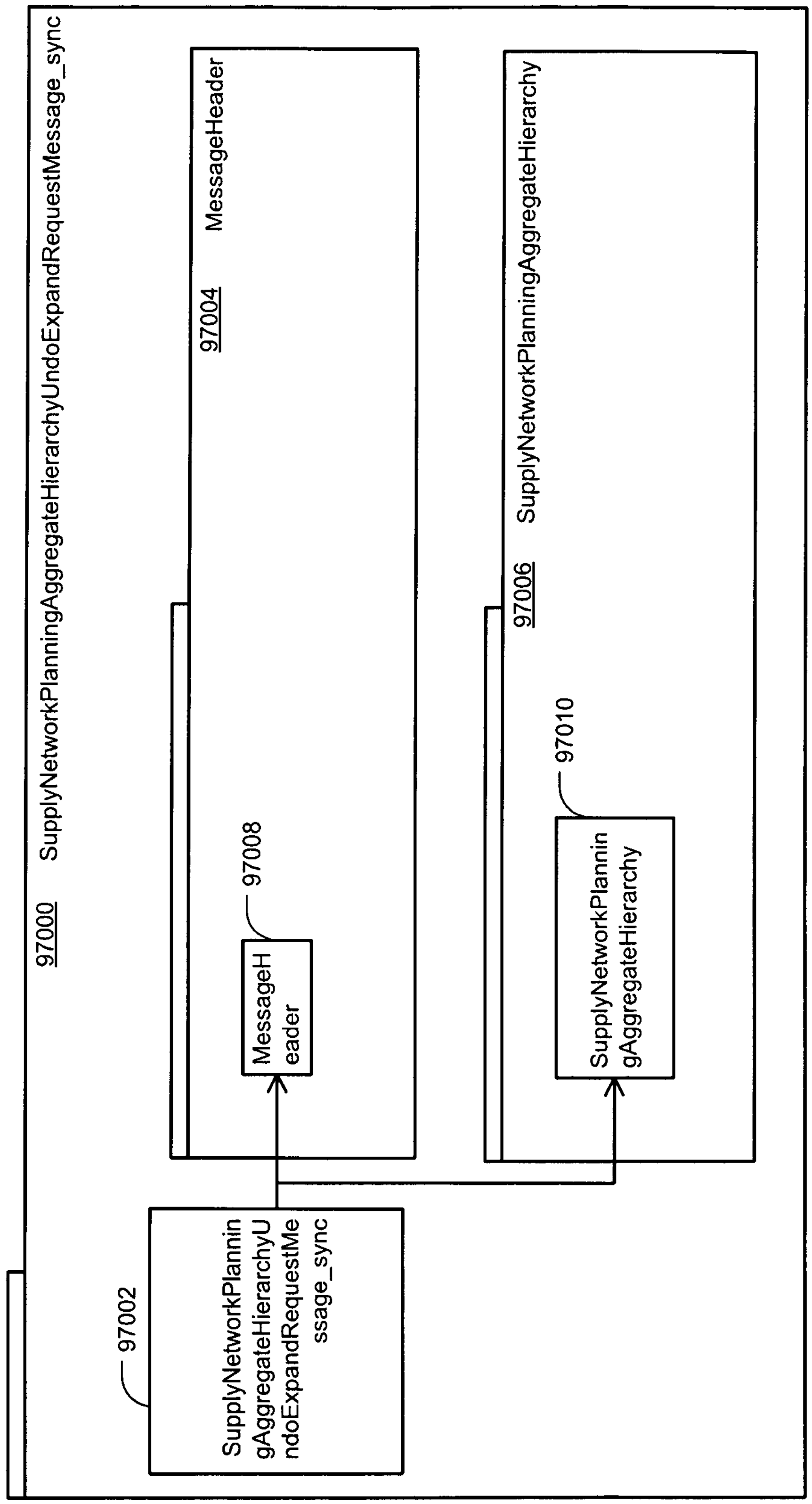
FIG. 97 shows an exemplary SupplyNetworkPlanningAggregateHierarchyUndoExpandRequestMessage_sync Message Data Type.

Additionally, FIG. 97 illustrates one example logical configuration of SupplyNetworkPlanningAggregateHierarchyUndoExpandRequestMessage message 97000. Specifically, this figure depicts the arrangement and hierarchy of various components such as one or more levels of packages, entities, and datatypes, shown here as 97000 through 97010. As described above, packages may be used to represent hierarchy levels. Entities are discrete business elements that are used during a business transaction. Data types are used to type object entities and interfaces with a structure. For example, SupplyNetworkPlanningAggregateHierarchyUndoExpandRequestMessage message 97000 includes, among other things, SupplyNetworkPlanningAggregateHierarchy 97006. Accordingly, heterogeneous applications may communicate using this consistent message configured as such.

Figure 98:
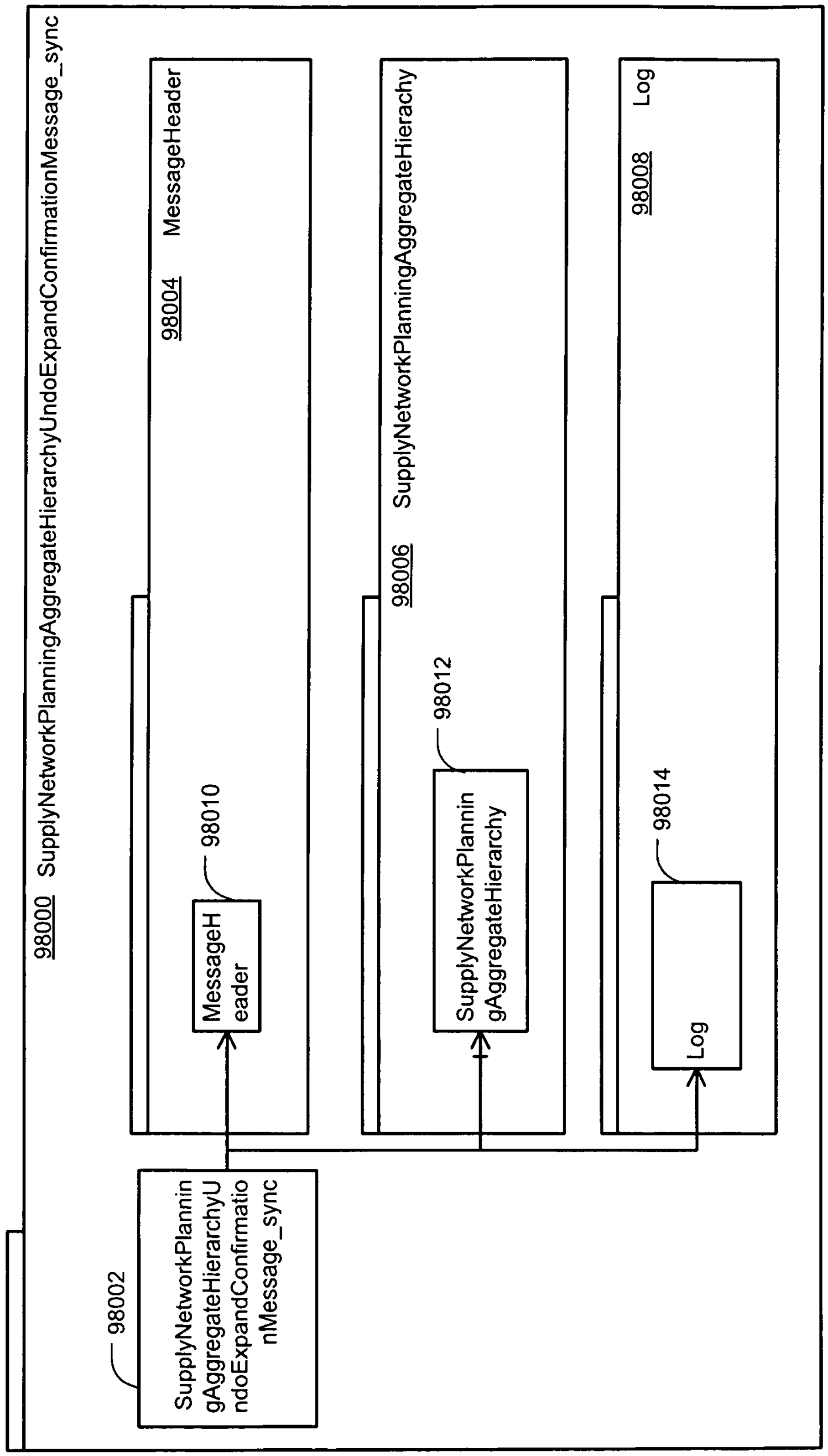
FIG. 98 shows an exemplary SupplyNetworkPlanningAggregateHierarchyUndoExpandConfirmationMessage_sync Message Data Type.

Additionally, FIG. 98 illustrates one example logical configuration of SupplyNetworkPlanningAggregateHierarchyUndoExpandConfirmationMessage message 98000. Specifically, this figure depicts the arrangement and hierarchy of various components such as one or more levels of packages, entities, and datatypes, shown here as 98000 through 98014. As described above, packages may be used to represent hierarchy levels. Entities are discrete business elements that are used during a business transaction. Data types are used to type object entities and interfaces with a structure. For example, SupplyNetworkPlanningAggregateHierarchyUndoExpandConfirmationMessage message 98000 includes, among other things, SupplyNetworkPlanningAggregateHierarchy 98006. Accordingly, heterogeneous applications may communicate using this consistent message configured as such.

Figure 99:
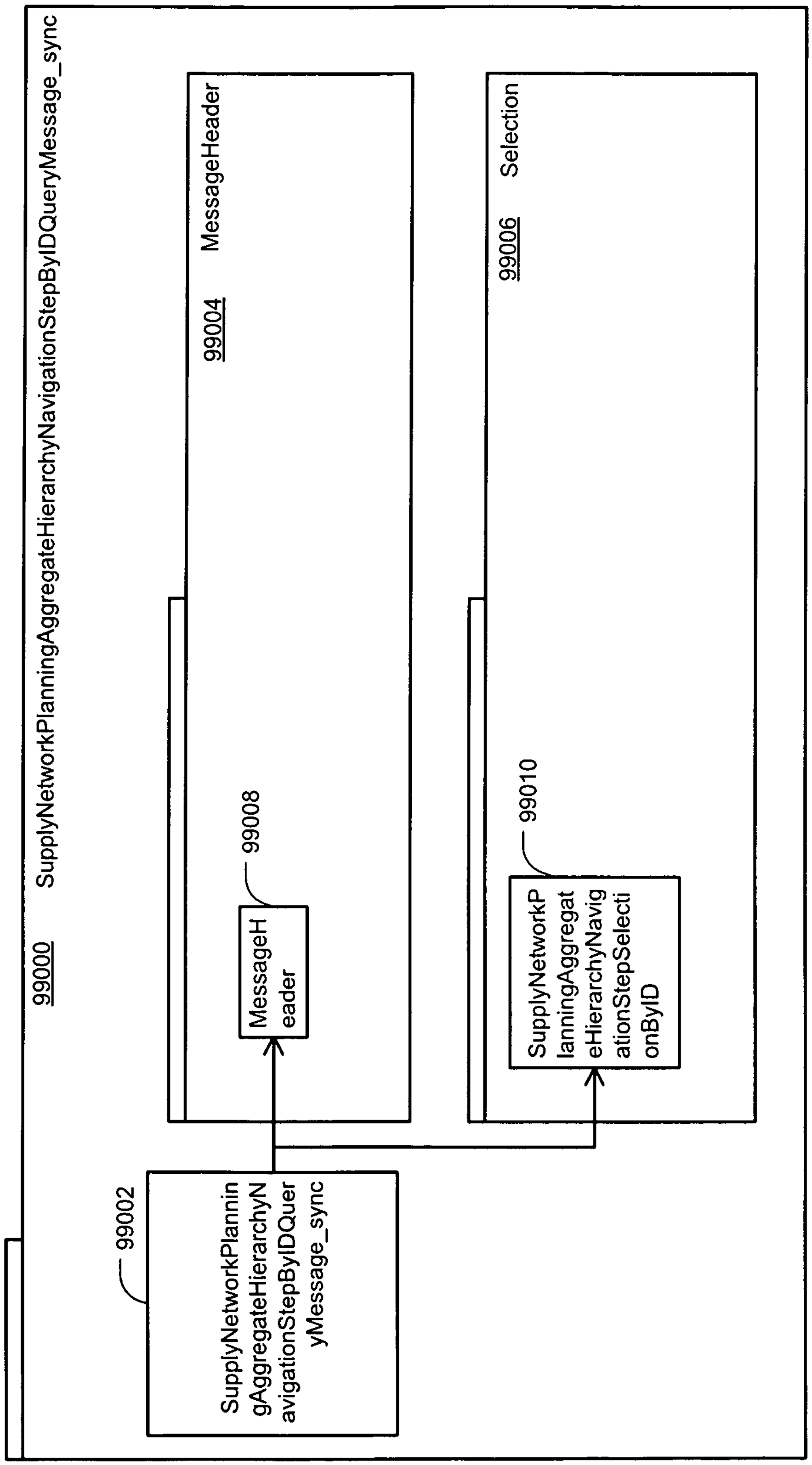
FIG. 99 shows an exemplary SupplyNetworkPlanningAggregateHierarchyNavigationStepByIDQueryMessage_sync Message Data Type.

Additionally, FIG. 99 illustrates one example logical configuration of SupplyNetworkPlanningAggregateHierarchyNavigationStepByIDQueryMessage message 99000. Specifically, this figure depicts the arrangement and hierarchy of various components such as one or more levels of packages, entities, and datatypes, shown here as 99000 through 99010. As described above, packages may be used to represent hierarchy levels. Entities are discrete business elements that are used during a business transaction. Data types are used to type object entities and interfaces with a structure. For example, SupplyNetworkPlanningAggregateHierarchyNavigationStepByIDQueryMessage message 99000 includes, among other things, Selection 99006. Accordingly, heterogeneous applications may communicate using this consistent message configured as such.

Figure 100:
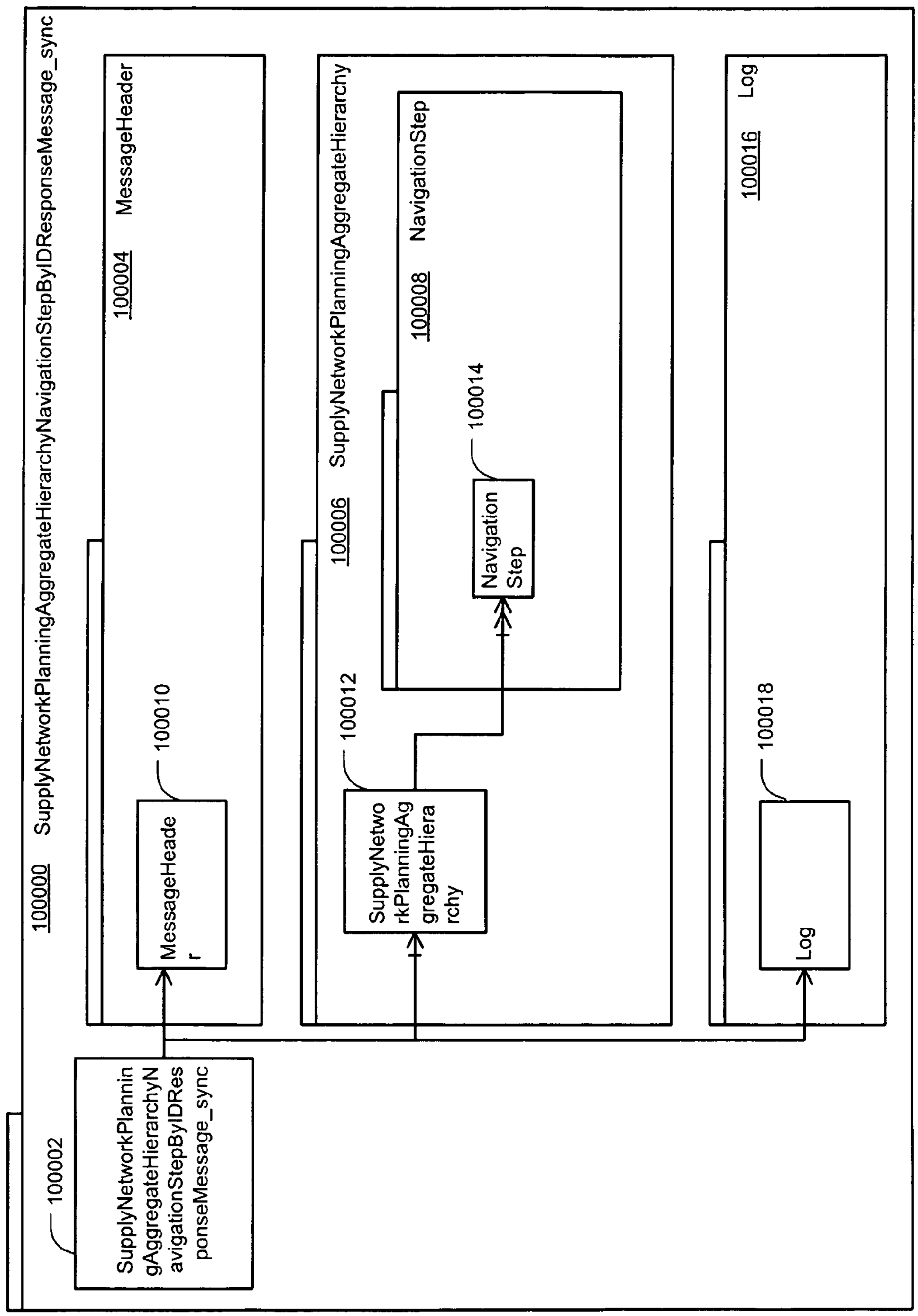
FIG. 100 shows an exemplary SupplyNetworkPlanningAggregateHierarchyNavigationStepByIDResponseMessage_sync Message Data Type.

Additionally, FIG. 100 illustrates one example logical configuration of SupplyNetworkPlanningAggregateHierarchyNavigationStepByIDResponseMessage message 100000. Specifically, this figure depicts the arrangement and hierarchy of various components such as one or more levels of packages, entities, and datatypes, shown here as 100000 through 100018. As described above, packages may be used to represent hierarchy levels. Entities are discrete business elements that are used during a business transaction. Data types are used to type object entities and interfaces with a structure. For example, SupplyNetworkPlanningAggregateHierarchyNavigationStepByIDResponseMessage message 100000 includes, among other things, SupplyNetworkPlanningAggregateHierarchy 100006. Accordingly, heterogeneous applications may communicate using this consistent message configured as such.

Figure 101:
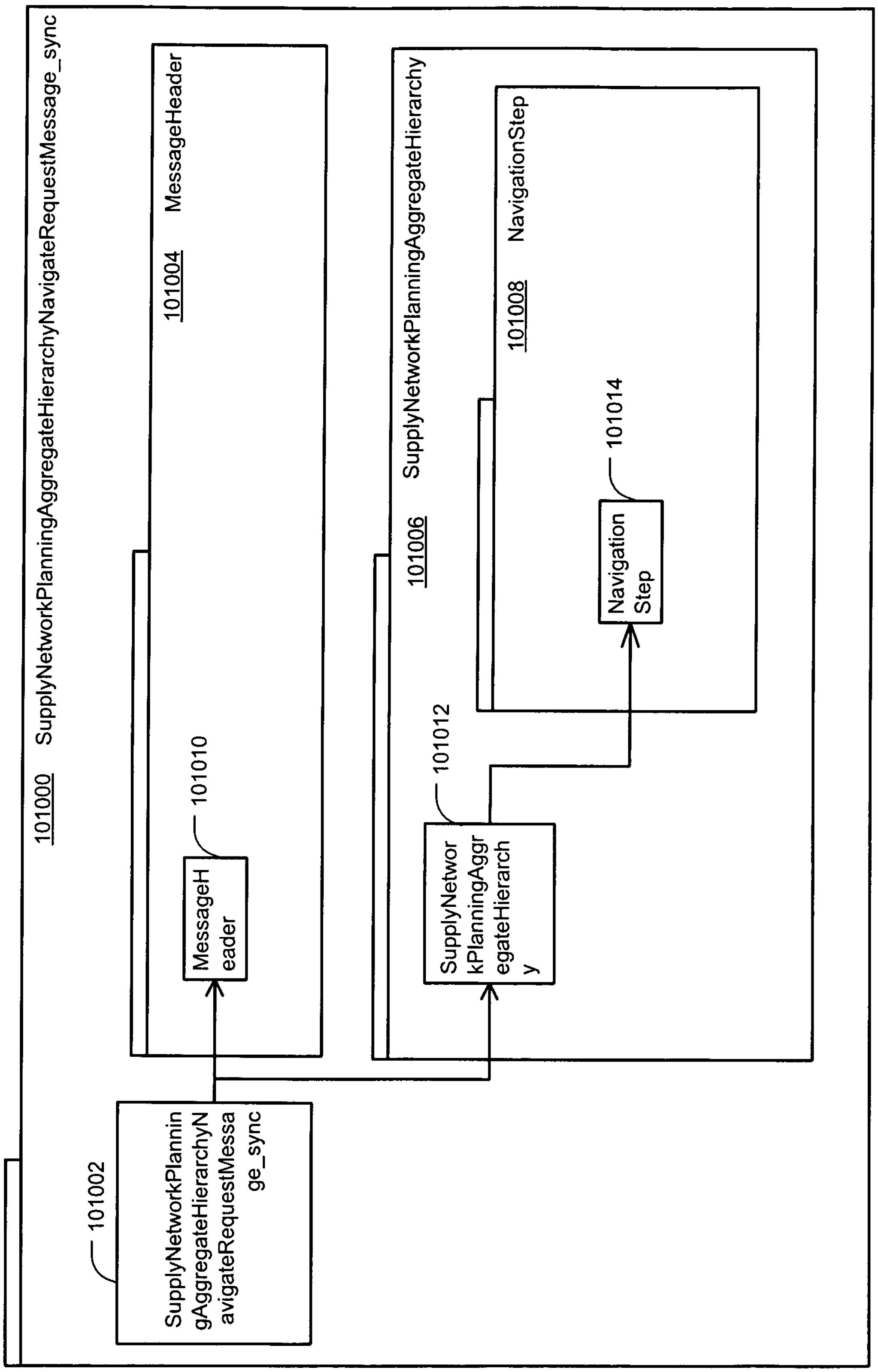
FIG. 101 shows an exemplary SupplyNetworkPlanningAggregateHierarchyNavigateRequestMessage_sync Message Data Type.

Additionally, FIG. 101 illustrates one example logical configuration of SupplyNetworkPlanningAggregateHierarchyNavigateRequestMessage message 101000. Specifically, this figure depicts the arrangement and hierarchy of various components such as one or more levels of packages, entities, and datatypes, shown here as 101000 through 101014. As described above, packages may be used to represent hierarchy levels. Entities are discrete business elements that are used during a business transaction. Data types are used to type object entities and interfaces with a structure. For example, SupplyNetworkPlanningAggregateHierarchyNavigateRequestMessage message 101000 includes, among other things, SupplyNetworkPlanningAggregateHierarchy 101006. Accordingly, heterogeneous applications may communicate using this consistent message configured as such.

Figure 102:
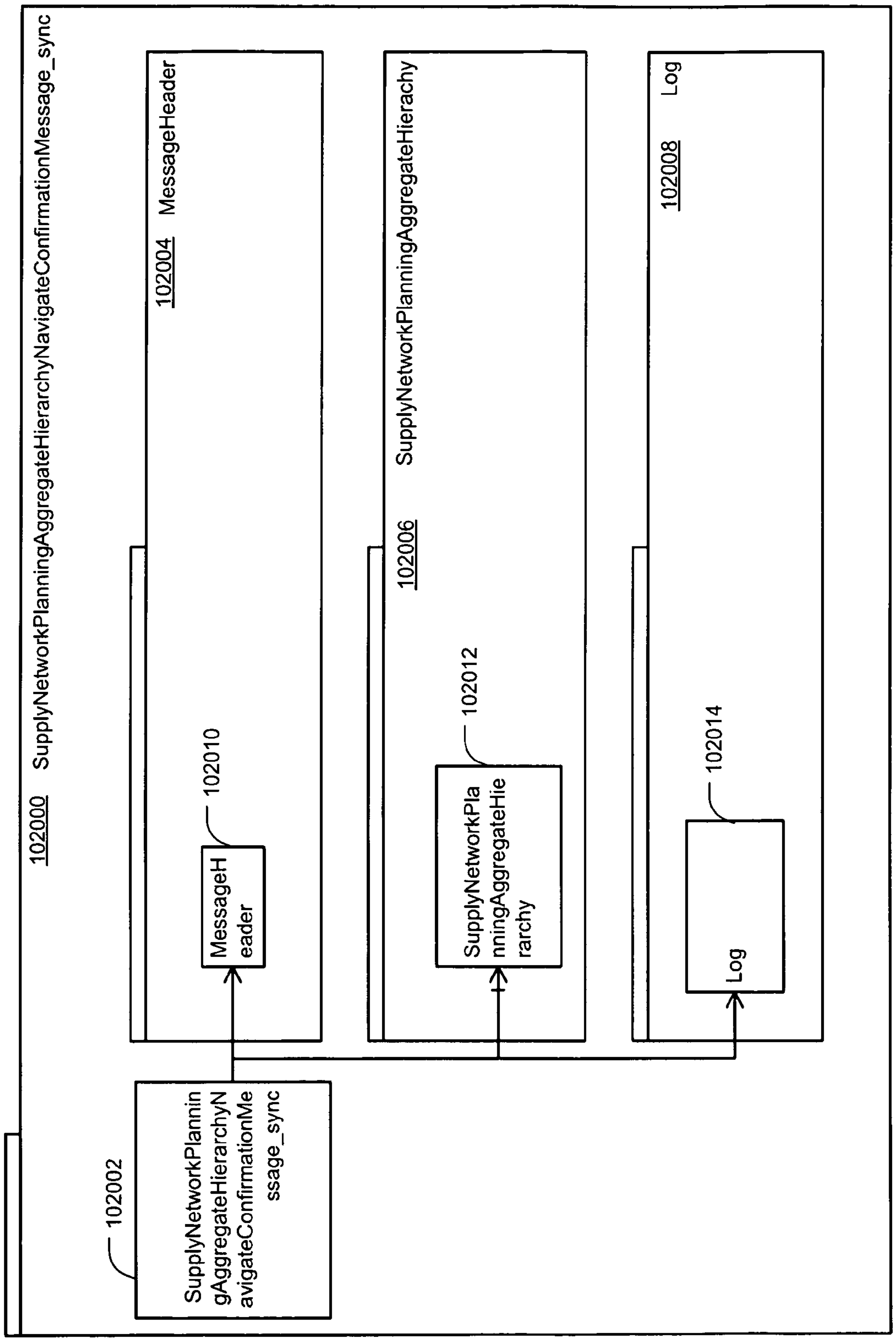
FIG. 102 shows an exemplary SupplyNetworkPlanningAggregateHierarchyNavigateConfirmationMessage_sync Message Data Type.

Additionally, FIG. 102 illustrates one example logical configuration of SupplyNetworkPlanningAggregateHierarchyNavigateConfirmationMessage message 102000. Specifically, this figure depicts the arrangement and hierarchy of various components such as one or more levels of packages, entities, and datatypes, shown here as 102000 through 102014. As described above, packages may be used to represent hierarchy levels. Entities are discrete business elements that are used during a business transaction. Data types are used to type object entities and interfaces with a structure. For example, SupplyNetworkPlanningAggregateHierarchyNavigateConfirmationMessage message 102000 includes, among other things, SupplyNetworkPlanningAggregateHierarchy 102006. Accordingly, heterogeneous applications may communicate using this consistent message configured as such.

Figure 103:
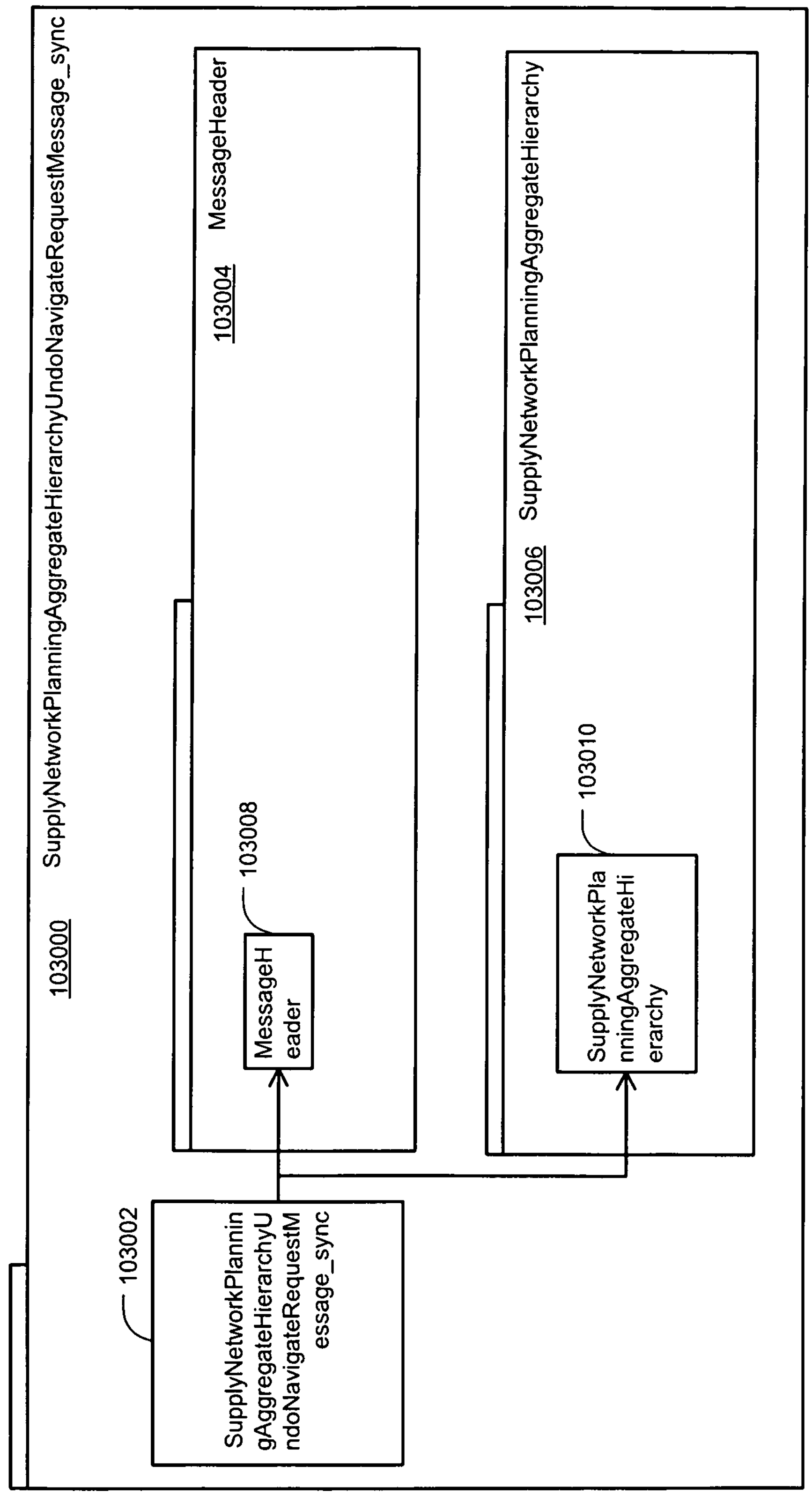
FIG. 103 shows an exemplary SupplyNetworkPlanningAggregateHierarchyUndoNavigateRequestMessage_sync Message Data Type.

Additionally, FIG. 103 illustrates one example logical configuration of SupplyNetworkPlanningAggregateHierarchyUndoNavigateRequestMessage message 103000. Specifically, this figure depicts the arrangement and hierarchy of various components such as one or more levels of packages, entities, and datatypes, shown here as 103000 through 103010. As described above, packages may be used to represent hierarchy levels. Entities are discrete business elements that are used during a business transaction. Data types are used to type object entities and interfaces with a structure. For example, SupplyNetworkPlanningAggregateHierarchyUndoNavigateRequestMessage message 103000 includes, among other things, SupplyNetworkPlanningAggregateHierarchy 103006. Accordingly, heterogeneous applications may communicate using this consistent message configured as such.

Figure 104:
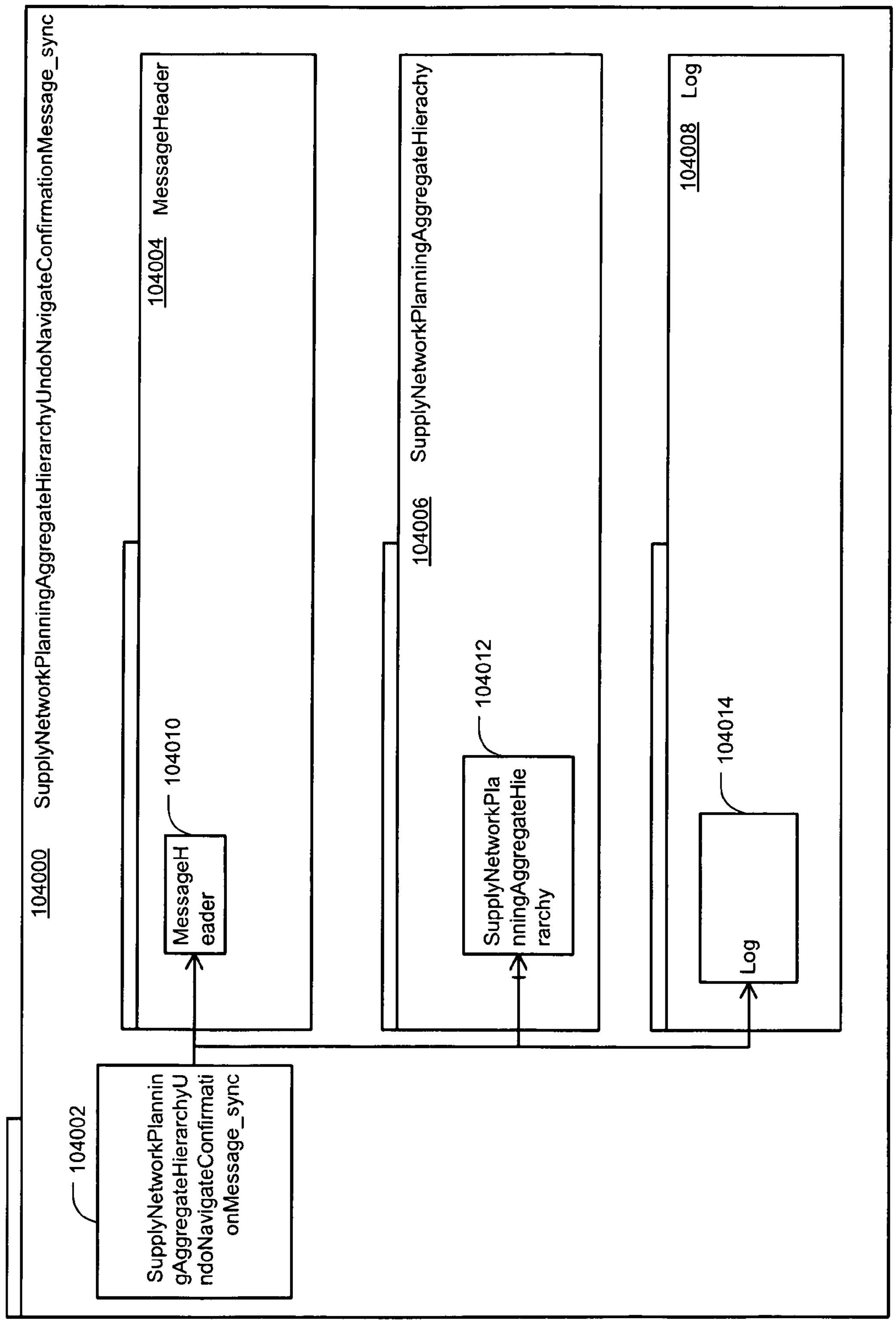
FIG. 104 shows an exemplary SupplyNetworkPlanningAggregateHierarchyUndoNavigateConfirmationMessage_sync Message Data Type.

Additionally, FIG. 104 illustrates one example logical configuration of SupplyNetworkPlanningAggregateHierarchyUndoNavigateConfirmationMessage message 104000. Specifically, this figure depicts the arrangement and hierarchy of various components such as one or more levels of packages, entities, and datatypes, shown here as 104000 through 104014. As described above, packages may be used to represent hierarchy levels. Entities are discrete business elements that are used during a business transaction. Data types are used to type object entities and interfaces with a structure. For example, SupplyNetworkPlanningAggregateHierarchyUndoNavigateConfirmationMessage message 104000 includes, among other things, SupplyNetworkPlanningAggregateHierarchy 104006. Accordingly, heterogeneous applications may communicate using this consistent message configured as such.

FIGS. 105-1 through 105-4 illustrate one example logical configuration of a SupplyNetworkPlanningAggregateHierarchyByIDQueryMessage_sync 105000 element structure. Specifically, these figures depict the arrangement and hierarchy of various components such as one or more levels of packages, entities, and datatypes, shown here as 105000 through 105126. As described above, packages may be used to represent hierarchy levels. Entities are discrete business elements that are used during a business transaction. Data types are used to type object entities and interfaces with a structure. For example, the SupplyNetworkPlanningAggregateHierarchyByIDQueryMessage_sync 105000 includes, among other things, a SupplyNetworkPlanningAggregateHierarchyByIDQueryMessage_sync 105002. Accordingly, heterogeneous applications may communicate using this consistent message configured as such.

FIGS. 106-1 through 106-9 illustrate one example logical configuration of a SupplyNetworkPlanningAggregateHierarchyByIDResponseMessage_sync 106000 element structure. Specifically, these figures depict the arrangement and hierarchy of various components such as one or more levels of packages, entities, and datatypes, shown here as 106000 through 106258. As described above, packages may be used to represent hierarchy levels. Entities are discrete business elements that are used during a business transaction. Data types are used to type object entities and interfaces with a structure. For example, the SupplyNetworkPlanningAggregateHierarchyByIDResponseMessage_sync 106000 includes, among other things, a SupplyNetworkPlanningAggregateHierarchyByIDResponseMessage_sync 106002. Accordingly, heterogeneous applications may communicate using this consistent message configured as such.

FIGS. 107-1 through 107-5 illustrate one example logical configuration of a SupplyNetworkPlanningAggregateHierarchyCancelConfirmationMessage_sync 107000 element structure. Specifically, these figures depict the arrangement and hierarchy of various components such as one or more levels of packages, entities, and datatypes, shown here as 107000 through 107152. As described above, packages may be used to represent hierarchy levels. Entities are discrete business elements that are used during a business transaction. Data types are used to type object entities and interfaces with a structure. For example, the SupplyNetworkPlanningAggregateHierarchyCancelConfirmationMessage_sync 107000 includes, among other things, a SupplyNetworkPlanningAggregateHierarchyCancelConfirmationMessage_sync 107002. Accordingly, heterogeneous applications may communicate using this consistent message configured as such.

FIGS. 108-1 through 108-4 illustrate one example logical configuration of a SupplyNetworkPlanningAggregateHierarchyCancelRequestMessage_sync 108000 element structure. Specifically, these figures depict the arrangement and hierarchy of various components such as one or more levels of packages, entities, and datatypes, shown here as 108000 through 108126. As described above, packages may be used to represent hierarchy levels. Entities are discrete business elements that are used during a business transaction. Data types are used to type object entities and interfaces with a structure. For example, the SupplyNetworkPlanningAggregateHierarchyCancelRequestMessage_sync 108000 includes, among other things, a SupplyNetworkPlanningAggregateHierarchyCancelRequestMessage_sync 108002. Accordingly, heterogeneous applications may communicate using this consistent message configured as such.

FIGS. 109-1 through 109-5 illustrate one example logical configuration of a SupplyNetworkPlanningAggregateHierarchyChangeConfirmationMessage_sync 109000 element structure. Specifically, these figures depict the arrangement and hierarchy of various components such as one or more levels of packages, entities, and datatypes, shown here as 109000 through 109152. As described above, packages may be used to represent hierarchy levels. Entities are discrete business elements that are used during a business transaction. Data types are used to type object entities and interfaces with a structure. For example, the SupplyNetworkPlanningAggregateHierarchyChangeConfirmationMessage_sync 109000 includes, among other things, a SupplyNetworkPlanningAggregateHierarchyChangeConfirmationMessage_sync 109002. Accordingly, heterogeneous applications may communicate using this consistent message configured as such.

FIGS. 110-1 through 110-4 illustrate one example logical configuration of a SupplyNetworkPlanningAggregateHierarchyChangeRequestMessage_sync 110000 element structure. Specifically, these figures depict the arrangement and hierarchy of various components such as one or more levels of packages, entities, and datatypes, shown here as 110000 through 110144. As described above, packages may be used to represent hierarchy levels. Entities are discrete business elements that are used during a business transaction. Data types are used to type object entities and interfaces with a structure. For example, the SupplyNetworkPlanningAggregateHierarchyChangeRequestMessage_sync 110000 includes, among other things, a SupplyNetworkPlanningAggregateHierarchyChangeRequestMessage_sync 110002. Accordingly, heterogeneous applications may communicate using this consistent message configured as such.

FIGS. 111-1 through 111-5 illustrate one example logical configuration of a SupplyNetworkPlanningAggregateHierarchyCreateConfirmationMessage_sync 111000 element structure. Specifically, these figures depict the arrangement and hierarchy of various components such as one or more levels of packages, entities, and datatypes, shown here as 111000 through 111152. As described above, packages may be used to represent hierarchy levels. Entities are discrete business elements that are used during a business transaction. Data types are used to type object entities and interfaces with a structure. For example, the SupplyNetworkPlanningAggregateHierarchyCreateConfirmationMessage_sync 111000 includes, among other things, a SupplyNetworkPlanningAggregateHierarchyCreateConfirmationMessage_sync 111002. Accordingly, heterogeneous applications may communicate using this consistent message configured as such.

FIGS. 112-1 through 112-5 illustrate one example logical configuration of a SupplyNetworkPlanningAggregateHierarchyCreateRequestMessage_sync 112000 element structure. Specifically, these figures depict the arrangement and hierarchy of various components such as one or more levels of packages, entities, and datatypes, shown here as 112000 through 112144. As described above, packages may be used to represent hierarchy levels. Entities are discrete business elements that are used during a business transaction. Data types are used to type object entities and interfaces with a structure. For example, the SupplyNetworkPlanningAggregateHierarchyCreateRequestMessage_sync 112000 includes, among other things, a SupplyNetworkPlanningAggregateHierarchyCreateRequestMessage_sync 112002. Accordingly, heterogeneous applications may communicate using this consistent message configured as such.

FIGS. 113-1 through 113-5 illustrate one example logical configuration of a SupplyNetworkPlanningAggregateHierarchyExpandConfirmationMessage_sync 113000 element structure. Specifically, these figures depict the arrangement and hierarchy of various components such as one or more levels of packages, entities, and datatypes, shown here as 113000 through 113152. As described above, packages may be used to represent hierarchy levels. Entities are discrete business elements that are used during a business transaction. Data types are used to type object entities and interfaces with a structure. For example, the SupplyNetworkPlanningAggregateHierarchyExpandConfirmationMessage_sync 113000 includes, among other things, a SupplyNetworkPlanningAggregateHierarchyExpandConfirmationMessage_sync 113002. Accordingly, heterogeneous applications may communicate using this consistent message configured as such.

FIGS. 114-1 through 114-4 illustrate one example logical configuration of a SupplyNetworkPlanningAggregateHierarchyExpandRequestMessage_sync 114000 element structure. Specifically, these figures depict the arrangement and hierarchy of various components such as one or more levels of packages, entities, and datatypes, shown here as 114000 through 114138. As described above, packages may be used to represent hierarchy levels. Entities are discrete business elements that are used during a business transaction. Data types are used to type object entities and interfaces with a structure. For example, the SupplyNetworkPlanningAggregateHierarchyExpandRequestMessage_sync 114000 includes, among other things, a SupplyNetworkPlanningAggregateHierarchyExpandRequestMessage_sync 114002. Accordingly, heterogeneous applications may communicate using this consistent message configured as such.

FIGS. 115-1 through 115-4 illustrate one example logical configuration of a SupplyNetworkPlanningAggregateHierarchyExpandStepByIDQueryMessage_sync 115000 element structure. Specifically, these figures depict the arrangement and hierarchy of various components such as one or more levels of packages, entities, and datatypes, shown here as 115000 through 115126. As described above, packages may be used to represent hierarchy levels. Entities are discrete business elements that are used during a business transaction. Data types are used to type object entities and interfaces with a structure. For example, the SupplyNetworkPlanningAggregateHierarchyExpandStepByIDQueryMessage_sync 115000 includes, among other things, a SupplyNetworkPlanningAggregateHierarchyExpandStepByIDQueryMessage_sync 115002. Accordingly, heterogeneous applications may communicate using this consistent message configured as such.

FIGS. 116-1 through 116-6 illustrate one example logical configuration of a SupplyNetworkPlanningAggregateHierarchyExpandStepByIDResponseMessage_sync 116000 element structure. Specifically, these figures depict the arrangement and hierarchy of various components such as one or more levels of packages, entities, and datatypes, shown here as 116000 through 116176. As described above, packages may be used to represent hierarchy levels. Entities are discrete business elements that are used during a business transaction. Data types are used to type object entities and interfaces with a structure. For example, the SupplyNetworkPlanningAggregateHierarchyExpandStepByIDResponseMessage_sync 116000 includes, among other things, a SupplyNetworkPlanningAggregateHierarchyExpandStepByIDResponseMessage_sync 116002. Accordingly, heterogeneous applications may communicate using this consistent message configured as such.

FIGS. 117-1 through 117-5 illustrate one example logical configuration of a SupplyNetworkPlanningAggregateHierarchyNavigateConfirmationMessage_sync 117000 element structure. Specifically, these figures depict the arrangement and hierarchy of various components such as one or more levels of packages, entities, and datatypes, shown here as 117000 through 117152. As described above, packages may be used to represent hierarchy levels. Entities are discrete business elements that are used during a business transaction. Data types are used to type object entities and interfaces with a structure. For example, the SupplyNetworkPlanningAggregateHierarchyNavigateConfirmationMessage_sync 117000 includes, among other things, a SupplyNetworkPlanningAggregateHierarchyNavigateConfirmationMessage_sync 117002. Accordingly, heterogeneous applications may communicate using this consistent message configured as such.

FIGS. 118-1 through 118-4 illustrate one example logical configuration of a SupplyNetworkPlanningAggregateHierarchyNavigateRequestMessage_sync 118000 element structure. Specifically, these figures depict the arrangement and hierarchy of various components such as one or more levels of packages, entities, and datatypes, shown here as 118000 through 118138. As described above, packages may be used to represent hierarchy levels. Entities are discrete business elements that are used during a business transaction.

Data types are used to type object entities and interfaces with a structure. For example, the SupplyNetworkPlanningAggregateHierarchyNavigateRequestMessage_sync 118000 includes, among other things, a SupplyNetworkPlanningAggregateHierarchyNavigateRequestMessage_sync 118002. Accordingly, heterogeneous applications may communicate using this consistent message configured as such.

FIGS. 119-1 through 119-4 illustrate one example logical configuration of a SupplyNetworkPlanningAggregateHierarchyNavigationStepByIDQueryMessage_sync 119000 element structure. Specifically, these figures depict the arrangement and hierarchy of various components such as one or more levels of packages, entities, and datatypes, shown here as 119000 through 119126. As described above, packages may be used to represent hierarchy levels. Entities are discrete business elements that are used during a business transaction. Data types are used to type object entities and interfaces with a structure. For example, the SupplyNetworkPlanningAggregateHierarchyNavigationStepByIDQueryMessage_sync 119000 includes, among other things, a SupplyNetworkPlanningAggregateHierarchyNavigationStepByIDQueryMessage_sync 119002. Accordingly, heterogeneous applications may communicate using this consistent message configured as such.

FIGS. 120-1 through 120-6 illustrate one example logical configuration of a SupplyNetworkPlanningAggregateHierarchyNavigationStepByIDResponseMessage_sync 120000 element structure. Specifically, these figures depict the arrangement and hierarchy of various components such as one or more levels of packages, entities, and datatypes, shown here as 120000 through 120176. As described above, packages may be used to represent hierarchy levels. Entities are discrete business elements that are used during a business transaction. Data types are used to type object entities and interfaces with a structure. For example, the SupplyNetworkPlanningAggregateHierarchyNavigationStepByIDResponseMessage_sync 120000 includes, among other things, a SupplyNetworkPlanningAggregateHierarchyNavigationStepByIDResponseMessage_sync 120002. Accordingly, heterogeneous applications may communicate using this consistent message configured as such.

FIGS. 121-1 through 121-5 illustrate one example logical configuration of a SupplyNetworkPlanningAggregateHierarchyUndoExpandConfirmationMessage_sync 121000 element structure. Specifically, these figures depict the arrangement and hierarchy of various components such as one or more levels of packages, entities, and datatypes, shown here as 121000 through 121152. As described above, packages may be used to represent hierarchy levels. Entities are discrete business elements that are used during a business transaction. Data types are used to type object entities and interfaces with a structure. For example, the SupplyNetworkPlanningAggregateHierarchyUndoExpandConfirmationMessage_sync 121000 includes, among other things, a SupplyNetworkPlanningAggregateHierarchyUndoExpandConfirmationMessage_sync 121002. Accordingly, heterogeneous applications may communicate using this consistent message configured as such.

FIGS. 122-1 through 122-4 illustrate one example logical configuration of a SupplyNetworkPlanningAggregateHierarchyUndoExpandRequestMessage_sync 122000 element structure. Specifically, these figures depict the arrangement and hierarchy of various components such as one or more levels of packages, entities, and datatypes, shown here as 122000 through 122126. As described above, packages may be used to represent hierarchy levels. Entities are discrete business elements that are used during a business transaction. Data types are used to type object entities and interfaces with a structure. For example, the SupplyNetworkPlanningAggregateHierarchyUndoExpandRequestMessage_sync 122000 includes, among other things, a SupplyNetworkPlanningAggregateHierarchyUndoExpandRequestMessage_sync 122002. Accordingly, heterogeneous applications may communicate using this consistent message configured as such.

FIGS. 123-1 through 123-5 illustrate one example logical configuration of a SupplyNetworkPlanningAggregateHierarchyUndoNavigateConfirmationMessage_sync 123000 element structure. Specifically, these figures depict the arrangement and hierarchy of various components such as one or more levels of packages, entities, and datatypes, shown here as 123000 through 123152. As described above, packages may be used to represent hierarchy levels. Entities are discrete business elements that are used during a business transaction. Data types are used to type object entities and interfaces with a structure. For example, the SupplyNetworkPlanningAggregateHierarchyUndoNavigateConfirmationMessage_sync 123000 includes, among other things, a SupplyNetworkPlanningAggregateHierarchyUndoNavigateConfirmationMessage_sync 123002. Accordingly, heterogeneous applications may communicate using this consistent message configured as such.

FIGS. 124-1 through 124-4 illustrate one example logical configuration of a SupplyNetworkPlanningAggregateHierarchyUndoNavigateRequestMessage_sync 124000 element structure. Specifically, these figures depict the arrangement and hierarchy of various components such as one or more levels of packages, entities, and datatypes, shown here as 124000 through 124126. As described above, packages may be used to represent hierarchy levels. Entities are discrete business elements that are used during a business transaction. Data types are used to type object entities and interfaces with a structure. For example, the SupplyNetworkPlanningAggregateHierarchyUndoNavigateRequestMessage_sync 124000 includes, among other things, a SupplyNetworkPlanningAggregateHierarchyUndoNavigateRequestMessage_sync 124002. Accordingly, heterogeneous applications may communicate using this consistent message configured as such.

Message Data Type SupplyNetworkPlanningAggregateHierarchyCreateRequestMessage_sync Message data type SupplyNetworkPlanningAggregateHierarchyRequestMessage_sync includes the SupplyNetworkPlanningAggregateHierarchy included in the business document. It includes the following packages: MessageHeader and SupplyNetworkPlanningAggregateHierarchy. The MessageHeader package groups the business information that is relevant for sending a business document in a message. It includes the MessageHeader entity. MessageHeader groups business information from the perspective of the sending application, such as information to identify the business document in a message, information about the sender, possibly information about the recipient, and information about the Business Scope. MessageHeader can include the following elements: ID, ReferenceID, CreationDateTime, TestDataIndicator, ReconciliationIndicator, SenderParty, RecipientParty, and BusinessScopeBusinessProcess.

ID may be based on GDT: BusinessDocumentMessageID. ReferenceID may be based on GDT: BusinessDocumentMessageID. CreationDateTime may be based on GDT: CreationDateTime. TestDataIndicator may be based on GDT:

TestDataIndicator. ReconciliationIndicator may be based on GDT: ReconciliationIndicator. SenderParty may be based on GDT: BusinessDocumentMessageHeaderParty. RecipientParty may be based on GDT: BusinessDocumentMessageHeaderParty. BusinessScopeBusinessProcess may be based on GDT: BusinessScopeBusinessProcess. BusinessScopeBusinessProcess is used to transfer SupplyPlanningSimulationVersion.

The SupplyNetworkPlanningAggregateHierarchy package groups the information related to a SupplyNetworkPlanningAggregateHierarchy. It includes the SupplyNetworkPlanningAggregateHierarchy entity. SupplyNetworkPlanningAggregateHierarchy is a hierarchy of different aggregates which are the planning levels in supply network planning.

The SupplyNetworkPlanningAggregateHierarchy entity can include the following elements: UsageCode, SupplyNetworkPlanConfigurationID, SupplyNetworkPlanConfiguration, SupplyNetworkPlanConfigurationSelectionID, and TemplateSupplyNetworkPlanningAggregateHierarchyID. UsageCode is the coded representation of the usage of a SupplyNetworkPlanningAggregateHierarchy. It determines if a SupplyNetworkPlanningAggregateHierarchy is used for either expansion or navigation actions, and may be based on GDT: SupplyNetworkPlanningAggregateHierarchyUsageCode. SupplyNetworkPlanConfigurationID is the unique identifier for a SupplyNetworkPlanConfiguration. SupplyNetworkPlanConfiguration data is used to create the SupplyNetworkPlanningAggregateHierarchy, and may be based on GDT: SupplyNetworkPlanConfigurationID.

SupplyNetworkPlanConfigurationSelectionID is the identifier for a Selection of a SupplyNetworkPlanConfiguration. Selection data is used to create the SupplyNetworkPlanningAggregateHierarchy. SupplyNetworkPlanConfigurationSelectionID may be based on GDT: SupplyNetworkPlanConfigurationSelectionID. TemplateSupplyNetworkPlanningAggregateHierarchyID is the unique identifier for a SupplyNetworkPlanningAggregateHierarchy which serves as template to create the SupplyNetworkPlanningAggregateHierarchy, and it may be based on GDT: SupplyNetworkPlanningAggregateHierarchyID. In some implementations, either TemplateSupplyNetworkPlanningAggregateHierarchyID or other optional parameters are supplied.

Message Data Type SupplyNetworkPlanningAggregateHierarchyCreateConfirmationMessage_sync Message data type SupplyNetworkPlanningAggregateHierarchyCreateConfirmationMessage_sync includes SupplyNetworkPlanningAggregateHierarchy included in the business document and Log information with detailed textual messages about the changes that were made or rejected. It includes the following packages: MessageHeader, SupplyNetworkPlanningAggregateHierarchy, and Log.

SupplyNetworkPlanningAggregateHierarchy includes the ID element. ID is the unique identifier for a SupplyNetworkPlanningAggregateHierarchy. It is the ID of the created SupplyNetworkPlanningAggregateHierarchy, and may be based on GDT: SupplyNetworkPlanningAggregateHierarchyID. The Log package groups the log information sent by Supply and Demand Matching. A log is a sequence of messages that result when an application executes a task. The log can be of type GDT: Log. In some implementations, the elements TypeID, SeverityCode, and Note are used in the item.

Message Data Type SupplyNetworkPlanningAggregateHierarchyCancelRequestMessage_sync Message data type SupplyNetworkPlanningAggregateHierarchyCancelRequestMessage_sync includes SupplyNetworkPlanningAggregateHierarchy included in the business document. It includes the following packages: MessageHeader and SupplyNetworkPlanningAggregateHierarchy. SupplyNetworkPlanningAggregateHierarchy includes the ID element. ID is the unique identifier for a SupplyNetworkPlanningAggregateHierarchy. It is the ID of the SupplyNetworkPlanningAggregateHierarchy on which the operation may be performed, and it may be based on GDT: SupplyNetworkPlanningAggregateHierarchyID.

Message Data Type SupplyNetworkPlanningAggregateHierarchyCancelConfirmationMessage_sync Message data type SupplyNetworkPlanningAggregateHierarchyCancelConfirmationMessage_sync includes the SupplyNetworkPlanningAggregateHierarchy included in the business document and Log information with detailed textual messages about the changes that were made or rejected. It includes the MessageHeader package, the SupplyNetworkPlanningAggregateHierarchy package, and the Log package. SupplyNetworkPlanningAggregateHierarchy includes the ID element. ID is the unique identifier for a SupplyNetworkPlanningAggregateHierarchy. It is the ID of the SupplyNetworkPlanningAggregateHierarchy on which the operation has been performed, and it may be based on GDT: SupplyNetworkPlanningAggregateHierarchyID.

Message Data Type SupplyNetworkPlanningAggregateHierarchyChangeRequestMessage_sync The message data type SupplyNetworkPlanningAggregateHierarchyChangeRequestMessage_sync includes the SupplyNetworkPlanningAggregateHierarchy included in the business document. It includes the MessageHeader package and the SupplyNetworkPlanningAggregateHierarchy package. The SupplyNetworkPlanningAggregateHierarchy Package includes the AggregateInstance package. The SupplyNetworkPlanningAggregateHierarchy includes the ID element. ID is the unique identifier for a SupplyNetworkPlanningAggregateHierarchy. It is the ID of the SupplyNetworkPlanningAggregateHierarchy on which the operation may be performed, and it may be based on GDT: SupplyNetworkPlanningAggregateHierarchyID. The AggregateInstance package groups the AggregateInstances of a SupplyNetworkPlanningAggregateHierarchy. The AggregateInstance package includes the AggregateInstance entity. An AggregateInstance is a node in the hierarchical structure of a SupplyNetworkPlanningAggregateHierarchy. Several of the AggregateInstances are usually located on the same level and then constitute an aggregate of planning objects in supply network planning. AggregateInstance includes the following elements: ID and ApplyIndicator. ID is the unique identifier for a SupplyNetworkPlanningAggregateHierarchyAggregateInstance which may be changed, may be based on GDT: SupplyNetworkPlanningAggregateHierarchyAggregateInstanceID. An ApplyIndicator indicates whether an object should be used. In this context it determines if the AggregateInstance is used in further expansion or navigation actions. ApplyIndicator may be based on CDT: ApplyIndicator. Before an AggregateInstance can be changed, it can be retrieved using SupplyNetworkPlanningAggregateHierarchyByIDResponseMessage_sync.

Message Data Type SupplyNetworkPlanningAggregateHierarchyChangeConfirmationMessage_sync The message data type SupplyNetworkPlanningAggregateHierarchyChangeConfirmationMessage_sync includes SupplyNetworkPlanningAggregateHierarchy included in the business document and Log information with detailed textual messages about the changes that were made or rejected. It includes the following packages: MessageHeader, SupplyNetworkPlanningAggregateHierarchy, and Log. SupplyNetworkPlanningAggregateHierarchy includes the ID element. ID is the unique identifier for a SupplyNetworkPlanningAggregateHierarchy. It is the ID of the SupplyNetworkPlanningAggregateHierarchy on which the operation has been performed. ID may be based on GDT: SupplyNetworkPlanningAggregateHierarchyID.

Message Data Type SupplyNetworkPlanningAggregateHierarchyByIDQueryMessage_sync

The message data type SupplyNetworkPlanningAggregateHierarchyByIDQueryMessage_sync includes SupplyNetworkPlanningAggregateHierarchySelectionByID. It includes the MessageHeader package and the Selection package. The Selection package collects all the selection criteria for the SupplyNetworkPlanningAggregateHierarchy. It includes the entity SupplyNetworkPlanningAggregateHierarchySelectionByID.

SupplyNetworkPlanningAggregateHierarchySelectionByID includes query elements to read a SupplyNetworkPlanningAggregateHierarchy by its ID. ID is the unique identifier for a SupplyNetworkPlanningAggregateHierarchy. It is the ID of the SupplyNetworkPlanningAggregateHierarchy on which the operation may be performed, and it may be based on GDT: SupplyNetworkPlanningAggregateHierarchyID.

Message Data Type SupplyNetworkPlanningAggregateHierarchyByIDResponseMessage_sync The message data type SupplyNetworkPlanningAggregateHierarchyByIDResponseMessage_sync includes SupplyNetworkPlanningAggregateHierarchy included in the business document and Log information with detailed textual messages about the changes that were made or rejected. It includes the following packages: MessageHeader, SupplyNetworkPlanningAggregateHierarchy, and Log. The SupplyNetworkPlanningAggregateHierarchy package includes the following packages: AggregateInstance, NavigationStep, and ExpandStep. SupplyNetworkPlanningAggregateHierarchy includes the ID and UsageCode elements. ID is the unique identifier for a SupplyNetworkPlanningAggregateHierarchy. It is the ID of the SupplyNetworkPlanningAggregateHierarchy on which the operation has been performed, and it may be based on GDT: SupplyNetworkPlanningAggregateHierarchyID.

UsageCode is the coded representation of the usage of a SupplyNetworkPlanningAggregateHierarchy. It determines if a SupplyNetworkPlanningAggregateHierarchy is used for either expansion or navigation actions. It may be based on GDT: SupplyNetworkPlanningAggregateHierarchyUsageCode. The AggregateInstance package groups the AggregateInstances of a SupplyNetworkPlanningAggregateHierarchy. The AggregateInstance package includes the AggregateInstance and CharacteristicValue entities. An AggregateInstance is a node in the hierarchical structure of a SupplyNetworkPlanningAggregateHierarchy. Several of the AggregateInstances are usually located on the same level and then constitute an aggregate of planning objects in supply network planning.

AggregateInstance can include the ID, ParentSupplyNetworkPlanningAggregateHierarchyAggregateInstanceID, and ApplyIndicator elements. ID is the unique identifier for a SupplyNetworkPlanningAggregateHierarchyAggregateInstance which is a node in the SupplyNetworkPlanningAggregateHierarchy. It may be based on GDT: SupplyNetworkPlanningAggregateHierarchyAggregateInstanceID. ParentSupplyNetworkPlanningAggregateHierarchyAggregateInstanceID is the unique identifier for a SupplyNetworkPlanningAggregateHierarchyAggregateInstance which is parent node of the current AggregateInstance. It has an initial value if no parent node exists, and may be based on GDT: SupplyNetworkPlanningAggregateHierarchyAggregateInstanceID. An ApplyIndicator indicates whether an object should be used. In this context it determines if the AggregateInstance is used in further expansion or navigation actions. ApplyIndicator is true by default, and may be based on CDT: ApplyIndicator.

A CharacteristicValue is part of the combination of Characteristics of a SupplyNetworkPlanConfiguration and their values. The combination describes a planning object in supply network planning. CharacteristicValue can include the SupplyNetworkPlanCharacteristicID and SupplyNetworkPlanCharacteristicValue elements. SupplyNetworkPlanCharacteristicID is the unique identifier for a Characteristic used in a SupplyNetworkPlanConfiguration, and it may be based on GDT: SupplyNetworkPlanCharacteristicID. SupplyNetworkPlanCharacteristicValue is an arbitrary value that a Characteristic of a SupplyNetworkPlanConfiguration can have, may be based on GDT: SupplyNetworkPlanCharacteristicValue.

The NavigationStep package groups the NavigationSteps of the SupplyNetworkPlanningAggregateHierarchy. It includes the NavigationStep entity. NavigationStep represents an already executed action of a SupplyNetworkPlanningAggregateHierarchy. Such an action navigates from one or more AggregateInstances to one or more other related AggregateInstances by replacing them in the hierarchy. NavigationStep can include the OrdinalNumberValue, ID, SupplyNetworkPlanningAggregateHierarchyActionStepTypeCode, and SupplyNetworkPlanCharacteristicID elements. An OrdinalNumberValue is a number that indicates the position of an element in a linearly ordered set that is ordered according to particular factors. In this context it indicates the position in the sequence of executed NavigationSteps. OrdinalNumberValue may be based on GDT: OrdinalNumberValue. ID is the unique identifier for a SupplyNetworkPlanningAggregateHierarchyNavigationStep. In this context it identifies an already executed NavigationStep. ID may be based on GDT: SupplyNetworkPlanningAggregateHierarchyNavigationStepID. SupplyNetworkPlanningAggregateHierarchyActionStepTypeCode is the coded representation of the type of a SupplyNetworkPlanningAggregateHierarchyNavigationStep or SupplyNetworkPlanningAggregateHierarchyExpandStep. In this context it describes the type of an already executed NavigationStep. SupplyNetworkPlanningAggregateHierarchyActionStepTypeCode may be based on GDT: SupplyNetworkPlanningAggregateHierarchyActionStepTypeCode. SupplyNetworkPlanCharacteristicID is the unique identifier for a characteristic used in a SupplyNetworkPlanConfiguration. It describes the resulting Characteristic of an already executed NavigationStep. SupplyNetworkPlanCharacteristicID may be based on GDT: SupplyNetworkPlanCharacteristicID. In some implementations, the combination of SupplyNetworkPlanningAggregateHierarchyActionStepTypeCode and SupplyNetwork- PlanCharacteristicID defines the result of a SupplyNetworkPlanningAggregateHierarchyNavigationStep or SupplyNetworkPlanningAggregateHierarchyExpandStep. A user determines the valid combinations during configuration.

The ExpandStep package groups the ExpandSteps of the SupplyNetworkPlanningAggregateHierarchy. It includes the ExpandStep entity. ExpandStep represents an already executed action of a SupplyNetworkPlanningAggregateHierarchy. Such an action expands the hierarchy of AggregateInstances by appending or inserting one or more related AggregateInstances to the hierarchy. ExpandStep can include the OrdinalNumberValue, ID, SupplyNetworkPlanningAggregateHierarchyActionStepTypeCode, and SupplyNetworkPlanCharacteristicID elements. An OrdinalNumberValue is a number that indicates the position of an element in a linearly ordered set that is ordered according to particular factors. In this context it indicates the position in the sequence of executed ExpandSteps. OrdinalNumberValue may be based on GDT: OrdinalNumberValue. ID is the unique identifier for a SupplyNetworkPlanningAggregateHierarchyExpandStep. In this context it identifies an already executed ExpandStep. ID may be based on GDT: SupplyNetworkPlanningAggregateHierarchyExpandStepID.

SupplyNetworkPlanningAggregateHierarchyActionStepTypeCode is the coded representation of the type of a SupplyNetworkPlanningAggregateHierarchyNavigationStep or SupplyNetworkPlanningAggregateHierarchyExpandStep. In this context it describes the type of an already executed ExpandStep. SupplyNetworkPlanningAggregateHierarchyActionStepTypeCode may be based on GDT: SupplyNetworkPlanningAggregateHierarchyActionStepTypeCode. SupplyNetworkPlanCharacteristicID is the unique identifier for a Characteristic used in a SupplyNetworkPlanConfiguration. It describes the Characteristic added to the resulting combination of Characteristics by an already executed ExpandStep. SupplyNetworkPlanCharacteristicID may be based on GDT: SupplyNetworkPlanCharacteristicID. In some implementations, the combination of SupplyNetworkPlanningAggregateHierarchyActionStepTypeCode and SupplyNetworkPlanCharacteristicID defines the result of a SupplyNetworkPlanningAggregateHierarchyNavigationStep or SupplyNetworkPlanningAggregateHierarchyExpandStep. A user determines the valid combinations during configuration.

Message Data Type SupplyNetworkPlanningAggregateHierarchyExpandStepByIDQueryMessage_sync The Message data type SupplyNetworkPlanningAggregateHierarchyExpandStepByIDQueryMessage_sync includes SupplyNetworkPlanningAggregateHierarchyExpandStepSelectionByID. It includes the MessageHeader and Selection packages. The Selection package collects all the selection criteria for the SupplyNetworkPlanningAggregateHierarchy. It includes the SupplyNetworkPlanningAggregateHierarchyExpandStepSelectionByID entity. SupplyNetworkPlanningAggregateHierarchyExpandStepSelectionByID includes the query elements to read the ExpandSteps of a SupplyNetworkPlanningAggregateHierarchy by its ID. ID is the unique identifier for a SupplyNetworkPlanningAggregateHierarchy. It is the ID of the SupplyNetworkPlanningAggregateHierarchy on which the operation may be performed, and it may be based on GDT: SupplyNetworkPlanningAggregateHierarchyID.

Message Data Type SupplyNetworkPlanningAggregateHierarchyExpandStepByIDResponseMessage_sync The message data type SupplyNetworkPlanningAggregateHierarchyExpandStepByIDResponse_sync includes the SupplyNetworkPlanningAggregateHierarchy included in the business document and Log information with detailed textual messages about the changes that were made or rejected. It includes the following packages: MessageHeader, SupplyNetworkPlanningAggregateHierarchy, and Log.

SupplyNetworkPlanningAggregateHierarchy includes the ID element. ID is the unique identifier for a SupplyNetworkPlanningAggregateHierarchy. It is the ID of the SupplyNetworkPlanningAggregateHierarchy on which the operation has been performed, and it may be based on GDT: SupplyNetworkPlanningAggregateHierarchyID.

ExpandStep represents an executable action on a SupplyNetworkPlanningAggregateHierarchy. Such an action expands the hierarchy of AggregateInstances by appending or inserting one or more related AggregateInstances to the hierarchy. ExpandStep can include the ID, SupplyNetworkPlanningAggregateHierarchyActionStepTypeCode, and SupplyNetworkPlanCharacteristicID elements.

ID is the unique identifier for a SupplyNetworkPlanningAggregateHierarchyExpandStep. In this context it identifies an executable ExpandStep. ID may be based on GDT: SupplyNetworkPlanningAggregateHierarchyExpandStepID. SupplyNetworkPlanningAggregateHierarchyActionStepTypeCode is the coded representation of the type of a SupplyNetworkPlanningAggregateHierarchyNavigationStep or SupplyNetworkPlanningAggregateHierarchyExpandStep. In this context it describes the type of an executable ExpandStep. SupplyNetworkPlanningAggregateHierarchyActionStepTypeCode may be based on GDT: SupplyNetworkPlanningAggregateHierarchyActionStepTypeCode. SupplyNetworkPlanCharacteristicID is the unique identifier for a Characteristic used in a SupplyNetworkPlanConfiguration. It describes the Characteristic added to the resulting combination of Characteristics by an executable ExpandStep, and it may be based on GDT: SupplyNetworkPlanCharacteristicID. In some implementations, the combination of SupplyNetworkPlanningAggregateHierarchyActionStepTypeCode and SupplyNetworkPlanCharacteristicID defines the result of a SupplyNetworkPlanningAggregateHierarchyNavigationStep or SupplyNetworkPlanningAggregateHierarchyExpandStep. A user determines the valid combinations during configuration.

Message Data Type SupplyNetworkPlanningAggregateHierarchyExpandRequestMessage_sync Message data type SupplyNetworkPlanningAggregateHierarchyExpandRequestMessage_sync includes SupplyNetworkPlanningAggregateHierarchy included in the business document. It includes the MessageHeader package and the SupplyNetworkPlanningAggregateHierarchy package. SupplyNetworkPlanningAggregateHierarchy may include the ID element. ID is the unique identifier for a SupplyNetworkPlanningAggregateHierarchy. It is the ID of the SupplyNetworkPlanningAggregateHierarchy on which the operation may be performed, and it may be based on GDT: SupplyNetworkPlanningAggregateHierarchyID. ExpandStep represents the action to be executed on a SupplyNetworkPlanningAggregateHierarchy. Such an action expands the hierarchy of AggregateInstances by appending or inserting one or more related AggregateInstances to the hierarchy.

ExpandStep can include the ID element. ID is the unique identifier for a SupplyNetworkPlanningAggregateHierarchyExpandStep. In this context it identifies the ExpandStep to be executed, and it may be based on GDT: SupplyNetworkPlanningAggregateHierarchyExpandStepID. In some implementations, the executable ExpandSteps are retrieved previously using SupplyNetworkPlanningAggregateHierarchyExpandStepByIDResponse_sync.

Message Data Type SupplyNetworkPlanningAggregateHierarchyExpandConfirmationMessage_sync The Message data type SupplyNetworkPlanningAggregateHierarchyExpandConfirmationMessage_sync includes the SupplyNetworkPlanningAggregateHierarchy included in the business document and Log information with detailed textual messages about the changes that were made or rejected. It includes the following packages: MessageHeader package, SupplyNetworkPlanningAggregateHierarchy package, and Log package. SupplyNetworkPlanningAggregateHierarchy can include the ID element. ID is the unique identifier for a SupplyNetworkPlanningAggregateHierarchy. It is the ID of the SupplyNetworkPlanningAggregateHierarchy on which the operation has been performed, and it may be based on GDT: SupplyNetworkPlanningAggregateHierarchyID.

Message Data Type SupplyNetworkPlanningAggregateHierarchyUndoExpandRequestMessage_sync The Message data type SupplyNetworkPlanningAggregateHierarchyExpandRequestMessage_sync includes SupplyNetworkPlanningAggregateHierarchy included in the business document. It includes the following packages: MessageHeader and SupplyNetworkPlanningAggregateHierarchy. SupplyNetworkPlanningAggregateHierarchy can include the ID element. ID is the unique identifier for a SupplyNetworkPlanningAggregateHierarchy. It is the ID of the SupplyNetworkPlanningAggregateHierarchy on which the operation may be performed. ID may be based on GDT: SupplyNetworkPlanningAggregateHierarchyID.

Message Data Type SupplyNetworkPlanningAggregateHierarchyUndoExpandConfirmationMessage_sync Message data type SupplyNetworkPlanningAggregateHierarchyUndoExpandConfirmationMessage_sync includes the SupplyNetworkPlanningAggregateHierarchy included in the business document and Log information with detailed textual messages about the changes that were made or rejected. It includes the following packages: MessageHeader, SupplyNetworkPlanningAggregateHierarchy, and Log. SupplyNetworkPlanningAggregateHierarchy can include the ID element. ID is the unique identifier for a SupplyNetworkPlanningAggregateHierarchy. It is the ID of the SupplyNetworkPlanningAggregateHierarchy on which the operation has been performed, and it may be based on GDT: SupplyNetworkPlanningAggregateHierarchy.

Message Data Type SupplyNetworkPlanningAggregateHierarchyNavigationStepByIDQueryMessage_sync The Message data type SupplyNetworkPlanningAggregateHierarchyNavigationStepByIDQueryRequestMessage_sync includes SupplyNetworkPlanningAggregateHierarchyNavigationStep SelectionByID. It includes the MessageHeader package and the Selection package. The Selection package collects all the selection criteria for the SupplyNetworkPlanningAggregateHierarchy. It includes the SupplyNetworkPlanningAggregateHierarchyNavigationStepSelectionByID entity.

SupplyNetworkPlanningAggregateHierarchyNavigationStepSelectionByID includes the query elements to read the NavigationSteps of a SupplyNetworkPlanningAggregateHierarchy by its ID. ID is the unique identifier for a SupplyNetworkPlanningAggregateHierarchy. It is the ID of the SupplyNetworkPlanningAggregateHierarchy on which the operation may be performed, and it may be based on GDT: SupplyNetworkPlanningAggregateHierarchyID.

Message Data Type SupplyNetworkPlanningAggregateHierarchyNavigationStepByIDResponseMessage_sync The Message data type SupplyNetworkPlanningAggregateHierarchyValidNavigationStepDetermineConfirmation_sync includes the SupplyNetworkPlanningAggregateHierarchy included in the business document. It includes the following packages: MessageHeader, SupplyNetworkPlanningAggregateHierarchy, and Log. SupplyNetworkPlanningAggregateHierarchy can include the ID element. ID is the unique identifier for a SupplyNetworkPlanningAggregateHierarchy. It is the ID of the SupplyNetworkPlanningAggregateHierarchy on which the operation has been performed, and it may be based on GDT: SupplyNetworkPlanningAggregateHierarchyID. NavigationStep represents an executable action on a SupplyNetworkPlanningAggregateHierarchy. Such an action navigates from one or more AggregateInstances to one or more other related AggregateInstances by replacing them in the hierarchy. NavigationStep can include the ID, SupplyNetworkPlanningAggregateHierarchyActionStepTypeCode, and SupplyNetworkPlanCharacteristicID elements.

ID is the unique identifier for a SupplyNetworkPlanningAggregateHierarchyNavigationStep. In this context it identifies an executable NavigationStep, and it may be based on GDT: SupplyNetworkPlanningAggregateHierarchyNavigationStepID. SupplyNetworkPlanningAggregateHierarchyActionStepTypeCode is the coded representation of the type of a SupplyNetworkPlanningAggregateHierarchyNavigationStep or SupplyNetworkPlanningAggregateHierarchyExpandStep. In this context it describes the type of an executable NavigationStep, and it may be based on GDT: SupplyNetworkPlanningAggregateHierarchyActionStepTypeCode. SupplyNetworkPlanCharacteristicID is the unique identifier for a Characteristic used in a SupplyNetworkPlanConfiguration. It describes the resulting Characteristic of an executable NavigationStep, and may be based on GDT: SupplyNetworkPlanCharacteristicID. In some implementations, the combination of SupplyNetworkPlanningAggregateHierarchyActionStepTypeCode and SupplyNetworkPlanCharacteristicID defines the result of a SupplyNetworkPlanningAggregateHierarchyNavigationStep or SupplyNetworkPlanningAggregateHierarchyExpandStep. A user determines the valid combinations during configuration.

Message Data Type SupplyNetworkPlanningAggregateHierarchyNavigateRequestMessage_sync The Message data type SupplyNetworkPlanningAggregateHierarchyNavigateRequestMessage_sync includes the SupplyNetworkPlanningAggregateHierarchy included in the business document. It includes the following packages: MessageHeader and SupplyNetworkPlanningAggregateHierarchy. SupplyNetworkPlanningAggregateHierarchy can include the ID element. ID is the unique identifier for a SupplyNetworkPlanningAggregateHierarchy. It is the ID of the SupplyNetworkPlanningAggregateHierarchy on which the operation may be performed, and it may be based on GDT: SupplyNetworkPlanningAggregateHierarchyID. NavigationStep represents the action to be executed on a SupplyNetworkPlanningAggregateHierarchy. Such an action navigates from one or more AggregateInstances to one or more other related AggregateInstances by replacing them in the hierarchy.

NavigationStep can include the ID element. ID is the unique identifier for a SupplyNetworkPlanningAggregateHierarchyNavigationStep. In this context it identifies the NavigationStep to be executed, and it may be based on GDT: SupplyNetworkPlanningAggregateHierarchyNavigationStepID. In some implementations, the executable NavigationSteps are retrieved previously using SupplyNetworkPlanningAggregateHierarchyNavigationStepByIDResponse_sync.

Message Data Type SupplyNetworkPlanningAggregateHierarchyNavigateConfirmationMessage_sync The Message data type SupplyNetworkPlanningAggregateHierarchyNavigateConfirmationMessage_sync includes the SupplyNetworkPlanningAggregateHierarchy included in the business document and Log information with detailed textual messages about the changes that were made or rejected. It includes the following packages: MessageHeader, SupplyNetworkPlanningAggregateHierarchy, and Log. SupplyNetworkPlanningAggregateHierarchy can include the ID element. ID is the unique identifier for a SupplyNetworkPlanningAggregateHierarchy. It is the ID of the SupplyNetworkPlanningAggregateHierarchy on which the operation has been performed, and it may be based on GDT: SupplyNetworkPlanningAggregateHierarchyID.

Message Data Type SupplyNetworkPlanningAggregateHierarchyUndoNavigateRequestMessage_sync The Message data type SupplyNetworkPlanningAggregateHierarchyNavigateRequestMessage_sync includes the SupplyNetworkPlanningAggregateHierarchy included in the business document. It includes the following packages: MessageHeader and SupplyNetworkPlanningAggregateHierarchy. SupplyNetworkPlanningAggregateHierarchy can include the ID element. ID is the unique identifier for a SupplyNetworkPlanningAggregateHierarchy. It is the ID of the SupplyNetworkPlanningAggregateHierarchy on which the operation may be performed, and it may be based on GDT: SupplyNetworkPlanningAggregateHierarchyID.

Message Data Type SupplyNetworkPlanningAggregateHierarchyUndoNavigateConfirmationMessage_sync The Message data type SupplyNetworkPlanningAggregateHierarchyUndoNavigateConfirmationMessage_sync includes the SupplyNetworkPlanningAggregateHierarchy included in the business document and Log information with detailed textual messages about the changes that were made or rejected. It includes the following packages: MessageHeader, SupplyNetworkPlanningAggregateHierarchy, and Log. SupplyNetworkPlanningAggregateHierarchy can include the ID element. ID is the unique identifier for a SupplyNetworkPlanningAggregateHierarchy. It is the ID of the SupplyNetworkPlanningAggregateHierarchy on which the operation has been performed, and it may be based on GDT: SupplyNetworkPlanningAggregateHierarchyID.

A number of implementations have been described. Nevertheless, it will be understood that various modifications may be made without departing from the spirit and scope of the disclosure. For example, processing can mean creating, updating, deleting, or some other massaging of information. Accordingly, other implementations are within the scope of the following claims.

What is claimed is:

1. A computer program product for providing a message-based interface for supply network planning-related requests, the supply network planning-related requests comprising requests associated with managing a long- or mid-term production or distribution plan, the computer program product comprising computer readable instructions embodied on tangible, non-transitory media and operable when executed to:

receive via a first message-based interface derived from a common business object model, where the common business object model includes business objects having relationships that enable derivation of message-based interfaces and message packages, the first message-based interface exposing at least one service as defined in a service registry and from a heterogeneous application executing in an environment of computer systems providing message-based services, a first message for requesting creation of a new supply network plan that includes a first message package derived from the common business object model and hierarchically organized in memory as:

a supply network plan create request message entity; and a supply network plan package comprising a supply network plan entity, where the supply network plan entity includes a supply network plan configuration ID;

process the first message according to the hierarchical organization of the first message package, where processing the first message includes unpacking the first message package based on the common business object model; and send a second message to the heterogeneous application responsive to the first message, where the second message includes a second message package derived from the common business object model to provide consistent semantics with the first message package.

2. The computer program product of claim 1 wherein the second message includes a second message confirming the request to create the new supply network plan, the second message including a second message package hierarchically organized in memory as:

a supply network plan create confirmation message entity;

a supply network plan package and a log package, the supply network plan package comprising a supply network plan entity, the supply network plan entity including an ID, and the log package comprising a log entity.

3. The computer program product of claim 1, wherein the derived message-based interfaces further include a supply network plan configuration interface and a supply network planning aggregate hierarchy interface.

4. A distributed system operating in a landscape of computer systems providing message-based services defined in a service registry, the system comprising:

a graphical user interface comprising computer readable instructions, embedded on tangible media, for communicating information associated with managing a long- or mid-term production or distribution plan using a request;

a first memory storing a user interface controller for processing the request and involving a message including a message package derived from a common business object model, where the common business object model includes business objects having relationships that enable derivation of message-based service interfaces and message packages, the message package hierarchically organized as:

a supply network plan create request message entity; and a supply network plan package comprising a supply network plan entity, where the supply network plan entity includes a supply network plan configuration ID; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the message package based on the common business object model.

5. The distributed system of claim 4, wherein the first memory is remote from the graphical user interface.

6. The distributed system of claim 4, wherein the first memory is remote from the second memory.

7. A computer program product for providing a message-based interface for supply network planning-related requests, the supply network planning-related requests comprising requests associated with managing a long- or mid-term production or distribution plan, the computer program product comprising computer readable instructions embodied on tangible, non-transitory media and operable when executed to:

receive via a message-based interface derived from a common business object model, where the common business object model includes business objects having relationships that enable derivation of message-based interfaces and message packages, the first message-based interface exposing at least one service as defined in a service registry and from a heterogeneous application executing in an environment of computer systems providing message-based services, a first message for querying supply network plans by details, the first message including a first message package derived from the common business object model and hierarchically organized in memory as:

a supply network plan key figure value by elements query message entity; and a selection package comprising a supply network plan key figure value selection by elements entity, where the supply network plan key figure value selection by elements entity includes a selection by ID, a selection by supply network planning aggregate hierarchy ID, at least one selection by key figure ID, and at least one selection by time series period ID, where each selection by key figure ID includes an interval boundary type code;

process the first message according to the hierarchical organization of the first message package, where processing the first message includes unpacking the first message package based on the common business object model; and send a second message to the heterogeneous application responsive to the first message, where the second message includes a second message package derived from the common business object model to provide consistent semantics with the first message package.

8. The computer program product of claim 5, wherein the second message includes a second message responsive to the query of the supply network plans by detail, the second message package including a second message hierarchically organized in memory as:

a supply network plan key figure value by elements response message entity; and a supply network plan package and a log package, where the supply network plan package comprises a supply network plan entity and a key figure value package, where the supply network plan entity includes an ID, and where the key figure value package includes at least one key figure value entity, each key figure value entity including a supply network plan key figure ID, a time series period ID, a supply network planning aggregate hierarchy aggregate instance ID, and a float value, and where the log package comprises a log entity.

9. A distributed system operating in a landscape of computer systems providing message-based services defined in a service registry, the system comprising:

a graphical user interface comprising computer readable instructions, embedded on tangible media, for communicating information associated with querying a set of supply network plans associated with long- or mid-term production or distribution plans using a request;

a first memory storing a user interface controller for processing the request and involving a message package derived from a common business object model, where the common business object model includes business objects having relationships that enable derivation of message-based service interfaces and message packages, the message package hierarchically organized as:

a supply network plan key figure value by elements query message entity; and a selection package comprising a supply network plan key figure value selection by elements entity, where the supply network plan key figure value selection by elements entity includes a selection by ID, a selection by supply network planning aggregate hierarchy ID, at least one selection by key figure ID, and at least one selection by time series period ID, where each selection by key figure ID includes an interval boundary type code; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the message package based on the common business object model.

10. The distributed system of claim 7, wherein the first memory is remote from the graphical user interface.

11. The distributed system of claim 7, wherein the first memory is remote from the second memory.

* * * * *